US012759905B2

(12) United States Patent
Ishikawa et al.

(10) Patent No.: US 12,759,905 B2
(45) Date of Patent: Oct. 13, 2026

(54) WATER SOFTENING DEVICE, RECYCLING METHOD FOR WATER SOFTENING DEVICE, AND METHOD FOR CLEANING WATER SOFTENING DEVICE

(71) Applicant: Panasonic Intellectual Property Management Co., Ltd., Osaka (JP)

(72) Inventors: Hiroki Ishikawa, Aichi (JP); Ayaka Nagata, Aichi (JP); Risako Koike, Aichi (JP); Yui Matsumoto, Aichi (JP); Hiroki Murase, Aichi (JP); Minato Kato, Aichi (JP); Yohsuke Hamada, Aichi (JP); Yuko Maruo, Osaka (JP); Hiroshi Yano, Osaka (JP); Yoshihiro Sakaguchi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 432 days.

(21) Appl. No.: 18/254,114

(22) PCT Filed: Nov. 10, 2021

(86) PCT No.: PCT/JP2021/041342

§ 371 (c)(1),
(2) Date: May 23, 2023

(87) PCT Pub. No.: WO2022/113741

PCT Pub. Date: Jun. 2, 2022

(65) Prior Publication Data

US 2024/0002263 A1 Jan. 4, 2024

(30) Foreign Application Priority Data

Nov. 30, 2020 (JP) ................................ 2020-197827
Dec. 16, 2020 (JP) ................................ 2020-208080
(Continued)

(51) Int. Cl.
*C02F 1/42* (2023.01)
*B01J 39/07* (2017.01)
(Continued)

(52) U.S. Cl.
CPC ................ *C02F 1/42* (2013.01); *B01J 39/07* (2017.01); *B01J 39/18* (2013.01); *B01J 41/07* (2017.01);
(Continued)

(58) Field of Classification Search
CPC .......... C02F 1/42; C02F 1/008; C02F 1/4618; C02F 2001/422; C02F 2001/425;
(Continued)

(56) References Cited

U.S. PATENT DOCUMENTS 5,863,438 A * 1/1999 Katzakian, Jr. .......... B01J 39/07 210/685
10,343,155 B1 7/2019 Maltbie
(Continued)

FOREIGN PATENT DOCUMENTS

EP 1110914 A2 6/2001
JP 2-169090 A 6/1990
(Continued)

OTHER PUBLICATIONS

Translation of Yamamoto (JP_05253568_A) (Year: 1993).*
(Continued)

*Primary Examiner* — Ekandra S. Miller-Cruz
(74) *Attorney, Agent, or Firm* — Rimon P.C.

(57) ABSTRACT

Water softening device includes water softening tank and neutralizing tank. Water softening tank softens raw water containing a hardness component by weakly acidic cation exchange resin. Water softening tank includes first water softening tank and second water softening tank. Neutralizing tank neutralizes the pH of softened water that has passed
(Continued)

through water softening tank by weakly basic anion exchange resin. Neutralizing tank includes first neutralizing tank and second neutralizing tank. Water softening device is configured to cause raw water containing a hardness component to flow through first water softening tank, first neutralizing tank, second water softening tank, and second neutralizing tank in this order.

4 Claims, 41 Drawing Sheets

(30) Foreign Application Priority Data

Jan. 29, 2021 (JP) ................................ 2021-012565
Feb. 22, 2021 (JP) ................................ 2021-025793
Feb. 25, 2021 (JP) ................................ 2021-028339

(51) Int. Cl.

*B01J 39/18* (2017.01)
*B01J 41/07* (2017.01)
*B01J 41/12* (2017.01)
*B01J 47/028* (2017.01)
*B01J 47/14* (2017.01)
*B01J 49/06* (2017.01)
*B01J 49/07* (2017.01)
*B01J 49/08* (2017.01)
*B01J 49/53* (2017.01)
*B01J 49/57* (2017.01)
*B01J 49/75* (2017.01)
*B01J 49/85* (2017.01)
*C02F 1/00* (2023.01)
*C02F 1/461* (2023.01)

(52) U.S. Cl.

CPC ............. *B01J 41/12* (2013.01); *B01J 47/028* (2013.01); *B01J 47/14* (2013.01); *B01J 49/06* (2017.01); *B01J 49/07* (2017.01); *B01J 49/08* (2017.01); *B01J 49/53* (2017.01); *B01J 49/57* (2017.01); *B01J 49/75* (2017.01); *B01J 49/85* (2017.01); *C02F 1/008* (2013.01); *C02F 1/4618* (2013.01); *C02F 2001/422* (2013.01); *C02F 2001/425* (2013.01); *C02F 2201/4613* (2013.01); *C02F 2201/46145* (2013.01); *C02F 2209/42* (2013.01); *C02F 2301/043* (2013.01); *C02F 2301/08* (2013.01); *C02F 2303/14* (2013.01); *C02F 2303/16* (2013.01)

(58) Field of Classification Search

CPC .... C02F 2201/4613; C02F 2201/46145; C02F 2209/42; C02F 2301/043; C02F 2301/08; C02F 2303/14; C02F 2303/16; C02F 1/66; C02F 2001/46185; B01J 39/07; B01J 39/18; B01J 41/07; B01J 41/12; B01J 47/028; B01J 47/14; B01J 49/06; B01J 49/07; B01J 49/08; B01J 49/53; B01J 49/57; B01J 49/75; B01J 49/85; B01J 47/026

USPC ........................................................ 210/677

See application file for complete search history.

(56) References Cited

U.S. PATENT DOCUMENTS

| | | | |
|---|---|---|---|
| 2006/0216217 | A1 | 9/2006 | Chan et al. |
| 2010/0301882 | A1 | 12/2010 | Söcknick et al. |
| 2012/0103025 | A1 | 5/2012 | Nambu et al. |
| 2015/0274545 | A1 | 10/2015 | Lim et al. |
| 2019/0232273 | A1 | 8/2019 | Maltbie |
| 2019/0263691 | A1 | 8/2019 | Karren et al. |
| 2022/0274100 | A1 | 9/2022 | Mukai et al. |

FOREIGN PATENT DOCUMENTS

| | | | |
|---|---|---|---|
| JP | H03-046836 | Y2 | 10/1991 |
| JP | H05-253568 | A | 10/1993 |
| JP | H06-134457 | A | 5/1994 |
| JP | 2000-288538 | A | 10/2000 |
| JP | 2001-170628 | A | 6/2001 |
| JP | 2003-220386 | A | 8/2003 |
| JP | 2003-302389 | A | 10/2003 |
| JP | 2004-195288 | A | 7/2004 |
| JP | 2005-334798 | A | 12/2005 |
| JP | 2006-043549 | A | 2/2006 |
| JP | 2009-165954 | A | 7/2009 |
| JP | 2009-165955 | A | 7/2009 |
| JP | 2010-142674 | A | 7/2010 |
| JP | 2010-194453 | A | 9/2010 |
| JP | 2011-030973 | A | 2/2011 |
| JP | 2011-505243 | A | 2/2011 |
| JP | 2012-030208 | A | 2/2012 |
| JP | 2013-121920 | A | 6/2013 |
| JP | 2019-162607 | A | 9/2019 |
| JP | 2020-182899 | A | 11/2020 |

OTHER PUBLICATIONS

Translation of Tsukamoto (JP_2001170628_A) (Year: 2001).*
The EPC Office Action dated Mar. 21, 2024 for the related European Patent Application No. 21897715.5.
International Search Report issued on Dec. 28, 2021 in International Patent Application No. PCT/JP2021/041342, with English translation.
Extended European Search Report dated Nov. 23, 2023 issued in European Patent Application No. 21872288.2.
International Search Report issued in International Patent Application No. PCT/JP2021/033933, mailed on Nov. 2, 2021.
Non-Final Office Action received in U.S. Appl. No. 18/021,494, dated Jun. 27, 2025.
Final Office Action received in U.S. Appl. No. 18/021,494, dated Oct. 16, 2025.
English Translation of Chinese Office Action dated Apr. 2, 2026 for the related Chinese Patent Application No. 202180079483.7.
Non-Final Office Action received in U.S. Appl. No. 18/021,494, dated Jun. 5, 2026.
English Translation of Chinese Office Action dated Jul. 24, 2026 for the related Chinese Patent Application No. 202180079483.7.

* cited by examiner

FIG. 3

| | IN WATER SOFTENING | IN WATER INJECTION | IN REGENERATION | IN DRAINING |
|---|---|---|---|---|
| ON-OFF VALVE 41 | ON | ON | | |
| ON-OFF VALVE 42 | ON | | | |
| ON-OFF VALVE 43 | ON | | | |
| ON-OFF VALVE 44 | ON | | | |
| ON-OFF VALVE 45 | ON | | | |
| ON-OFF VALVE 51 | | ON | ON | ON |
| ON-OFF VALVE 52 | | | ON | ON |
| ON-OFF VALVE 53 | | | ON | ON |
| ON-OFF VALVE 54 | | | ON | ON |
| ON-OFF VALVE 55 | | | ON | ON |
| ON-OFF VALVE 56 | | | ON | ON |
| ON-OFF VALVE 61 | | | ON | ON |
| ON-OFF VALVE 62 | | | | ON |
| ELECTRODE | | | ON | |
| WATER PUMP | | | ON | |

FIG. 15

| | IN FIRST WATER SOFTENING TREATMENT | IN FIRST WATER STORAGE TREATMENT | IN FIRST REGENERATION TREATMENT | IN SECOND WATER SOFTENING TREATMENT | IN SECOND WATER STORAGE TREATMENT | IN SECOND REGENERATION TREATMENT | IN THIRD WATER SOFTENING TREATMENT | IN THIRD WATER STORAGE TREATMENT | IN THIRD REGENERATION TREATMENT | IN DRAINAGE TREATMENT |
|---|---|---|---|---|---|---|---|---|---|---|
| ON-OFF VALVE 1013 | | ON | | | | | ON | | | |
| ON-OFF VALVE 1014 | | | | ON | | | | ON | | |
| SELECTION VALVE 1015 | 1053→1055 | | | | 1053→1055 | 1054→1055 | 1054→1055 | | | |
| SELECTION VALVE 1016 | 1055→1056 | | | | 1055→1056 | 1076→1056 | 1055→1056 | | | |
| SELECTION VALVE 1017 | 1056→1057 | | | | 1056→1057 | 1056→1077 | 1056→1057 | | | |
| SELECTION VALVE 1018 | 1057→1058 | | | | 1057→1058 | 1078→1058 | 1057→1058 | | | |
| SELECTION VALVE 1019 | 1059→1060 | | | 1059→1060 | | | 1059→1061 | | | |
| SELECTION VALVE 1020 | 1058→1059 | | | | 1058→1079 | 1058→1079 | 1058→1059 | | | |
| SELECTION VALVE 1021 | 1060→1063 | | | 1052→1063 | | | | 1052→1063 | | |
| SELECTION VALVE 1022 | 1063→1064 | | | 1063→1064 | | | | 1063→1064 | 1080→1064 | |
| SELECTION VALVE 1023 | 1064→1065 | | | 1064→1065 | | | | 1064→1065 | 1064→1081 | |
| SELECTION VALVE 1024 | 1065→1066 | | | 1065→1066 | | | | 1065→1066 | 1082→1066 | |
| SELECTION VALVE 1025 | 1067→1069 | | | 1067→1068 | | | | | | |
| SELECTION VALVE 1026 | 1066→1067 | | | 1066→1067 | | | | 1066→1083 | 1066→1083 | |
| SELECTION VALVE 1027 | | 1050→1070 | | 1068→1070 | | | 1050→1070 | | | |
| SELECTION VALVE 1028 | | 1070→1071 | 1084→1071 | 1070→1071 | | | 1070→1071 | | | |
| SELECTION VALVE 1029 | | 1071→1072 | 1071→1085 | 1071→1072 | | | 1071→1072 | | | |
| SELECTION VALVE 1030 | | 1072→1073 | 1086→1073 | 1072→1073 | | | 1072→1073 | | | |
| SELECTION VALVE 1031 | 1074→1054 | | | 1074→1075 | | | 1074→1054 | | | |
| SELECTION VALVE 1032 | | 1073→1087 | | 1073→1074 | | | 1073→1074 | | | |
| SELECTION VALVE 1033 | | | 1088→1094 | | | 1088→1076 | | | 1088→1094 | |
| SELECTION VALVE 1034 | | | 1090→1088 | | | 1090→1088 | | | 1090→1088 | 1090→1089 |
| SELECTION VALVE 1035 | | | 1094→1084 | | | | | | 1094→1080 | |
| SELECTION VALVE 1036 | | | 1092→1093 | | | 1092→1078 | | | 1092→1093 | |
| SELECTION VALVE 1037 | | | 1091→1092 | | | 1091→1092 | | | 1091→1092 | 1091→1096 |
| SELECTION VALVE 1038 | | | 1093→1086 | | | | | | 1093→1082 | |
| ELECTRODE | | | ON | | | ON | | | ON | |
| WATER PUMP | | | ON | | | ON | | | ON | ON |

FIG. 21

| | SELECTION VALVE 2017 | SELECTION VALVE 2019 | ON-OFF VALVE 2027 | ON-OFF VALVE 2028 | ON-OFF VALVE 2029 | ON-OFF VALVE 2030 | ON-OFF VALVE 2031 | ON-OFF VALVE 2032 | ON-OFF VALVE 2033 | ON-OFF VALVE 2034 | ELECTRODE | WATER PUMP |
|---|---|---|---|---|---|---|---|---|---|---|---|---|
| IN WATER SOFTENING | | | | | | | ON | ON | ON | | | |
| IN WATER INJECTION | | | | ON | | | ON | | | | | |
| IN REGENERATION | TO 2003 | TO 2004 | ON | ON | ON | ON | | | | ON | ON | ON |
| IN WASHING | TO 2016 | TO 2018 | | | | ON | ON | ON | | ON | ON (POLARITY INVERSION) | ON |
| IN DRAINING | TO 2016 | TO 2018 | | | | ON | | | | ON | | ON |

FIG. 27

| | ON-OFF VALVE 3031 | ON-OFF VALVE 3032 | ON-OFF VALVE 3034 | ON-OFF VALVE 3035 | ON-OFF VALVE 3036 | ON-OFF VALVE 3037 | ON-OFF VALVE 3038 | ON-OFF VALVE 3039 | SELECTION VALVE 3040 | ON-OFF VALVE 3041 | ELECTRODE | WATER PUMP |
|---|---|---|---|---|---|---|---|---|---|---|---|---|
| IN WATER INJECTION | ON | | | | ON | | | | | | | |
| IN REGENERATION | | | | ON | ON | ON | ON | ON | TO 3004 | | ON | ON |
| IN WASHING OF SEPARATION PART | ON | | | | | | | | TO 3016 | ON | | |
| IN DRAINING | | | | ON | ON | ON | ON | ON | TO 3016 | | | ON |
| IN WATER SOFTENING | ON | ON | ON | | | | | | | | | |

FIG. 32

| | ON-OFF VALVE 3031 | ON-OFF VALVE 3032 | ON-OFF VALVE 3033 | ON-OFF VALVE 3034 | ON-OFF VALVE 3035 | ON-OFF VALVE 3036 | ON-OFF VALVE 3037 | ON-OFF VALVE 3038 | ON-OFF VALVE 3039 | ON-OFF VALVE 3042 | ON-OFF VALVE 3043 | ON-OFF VALVE 3044 | ELECTRODE | WATER PUMP |
|---|---|---|---|---|---|---|---|---|---|---|---|---|---|---|
| IN WATER INJECTION | ON | | | | | ON | | | | | | | | |
| IN REGENERATION | | | ON | | ON | ON | ON | ON | ON | ON | ON | | ON | ON |
| IN WASHING OF SEPARATION PART | ON | ON | | | | | ON | | | | ON | ON | | |
| IN DRAINING | | | ON | | ON | ON | ON | ON | ON | ON | ON | ON | | ON |
| IN WATER SOFTENING | ON | ON | ON | ON | | | | | | | | | | |

WATER SOFTENING DEVICE, RECYCLING METHOD FOR WATER SOFTENING DEVICE, AND METHOD FOR CLEANING WATER SOFTENING DEVICE

CROSS-REFERENCE OF RELATED APPLICATIONS

This application is the U.S. National Phase under 35 U.S.C. § 371 of International Patent Application No. PCT/JP2021/041342, filed on Nov. 10, 2021, which in turn claims the benefit of Japanese Patent Application No. 2020-208080, filed on Dec. 16, 2020, Japanese Patent Application No. 2020-197827, filed on Nov. 30, 2020, Japanese Patent Application No. 2021-028339, filed on Feb. 25, 2021, Japanese Patent Application No. 2021-025793, filed on Feb. 22, 2021, and Japanese Patent Application No. 2021-012565, filed on Jan. 29, 2021, the entire disclosures of which Applications are incorporated by reference herein.

TECHNICAL FIELD

The present disclosure relates to a water softening device for obtaining domestic water.

BACKGROUND ART

In a conventional water softening device using a weakly acidic cation exchange resin, a method for regenerating a cation exchange resin by acidic electrolytic water generated by electrolysis has been known (see, for example PTLs 1, 2) as a method for regenerating a cation exchange resin without using salt. The weakly acidic cation exchange resin has a proton at the terminal of the functional group, and softens raw water by exchanging calcium ions or magnesium ions in the raw water with hydrogen ions. Then, hydrogen ions in water softened by the weakly acidic cation exchange resin are neutralized by being adsorbed to the weakly basic anion exchange resin provided at the subsequent stage of the weakly acidic cation exchange resin. In a conventional water softening device, as a method for regenerating a weakly acidic cation exchange resin, a method for regenerating a weakly acidic cation exchange resin by acidic electrolytic water generated by electrolysis is known. In addition, as a method for regenerating a weakly basic anion exchange resin, a method for regenerating a weakly basic anion exchange resin by alkaline electrolytic water generated by electrolysis is known (see, for example, PTL 3).

CITATION LIST

Patent Literature

PTL 1: Unexamined Japanese Patent Publication No. 2011-30973
PTL 2: Unexamined Japanese Patent Publication No. 2009-165954
PTL 3: Unexamined Japanese Patent Publication No. 2010-142674

SUMMARY OF THE INVENTION

In the conventional water softening device, in the water softening treatment of hard water having a large amount of hardness components and water having a large proportion of permanent hardness in the hardness components, the water is strongly acidified before removing all the hardness components. Therefore, as a first problem, there is a problem that water softening performance is deteriorated while the water is flowing through the weakly acidic cation exchange resin even when a water softening treatment is performed using a large amount of weakly acidic cation exchange resin.

In addition, since the time for regenerating the weakly acidic cation exchange resin is determined by the hardness adsorption amount of the weakly acidic cation exchange resin, it is basically proportional to the amount of softened water used and the hardness of the raw water. During regeneration of the weakly acidic cation exchange resin, raw water does not pass through the weakly acidic cation exchange resin, and water with high hardness comes out of the tap. Therefore, reproduction is often performed at night when the possibility of using softened water is low. For this reason, as a second problem, in a region where the raw water has a high hardness, a regeneration time is long, and in a case where reproduction cannot be performed only at night, it is necessary to perform a regeneration treatment in a time zone in which softened water is desired to be used such as daytime, and there is a problem that a water softening treatment cannot be performed.

Further, in the conventional water softening device, in the regeneration treatment, a hardness component (for example, calcium ions and magnesium ions) released from the water softening tank may react with alkaline electrolytic water in the electrolyzer to generate a precipitate. Therefore, as a third problem, there is a problem that when the water softening treatment is resumed in a state where the precipitate flows into the neutralizing tank and accumulates in the neutralizing tank, the water softening performance is deteriorated.

Further, in the regeneration treatment, a hardness component (for example, calcium ions and magnesium ions) released from the water softening tank may react with the alkaline electrolytic water in the electrolyzer to generate a precipitate. When the water softening treatment is resumed in a state of where such precipitates flow into the neutralizing tank and accumulates in the neutralizing tank, there is a problem that the water softening performance is deteriorated. As a countermeasure, it is effective to provide a separation part that prevents inflow of precipitates into the neutralizing tank at the front stage of the neutralizing tank, but as a fourth problem, it is necessary to periodically perform a washing treatment for removing precipitates separated by the separation part.

Further, in the electrolysis of water for generating acidic electrolytic water and alkaline electrolytic water, cations as hardness components in water move to the cathode side. Therefore, the solid content (calcium hydroxide or magnesium hydroxide) derived from the hardness component tends to increase in alkaline electrolytic water generated on the cathode side. When the weakly basic anion exchange resin is regenerated using alkaline electrolytic water containing such a solid content, the solid content is adsorbed to the weakly basic anion exchange resin. Therefore, as a fifth problem, in the water softening treatment after the regeneration treatment, the hardness component adsorbed to the weakly basic anion exchange resin is dissolved in the acidic softened water, so that the hardness of the softened water to be generated tends to increase, and there is a problem that the water softening ability is deteriorated.

The conventional water softening device is required to solve at least one of the first to fifth problems described above.

Therefore, an object of the present disclosure is to provide a water softening device capable of suppressing deterioration in water softening performance.

As a water softening device corresponding to the first problem, the water softening device according to the present disclosure includes a water softening tank and a neutralizing tank. The water softening tank softens raw water containing a hardness component by a weakly acidic cation exchange resin. The neutralizing tank neutralizes the pH of softened water that has passed through the water softening tank by a weakly basic anion exchange resin. The water softening tank includes a first water softening tank and a second water softening tank. The neutralizing tank includes a first neutralizing tank and a second neutralizing tank. The water softening device is configured such that the raw water flows through the first water softening tank, the first neutralizing tank, the second water softening tank, and the second neutralizing tank in this order. As a result, the above structure can achieve the intended object.

In addition, as a water softening device corresponding to the second problem, a water softening device according to the present disclosure includes three or more water softening portions each including a water softening tank for softening raw water containing a hardness component by a weakly acidic cation exchange resin and a neutralizing tank for neutralizing softened water having passed through the water softening tank by a weakly basic anion exchange resin, and an electrolyzer for generating acidic electrolytic water for regenerating the weakly acidic cation exchange resin in the water softening tank and alkaline electrolytic water for regenerating the weakly basic anion exchange resin in the neutralizing tank. The three or more water softening portions include a water softening treatment portion that performs a water softening treatment of raw water by connecting two or more water softening portions in series and a regeneration treatment portion that performs a regeneration treatment of the water softening portion using acidic electrolytic water and alkaline electrolytic water fed from the electrolyzer during a period in which the water softening treatment is performed. As a result, the above structure can achieve the intended object.

Further, as a water softening device corresponding to the third problem, the water softening device according to the present disclosure includes a water softening tank, a neutralizing tank, an electrolyzer, a water storage tank, and a separation part. The water softening tank softens raw water containing a hardness component by a weakly acidic cation exchange resin. The neutralizing tank neutralizes the pH of softened water that has passed through the water softening tank by a weakly basic anion exchange resin. The electrolyzer produces acidic electrolytic water for regenerating the weakly acidic cation exchange resin in the water softening tank and alkaline electrolytic water for regenerating the weakly basic anion exchange resin in the neutralizing tank. The water storage tank mixes the acidic electrolytic water having flowed through the water softening tank and the alkaline electrolytic water having flowed through the neutralizing tank to generate mixture, and supplies the mixture to the electrolyzer. The separation part is provided in a channel communicating the electrolyzer and the neutralizing tank, and separates a precipitate caused by a hardness component contained in water introduced into the electrolyzer. As a result, the above structure can achieve the intended object.

Further, as a water softening device corresponding to the fourth problem, the water softening device according to the present disclosure includes a water softening tank, a neutralizing tank, an electrolyzer, and a separation part. The water softening tank softens raw water containing a hardness component by a weakly acidic cation exchange resin. The neutralizing tank neutralizes the pH of softened water that has passed through the water softening tank by a weakly basic anion exchange resin. The electrolyzer produces acidic electrolytic water for regenerating the weakly acidic cation exchange resin in the water softening tank and alkaline electrolytic water for regenerating the weakly basic anion exchange resin in the neutralizing tank. The separation part is provided in a channel communicating the electrolyzer and the neutralizing tank, and separates a precipitate caused by a hardness component contained in water introduced into the electrolyzer. Then, after the water softening tank and the neutralizing tank are regenerated, the water softening device performs a separation part washing treatment of flowing acidic softened water having flowed through the water softening tank to the separation part and discharging the acidic softened water to the outside of the device. As a result, the above structure can achieve the intended object.

Further, as a water softening device corresponding to the fifth problem, the water softening device according to the present disclosure includes a water softening tank, a neutralizing tank, an electrolyzer, a first channel, a second channel, a tank, a third channel, a fourth channel, and a fifth channel. The water softening tank softens raw water containing a hardness component by a weakly acidic cation exchange resin. In the neutralizing tank, acidic softened water obtained in the water softening tank is neutralized by a weakly basic anion exchange resin. The electrolyzer generates acidic electrolytic water and alkaline electrolytic water. The first channel guides the acidic electrolytic water or the alkaline electrolytic water generated in the electrolyzer to the water softening tank. The second channel guides the acidic electrolytic water or the alkaline electrolytic water generated in the electrolyzer to the neutralizing tank. The tank stores the acidic electrolytic water and the alkaline electrolytic water used for regenerating the weakly acidic cation exchange resin and the weakly basic anion exchange resin. The third channel connects the water softening tank and the tank. The fourth channel connects the neutralizing tank and the tank. The fifth channel connects the electrolyzer and the tank. In the water softening device, the channel of water is set such that the acidic electrolytic water generated in the electrolyzer passes through the water softening tank via the first channel when the weakly acidic cation exchange resin is regenerated, and the alkaline electrolytic water generated in the electrolyzer passes through the neutralizing tank via the second channel when the weakly basic anion exchange resin is regenerated, and the water softening device has at least one of the following configuration (1) and the following configuration (2).

Configuration (1): Solid Separation Filter Positioned in the Middle of the Second Channel Configuration (2): First switch valve for switching between a first bypass channel for guiding water discharged from an electrolyzer to a tank from the middle of a second channel without passing through a neutralizing tank, and a channel to the first bypass channel and a channel to the neutralizing tank provided in the second channel The above structure can achieve the intended object.

The water softening device according to the present disclosure can provide a water softening device capable of efficiently performing a regeneration treatment of a weakly acidic cation exchange resin by acidic electrolytic water generated by electrolysis or a regeneration treatment of a weakly basic anion exchange resin by alkaline electrolytic water generated by electrolysis.

BRIEF DESCRIPTION OF THE DRAWINGS

FIG. 3 is a diagram illustrating a state of the water softening device in operation.

FIG. 15 is a diagram illustrating a state of a water softening device in operation.

FIG. 21 is a diagram illustrating a state of the water softening device in operation.

FIG. 27 is a diagram illustrating a state of the water softening device in operation according to the fourth exemplary embodiment-1.

FIG. 32 is a diagram illustrating a state of the water softening device in operation according to the fourth exemplary embodiment-3.

DESCRIPTION OF EMBODIMENT

First Exemplary Embodiment

Figure 1:
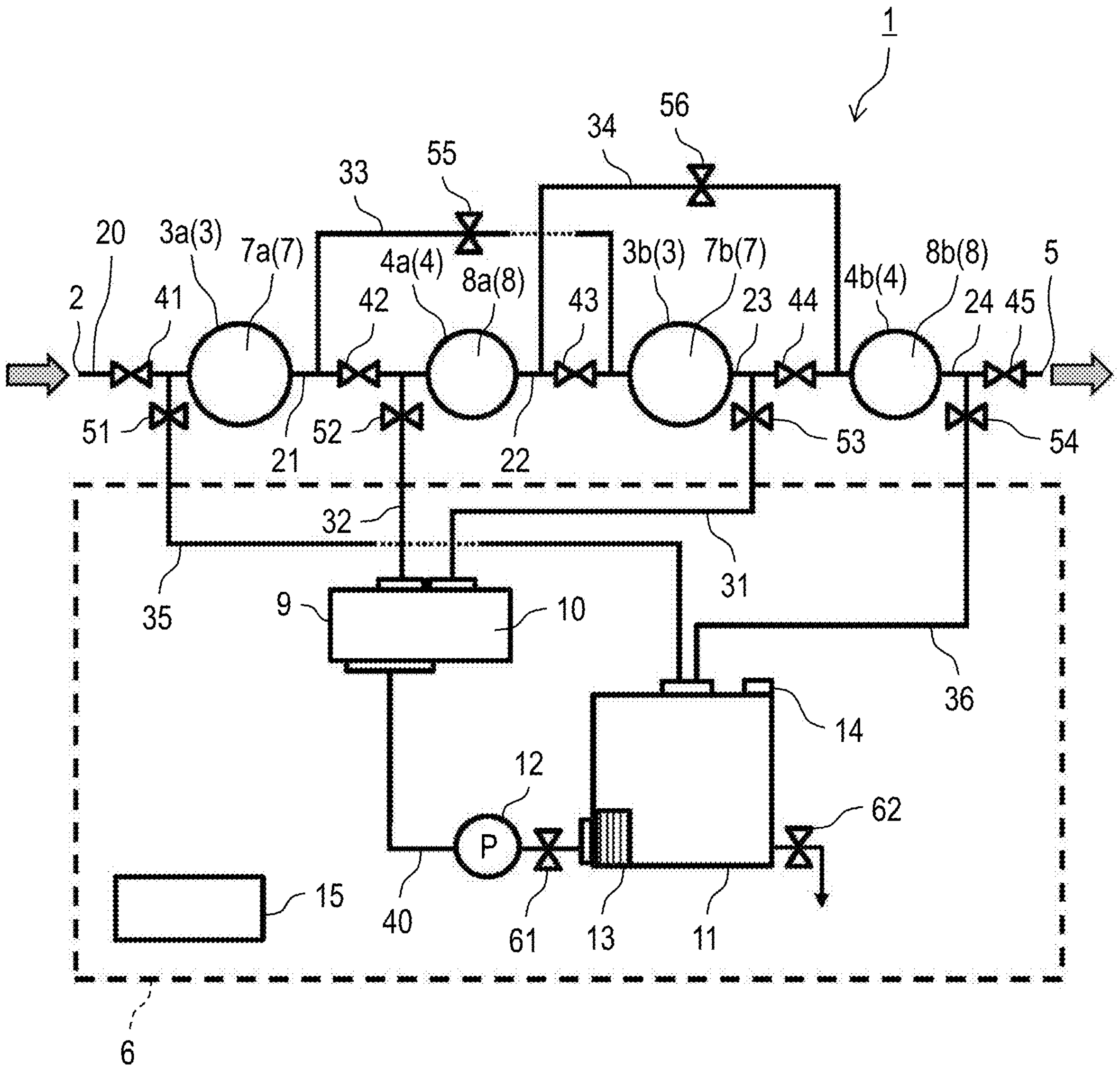
FIG. 1 is a conceptual diagram illustrating a configuration of a water softening device according to a first exemplary embodiment of the present disclosure.

A water softening device according to the present disclosure includes a water softening tank and a neutralizing tank. The water softening tank softens raw water containing a hardness component by a weakly acidic cation exchange resin. The neutralizing tank neutralizes the pH of softened water that has passed through the water softening tank by a weakly basic anion exchange resin. The water softening tank includes a first water softening tank and a second water softening tank. The neutralizing tank includes a first neutralizing tank and a second neutralizing tank. The water softening device is configured such that the raw water flows through the first water softening tank, the first neutralizing tank, the second water softening tank, and the second neutralizing tank in this order.

According to such a configuration, the raw water containing the hardness component flows out of the first water softening tank before the pH of the raw water is lowered by the water softening treatment in the first water softening tank, is neutralized in the first neutralizing tank, and is softened in the second water softening tank. Therefore, as compared with the case where each of the water softening tank and the neutralizing tank is constituted by a single body as in the conventional water softening device, it is possible to suppress a decrease in pH of water flowing in the water softening tank, that is, acidification, and thus exchange between the hardness component and hydrogen ions held by the weakly acidic cation exchange resin in the water softening tank (particularly, the second water softening tank) easily occurs. Therefore, the water softening performance can be improved as compared with the conventional water softening device.

In addition, the water softening device according to the present disclosure may further include an electrolyzer that generates acidic electrolytic water for regenerating the weakly acidic cation exchange resin in the water softening tank and alkaline electrolytic water for regenerating the weakly basic anion exchange resin in the neutralizing tank, and a treatment tank that mixes the acidic electrolytic water having flowed through the water softening tank and the alkaline electrolytic water having flowed through the neutralizing tank to generate mixture, and supplies the mixture to the electrolyzer. According to such a configuration, the weakly acidic cation exchange resin can be regenerated by the acidic electrolytic water generated in the electrolyzer, and the weakly basic anion exchange resin can be regenerated by the alkaline electrolytic water. Therefore, the maintenance frequency of the water softening device can be reduced, and the water softening device can be used for a long period of time.

Further, in the water softening device according to the present disclosure, it is preferable that the acidic electrolytic water fed from the electrolyzer circulates through the second water softening tank and then circulates through the first water softening tank during the regeneration treatment for regenerating the weakly acidic cation exchange resin. Thus, during the regeneration treatment, the acidic electrolytic water fed from the electrolyzer flows into the second water softening tank having a smaller adsorption amount of the hardness component than that of the first water softening tank, and the acidic electrolytic water containing the hardness component is fed from the second water softening tank to the first water softening tank. In the regeneration of the weakly acidic cation exchange resin in the second water softening tank, since the consumption of hydrogen ions in the acidic electrolytic water is small, that is, the reduction in the hydrogen ion concentration can be suppressed as compared with the regeneration of the first water softening tank, the acidic electrolytic water containing a large amount of hydrogen ions can be prevented from flowing into the first water softening tank, and the hardness component can be prevented from being re-adsorbed in the first water softening tank. Therefore, it is possible to suppress a decrease in the regeneration treatment efficiency and to shorten the regeneration time.

Further, in the water softening device according to the present disclosure, it is preferable that the acidic electrolytic water is introduced into the first water softening tank and the second water softening tank from the downstream side of the first water softening tank and the second water softening tank during the regeneration treatment. Accordingly, during the regeneration treatment, the acidic electrolytic water fed from the electrolyzer flows in from the downstream side where the adsorption amount of the hardness component is smaller in each water softening tank, and the water softening tank is regenerated. In the regeneration of the weakly acidic cation exchange resin on the downstream side, since the consumption of hydrogen ions in the acidic electrolytic water is small, that is, the reduction in the hydrogen ion concentration of the acidic electrolytic water can be suppressed, the hardness component contained in the acidic electrolytic water from the downstream side can be suppressed from being re-adsorbed on the upstream side. Therefore, it is possible to suppress a decrease in the regeneration treatment efficiency of each water softening tank and to shorten the regeneration time.

Hereinafter, exemplary embodiments of the present disclosure will be described with reference to the drawings. Note that the following exemplary embodiments are examples embodying the present disclosure, and do not limit the technical scope of the present disclosure. Each of the drawings described in the following exemplary embodiments is a schematic view, and each of a ratio of sizes and a ratio of thicknesses of each constituent element in each drawing does not necessarily reflect the actual dimensional ratio.

With reference to FIG. 1, water softening device 1 according to a first exemplary embodiment of the present disclosure will be described. FIG. 1 is a conceptual diagram illustrating a configuration of water softening device 1 according to the first exemplary embodiment of the present disclosure. FIG. 1 conceptually shows each element of water softening device 1.

(Overall Configuration)

Water softening device 1 is a device for generating neutral softened water that can be used as domestic water from city water (raw water containing a hardness component) supplied from the outside.

Specifically, as illustrated in FIG. 1, water softening device 1 includes inlet port 2 for raw water from the outside, water softening tank 3, neutralizing tank 4, water take-out port 5 for softened water after treatment, and regeneration device 6. Water softening tank 3 includes first water softening tank 3*a* and second water softening tank 3*b*. Neutralizing tank 4 includes first neutralizing tank 4*a* and second neutralizing tank 4*b*. Further, regeneration device 6 includes electrolyzer 9, treatment tank 11, and water pump 12. Water softening device 1 includes a plurality of on-off valves (on-off valve 41 to on-off valve 45, on-off valve 51 to on-off valve 56, on-off valve 61, and on-off valve 62) and controller 15.

Inlet port 2 is connected to city water. Water softening device 1 allows water after water softening treatment to be taken out from water take-out port 5 by the pressure of city water.

The path from inlet port 2 to water take-out port 5 is connected by channel 20, channel 21, channel 22, channel 23, and channel 24. Channel 20 is a channel connecting inlet port 2 to first water softening tank 3*a*. Channel 21 is a channel connecting first water softening tank 3*a* to first neutralizing tank 4*a*. Channel 22 is a channel connecting first neutralizing tank 4*a* to second water softening tank 3*b*. Channel 23 is a channel connecting second water softening tank 3*b* to second neutralizing tank 4*b* Channel 24 is a channel connecting second neutralizing tank 4*b* to water take-out port 5.

In other words, channel 20 is a channel for guiding raw water containing a hardness component from inlet port 2 to first water softening tank 3*a*. Channel 21 is a channel for guiding the water subjected to the water softening treatment in first water softening tank 3*a* to first neutralizing tank 4*a*. Channel 22 is a channel for guiding the water neutralized in first neutralizing tank 4*a* to second water softening tank 3*b*. Channel 23 is a channel for guiding raw water softened by second water softening tank 3*b* to second neutralizing tank 4*b* Channel 24 is a channel for guiding softened water neutralized by second neutralizing tank 4*b* to water take-out port 5.

That is, in water softening device 1, in the water softening treatment, city water supplied from the outside flows through inlet port 2, channel 20, first water softening tank 3*a*, channel 21, first neutralizing tank 4*a*, channel 22, second water softening tank 3*b*, channel 23, second neutralizing tank 4*b*, channel 24, and water take-out port 5 in this order, and is discharged as neutral softened water.

(Water Softening Tank and Neutralizing Tank)

Water softening tank 3 is configured by, for example, filling a cylindrical container with weakly acidic cation exchange resin 7. Neutralizing tank 4 is configured by, for example, filling a cylindrical container with weakly basic anion exchange resin 8.

Water softening tank 3 includes first water softening tank 3*a* and second water softening tank 3*b*. First water softening tank 3*a* is filled with first weakly acidic cation exchange resin 7*a*. Second water softening tank 3*b* is filled with second weakly acidic cation exchange resin 7*b*. First water softening tank 3*a* and second water softening tank 3*b* have the same channel length, channel cross-sectional area, and volume of weakly acidic cation exchange resin 7. Hereinafter, first weakly acidic cation exchange resin 7*a* and second weakly acidic cation exchange resin 7*b* will be described as weakly acidic cation exchange resin 7 when it is not particularly necessary to distinguish between them.

Neutralizing tank 4 includes first neutralizing tank 4*a* and second neutralizing tank 4*b*. First neutralizing tank 4*a* is configured by, for example, filling a cylindrical container with first weakly basic anion exchange resin 8*a*. Second neutralizing tank 4*b* is filled with second weakly basic anion exchange resin 8*b*. First neutralizing tank 4*a* and second neutralizing tank 4*b* have the same channel length, channel cross-sectional area, and volume of weakly basic anion exchange resin 8. Hereinafter, first weakly basic anion exchange resin 8*a* and second weakly basic anion exchange resin 8*b* will be described as weakly basic anion exchange resin 8 in a case where it is not particularly necessary to distinguish between them.

Here, weakly acidic cation exchange resin 7 is not particularly limited, and ones for general purposes can be used. Examples thereof include a resin having a carboxyl group (—COOH) as an exchange group. A resin in which a hydrogen ion (H+) as a counter ion of a carboxyl group is a cation such as a metal ion or an ammonium ion (NH4+) may also be used.

Weakly basic anion exchange resin 8 is not particularly limited, and ones for general purposes can be used. Examples thereof include a resin in free-base ion form.

Water softening tank 3 softens raw water containing a hardness component by the action of weakly acidic cation exchange resin 7. More specifically, water softening tank 3 is provided with weakly acidic cation exchange resin 7 having a hydrogen ion at the terminal of the functional group. Water softening tank 3 exchanges cations (calcium ion, magnesium ion) which are hardness components contained in flowing water (raw water) with hydrogen ions to allow the hardness of the raw water to decrease and the raw water to be softened. In addition, because the terminal of the functional group of weakly acidic cation exchange resin 7 is a hydrogen ion, weakly acidic cation exchange resin 7 can be regenerated using acidic electrolytic water in the regeneration treatment described later. At this time, cations, which are hardness components taken in during the water softening treatment, are released from weakly acidic cation exchange resin 7.

More specifically, in first water softening tank 3*a*, the raw water containing the hardness component is made to pass from channel 20 and passes through first weakly acidic cation exchange resin 7*a* filled inside, thereby softening the raw water containing the hardness component and allowing the softened water to pass via channel 21 to first neutralizing tank 4*a*. However, the water softened by first weakly acidic cation exchange resin 7*a* contains a large amount of hydrogen ions exchanged for the hardness component and flowed out, and is acidic water having a low pH. Here, when water containing a large amount of the permanent hardness component (for example, a sulfate such as calcium sulfate or a chloride such as magnesium chloride) as the hardness component is softened, the pH is more likely to decrease comparing to water containing a large amount of the temporary hardness component (carbonates such as, for example, calcium carbonate). Although details will be described later, water softening is less likely to proceed in a state where the pH is lowered, and thus water having flowed through first water softening tank 3*a* is caused to pass through first neutralizing tank 4*a* to perform neutralization.

On the other hand, in second water softening tank 3*b*, neutralized neutral water passes through channel 22, and passes through second weakly acidic cation exchange resin 7*b* filled inside. As a result, the hardness components that could not be removed in first water softening tank 3*a* are exchanged for hydrogen ions of second weakly acidic cation exchange resin 7*b*. Therefore, the water flowing into second water softening tank 3*b* is softened. However, the water softened by second weakly acidic cation exchange resin 7*b* contains hydrogen ions that have been exchanged for hardness components and have flowed out, and thus is acidic water.

Neutralizing tank 4 neutralizes the pH of the softened water (acidified softened water) containing hydrogen ions that have come out of water softening tank 3 by the action of weakly basic anion exchange resin 8, and converts the softened water into neutral softened water. More specifically, neutralizing tank 4 is provided with weakly basic anion exchange resin 8, and adsorbs hydrogen ions contained in softened water from water softening tank 3 with anions, thereby increasing the pH of the softened water to obtain neutral softened water. In addition, weakly basic anion exchange resin 8 can be regenerated using alkaline electrolytic water regeneration treatment to be described later.

More specifically, in first neutralizing tank 4*a*, softened water containing hydrogen ions is passed from channel 21 and circulated in first weakly basic anion exchange resin 8*a* filled in first neutralizing tank 4*a* to neutralize acidified water having flowed out of first water softening tank 3*a*, and the acidified water is caused to flow into second water softening tank 3*b* via channel 22 as neutral water. That is, first neutralizing tank 4*a* neutralizes acidic water having flowed out of first water softening tank 3*a* and containing hydrogen ions released from first weakly acidic cation exchange resin 7*a* so that water having flowed through first neutralizing tank 4*a* is fed to second water softening tank 3*b* as water that is easily softened.

On the other hand, in second neutralizing tank 4*b*, the softened water containing hydrogen ions is passed from channel 23 and circulated in second weakly basic anion exchange resin 8*b* filled in second neutralizing tank 4*b* to neutralize the acidified softened water came out from second water softening tank 3*b*, and the acidified softened water is passed as neutral softened water to the outside through channel 24. That is, second neutralizing tank 4*b* neutralizes acidic water having flowed out of second water softening tank 3*b* and containing hydrogen ions released from second weakly acidic cation exchange resin 7*b*, thereby flowing out softened water that can be used as domestic water.

(Regeneration Device)

Regeneration device 6 is a device for regenerating weakly acidic cation exchange resin 7 of water softening tank 3 and regenerating weakly basic anion exchange resin 8 of neutralizing tank 4. Specifically, as described above, regeneration device 6 includes electrolyzer 9, treatment tank 11, and water pump 12. In regeneration device 6, first supply channel 31, first recovery channel 35, second supply channel 32, and second recovery channel 36 are connected to channel 23, channel 20, channel 21, and channel 24 from inlet port 2 to water take-out port 5, respectively. Channel 21 and channel 22 are connected by first bypass channel 33. Channel 22 and channel 23 are connected by second bypass channel 34. Each of the channels constitutes circulation channel 30 (first circulation channel 30*a*, second circulation channel 30*b*) to be described later.

Here, first supply channel 31 is a channel for supplying acidic electrolytic water from electrolyzer 9 to second water softening tank 3*b*. First bypass channel 33 is a channel for supplying the acidic electrolytic water having flowed through second water softening tank 3*b* to first water softening tank 3*a* while bypassing first neutralizing tank 4*a*. First recovery channel 35 is a channel for recovering water containing a hardness component that has passed through first water softening tank 3*a* into treatment tank 11. Second supply channel 32 is a channel for supplying alkaline electrolytic water from electrolyzer 9 to first neutralizing tank 4*a*. Second bypass channel 34 is a channel that supplies the alkaline electrolytic water having flowed through first neutralizing tank 4*a* to second neutralizing tank 4*b* while bypassing second water softening tank 3*b*. Second recovery channel 36 is a channel for recovering water having passed through second neutralizing tank 4*b* into treatment tank 11.

(Electrolyzer)

Electrolyzer 9 applies electrolysis to the entering water (water supplied from treatment tank 11) using electrode 10 provided inside, thereby generating acidic electrolytic water and alkaline electrolytic water, and discharges them. More specifically, in an electrode serving as an anode during electrolysis, hydrogen ions are generated by electrolysis, and acidic electrolytic water is generated. In addition, in an electrode serving as a cathode during electrolysis, hydroxide ions are generated by electrolysis, and alkaline electrolytic water is generated. Then, electrolyzer 9 supplies the acidic electrolytic water to second water softening tank 3*b* via first supply channel 31. In addition, electrolyzer 9 supplies the alkaline electrolytic water to first neutralizing tank 4*a* via second supply channel 32. Although details will be described later, the acidic electrolytic water generated by electrolyzer 9 is used for regenerating first weakly acidic cation exchange resin 7*a* in first water softening tank 3*a* and second weakly acidic cation exchange resin 7*b* in second water softening tank 3*b*. The alkaline electrolytic water generated by electrolyzer 9 is used for regenerating first weakly basic anion exchange resin 8*a* in first neutralizing tank 4*a* and second weakly basic anion exchange resin 8*b* in second neutralizing tank 4*b*. Electrolyzer 9 is configured such that an energization state to electrode 10 can be controlled by controller 15 described later.

(Treatment Tank)

Treatment tank 11 is a tank or a container provided with air vent valve 14. Treatment tank 11 secures and stores water to be circulated in circulation channel 30 (see FIG. 2) when the weakly acidic cation exchange resin 7 and weakly basic anion exchange resin 8 are regenerated. In addition, treatment tank 11 mixes acidic electrolytic water containing a hardness component that has flowed through water softening tank 3 and alkaline electrolytic water containing anions that has flowed through neutralizing tank 4 to generate mixture, and supplies the mixture to electrolyzer 9.

In treatment tank 11, a reaction product (reaction product originating from the hardness component contained in raw water) is generated by the reaction between the mixed hardness component and alkaline electrolytic water. More specifically, acidic electrolytic water containing a hardness component after regenerating weakly acidic cation exchange resin 7 in water softening tank 3 passes through treatment tank 11 via first recovery channel 35. In addition, alkaline electrolytic water containing anions (for example, chloride ions and hydroxide ions) after regenerating weakly basic anion exchange resin 8 in neutralizing tank 4 passes through treatment tank 11 via second recovery channel 36. Then, in treatment tank 11, the acidic electrolytic water containing a hardness component and the alkaline electrolytic water containing anions are mixed, and the hardness component reacts with the alkaline electrolytic water. For example, when the hardness component in the acidic electrolytic water is calcium ions, a reaction in which calcium carbonate is generated or calcium hydroxide is generated occurs by mixing the calcium ions with the alkaline electrolytic water. Then, the reacted hardness component can be separated as a reaction product by filtration part 13 described later, and treated water can be obtained.

Note that "the hardness component reacts" includes not only a state in which all the hardness components react but also a state in which a component that does not react or a component that does not exceed the solubility product is contained in treatment tank 11.

Then, the treated water obtained by the reaction of the hardness component in treatment tank 11 passes to electrolyzer 9, is electrolyzed in electrolyzer 9, and becomes acidic electrolytic water and alkaline electrolytic water, and they are supplied to water softening tank 3 and neutralizing tank 4, respectively. Then, the acidic electrolytic water and the alkaline electrolytic water are reused in water softening tank 3 and neutralizing tank 4, respectively, and thereafter pass into treatment tank 11 again. Therefore, the acidic electrolytic water and the alkaline electrolytic water used for the regeneration of weakly acidic cation exchange resin 7 and the regeneration of weakly basic anion exchange resin 8 can be reused. In addition, because water in which the hardness component has reacted is reused, it is possible to suppress a reduction in regeneration efficiency when weakly acidic cation exchange resin 7 is regenerated.

(Water Pump)

Water pump 12 is a device for circulating water in circulation channel 30 (see FIG. 2) during the regeneration treatment by regeneration device 6. Water pump 12 is provided in water delivery channel 40 that communicatively connects treatment tank 11 and electrolyzer 9. Water pump 12 is preferably disposed at a position on the upstream side of electrolyzer 9 and on the downstream side of treatment tank 11. Such a disposition is adopted because one water pump 12 can easily circulate water to first circulation channel 30*a* and second circulation channel 30*b* described later. Water pump 12 is connected to controller 15 described later so as to be able to communicate therewith in a wireless or wired manner.

(Filtration Part)

Filtration part 13 is provided at a front stage of water delivery channel 40 connected from treatment tank 11 to electrolyzer 9. Then, filtration part 13 separates the precipitate contained in the water having flowed through treatment tank 11. The precipitate is a reaction product generated by a reaction between acidic electrolytic water containing a hardness component having flowed through water softening tank 3 and alkaline electrolytic water containing anions having flowed through neutralizing tank 4.

By separating the precipitates by the filtration part 13, the treated water flowing through water delivery channel 40 contains less hardness components than the city water or the water treated by the device not including filtration part 13. That is, since the hardness of the treatment water is reduced by separating the precipitate by filtration part 13, the hardness of the acidic electrolytic water generated in electrolyzer 9 is also reduced. Therefore, the hardness component flowing into water softening tank 3 can be reduced, and a decrease in the regeneration efficiency of weakly acidic cation exchange resin 7 can be suppressed.

The form of filtration part 13 is not limited as long as the reaction product from the hardness component in treatment tank 11 can be separated. For example, a form using a cartridge type filter, a filtration layer using a granular filter material, a cyclone type solid-liquid separator, a hollow fiber membrane, or the like can be mentioned.

(On-Off Valve)

A plurality of on-off valves (on-off valve 41 to on-off valve 45, on-off valve 51 to on-off valve 56, on-off valve 61, and on-off valve 62) are provided in the respective channels, and are switched between an "open" state and a "closed" state in the respective channels. In addition, each of the plurality of on-off valves (on-off valve 41 to on-off valve 45, on-off valve 51 to on-off valve 56, on-off valve 61, and on-off valve 62) is connected to controller 15 to be described later so as to be able to communicate therewith in a wireless or wired manner (Controller)

Controller 15 controls water softening treatment for softening raw water containing a hardness component. In addition, controller 15 controls the regeneration treatment of weakly acidic cation exchange resin 7 in water softening tank 3 and weakly basic anion exchange resin 8 in neutralizing tank 4. Further, controller 15 controls switching of the water softening treatment, the regeneration treatment, and the drainage treatment of water softening device 1. At this time, controller 15 controls the operations of electrode 10, water pump 12, on-off valve 41 to on-off valve 45, on-off valve 51 to on-off valve 56, on-off valve 61, and on-off valve 62, switches the water softening treatment, the regeneration treatment, and the drainage treatment, and executes each treatment.

(Channel)

Figure 2:
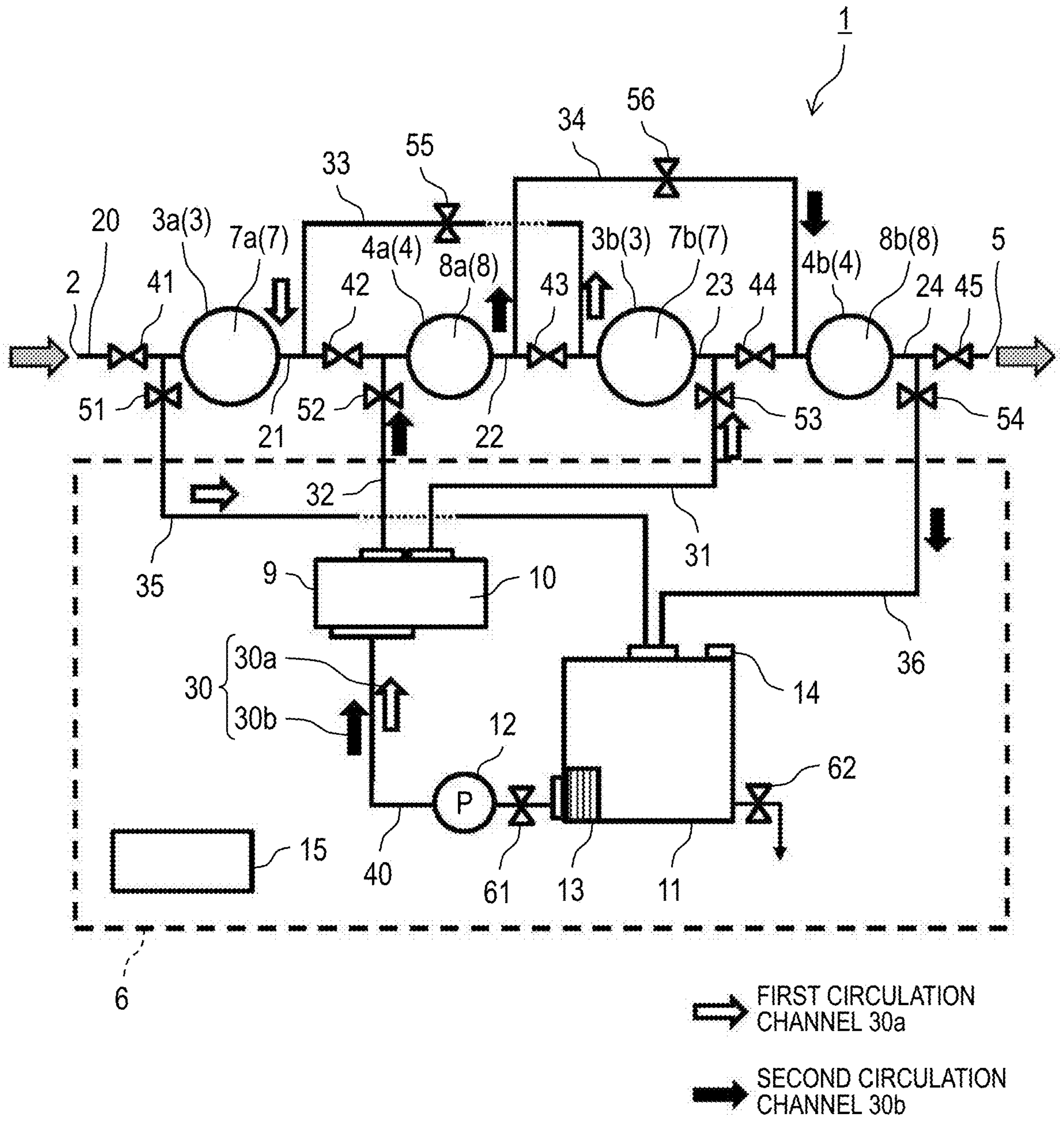
FIG. 2 is a configuration diagram illustrating a circulation channel of the water softening device.

Next, circulation channel 30 formed during the regeneration treatment of water softening device 1 will be described with reference to FIG. 2. FIG. 2 is a configuration diagram illustrating circulation channel 30 of water softening device 1.

Although the description overlaps, in water softening device 1, electrolyzer 9 and treatment tank 11 included in regeneration device 6 are communicably connected by water delivery channel 40 as illustrated in FIG. 2. Electrolyzer 9 and treatment tank 11 are communicably connected to channel 23, channel 20, channel 21, and channel 24 which connect the path from inlet port 2 to water take-out port 5, by first supply channel 31, first recovery channel 35, and second supply channel 32, and second recovery channel 36, respectively. First bypass channel 33 connects channel 21 and channel 22 by bypass connection. In addition, channel 22 and channel 23 are bypass-connected by second bypass channel 34. Each of the channels constitutes circulation channel 30 (first circulation channel 30*a*, second circulation channel 30*b*) to be described later.

First supply channel 31 is a channel for supplying acidic electrolytic water from electrolyzer 9 to second water softening tank 3*b*, and on-off valve 53 is installed in the channel. That is, water softening device 1 includes first supply channel 31 that can draw out acidic electrolytic water from electrolyzer 9 and supply the acidic electrolytic water to the downstream side of second water softening tank 3*b*.

First bypass channel 33 is a channel for supplying acidic electrolytic water from second water softening tank 3*b* to first water softening tank 3*a*, and on-off valve 55 is installed in the channel. That is, water softening device 1 includes first bypass channel 33 that can supply the acidic electrolytic water having flowed through second water softening tank 3*b* to the downstream side of first water softening tank 3*a*. By providing first bypass channel 33, the regeneration treatment can be advanced without circulating acidic electrolytic water in first neutralizing tank 4*a* existing between first water softening tank 3*a* and second water softening tank 3*b*.

First recovery channel 35 is a channel for recovering acidic electrolytic water containing a hardness component having passed through first water softening tank 3*a* into treatment tank 11, and on-off valve 51 is installed in the channel That is, water softening device 1 includes first recovery channel 35 that can connect the upstream side of treatment tank 11 to the upstream side of first water softening tank 3*a*.

Second supply channel 32 is a channel for supplying alkaline electrolytic water from electrolyzer 9 to first neutralizing tank 4*a*, and on-off valve 52 is installed in the channel That is, water softening device 1 includes second supply channel 32 that can draw out alkaline electrolytic water from electrolyzer 9 and supply the alkaline electrolytic water to the upstream side of first neutralizing tank 4*a*.

Second bypass channel 34 is a channel for supplying alkaline electrolytic water from first neutralizing tank 4*a* to second neutralizing tank 4*b*, and on-off valve 56 is installed in the channel. That is, water softening device 1 includes second bypass channel 34 that can supply the alkaline electrolytic water having flowed through first neutralizing tank 4*a* to the upstream side of second neutralizing tank 4*b*.

Second recovery channel 36 is a channel for recovering the alkaline electrolytic water having passed through second neutralizing tank 4*b* into treatment tank 11, and on-off valve 54 is installed in the channel That is, water softening device 1 includes second recovery channel 36 that can connect the upstream side of treatment tank 11 to the downstream side of second neutralizing tank 4*b*.

Circulation channel 30 includes first circulation channel 30*a* through which water fed from treatment tank 11 by water pump 12 flows through second water softening tank 3*b* and first water softening tank 3*a*, and second circulation channel 30*b* through which water fed from treatment tank 11 by water pump 12 flows through first neutralizing tank 4*a* and second neutralizing tank 4*b*.

As illustrated in FIG. 2 (white arrows), first circulation channel 30*a* is a channel in which water fed from treatment tank 11 by water pump 12 flows through electrolyzer 9, second water softening tank 3*b*, and first water softening tank 3*a*, and returns to treatment tank 11 for circulation. More specifically, first circulation channel 30*a* is a channel in which water fed from treatment tank 11 by water pump 12 flows and circulates through water delivery channel 40, electrolyzer 9, first supply channel 31, on-off valve 53, second water softening tank 3*b*, first bypass channel 33, on-off valve 55, first water softening tank 3*a*, first recovery channel 35, on-off valve 51, and treatment tank 11 in this order.

As illustrated in FIG. 2 (black arrows), second circulation channel 30*b* is a channel in which water fed from treatment tank 11 by water pump 12 flows through electrolyzer 9, first neutralizing tank 4*a*, and second neutralizing tank 4*b*, and returns to treatment tank 11 for circulation. More specifically, second circulation channel 30*b* is a channel in which water fed from treatment tank 11 by water pump 12 flows and circulates through water delivery channel 40, electrolyzer 9, second supply channel 32, on-off valve 52, first neutralizing tank 4*a*, second bypass channel 34, on-off valve 56, second neutralizing tank 4*b*, second recovery channel 36, on-off valve 54, and treatment tank 11 in this order.

Here, the state of each channel for circulating water in circulation channel 30 will be described.

Channel 23 is provided with on-off valve 44 on the downstream side of first supply channel 31 and on the upstream side of second bypass channel 34. Closing on-off valve 44 to open on-off valve 53 forms a state in which first supply channel 31 is communicably connected to the downstream side of second water softening tank 3*b*. This allows the acidic electrolytic water from electrolyzer 9 to be supplied to second water softening tank 3*b*.

Channel 21 is provided with on-off valve 42 on the downstream side of first bypass channel 33 and on the upstream side of second supply channel 32. In Channel 22, on-off valve 43 is provided on the downstream side of second bypass channel 34 and on the upstream side of first bypass channel 33. Then, closing on-off valve 42 and on-off valve 43 and opening on-off valve 55 form a state in which first bypass channel 33 is communicatively connected to the upstream side of second water softening tank 3*b* and the downstream side of first water softening tank 3*a*. As a result, the acidic electrolytic water having flowed through second water softening tank 3*b* can be supplied to first water softening tank 3*a*.

Channel 20 is provided with on-off valve 41 on the downstream side of inlet port 2 and on the upstream side of first recovery channel 35. Closing on-off valve 41 and on-off valve 42 and opening on-off valve 51 form a state in which first recovery channel 35 is communicatively connected to the upstream side of first water softening tank 3*a*. As a result, water softening device 1 can recover water (acidic electrolytic water containing hardness components) having flowed through first water softening tank 3*a* and second water softening tank 3*b* into treatment tank 11.

Closing on-off valve 42 and opening on-off valve 52 form a state in which second supply channel 32 is communicatively connected to the upstream side of first neutralizing tank 4*a*. This allows the alkaline electrolytic water to be supplied from electrolyzer 9 to first neutralizing tank 4*a*.

In addition, closing on-off valve 42, on-off valve 43, and on-off valve 44 and opening on-off valve 56 form a state in which second bypass channel 34 is communicably connected to the downstream side of first neutralizing tank 4*a* and the upstream side of second neutralizing tank 4*b*. As a result, the alkaline electrolytic water having flowed through first neutralizing tank 4*a* can be supplied to second neutralizing tank 4*b*.

Closing on-off valve 44 and on-off valve 45 and opening on-off valve 54 form a state in which second recovery channel 36 is communicatively connected to the downstream side of second neutralizing tank 4*b*. As a result, in water softening device 1, the water (alkaline electrolytic water containing anions) having flowed through first neutralizing tank 4*a* and second neutralizing tank 4*b* can be recovered into treatment tank 11.

Water delivery channel 40 is provided with on-off valve 61 on the downstream side of treatment tank 11 (position between treatment tank 11 and water pump 12). By closing on-off valve 61, water can be stored in treatment tank 11. On the other hand, by opening on-off valve 61, water can be supplied to water delivery channel 40.

By closing on-off valve 41 and on-off valve 45, the circulation of water to circulation channel 30 can be started, and by opening on-off valve 41 and on-off valve 45, the circulation of water to circulation channel 30 can be stopped.

(Water Softening Treatment, Regeneration Treatment, and Drainage Treatment)

Next, water softening treatment, regeneration treatment, and drainage treatment of water softening device 1 starting from the regeneration treatment will be described with reference to FIG. 3. FIG. 3 is a diagram illustrating a state of water softening device 1 in operation.

In the water softening treatment, the regeneration treatment, and the drainage treatment, as illustrated in FIG. 3, controller 15 switches on-off valve 41 to on-off valve 45, on-off valve 51 to on-off valve 56, on-off valve 61, on-off valve 62, electrode 10 of electrolyzer 9, and water pump 12 to control them to be in respective flowing states. Controller 15 includes, for example, a computer system including a processor and a memory. Then, with the processor executing a program stored in the memory, the computer system functions as the controller. Here, the program executed by the processor is recorded in advance in the memory of the computer system, but may be provided by being recorded in a non-transitory recording medium such as a memory card, or may be provided through a telecommunication line such as the Internet.

Here, "ON" in FIG. 3 individually indicates a state in which the corresponding on-off valve is "open", a state in which electrode 10 is energized, or a state in which water pump 12 is operating. Blanks indicate a state in which the corresponding on-off valve is "closed", a state in which electrode 10 is not energized, or a state in which water pump 12 is stopped.

(Regeneration Treatment)

Next, an operation during the regeneration treatment by regeneration device 6 of water softening device 1 will be described sequentially with reference to the columns of "IN WATER INJECTION" and "IN REGENERATION" in FIG. 3.

In water softening device 1, when water softening tank 3 filled with weakly acidic cation exchange resin 7 is continuously used, the cation exchange capacity decreases or disappears. That is, ion exchange cannot be performed after all the hydrogen ions, which are functional groups of the cation exchange resin, are exchanged for calcium ions or magnesium ions, which are hardness components. In such a state, the hardness component is contained in the treatment water. Therefore, in water softening device 1, it is necessary to perform regeneration treatment of water softening tank 3 and neutralizing tank 4 by regeneration device 6.

Therefore, in water softening device 1, controller 15 specifies a time zone in which the regeneration treatment can be performed once in a predetermined period (for example, one day (24 hours)) and executes the regeneration treatment.

First, as illustrated in FIG. 3, in water injection, on-off valve 41 and on-off valve 51 are opened. This causes water softening device 1 to introduce the raw water into treatment tank 11 from inlet port 2 via first recovery channel 35 by the pressure of city water. At this time, on-off valve 42 to on-off valve 45, on-off valve 52 to on-off valve 56, on-off valve 61, and on-off valve 62 are closed. By storing a predetermined amount of water corresponding to the capacity of water softening device 1 in treatment tank 11, regeneration device 6 can secure an amount of water at the time of regeneration.

Next, in regeneration, when on-off valve 41 to on-off valve 45, and on-off valve 62 are closed and on-off valve 51 to on-off valve 56 and on-off valve 61 are open, first circulation channel 30*a* and second circulation channel 30*b* are formed as illustrated in FIG. 2.

When electrode 10 of electrolyzer 9 and water pump 12 operate, the water stored in treatment tank 11 circulates through each of first circulation channel 30*a* and second circulation channel 30*b*.

At this time, the acidic electrolytic water generated in electrolyzer 9 is supplied into second water softening tank 3*b* through first supply channel 31, and flows through second weakly acidic cation exchange resin 7*b* therein. Then, the acidic electrolytic water having flowed through second water softening tank 3*b* flows through first bypass channel 33, is supplied into first water softening tank 3*a*, and flows through first weakly acidic cation exchange resin 7*a* therein. That is, by passing the acidic electrolytic water through first weakly acidic cation exchange resin 7*a* and second weakly acidic cation exchange resin 7*b*, cations (hardness components) adsorbed to first weakly acidic cation exchange resin 7*a* and second weakly acidic cation exchange resin 7*b* cause an ion exchange reaction with hydrogen ions contained in the acidic electrolytic water. As a result, first weakly acidic cation exchange resin 7*a* and second weakly acidic cation exchange resin 7*b* are regenerated. Thereafter, the acidic electrolytic water that has flowed through first weakly acidic cation exchange resin 7*a* contains cations and flows into first recovery channel 35. That is, the acidic electrolytic water containing cations that have flowed through first weakly acidic cation exchange resin 7*a* and second weakly acidic cation exchange resin 7*b* is recovered into treatment tank 11 via first bypass channel 33 and first recovery channel 35.

As described above, first circulation channel 30*a* is configured to cause the acidic electrolytic water to flow from the downstream side of second water softening tank 3*b* located on the most downstream side from the inlet port of the raw water and having second weakly acidic cation exchange resin 7*b* having a small adsorption amount of hardness components, and to flow into the downstream side of first water softening tank 3*a* located on the upstream side and having first weakly acidic cation exchange resin 7*a* to which more hardness components are adsorbed as compared with second weakly acidic cation exchange resin 7*b*. That is, first circulation channel 30*a* is a channel for allowing the acidic electrolytic water fed from electrolyzer 9 to flow into second water softening tank 3*b*, then feeding the acidic electrolytic water to first water softening tank 3*a* by first bypass channel 33, circulating the acidic electrolytic water in first water softening tank 3*a*, recovering the acidic electrolytic water in treatment tank 11, and then allowing the acidic electrolytic water to flow into electrolyzer 9. Further, first circulation channel 30*a* includes a path for introducing the acidic electrolytic water fed from electrolyzer 9 into first water softening tank 3*a* and second water softening tank 3*b* from the downstream sides of first water softening tank 3*a* and second water softening tank 3*b*, and allowing the acidic electrolytic water to flow out of the upstream side where the adsorption amount of the hardness component is larger than that on the downstream side of each water softening tank.

On the other hand, the alkaline electrolytic water generated in electrolyzer 9 is supplied into first neutralizing tank 4*a* through second supply channel 32, and flows through first weakly basic anion exchange resin 8*a* therein. Then, the alkaline electrolytic water having flowed through first neutralizing tank 4*a* flows through second bypass channel 34, is fed into second neutralizing tank 4*b*, and flows through second weakly basic anion exchange resin 8*b* therein. That is, by allowing the alkaline electrolytic water to pass through first weakly basic anion exchange resin 8*a* and second weakly basic anion exchange resin 8*b*, anions adsorbed to first weakly basic anion exchange resin 8*a* and second weakly basic anion exchange resin 8*b* cause an ion exchange reaction with hydroxide ions contained in the alkaline electrolytic water. As a result, first weakly basic anion exchange resin 8*a* and second weakly basic anion exchange resin 8*b* are regenerated. Thereafter, the alkaline electrolytic water that has flowed through second weakly basic anion exchange resin 8*b* contains anions and flows into second recovery channel 36. That is, the alkaline electrolytic water containing anions that has flowed through first weakly basic anion exchange resin 8*a* and second weakly basic anion exchange resin 8*b* is recovered into treatment tank 11 via second bypass channel 34 and the second recovery channel 36. Water softening device 1 may be configured such that the alkaline electrolytic water generated in electrolyzer 9 flows through second neutralizing tank 4*b*, then flows through first neutralizing tank 4*a*, and flows into treatment tank 11. In this case, for example, second supply channel 32 may be connected to the downstream side of second neutralizing tank 4*b* and the upstream side of on-off valve 45, and second recovery channel 36 may be connected to the downstream side of on-off valve 42 and the upstream side of first neutralizing tank 4*a*.

In treatment tank 11, the acidic electrolytic water containing cations recovered from first water softening tank 3*a* and second water softening tank 3*b* and the alkaline electrolytic water containing anions recovered from first neutralizing tank 4*a* and second neutralizing tank 4*b* are mixed and neutralized.

At this time, by mixing the acidic electrolytic water containing cations (hardness components) and the alkaline electrolytic water containing anions, the hardness components react with hydroxide ions contained in the alkaline electrolytic water, and a precipitate is generated. For example, when the hardness component in the acidic electrolytic water is calcium ions, calcium hydroxide is generated by the alkaline electrolytic water, or calcium carbonate is generated from bond between calcium ions and carbonate ions chronically existing in water.

Thereafter, when the water treated in treatment tank 11 flows through filtration part 13, the reaction product is removed, and the water passes through electrolyzer 9 again via water delivery channel 40. Then, the passed water is electrolyzed again in electrolyzer 9.

Here, the electrolytic water (acidic electrolytic water, alkaline electrolytic water) electrolyzed again in electrolyzer 9 is used for regeneration of weakly acidic cation exchange resin 7 and regeneration of weakly basic anion exchange resin 8, respectively. That is, the acidic electrolytic water used for regenerating weakly acidic cation exchange resin 7 is reused as an electrolytic water again in treatment tank 11 from a state where the hardness component is changed into a reaction product and filtered. In addition, in the electrolytic acidic water to be reused, the hardness component contained in the water is reduced as compared with the case of city water (raw water containing a hardness component) supplied from the outside or the case of the water treated by the device where treatment tank 11 is not provided. When electrolysis is performed in electrolyzer 9, the hardness component which is cations moves into the alkaline electrolytic water, and therefore the hardness of the acidic electrolytic water decreases, and a decrease in regeneration efficiency of weakly acidic cation exchange resin 7 can be suppressed. Further, it is possible to suppress adhesion of sticking objects originating from the hardness component inside electrolyzer 9 and water softening tank 3.

Then, in water softening device 1, when the regeneration treatment is completed, the operations of electrode 10 and water pump 12 are stopped. Further, by opening on-off valve 62, the process proceeds to the drainage treatment. Note that the end of the regeneration treatment may be set to a certain time (for example, 7 hours) from the start of the regeneration treatment (the start of the operation of electrode 10).

(Drainage Treatment)

In water softening device 1, when the regeneration treatment is completed, the process proceeds to the drainage treatment. Here, the drainage treatment is a treatment for discharging acidic electrolytic water and alkaline electrolytic water remaining in circulation channel 30.

Next, the operation at the time of drainage treatment by water softening device 1 will be described with reference to the column of "IN DRAINING" in FIG. 3.

As illustrated in FIG. 3, in water softening device 1, in the drainage treatment (in draining), on-off valve 41 to on-off valve 45 are closed, and on-off valve 51 to on-off valve 56, on-off valve 61, and on-off valve 62 are opened.

Thus, the acidic electrolytic water remaining in first circulation channel 30*a* and the alkaline electrolytic water remaining in second circulation channel 30*b* can flow into treatment tank 11.

Next, when on-off valve 62 is opened, the electrolytic water in treatment tank 11 can be discharged to the outside of the device by the action of air vent valve 14.

By performing the drainage treatment, it is possible to prevent the acidic electrolytic water and the alkaline electrolytic water remaining in circulation channel 30 from mixing with the raw water flowing in from inlet port 2 and being discharged from the water take-out port 5 when the water softening treatment is resumed.

Then, in water softening device 1, when the drainage treatment is completed, on-off valve 51 to on-off valve 56, on-off valve 61, and on-off valve 62 are closed, and on-off valve 41 to on-off valve 45 are opened to proceed to the water softening treatment. Note that the end of the drainage treatment may be set at the time when a certain time (for example, one minute) has elapsed from the start of the drainage treatment.

(Water Softening Treatment)

When the drainage treatment is completed, water softening device 1 proceeds to the water softening treatment.

First, an operation at the time of water softening treatment by water softening device 1 will be described with reference to the column "IN WATER SOFTENING" in FIG. 3.

As illustrated in FIG. 3, water softening device 1 opens on-off valve 45 provided in water take-out port 5 in a state where on-off valve 41 to on-off valve 44 are open in the water softening treatment (in water softening). This allows water softening device 1 to cause city water (raw water containing a hardness component) to flow through water softening tank 3 and neutralizing tank 4 from the outside, and therefore allows the softened water (neutral softened water) to be taken out from water take-out port 5. At this time, all of on-off valve 51 to on-off valve 56, on-off valve 61, and on-off valve 62 are in a closed state. The operations of electrode 10 of electrolyzer 9 and water pump 12 are also stopped.

Specifically, as illustrated in FIG. 1, in the water softening treatment, raw water to be supplied is supplied from inlet port 2 to first water softening tank 3*a* through channel 20 by the pressure of city water. The raw water supplied to first water softening tank 3*a* flows through first weakly acidic cation exchange resin 7*a* provided in first water softening tank 3*a*. At this time, cations as the hardness component in the raw water are adsorbed by the action of first weakly acidic cation exchange resin 7*a*, and hydrogen ions are released (ion exchange is performed). Then, cations are removed from the raw water, whereby the raw water is softened. Since the softened water contains a large amount of hydrogen ions that have been exchanged for the hardness component and flowed out, the softened water is acidified to be acidic water having a low pH. The softened water further flows through channel 21 and flows into first neutralizing tank 4*a*. In first neutralizing tank 4*a*, hydrogen ions contained in the softened water are adsorbed by the action of first weakly basic anion exchange resin 8*a*. That is, since hydrogen ions are removed from the water softened by first water softening tank 3*a*, the lowered pH is increased and neutralized. Therefore, as compared with the case where water softened in first water softening tank 3*a* is directly softened in second water softening tank 3*b*, the water softening treatment in second water softening tank 3*b* easily proceeds. The water neutralized by first neutralizing tank 4*a* further flows through channel 22 and flows into second water softening tank 3*b*. In second water softening tank 3*b*, cations as hardness components are adsorbed and hydrogen ions are released by the action of second weakly acidic cation exchange resin 7*b*. That is, the water flowing into second water softening tank 3*b* is softened to be softened water. The softened water containing hydrogen ions flows through channel 23 and flows into second neutralizing tank 4*b*. In second neutralizing tank 4*b*, hydrogen ions contained in the inflowing softened water are adsorbed by the action of second weakly basic anion exchange resin 8*b*. That is, since hydrogen ions are removed from the softened water, the lowered pH increases, and the softened water becomes softened neutral water that can be used as domestic water. The softened neutral water can be taken out from water take-out port 5 through channel 24.

Then, in water softening device 1, the regeneration treatment is executed when the time zone specified by controller 15 is reached or when the water softening treatment exceeds a certain period of time.

As described above, in water softening device 1, the water softening treatment, the regeneration treatment, and the drainage treatment are repeatedly performed.

Next, with reference to FIG. 4, a description will be given of an intention and a configuration in which water softening tank 3 is first water softening tank 3*a* and second water softening tank 3*b*, and neutralizing tank 4 is first neutralizing tank 4*a* and second neutralizing tank 4*b*.

Figure 4:
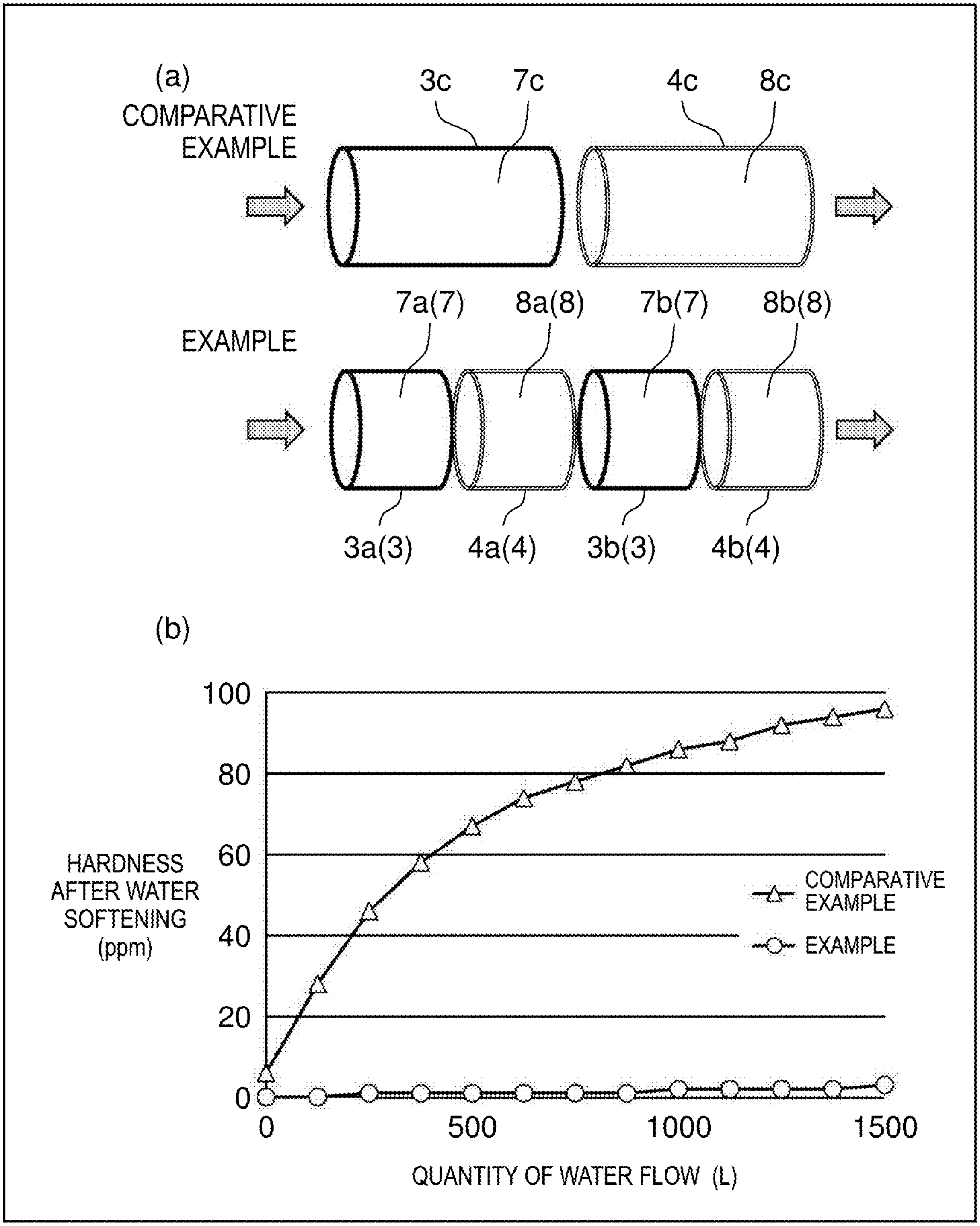
FIG. 4 is a diagram for explaining water softening performance of water softening devices according to an example and a comparative example.

FIG. 4 is a diagram for explaining water softening performance of the water softening devices according to examples and comparative examples. More specifically, part (a) of FIG. 4 is a conceptual diagram illustrating a water softening tank and a neutralizing tank constituting water softening devices according to examples and comparative examples. Part (b) of FIG. 4 is a diagram illustrating water softening performance of the water softening device according to the examples and the comparative examples, and is a diagram plotting the hardness of water after the water softening treatment with respect to the quantity of water flow of the raw water containing the hardness component. Here, the example corresponds to water softening device 1 according to the present first exemplary embodiment, and the comparative example corresponds to conventional water softening device 1*c*.

As illustrated in part (a) of FIG. 4, water softening device 1*c* according to a comparative example includes single water softening tank 3*c* and a single neutralizing tank 4*c*. Water softening tank 3*c* is filled with weakly acidic cation exchange resin 7*c*. Neutralizing tank 4*c* is filled with weakly basic anion exchange resin 8*c*. In the water softening treatment, water softening device 1*c* circulates raw water containing a hardness component from the upstream of water softening tank 3*c*, and adsorbs the hardness component with weakly acidic cation exchange resin 7*c*. Then, the resulting acidified softened water is circulated in neutralizing tank 4*c*, and hydrogen ions are adsorbed and neutralized by weakly basic anion exchange resin 8*c*, so that softened neutral water can be obtained.

On the other hand, water softening device 1 according to the example includes water softening tank 3 and neutralizing tank 4. Water softening tank 3 is configured by first water softening tank 3*a* and second water softening tank 3*b*. First water softening tank 3*a* is filled with first weakly acidic cation exchange resin 7*a*. Second water softening tank 3*b* is filled with second weakly acidic cation exchange resin 7*b*. The channel cross-sectional areas of first water softening tank 3*a* and second water softening tank 3*b* are configured to be equal to the cross-sectional area of water softening tank 3*c*. The channel cross-sectional area indicates a cross-sectional area when water softening tank 3 and neutralizing tank 4 are cut perpendicularly to the flowing direction. The total of the channel lengths of first water softening tank 3*a* and second water softening tank 3*b* is configured to be equal to the channel length of water softening tank 3*c*. Further, the total volume of first weakly acidic cation exchange resin 7*a* and second weakly acidic cation exchange resin 7*b* is configured to be equal to the volume of weakly acidic cation exchange resin 7*c*.

Neutralizing tank 4 is configured by first neutralizing tank 4*a* and second neutralizing tank 4*b*. First neutralizing tank 4*a* is filled with first weakly basic anion exchange resin 8*a*. Second neutralizing tank 4*b* is filled with second weakly basic anion exchange resin 8*b*. The channel cross-sectional areas of first neutralizing tank 4*a* and second neutralizing tank 4*b* are configured to be equal to the cross-sectional area of neutralizing tank 4*c*. The total channel length of first neutralizing tank 4*a* and second neutralizing tank 4*b* is equal to the channel length of neutralizing tank 4*c*. Further, the total volume of first weakly basic anion exchange resin 8*a* and second weakly basic anion exchange resin 8*b* is configured to be equal to the volume of weakly basic anion exchange resin 8*c*.

Further, water softening device 1 is configured such that, in the water softening treatment, raw water containing a hardness component flowing in from inlet port 2 flows through first water softening tank 3*a*, first neutralizing tank 4*a*, second water softening tank 3*b*, and second neutralizing tank 4*b* in this order.

As illustrated in part (b) of FIG. 4, in the comparative example, the hardness of water after water softening treatment exceeds 50 ppm when 200 L to 300 L of raw water is passed, and the hardness increases as the quantity of water flow increases. In the comparative example, when the water softening treatment is performed, in water softening tank 3*c*, the hardness component contained in the raw water and hydrogen ions adsorbed on weakly acidic cation exchange resin 7*c* are exchanged, and hydrogen ions are released. Then, as the water flows through water softening tank 3*c*, the pH of the passing water decreases (the water is acidified), and the hardness component is hardly adsorbed. Thereafter, the water having flowed through water softening tank 3*c* flows into neutralizing tank 4*c*, and hydrogen ions are removed by the action of weakly basic anion exchange resin 8*c*. Therefore, the lowered pH increases to become neutral water, but in order to obtain softened water, it is necessary to perform the regeneration treatment at the time when the quantity of water flow of the raw water reaches 200 L to 300 L.

On the other hand, in the example, the hardness of water after softening is about several ppm even when 1500 L of raw water is passed, and softened water can be continuously obtained even if the quantity of water flow increases. Comparison between the example and the comparative example shows that the example can maintain water softening performance for a longer period of time. In the example, when the water softening treatment is performed, in first water softening tank 3*a*, the hardness component contained in the raw water is exchanged with hydrogen ions adsorbed on first weakly acidic cation exchange resin 7*a*, and hydrogen ions are released. Since the channel length of first water softening tank 3*a* is shorter than the channel length of water softening tank 3*c*, the acidic water flows out of first water softening tank 3*a* before the acidification proceeds and flows into first neutralizing tank 4*a*. Hydrogen ions are removed from the flowed acidic water by first weakly basic anion exchange resin 8*a*, and the acidic water becomes neutral water. Thereafter, the water softening treatment is performed again by flowing through second water softening tank 3*b*, and acidified softened water can be obtained. By circulating the acidified softened water in second neutralizing tank 4*b*, neutral softened water that can be used as domestic water is obtained.

That is, in the example, it is possible to suppress a decrease in pH of water flowing in water softening tank 3 as compared with the comparative example, and exchange between the hardness component and hydrogen ions held by weakly acidic cation exchange resin 7 easily occurs. Therefore, in the example, as compared with the comparative example, by alternately providing water softening tank 3 and neutralizing tank 4, it is possible to improve the water softening performance when weakly acidic cation exchange resin 7 and weakly basic anion exchange resin 8 having the same volume as in the comparative example are used. In addition, in a case where it is desired to obtain water softening performance equivalent to that of the comparative example, it is possible to reduce the volumes of weakly acidic cation exchange resin 7 and weakly basic anion exchange resin 8 necessary, and thus, it is possible to reduce the size and cost of water softening device 1. Further, when water containing a large amount of the permanent hardness component (for example, a sulfate such as calcium sulfate or a chloride such as magnesium chloride) is softened, the pH is more likely to decrease comparing to water containing a large amount of the temporary hardness component (carbonates such as, for example, calcium carbonate). Therefore, in the comparative example in which water containing a large amount of permanent hardness components is softened once and neutralized once, water softening performance of water softening device 1 is deteriorated. On the other hand, in the example, after the pH of the water reduced by the water softening in first water softening tank 3*a* is neutralized in first neutralizing tank 4*a*, the water can be softened again by second water softening tank 3*b*. Therefore, as compared with the comparative example, water softening device 1 is hardly affected by the water quality of the raw water (ratio of permanent hardness to hardness components), and can obtain high water softening performance regardless of the water quality of the raw water.

According to water softening device 1 of the present first exemplary embodiment, the following effects can be obtained.

(1) Water softening device 1 includes water softening tank 3 and neutralizing tank 4. Water softening tank 3 softens raw water containing a hardness component by weakly acidic cation exchange resin 7. Neutralizing tank 4 neutralizes the pH of softened water having passed through water softening tank 3 by weakly basic anion exchange resin 8. Water softening tank 3 includes first water softening tank 3*a* and second water softening tank 3*b*. Neutralizing tank 4 includes first neutralizing tank 4*a* and second neutralizing tank 4*b*. Water softening device 1 is configured such that raw water flows through first water softening tank 3*a*, first neutralizing tank 4*a*, second water softening tank 3*b*, and second neutralizing tank 4*b* in this order.

According to such a configuration, the raw water containing the hardness component flows out of first water softening tank 3*a* before the pH of the raw water is lowered by the water softening treatment in first water softening tank 3*a*, is neutralized in first neutralizing tank 4*a*, and is softened in second water softening tank 3*b*. Therefore, as compared with the case where each of water softening tank 3*c* and neutralizing tank 4*c* is constituted by a single body as in the conventional water softening device 1*c*, it is possible to suppress a decrease in pH and acidification of water flowing in water softening tank 3, so that exchange between the hardness component and hydrogen ions held by second weakly acidic cation exchange resin 7*b* of second water softening tank 3*b* easily occurs. Therefore, water softening device 1 can improve water softening performance as compared with conventional water softening device 1*c*. When weakly acidic cation exchange resin 7 and weakly basic anion exchange resin 8 having the same volume as that of the conventional water softening device 1*c* are used, the water softening performance can be improved.

(2) Water softening device 1 further includes electrolyzer 9 for generating acidic electrolytic water for regenerating weakly acidic cation exchange resin 7 in water softening tank 3 and alkaline electrolytic water for regenerating weakly basic anion exchange resin 8 in neutralizing tank 4, and treatment tank 11 for mixing the acidic electrolytic water having flowed through water softening tank 3 and the alkaline electrolytic water having flowed through neutralizing tank 4 to generate mixture, and supplying the mixture to electrolyzer 9. According to such a configuration, weakly acidic cation exchange resin 7 can be regenerated by the acidic electrolytic water generated in electrolyzer 9, and weakly basic anion exchange resin 8 can be regenerated by the alkaline electrolytic water. Therefore, the maintenance frequency of water softening device 1 can be reduced, and water softening device 1 that can be used for a long period of time can be obtained.

(3) Water softening device 1 is configured such that the acidic electrolytic water fed from electrolyzer 9 flows through second water softening tank 3*b* and then flows through first water softening tank 3*a* during the regeneration treatment for regenerating weakly acidic cation exchange resin 7. As a result, during the regeneration treatment, the acidic electrolytic water fed from electrolyzer 9 flows into second water softening tank 3*b* having a smaller adsorption amount of the hardness component than that of first water softening tank 3*a*, and the acidic electrolytic water containing the hardness component is fed into first water softening tank 3*a*. In the regeneration of second weakly acidic cation exchange resin 7*b* in second water softening tank 3*b*, since the consumption of hydrogen ions in the acidic electrolytic water is small, that is, a reduction in the hydrogen ion concentration can be suppressed as compared with the regeneration of first water softening tank 3*a*, the acidic electrolytic water containing a large amount of hydrogen ions flows into first water softening tank 3*a*, and the hardness component can be suppressed from being re-adsorbed in first water softening tank 3*a*. Therefore, it is possible to suppress a decrease in the regeneration treatment efficiency and to shorten the regeneration time.

Since the acidic electrolytic water fed from electrolyzer 9 flows into second water softening tank 3*b* having a smaller adsorption amount of hardness components than first water softening tank 3*a*, and the acidic electrolytic water containing hardness components is fed into first water softening tank 3*a*, it can be said that the hardness components flowing out by regeneration of second water softening tank 3*b* are smaller than those in first water softening tank 3*a*. Therefore, compared with the case where the acidic electrolytic water is introduced from first water softening tank 3*a*, in the case where the acidic electrolytic water is introduced from second water softening tank 3*b*, since the hardness component contained in the acidic electrolytic water is small, it is possible to suppress re-adsorption of the hardness component in first water softening tank 3*a*, it is possible to suppress a decrease in the regeneration treatment efficiency, and it can be said that the regeneration time can be shortened.

(4) Water softening device 1 is configured such that acidic electrolytic water is introduced into first water softening tank 3*a* and second water softening tank 3*b* from the downstream side of first water softening tank 3*a* and second water softening tank 3*b* during the regeneration treatment. Accordingly, during the regeneration treatment, the acidic electrolytic water fed from electrolyzer 9 flows in from the downstream side where the adsorption amount of the hardness component is smaller in water softening tank 3, and water softening tank 3 is regenerated. In the regeneration of weakly acidic cation exchange resin 7 on the downstream side, since the consumption of hydrogen ions in the acidic electrolytic water is small, that is, the reduction in the hydrogen ion concentration of the acidic electrolytic water can be suppressed, the hardness component contained in the acidic electrolytic water from the downstream side can be suppressed from being re-adsorbed on the upstream side. Therefore, it is possible to suppress a decrease in the regeneration treatment efficiency of water softening tank 3 and to shorten the regeneration time.

Since the acidic electrolytic water fed from electrolyzer 9 flows in from the downstream side where the adsorption amount of the hardness component is smaller in water softening tank 3, and water softening tank 3 is regenerated, it can be said that the hardness component flowing out by the regeneration of weakly acidic cation exchange resin 7 on the downstream side is smaller than that on the upstream side. Therefore, compared with the case where the acidic electrolytic water is introduced from the upstream side, it can be said that when the acidic electrolytic water is introduced from the downstream side, it is possible to suppress re-adsorption of the hardness component to weakly acidic cation exchange resin 7 on the upstream side, it is possible to suppress a decrease in the regeneration treatment efficiency, and it is possible to shorten the regeneration time.

(5) In water softening device 1, first neutralizing tank 4*a* is configured such that the acidic water having flowed out of first water softening tank 3*a* flows into first neutralizing tank 4*a* in the water softening treatment. Thus, first neutralizing tank 4*a* can neutralize hydrogen ions generated from first water softening tank 3*a*. Therefore, inflow of acidic water into second water softening tank 3*b* into which water having flowed out of first neutralizing tank 4*a* flows can be suppressed. Therefore, water softening can be performed by second water softening tank 3*b* without deteriorating the water softening performance of second water softening tank 3*b*, and the water softening performance is improved.

(6) In water softening device 1, first water softening tank 3*a* and second water softening tank 3*b* have the same channel length, channel cross-sectional area, volume of resin filled in water softening tank 3, and type of resin filled in water softening tank 3. As a result, since first water softening tank 3*a* and second water softening tank 3*b* can be formed of the same member, the cost of water softening device 1 can be reduced.

(7) In water softening device 1, first neutralizing tank 4*a* and second neutralizing tank 4*b* have the same channel length, channel cross-sectional area, volume of resin filled in neutralizing tank 4, and type of resin filled in neutralizing tank 4. According to such a configuration, since first neutralizing tank 4*a* and second neutralizing tank 4*b* can be formed of the same member, the cost of water softening device 1 can be reduced.

The present disclosure has been described above based on the exemplary embodiments. It will be understood by those skilled in the art that the exemplary embodiments are merely examples; further, in modifications of the exemplary embodiments, components or processes of the exemplary embodiments are variously combined, and additionally, the modifications fall within the scope of the present disclosure.

In water softening device 1 according to the present first exemplary embodiment, the number of water softening tanks 3 and the number of neutralizing tanks 4 are two, but the present disclosure is not limited thereto. For example, the number may be three or more. As a result, since the number of times of alternately performing water softening and neutralization in the water softening treatment increases, the water softening performance can be further improved.

In water softening device 1 according to the present first exemplary embodiment, first water softening tank 3*a* and second water softening tank 3*b* have the same channel length and channel cross-sectional area, but the present disclosure is not limited thereto. For example, the channel length or the channel cross-sectional area may be different, or both the channel length and the channel cross-sectional area may be different. Even in this case, the same effects as those of the first exemplary embodiment can be obtained.

In water softening device 1 according to the present first exemplary embodiment, the volumes of first weakly acidic cation exchange resin 7*a* filled in first water softening tank 3*a* and second weakly acidic cation exchange resin 7*b* filled in second water softening tank 3*b* are equal to each other, but the present disclosure is not limited thereto. For example, the volumes of first weakly acidic cation exchange resin 7*a* and second weakly acidic cation exchange resin 7*b* may be different from each other, or different types of weakly acidic cation exchange resins 7 may be used. Thus, the water softening performance can be adjusted, and water softening device 1 having water softening performance suitable for the purpose can be obtained.

In water softening device 1 according to the present first exemplary embodiment, the channel lengths and the channel cross-sectional areas of first neutralizing tank 4*a* and second neutralizing tank 4*b* are equal to each other, but the present disclosure is not limited thereto. For example, the channel length or the channel cross-sectional area may be different, or both the channel length and the channel cross-sectional area may be different. In this way, the same effect as that of the first exemplary embodiment can be obtained.

In water softening device 1 according to the present first exemplary embodiment, the volumes of first weakly basic anion exchange resin 8*a* filled in first neutralizing tank 4*a* and second weakly basic anion exchange resin 8*b* filled in second neutralizing tank 4*b* are equal to each other, but the present disclosure is not limited thereto. For example, the volumes of first weakly basic anion exchange resin 8*a* and second weakly basic anion exchange resin 8*b* may be different from each other, or different types of weakly basic anion exchange resins 8 may be used. However, the volume of second weakly basic anion exchange resin 8*b* filled in second neutralizing tank 4*b* may be a volume sufficient to adsorb hydrogen ions released from second water softening tank 3*b* and to make acidic softened water flowing in from second water softening tank 3*b* into neutral softened water.

Thus, the water softening performance can be adjusted, and water softening device 1 having water softening performance suitable for the purpose can be obtained.

In addition, in water softening device 1 according to the present first exemplary embodiment, the acidic electrolytic water is circulated in the order of second water softening tank 3*b* and first water softening tank 3*a*, but the present disclosure is not limited thereto. For example, the acidic electrolytic water may be circulated through first water softening tank 3*a* and second water softening tank 3*b* in this order. Further, in water softening device 1 according to the present first exemplary embodiment, the acidic electrolytic water is circulated from the downstream side of water softening tank 3, but may be circulated from the upstream side. Even in this case, the regeneration treatment of water softening tank 3 can be performed.

In addition, in water softening device 1 according to the present first exemplary embodiment, the acidic electrolytic water is circulated in the order of second water softening tank 3*b* and first water softening tank 3*a*, but the present disclosure is not limited thereto. For example, a first regeneration device and a second regeneration device having functions equivalent to those of regeneration device 6 may be used to perform the regeneration treatment in independent distribution paths. As a result, the regeneration treatment of first water softening tank 3*a* and second water softening tank 3*b* can be independently performed, and the time required for the regeneration treatment can be shortened.

In addition, in water softening device 1 according to the present first exemplary embodiment, the regeneration treatment is executed when the time zone specified by controller 15 is reached or when the water softening treatment exceeds a certain period of time, but the present disclosure is not limited thereto. For example, an ion concentration detector may be provided on the downstream side of second neutralizing tank 4*b* and on the upstream side of on-off valve 45, the ion concentration detector may constantly detect the ion concentration (for example, the hardness component concentration) of softened water flowing through channel 24, and the regeneration treatment may be executed not only in a case where the time zone specified by controller 15 is reached or the water softening treatment exceeds a certain time, but also in a case where the ion concentration exceeds a preset reference value. Thus, the execution of the regeneration treatment can be determined based on the ion concentration of water after flowing through second neutralizing tank 4*b*. Therefore, the state of weakly acidic cation exchange resin 7 in water softening tank 3 can be determined more accurately, and weakly acidic cation exchange resin 7 and weakly basic anion exchange resin 8 can be regenerated at an appropriate timing.

Further, in water softening device 1 according to the present first exemplary embodiment, in the washing treatment (washing), the raw water is introduced into electrolyzer 9 from inlet port 2 through water softening tank 3, neutralizing tank 4, second recovery channel 36, and treatment tank 11, but the present disclosure is not limited thereto. For example, the raw water may be circulated through first recovery channel 35 instead of second recovery channel 36. This makes it possible to recover the acidic electrolytic water containing the hardness component remaining in first recovery channel 35.

Second Exemplary Embodiment

A second exemplary embodiment includes at least a second exemplary embodiment-1, a second exemplary embodiment-2, and a second exemplary embodiment-3 described below.

A water softening device according to the present disclosure includes three or more water softening portions each including a water softening tank for softening raw water containing a hardness component by a weakly acidic cation exchange resin and a neutralizing tank for neutralizing softened water having passed through the water softening tank by a weakly basic anion exchange resin, and an electrolyzer for generating acidic electrolytic water for regenerating the weakly acidic cation exchange resin in the water softening tank and alkaline electrolytic water for regenerating the weakly basic anion exchange resin in the neutralizing tank. The three or more water softening portions include a water softening treatment portion that performs a water softening treatment of raw water by connecting two or more water softening portions in series and a regeneration treatment portion that performs a regeneration treatment of the water softening portion using acidic electrolytic water and alkaline electrolytic water fed from the electrolyzer during a period in which the water softening treatment is performed.

According to such a configuration, the water softening treatment is performed by two or more water softening portions in the water softening treatment portion, and the water softening portion is regenerated in the regeneration treatment portion during a period in which the water softening treatment is performed. Therefore, the water softening device can complete the regeneration treatment of the water softening portion (the weakly acidic cation exchange resin in the water softening tank and the weakly basic anion exchange resin in the neutralizing tank) used as the water softening treatment portion without causing restriction on the supply of softened water to the user. That is, it is possible to provide a water softening device capable of executing the regeneration treatment of the water softening tank and the neutralizing tank without causing restriction on the supply of softened water to the user.

Further, in the water softening device according to the present disclosure, the water softening treatment portion preferably performs the water softening treatment by communicating and connecting the water softening portions in series in order of a larger adsorption amount of the hardness component adsorbed to the water softening tank of the water softening portion from the upstream side into which the raw water is introduced to form a water softening channel, and circulating the raw water through the water softening channel. As a result, in the water softening treatment portion, the water softening portion needs to be regenerated from the upstream side of the water softening channel, so that it is possible to efficiently exchange the water softening portion for which the regeneration treatment is required in the water softening treatment portion with the water softening portion for which the regeneration treatment is completed in the regeneration treatment portion.

Further, in the water softening device according to the present disclosure, when the water softening portion constituting the water softening channel needs to be regenerated, it is preferable that the most upstream water softening portion be separated from the water softening channel, and the water softening channel be switched so that the water softening portion for which the regeneration treatment has been completed in the regeneration treatment portion is incorporated into the most downstream side of the water softening channel. As a result, when the water softening portion that needs to be regenerated in the water softening treatment portion is replaced with the water softening portion for which the regeneration treatment has been completed in the regeneration treatment portion (in other words, when switching of the water softening channel is performed), the water softening channel in the water softening treatment portion can be formed by connecting the water softening portions in series in order of a larger adsorption amount of the hardness component adsorbed to the water softening tank of the water softening portion from the upstream side into which the raw water is introduced. As a result, it is possible to easily specify the water softening portion that requires a regeneration treatment in the water softening treatment portion.

Further, in the water softening device according to the present disclosure, switching of the water softening channel may be performed every lapse of a certain period from the start of the water softening treatment. As a result, by setting a certain period based on the hardness of the raw water in the use environment of the water softening device and the integrated flow rate and periodically switching the water softening channel, in the water softening device, it is possible to suppress deterioration or disappearance of the hardness removing performance of the water softening treatment portion, and it is possible to stably soften the water over a long period of time.

In addition, the water softening device according to the present disclosure may further include an ion concentration detector that detects an ion concentration of softened water led out from the downstream side of the water softening channel, and switching of the water softening channel may be performed based on the ion concentration. As a result, when the hardness removing performance in the water softening treatment portion decreases or disappears, the water softening channel can be reliably switched, so that the water softening device can more reliably suppress the decrease or disappearance of the hardness removing performance of the water softening treatment portion, and can stably soften water over a long period of time.

The water softening device according to the present disclosure further includes a pre-stage ion concentration detector that detects the first ion concentration of the acidic electrolytic water before being introduced from the electrolyzer into the water softening portion constituting the regeneration treatment portion, and a post-stage ion concentration detector that detects the second ion concentration of the acidic electrolytic water after being led out from the water softening portion constituting the regeneration treatment portion. The water softening channel may be switched based on the first ion concentration detected by the pre-stage ion concentration detector and the second ion concentration detected by the post-stage ion concentration detector. As a result, at the timing when the regeneration of the water softening portion in the regeneration treatment portion is completed, the water softening portion for which the regeneration treatment is completed can be replaced with the water softening portion in the water softening treatment portion. Therefore, the water softening device can stably soften water for a long period of time without causing restriction on the supply of softened water to the user.

Hereinafter, exemplary embodiments of the present disclosure will be described with reference to the drawings. Note that the following exemplary embodiments are examples embodying the present disclosure, and do not limit the technical scope of the present disclosure. Each of the drawings described in the following exemplary embodiments is a schematic view, and each of a ratio of sizes and a ratio of thicknesses of each constituent element in each drawing does not necessarily reflect the actual dimensional ratio.

Second Exemplary Embodiment-1

Figure 5:
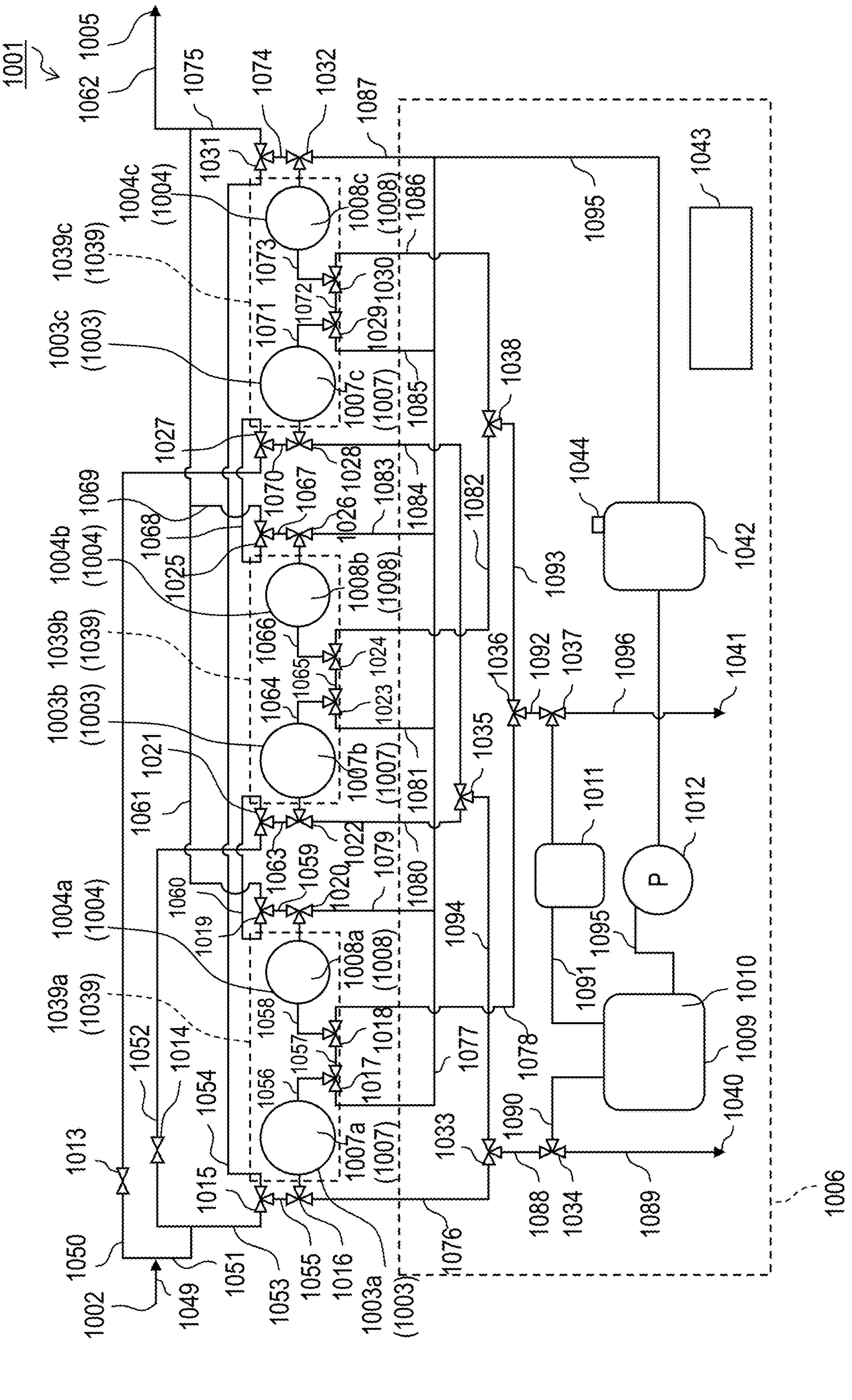
FIG. 5 is a conceptual diagram illustrating a configuration of a water softening device according to a second exemplary embodiment-1 of the present disclosure.

With reference to FIG. 5, water softening device 1001 according to the second exemplary embodiment-1 of the present disclosure will be described. FIG. 5 is a conceptual diagram illustrating a configuration of water softening device 1001 according to the second exemplary embodiment-1 of the present disclosure. FIG. 5 conceptually shows each element of water softening device 1001.

(Overall Configuration)

Water softening device 1001 is a device for generating neutral softened water that can be used as domestic water from city water (raw water containing a hardness component) supplied from the outside.

As illustrated in FIG. 5, water softening device 1001 includes inlet port 1002 into which raw water (raw water containing hardness components) from the outside flows, three-stage water softening portions 1039 having water softening tank 1003 and neutralizing tank 1004, respectively, water take-out port 1005 for taking treated softened water, and regeneration device 1006. Then, water softening device 1001 softens the raw water introduced from inlet port 1002 in two-stage water softening portions 1039 (water softening treatment portion) among three-stage water softening portions 1039, and leads out the raw water as softened water from water take-out port 1005. On the other hand, water softening device 1001 performs regeneration treatment of water softening portion 1039 by regeneration device 1006 during the period in which the water softening treatment is performed in the remaining one-stage water softening portion 1039 (regeneration treatment portion) of three-stage water softening portions 1039. As described above, water softening device 1001 can perform the water softening treatment and the regeneration treatment simultaneously in parallel.

Specifically, water softening device 1001 includes, as three-stage water softening portions 1039, first water softening portion **1039*a* having first water softening tank 1003*a* and first neutralizing tank 1004*a*, second water softening portion 1039*b* having second water softening tank 1003*b* and second neutralizing tank 1004*b*, and third water softening portion 1039*c* having third water softening tank 1003*c* and third neutralizing tank 1004*c*. Then, three-stage water softening portions 1039 are classified into a water softening treatment portion configured to include the two-stage water softening portions 1039 for performing the water softening treatment and a regeneration treatment portion configured to include the remaining one-stage water softening portion 1039 for performing the regeneration treatment according to the treatment states of the respective water softening portions 1039**. Details are described later.

Hereinafter, first water softening portion **1039*a*, second water softening portion 1039*b*, and third water softening portion 1039*c* will be described as water softening portion 1039 when it is not particularly necessary to distinguish between them. In addition, first water softening tank 1003*a*, second water softening tank 1003*b*, and third water softening tank 1003*c* will be described as water softening tank 1003 when it is not particularly necessary to distinguish between them. In addition, first neutralizing tank 1004*a*, second neutralizing tank 1004*b*, and third neutralizing tank 1004*c* will be described as neutralizing tank 1004** when it is not particularly necessary to distinguish between them.

Regeneration device 1006 includes electrolyzer 1009, separation part 1011, water pump 1012, water storage tank 1042, first drainage port 1040, and second drainage port 1041.

Water softening device 1001 includes a plurality of on-off valves (on-off valve 1013, on-off valve 1014), a plurality of selection valves (selection valve 1015 to selection valve 1038), and controller 1043.

Inlet port 1002 is connected to city water. In water softening device 1001, as the water softening treatment, the city water flows through the water softening treatment portion at the pressure of the city water, and the water after the water softening treatment can be taken out from water take-out port 1005. In addition, water softening device 1001 can cause the electrolytic water to flow through the regeneration treatment portion to perform a regeneration treatment while the water softening treatment is being performed by regeneration device 1006.

(Water Softening Portion)

As described above, each of three-stage water softening portions 1039 includes water softening tank 1003 and neutralizing tank 1004.

Water softening tank 1003 is configured by, for example, filling a cylindrical container with weakly acidic cation exchange resin 1007. Weakly acidic cation exchange resin 1007 is not particularly limited, and ones for general purposes can be used. Examples thereof include a resin having a carboxyl group (—COOH) as an exchange group. A resin in which a hydrogen ion (H+) as a counter ion of a carboxyl group is a cation such as a metal ion or an ammonium ion (NH4+) may also be used.

More specifically, first water softening tank 1003*a* is filled with first weakly acidic cation exchange resin 1007*a*. Second water softening tank 1003*b* is filled with second weakly acidic cation exchange resin 1007*b*. Third water softening tank 1003*c* is filled with third weakly acidic cation exchange resin 1007*c*. First water softening tank 1003*a*, second water softening tank 1003*b*, and third water softening tank 1003*c* have the same channel length, channel cross-sectional area, and volume of weakly acidic cation exchange resin 1007. Hereinafter, first weakly acidic cation exchange resin 1007*a*, second weakly acidic cation exchange resin 1007*b*, and third weakly acidic cation exchange resin 1007*c* will be described as weakly acidic cation exchange resin 1007 unless it is particularly necessary to distinguish them from one another.

The neutralizing tank 1004 is configured by, for example, filling a cylindrical container with weakly basic anion exchange resin 1008. Weakly basic anion exchange resin 1008 is not particularly limited, and ones for general purposes can be used. Examples thereof include a resin in free-base ion form.

More specifically, first neutralizing tank 1004*a* is filled with first weakly basic anion exchange resin 1008*a*. Second neutralizing tank 1004*b* is filled with second weakly basic anion exchange resin 1008*b*. Third neutralizing tank 1004*c* is filled with third weakly basic anion exchange resin 1008*c*. First neutralizing tank 1004*a*, second neutralizing tank 1004*b*, and third neutralizing tank 1004*c* have the same channel length, channel cross-sectional area, and volume of weakly basic anion exchange resin 1008. Hereinafter, first weakly basic anion exchange resin 1008*a*, second weakly basic anion exchange resin 1008*b*, and third weakly basic anion exchange resin 1008*c* will be described as weakly basic anion exchange resin 1008 unless it is particularly necessary to distinguish them from one another.

water softening portion 1039 includes first water softening portion 1039*a*, second water softening portion 1039*b*, and third water softening portion 1039*c*. First water softening portion 1039*a* includes first water softening tank 1003*a* and first neutralizing tank 1004*a*. Second water softening portion 1039*b* includes second water softening tank 1003*b* and second neutralizing tank 1004*b*. Third water softening portion 1039*c* includes third water softening tank 1003*c* and third neutralizing tank 1004*c*.

(Water Softening Tank)

Water softening tank 1003 softens raw water containing hardness components or neutralized neutral water (neutral water neutralized by water softening portion 1039 of the preceding stage) by the action of weakly acidic cation exchange resin 1007. More specifically, water softening tank 1003 is provided with weakly acidic cation exchange resin 1007 having a hydrogen ion at the terminal of the functional group. Water softening tank 1003 exchanges cations (calcium ion, magnesium ion) which are hardness components contained in flowing water with hydrogen ions to allow the hardness of the flowing water to decrease and the flowing water to be softened. In addition, because the terminal of the functional group of weakly acidic cation exchange resin 1007 is a hydrogen ion, weakly acidic cation exchange resin 1007 can be regenerated using acidic electrolytic water in the regeneration treatment described later. At this time, cations, which are hardness components taken in during the water softening treatment, are released from weakly acidic cation exchange resin 1007.

Figure 12:
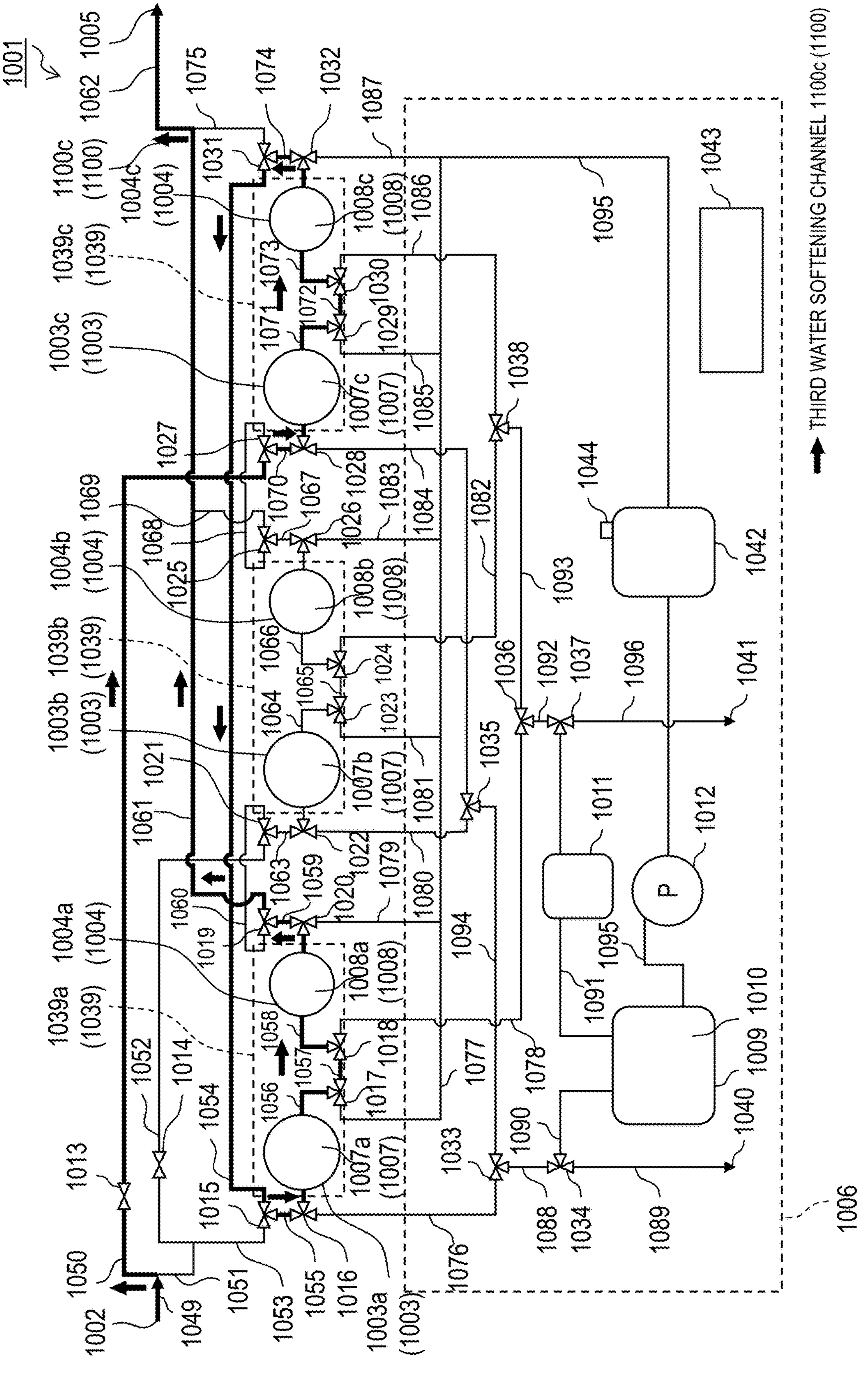
FIG. 12 is a configuration diagram illustrating a third water softening channel of the water softening device.

More specifically, in first water softening tank 1003*a*, raw water containing a hardness component (see FIG. 6) or neutralized neutral water (neutral water neutralized by third water softening portion 1039*c* of the preceding stage: see FIG. 12) is passed from channel 1056, and passes through first weakly acidic cation exchange resin 1007*a* filled inside. Thus, the water flowing into first water softening tank 1003*a* is softened, and the softened water is allowed to pass to first neutralizing tank 1004*a* via channel 1056, channel 1057, and channel 1058. However, the water softened by first weakly acidic cation exchange resin 1007*a* contains a large amount of hydrogen ions exchanged for the hardness component and flowed out, and is acidic water having a low pH.

Figure 6:
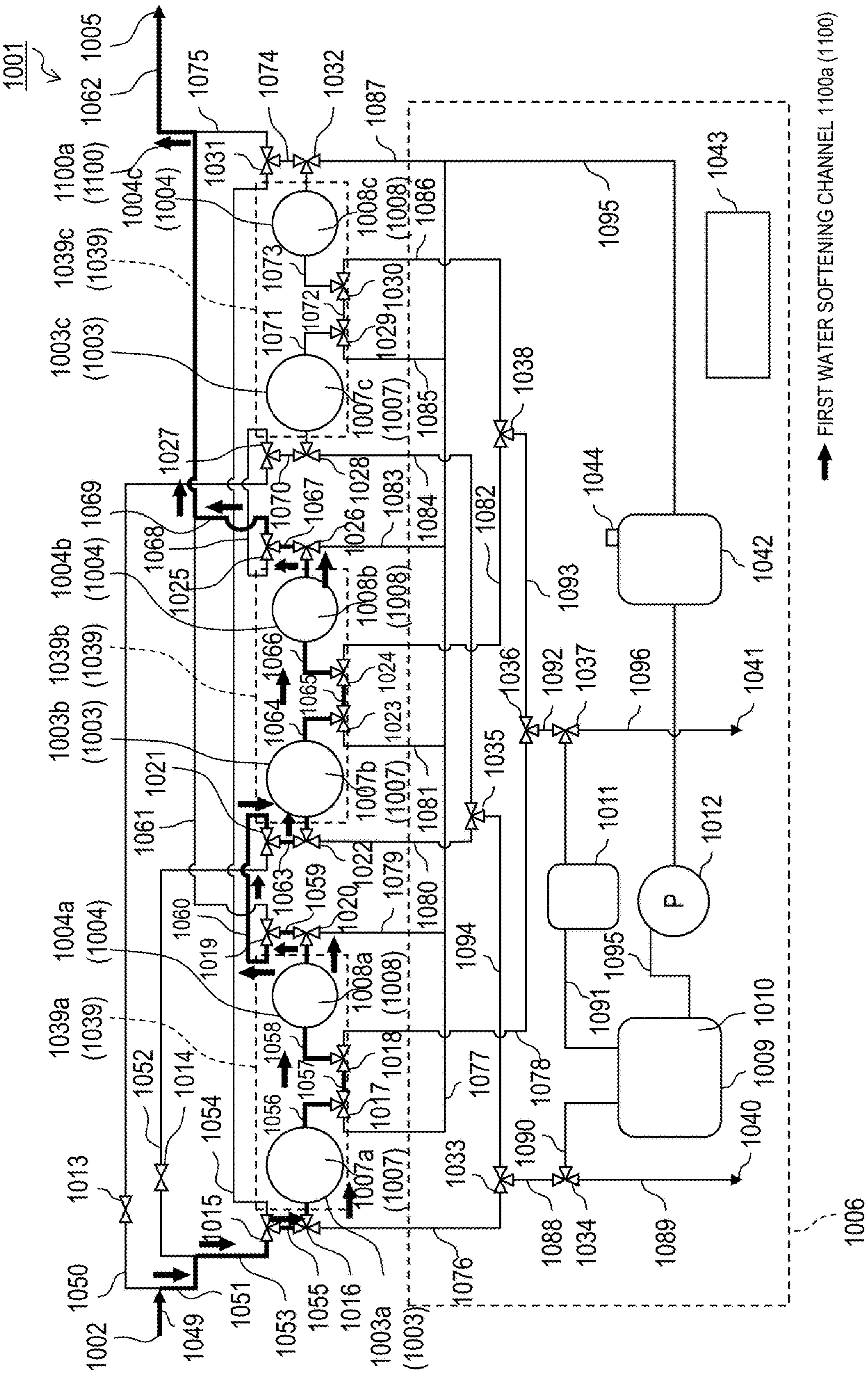
FIG. 6 is a configuration diagram illustrating a first water softening channel of the water softening device.

On the other hand, in second water softening tank 1003*b*, raw water containing hardness components (see FIG. 9) or neutralized neutral water (neutral water neutralized by first water softening portion 1039*a* of the preceding stage: see FIG. 6) is passed from channel 1064, and passes through second weakly acidic cation exchange resin 1007*b* filled inside. As a result, the water flowing into second water softening tank 1003*b* is softened, and the softened water is allowed to pass to second neutralizing tank 1004*b* via channel 1064, channel 1065, and channel 1066. However, the water softened by second weakly acidic cation exchange resin 1007*b* contains a large amount of hydrogen ions exchanged for the hardness component and flowing out, and is acidic water having a low pH.

Figure 9:
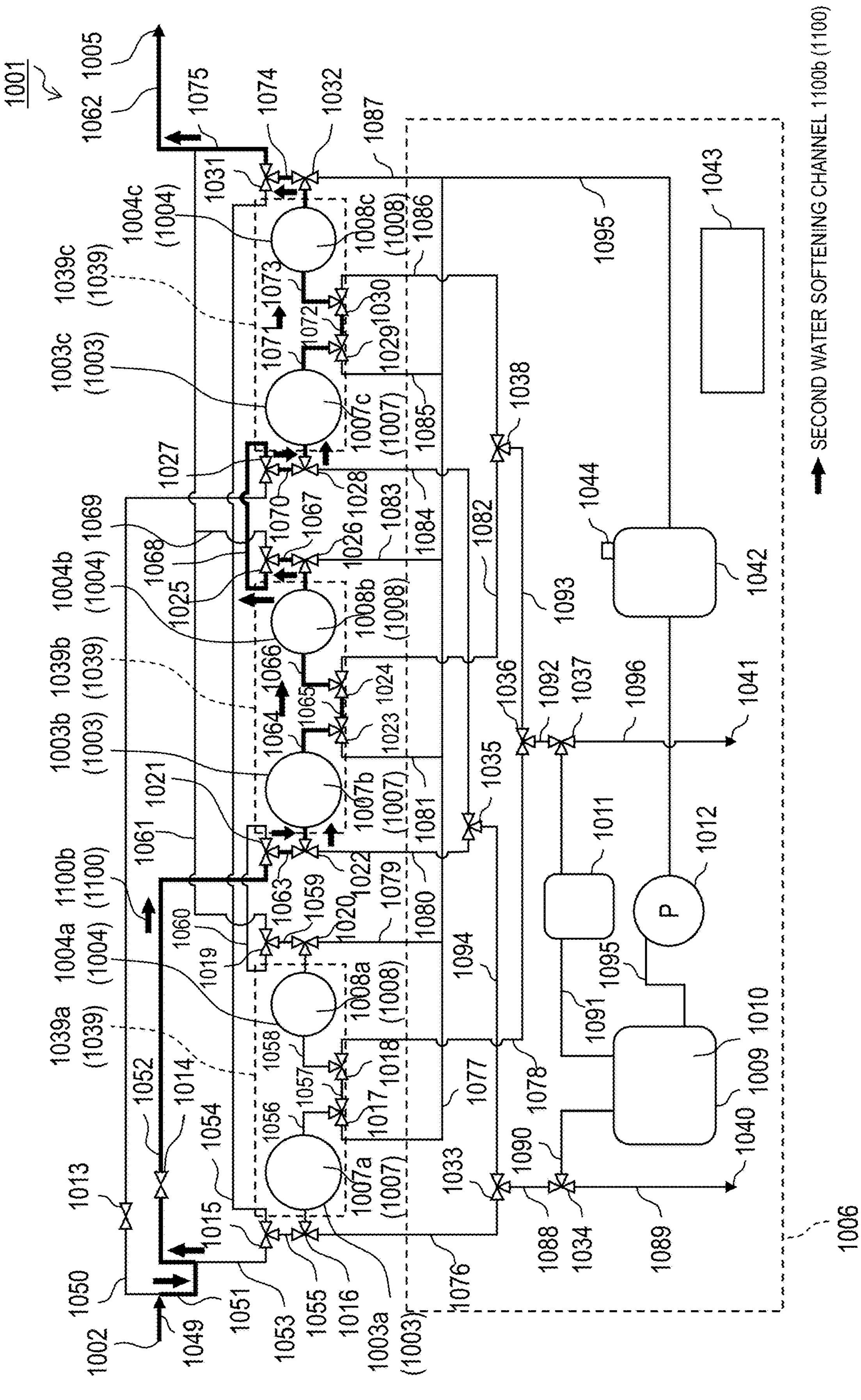
FIG. 9 is a configuration diagram illustrating a second water softening channel of the water softening device.

On the other hand, in third water softening tank 1003*c*, raw water containing hardness components (see FIG. 12) or neutralized neutral water (neutral water neutralized by second water softening portion 1039*b* of the preceding stage: see FIG. 9) is passed from channel 1071, and passes through third weakly acidic cation exchange resin 1007*c* filled inside. As a result, the water flowing into third water softening tank 1003*c* is softened, and the softened water is allowed to pass to third neutralizing tank 1004*c* via channel 1071, channel 1072, and channel 1073. However, the water softened by third weakly acidic cation exchange resin 1007*c* contains a large amount of hydrogen ions exchanged for the hardness component and flowed out, and is acidic water having a low pH.

(Neutralizing Tank)

Neutralizing tank 1004 neutralizes the pH of the softened water (acidified softened water) containing hydrogen ions that have come out of water softening tank 1003 by the action of weakly basic anion exchange resin 1008, and converts the softened water into neutral softened water. More specifically, neutralizing tank 1004 is provided with weakly basic anion exchange resin 1008, and adsorbs hydrogen ions contained in softened water from water softening tank 1003 with anions, thereby increasing the pH of the softened water to obtain neutral softened water. In addition, weakly basic anion exchange resin 1008 can be regenerated using alkaline electrolytic water in a regeneration treatment to be described later.

More specifically, in first neutralizing tank 1004*a*, softened water containing hydrogen ions having flowed out of first water softening tank 1003*a* passes through channel 1056, channel 1057, and channel 1058, and flows through first weakly basic anion exchange resin 1008*a* filled therein, thereby neutralizing acidified water having flowed out of first water softening tank 1003*a*.

On the other hand, in second neutralizing tank 1004*b*, softened water containing hydrogen ions having flowed out of second water softening tank 1003*b* passes through channel 1064, channel 1065, and channel 1066, and flows through second weakly basic anion exchange resin 1008*b* filled inside, thereby neutralizing acidified water having flowed out of second water softening tank 1003*b*.

On the other hand, in third neutralizing tank 1004*c*, softened water containing hydrogen ions having flowed out of third water softening tank 1003*c* passes through channel 1071, channel 1072, and channel 1073, and flows through third weakly basic anion exchange resin 1008*c* filled inside, thereby neutralizing acidified water having flowed out of third water softening tank 1003*c*.

As described above, water softening portion 1039 softens the raw water containing the hardness component or the neutralized neutral water by water softening tank 1003. The softened water contains a large amount of hydrogen ions that have been exchanged for the hardness component and flowed out, and is acidic water having a low pH. The softened acidic water is neutralized by neutralizing tank 1004. That is, in water softening portion 1039, raw water containing a hardness component or neutralized neutral water flows through the inside, so that the water can be led out as neutral water having a hardness component relatively lower than that before flowing through water softening portion 1039.

More specifically, in first water softening portion 1039*a*, the raw water containing the hardness component or the neutralized neutral water flows through first water softening tank 1003*a* to be softened into acidic water having a low pH. The softened acidic water is neutralized by first neutralizing tank 1004*a*, and is led out as neutral water having a hardness component relatively lower than that before flowing through first water softening portion 1039*a*.

On the other hand, in second water softening portion 1039*b*, the raw water containing the hardness component or the neutralized neutral water is softened through second water softening tank 1003*b* and becomes acidic water having a low pH. Then, the softened acidic water is neutralized by second neutralizing tank 1004*b* and flows out as neutral water having a hardness component relatively lower than that before flowing through second water softening portion 1039*b*.

On the other hand, in third water softening portion 1039*c*, the raw water containing the hardness component or the neutralized neutral water flows through third water softening tank 1003*c* and becomes softened acidic water having a low pH. Then, the softened acidic water is neutralized by third neutralizing tank 1004*c* and flows out as neutral water having a hardness component relatively lower than that before flowing through third water softening portion 1039*c*.

Next, regeneration device 1006 is described.

In water softening device 1001, when water softening tank 1003 filled with weakly acidic cation exchange resin 1007 is continuously used, the cation exchange capacity decreases or disappears. That is, ion exchange cannot be performed after all the hydrogen ions, which are functional groups of the cation exchange resin, are exchanged for calcium ions or magnesium ions, which are hardness components. In such a state, the hardness component is contained in the treatment water. Therefore, in water softening device 1001, it is necessary to perform regeneration treatment of water softening tank 3 and neutralizing tank 1004 by regeneration device 1006. Regeneration device 1006 is a device for regenerating weakly acidic cation exchange resin 1007 of water softening tank 1003 and regenerating weakly basic anion exchange resin 1008 of neutralizing tank 1004.

Specifically, as illustrated in FIG. 5, regeneration device 1006 includes electrolyzer 1009, separation part 1011, water pump 1012, water storage tank 1042, first drainage port 1040, and second drainage port 1041.

(Electrolyzer)

Electrolyzer 1009 applies electrolysis to the entering water (water supplied from water storage tank 1042) using electrode 1010 provided inside, thereby generating acidic electrolytic water and alkaline electrolytic water, and discharges them. More specifically, hydrogen ions are generated by electrolysis on the electrode side serving as an anode during electrolysis, and acidic electrolytic water is generated. On the electrode side serving as a cathode during electrolysis, hydroxide ions are generated by electrolysis, and alkaline electrolytic water is generated. Then, electrolyzer 1009 supplies the acidic electrolytic water to water softening tank 1003 of water softening portion 1039 via acidic electrolytic water circulation channel 1102 (see FIGS. 8, 11, and 14) to be described later. In addition, electrolyzer 1009 supplies the alkaline electrolytic water to neutralizing tank 1004 of the same water softening portion 1039 via alkaline electrolytic water circulation channel 1103 (see FIGS. 8, 11, and 14) to be described later. Although details will be described later, the acidic electrolytic water generated by electrolyzer 1009 is used for regenerating first weakly acidic cation exchange resin 1007*a* in first water softening tank 1003*a*, second weakly acidic cation exchange resin 1007*b* in second water softening tank 1003*b*, or third weakly acidic cation exchange resin 1007*c* in third water softening tank 1003*c* according to the connection state of the respective channels. Further, the alkaline electrolytic water generated by electrolyzer 1009 is used for regenerating first weakly basic anion exchange resin 1008*a* in first neutralizing tank 1004*a*, second weakly basic anion exchange resin 1008*b* in second neutralizing tank 1004*b*, or third weakly basic anion exchange resin 1008*c* in third neutralizing tank 1004*c* according to the connection state of the respective channels. Electrolyzer 1009 is configured such that an energization state to electrode 1010 can be controlled by controller 1043 described later.

(Water Storage Tank)

Water storage tank 1042 secures and stores water to be circulated when weakly acidic cation exchange resin 1007 and weakly basic anion exchange resin 1008 are regenerated. Then, the water having flowed through water storage tank 1042 passes through electrolyzer 1009, is electrolyzed in electrolyzer 1009, becomes acidic electrolytic water and alkaline electrolytic water, and is supplied to water softening tank 1003 and neutralizing tank 1004 of water softening portion 1039, respectively. Then, the acidic electrolytic water and the alkaline electrolytic water are reused in water softening tank 1003 and neutralizing tank 1004 of water softening portion 1039, and thereafter pass (recovered) into water storage tank 1042 again. Therefore, the acidic electrolytic water and the alkaline electrolytic water used for the regeneration of weakly acidic cation exchange resin 1007 and the regeneration of weakly basic anion exchange resin 1008 can be reused.

(Water Pump)

Water pump 1012 is a device that circulates water through acidic electrolytic water circulation channel 1102 and alkaline electrolytic water circulation channel 1103 (see FIGS. 8, 11, and 14) during the regeneration treatment by regeneration device 1006. Water pump 1012 is provided in channel 1095 communicatively connecting water storage tank 1042 and electrolyzer 1009. Water pump 1012 is preferably disposed on the upstream side of electrolyzer 1009 and on the downstream side of water storage tank 1042. This arrangement is made because one water pump 1012 can easily circulate water to acidic electrolytic water circulation channel 1102 and alkaline electrolytic water circulation channel 1103. Water pump 1012 is connected to controller 1043 described later so as to be able to communicate therewith in a wireless or wired manner.

(Separation Part)

Separation part 1011 is provided in channel 1091 leading from electrolyzer 1009 to selection valve 1037. Then, separation part 1011 separates a precipitate contained in the alkaline electrolytic water fed from electrolyzer 1009. Here, the precipitate is a reaction product generated when a hardness component, which is a cation released from water softening tank 1003 during the regeneration treatment of water softening tank 1003, reacts with alkaline electrolytic water in electrolyzer 1009. More specifically, water is electrolyzed in electrolyzer 1009, and acidic electrolytic water is obtained on the anode side, and is passed through acidic electrolytic water circulation channel 1102. On the cathode side, alkaline electrolytic water containing anions (for example, hydroxide ions) is obtained, and the alkaline electrolytic water is passed through alkaline electrolytic water circulation channel 1103. In addition, while electrolysis is being performed in electrolyzer 1009, the hardness components (for example, calcium ions and magnesium ions) released from water softening tank 1003 during the regeneration treatment move to the cathode side. Since alkaline electrolytic water is generated on the cathode side, the hardness component and the alkaline electrolytic water react with each other to form a precipitate. For example, when the hardness component is calcium ions, a reaction in which calcium carbonate is generated or calcium hydroxide is generated occurs by mixing the calcium ions with the alkaline electrolytic water. Precipitates derived from the hardness components are separated as precipitates by separation part 1011 provided in alkaline electrolytic water circulation channel 1103. By separating the precipitates derived from the hardness components by separation part 1011, it is possible to prevent the precipitates from flowing into neutralizing tank 1004 to which the precipitates are connected and accumulating. Therefore, when water softening portion 1039 (in particular, neutralizing tank 1004) for which the regeneration treatment has been completed is used in place of water softening portion 1039 of the water softening treatment portion, the precipitate deposited in neutralizing tank 1004 reacts with hydrogen ions released from water softening tank 1003 to form a hardness component, and it is possible to suppress an increase in the hardness of the softened water fed from neutralizing tank 1004.

In addition, during the regeneration treatment, the alkaline electrolytic water from which the precipitate derived from the hardness component is separated by separation part 1011 flows through neutralizing tank 1004, is mixed with the acidic electrolytic water, and then electrolyzed again in electrolyzer 1009, and is provided for regeneration of weakly acidic cation exchange resin 1007 and regeneration of weakly basic anion exchange resin 1008 as the acidic electrolytic water and the alkaline electrolytic water, respectively. At this time, the hardness component contained in the acidic electrolytic water is reduced as compared with the city water or the case of the water treated by the device with which separation part 1011 is not provided. That is, since the hardness of the acidic electrolytic water is reduced by separating the precipitate by separation part 1011, the hardness component flowing into water softening tank 1003 can be reduced, and the reduction in the regeneration efficiency of weakly acidic cation exchange resin 1007 can be suppressed.

Note that "the hardness component reacts" includes not only a state in which all the hardness components react but also a state in which a component that does not react or a component that does not exceed the solubility product is contained.

The form of separation part 1011 is not limited as long as the precipitate generated by the reaction between the hardness component and the alkaline electrolytic water can be separated. For example, a form using a cartridge type filter, a filtration layer using a granular filter material, a cyclone type solid-liquid separator, a hollow fiber membrane, or the like can be mentioned.

As a means generally used as a form of separation part 1011, a cartridge type filter can be exemplified. As the cartridge type filter, a deep filtration type such as a yarn winding filter, a surface filtration type such as a pleated filter and a membrane filter, or a combination thereof can be used.

The yarn winding filter corresponds to a particle diameter of 1 to 150 micrometers, and is mainly used as a pre-filter. The pleated filter and the membrane filter have particle diameters as wide as about 0.03 to 100 micrometers, and it is preferable to use a pleated filter and a membrane filter with an accuracy of about 0.5 to 1.5 micrometers particularly in the implementation of the present disclosure in order to capture the hardness component precipitated in the regeneration treatment described later.

The granular filter material used for the filtration layer is intended to capture and remove hardness components, but it is also possible to remove particles having a surface potential to be adsorbed to the granular filter material, particles having a particle diameter of about 1 μm to 10 μm or chromaticity depending on the existence state of ions and the like in raw water. As the granular filter material, a filter material suitable for an object to be removed, such as filtration sand, a pellet fiber filter material, or the like, can be used. The material of the granular filter material may be, for example, a material having hardness that is likely to settle in water and is less likely to be deformed by pressure, such as sand, anthracite, garnet, ceramics, granular activated carbon, iron oxyhydroxide, or manganese sand. The particle diameter may be, for example, 0.3 mm to 5.0 mm, having an equivalent coefficient of 1.2 to 2.0.

Multilayer filtration method in which a plurality of types of filter materials having different specific gravities are mixed and used is a method in which particles having different sizes are layered in order from smallest particles to largest from the bottom as a layer for filtration. In the multilayer filtration method, particles having a large specific gravity and a small size and particles having a small specific gravity and a large size are usually mixed to form a multilayer structure. The multilayer filtration method is preferable because there are advantages such as high filtration efficiency per unit volume and low head loss as compared with a case where a single kind of filter material is used. As a granular filter material, for example, 0.3 millimeters of garnet, 0.6 meters of sand, and 1.0 millimeters of anthracite are mixed at 2:1:1 and used, and it is preferable to adjust the mixing ratio and the particle diameter according to the particle characteristics of the turbidity.

As described above, regeneration device 1006 includes each member.

(On-Off Valve and Selection Valve)

A plurality of on-off valves (on-off valve 1013, on-off valve 1014) and a plurality of selection valves (selection valve 1015 to selection valve 1038) are operated in combination to switch a connection state of three-stage water softening portions 1039 between a water softening treatment portion including the two-stage water softening portions 1039 that perform the water softening treatment and the regeneration treatment portion including the remaining one-stage water softening portion 1039 that performs the regeneration treatment.

On-off valve 1013 is provided in channel 1050, and switches between an "open" state and a "closed" state in channel 1050.

On-off valve 1014 is provided in channel 1052, and switches between an "open" state and a "closed" state in channel 1052.

On the other hand, selection valve 1015 is provided at a connection point of channel 1053, channel 1054, and channel 1055, and switches between a state in which the water flowing from channel 1053 is allowed to flow through channel 1055 and a state in which the water flowing from channel 1054 is allowed to flow through channel 1055.

Selection valve 1016 is provided at a connection point of channel 1055, channel 1056, and channel 1076, and switches between a state in which the water flowing from channel 1055 flows through channel 1056 and a state in which the water flowing from channel 1076 flows through channel 1056.

Selection valve 1017 is provided at a connection point of channel 1056, channel 1057, and channel 1077, and switches between a state in which the water flowing from channel 1056 flows through channel 1057 and a state in which the water flowing from channel 1056 flows through channel 1077.

Selection valve 1018 is provided at a connection point of channel 1057, channel 1058, and channel 1078, and switches between a state in which the water flowing from channel 1057 flows through channel 1058 and a state in which the water flowing from channel 1078 flows through channel 1058.

Selection valve 1019 is provided at a connection point of channel 1059, channel 1060, and channel 1061, and switches between a state in which the water flowing from channel 1059 flows through channel 1060 and a state in which the water flowing from channel 1059 flows through channel 1061.

Selection valve 1020 is provided at a connection point of channel 1058, channel 1059, and channel 1079, and switches between a state in which the water flowing from channel 1058 flows through channel 1059 and a state in which the water flowing from channel 1058 flows through channel 1079.

Selection valve 1021 is provided at a connection point of channel 1052, channel 1060, and channel 1063, and switches between a state in which the water flowing from channel 1052 flows through channel 1063 and a state in which the water flowing from channel 1060 flows through channel 1063.

Selection valve 1022 is provided at a connection point of channel 1063, channel 1064, and channel 1080, and switches between a state in which the water flowing from channel 1063 flows through channel 1064 and a state in which the water flowing from channel 1080 flows through channel 1064.

Selection valve 1023 is provided at a connection point of channel 1064, channel 1065, and channel 1081, and switches between a state in which the water flowing from channel 1064 flows through channel 1065 and a state in which the water flowing from channel 1064 flows through channel 1081.

Selection valve 1024 is provided at a connection point of channel 1065, channel 1066, and channel 1082, and switches between a state in which the water flowing from channel 1065 flows through channel 1066 and a state in which the water flowing from channel 1082 flows through channel 1066.

Selection valve 1025 is provided at a connection point of channel 1067, channel 1068, and channel 1069, and switches between a state in which the water flowing from channel 1067 flows through channel 1068 and a state in which the water flowing from channel 1067 flows through channel 1069.

Selection valve 1026 is provided at a connection point of channel 1066, channel 1067, and channel 1083, and switches between a state in which the water flowing from channel 1066 flows through channel 1067 and a state in which the water flowing from channel 1066 flows through channel 1083.

Selection valve 1027 is provided at a connection point of channel 1050, channel 1068, and channel 1070, and switches between a state in which the water flowing from channel 1050 flows through channel 1070 and a state in which the water flowing from channel 1068 flows through channel 1070.

Selection valve 1028 is provided at a connection point of channel 1070, channel 1071, and channel 1084, and switches between a state in which the water flowing from channel 1070 flows through channel 1071 and a state in which the water flowing from channel 1084 flows through channel 1071.

Selection valve 1029 is provided at a connection point of channel 1071, channel 1072, and channel 1085, and switches between a state in which the water flowing from channel 1071 flows through channel 1072 and a state in which the water flowing from channel 1071 flows through channel 1085.

Selection valve 1030 is provided at a connection point of channel 1072, channel 1073, and channel 1086, and switches between a state in which the water flowing from channel 1072 flows through channel 1073 and a state in which the water flowing from channel 1086 flows through channel 1073.

Selection valve 1031 is provided at a connection point of channel 1054, channel 1074, and channel 1075, and switches between a state in which the water flowing from channel 1074 flows through channel 1054 and a state in which the water flowing from channel 1074 flows through channel 1075.

Selection valve 1032 is provided at a connection point of channel 1073, channel 1074, and channel 1087, and switches between a state in which the water flowing from channel 1073 flows through channel 1074 and a state in which the water flowing from channel 1073 flows through channel 1087.

Selection valve 1033 is provided at a connection point of channel 1076, channel 1088, and channel 1094, and switches between a state in which the water flowing from channel 1088 flows through channel 1076 and a state in which the water flowing from channel 1088 flows through channel 1094.

Selection valve 1034 is provided at a connection point of channel 1088, channel 1089, and channel 1090, and switches between a state in which the water flowing from channel 1090 flows through channel 1088 and a state in which the water flowing from channel 1090 flows through channel 1089.

Selection valve 1035 is provided at a connection point of channel 1080, channel 1084, and channel 1094, and switches between a state in which the water flowing from channel 1094 flows through channel 1080 and a state in which the water flowing from channel 1094 flows through channel 1084.

Selection valve 1036 is provided at a connection point of channel 1078, channel 1092, and channel 1093, and switches between a state in which the water flowing from channel 1092 flows through channel 1078 and a state in which the water flowing from channel 1092 flows through channel 1093.

Selection valve 1037 is provided at a connection point of channel 1091, channel 1092, and channel 1096, and switches between a state in which the water flowing from channel 1091 flows through channel 1092 and a state in which the water flowing from channel 1091 flows through channel 1096.

Selection valve 1038 is provided at a connection point of channel 1082, channel 1086, and channel 1093, and switches between a state in which the water flowing from channel 1093 flows through channel 1082 and a state in which the water flowing from channel 1093 flows through channel 1086.

Here, the plurality of on-off valves (on-off valve 1013, on-off valve 1014) and the plurality of selection valves (selection valve 1015 to selection valve 1038) are each connected to a controller 1043 to be described later so as to communicate with the controller in a wireless or wired manner (Controller)

Controller 1043 controls a water softening treatment for softening raw water containing a hardness component in the water softening treatment portion. In addition, controller 1043 controls the regeneration treatment of water softening portion 1039 (weakly acidic cation exchange resin 1007 in water softening tank 1003 and weakly basic anion exchange resin 1008 in neutralizing tank 1004) in the regeneration treatment portion. Further, controller 1043 controls switching of the water softening treatment, the water storage treatment, the regeneration treatment, and the drainage treatment of water softening device 1001. At this time, controller 1043 controls the operations of electrode 1010, water pump 1012, on-off valve 1013, on-off valve 1014, and selection valves 1015 to 1038, switches the water softening treatment, the water storage treatment, the regeneration treatment, and the water drainage treatment, and executes the respective treatments. The various treatments will be described later in detail. Controller 1043 includes, for example, a computer system including a processor and a memory. Then, with the processor executing a program stored in the memory, the computer system functions as the controller. Here, the program executed by the processor is recorded in advance in the memory of the computer system, but may be provided by being recorded in a non-transitory recording medium such as a memory card, or may be provided through a telecommunication line such as the Internet.

(Channel)

A plurality of channels configured in water softening device 1001 will be described. Here, the plurality of channels include water softening channel 1100 configured in the water softening treatment, water storage channel 1101 configured in the regeneration treatment, acidic electrolytic water circulation channel 1102 and alkaline electrolytic water circulation channel 1103 configured in the regeneration treatment.

More specifically, water softening device 1001 constitutes first water softening channel 1100*a*, second water softening channel 1100*b*, and third water softening channel 1100*c* as water softening channel 1100. Water softening device 1001 constitutes first water storage channel 1101*a*, second water storage channel 1101*b*, and third water storage channel 1101*c* as water storage channel 1101. In addition, water softening device 1001 constitutes, as acidic electrolytic water circulation channel 1102, first acidic electrolytic water circulation channel 1102*a*, second acidic electrolytic water circulation channel 1102*b*, and third acidic electrolytic water circulation channel 1102*c*. Water softening device 1001 constitutes, as alkaline electrolytic water circulation channel 1103, first alkaline electrolytic water circulation channel 1103*a*, second alkaline electrolytic water circulation channel 1103*b*, and third alkaline electrolytic water circulation channel 1103*c*.

Figure 7:
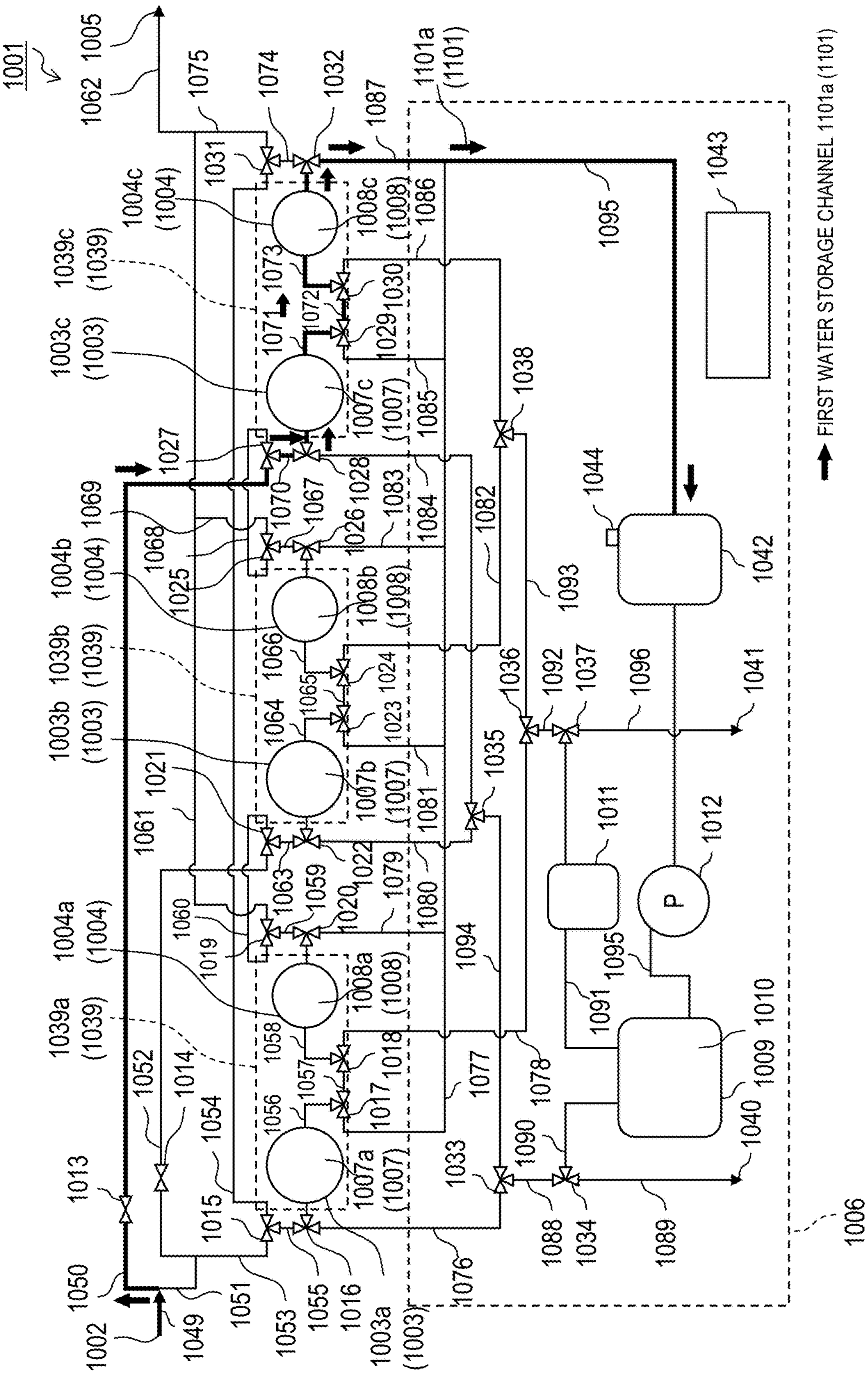
FIG. 7 is a configuration diagram illustrating a first water storage channel of the water softening device.
Figure 8:
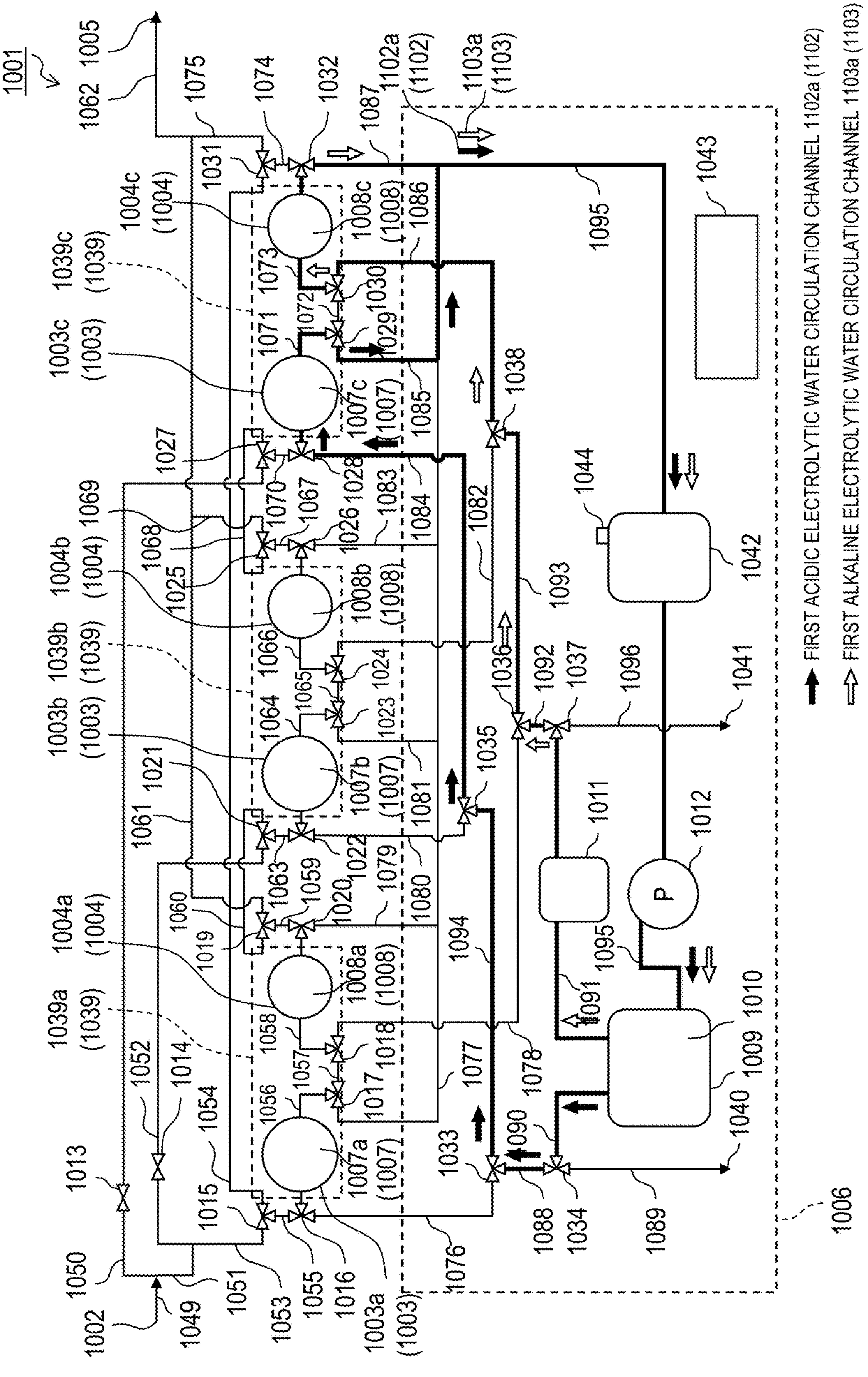
FIG. 8 is a configuration diagram illustrating a first acidic electrolytic water circulation channel and a first alkaline electrolytic water circulation channel of the water softening device.

First, with reference to FIGS. 6 to 8, the respective channels (first water softening channel 1100*a*, first water storage channel 1101*a*, first acidic electrolytic water circulation channel 1102*a*, first alkaline electrolytic water circulation channel 1103*a*) in a state where three-stage water softening portions 1039 are switched to the water softening treatment portion including first water softening portion 1039*a* and second water softening portion 1039*b* and the regeneration treatment portion including third water softening portion 1039*c* will be described. FIG. 6 is a configuration diagram illustrating first water softening channel 1100*a* of water softening device 1001. FIG. 7 is a configuration diagram illustrating first water storage channel 1101*a* of water softening device 1001. FIG. 8 is a configuration diagram illustrating first acidic electrolytic water circulation channel 1102*a* and first alkaline electrolytic water circulation channel 1103*a* of water softening device 1001.

(First Water Softening Channel)

As illustrated in FIG. 6 (black arrow), first water softening channel 1100*a* is a channel through which raw water flowing in from inlet port 1002 flows through first water softening portion 1039*a* and second water softening portion 1039*b* in this order to perform water softening treatment and to take softened water from water take-out port 1005. More specifically, in first water softening channel 1100*a*, the raw water flowing in from inlet port 1002 flows into channel 1049, channel 1051, channel 1053, selection valve 1015, channel 1055, selection valve 1016, channel 1056, first water softening tank 1003*a* provided in channel 1056, selection valve 1017, channel 1057, selection valve 1018, channel 1058, first neutralizing tank 1004*a* provided in channel 1058, selection valve 1020, channel 1059, selection valve 1019, channel 1060, selection valve 1021, channel 1063, selection valve 1022, channel 1064, second water softening tank 1003*b* provided in channel 1064, selection valve 1023, channel 1065, selection valve 1024, channel 1066, second neutralizing tank 1004*b* provided in channel 1066, selection valve 1026, channel 1067, selection valve 1025, channel 1069, channel 1061, and channel 1062 in this order, and the softened water is taken from the water take-out port 1005.

(First Water Storage Channel)

As illustrated in FIG. 7 (black arrow), first water storage channel 1101*a* is a channel for circulating the raw water flowing in from inlet port 1002 to third water softening portion 1039*c* and storing the raw water in water storage tank 1042 in order to store the water to be used at the time of performing the regeneration treatment in regeneration device 1006. More specifically, first water storage channel 1101*a* is a channel through which the raw water flowing in from inlet port 1002 flows through channel 1049, channel 1050, on-off valve 1013 provided in channel 1050, selection valves 1027, channel 1070, selection valves 1028, channel 1071, third water softening tank 1003*c* provided in channel 1071, selection valve 1029, channel 1072, selection valve 1030, channel 1073, third neutralizing tank 1004*c* provided in channel 1073, selection valve 1032, channel 1087, and channel 1095 in this order, and is stored in water storage tank 1042.

(First Acidic Electrolytic Water Circulation Channel)

As illustrated in FIG. 8 (black arrow), first acidic electrolytic water circulation channel 1102*a* is a channel for generating acidic electrolytic water by electrolyzing water fed from water storage tank 1042 by water pump 1012 using electrode 1010 in electrolyzer 1009 during the regeneration treatment, circulating the generated acidic electrolytic water through third water softening tank 1003*c* to regenerate third weakly acidic cation exchange resin 1007*c*, and then returning to water storage tank 1042 for circulation. More specifically, first acidic electrolytic water circulation channel 1102*a* is a channel through which water fed from water storage tank 1042 by water pump 1012 flows through channel 1095 to be electrolyzed by electrolyzer 1009 to become acidic electrolytic water, and circulates through channel 1090, selection valves 1034, channel 1088, selection valves 1033, channel 1094, selection valves 1035, channel 1084, selection valve 1028, channel 1071, third water softening tank 1003*c* provided in channel 1071, selection valve 1029, channel 1085, channel 1077, and channel 1095 in this order.

(First Alkaline Electrolytic Water Circulation Channel)

As illustrated in FIG. 8 (white arrow), first alkaline electrolytic water circulation channel 1103*a* is a channel that generates alkaline electrolytic water by electrolyzing water fed from water storage tank 1042 by water pump 1012 with electrode 1010 in electrolyzer 1009 during the regeneration treatment, regenerates third weakly basic anion exchange resin 1008*c* by allowing the generated alkaline electrolytic water to flow through third neutralizing tank 1004*c*, and then returns to water storage tank 1042 for circulation. More specifically, first alkaline electrolytic water circulation channel 1103*a* is a channel in which water fed from water storage tank 1042 by water pump 1012 flows through channel 1095 to be electrolyzed by electrolyzer 1009 to become alkaline electrolytic water, and circulates through channel 1091, separation part 1011 provided in channel 1091, selection valve 1037, channel 1092, selection valve 1036, channel 1093, selection valve 1038, channel 1086, selection valve 1030, channel 1073, third neutralizing tank 1004*c* provided in channel 1073, selection valve 1032, channel 1087, and channel 1095 in this order.

Figure 10:
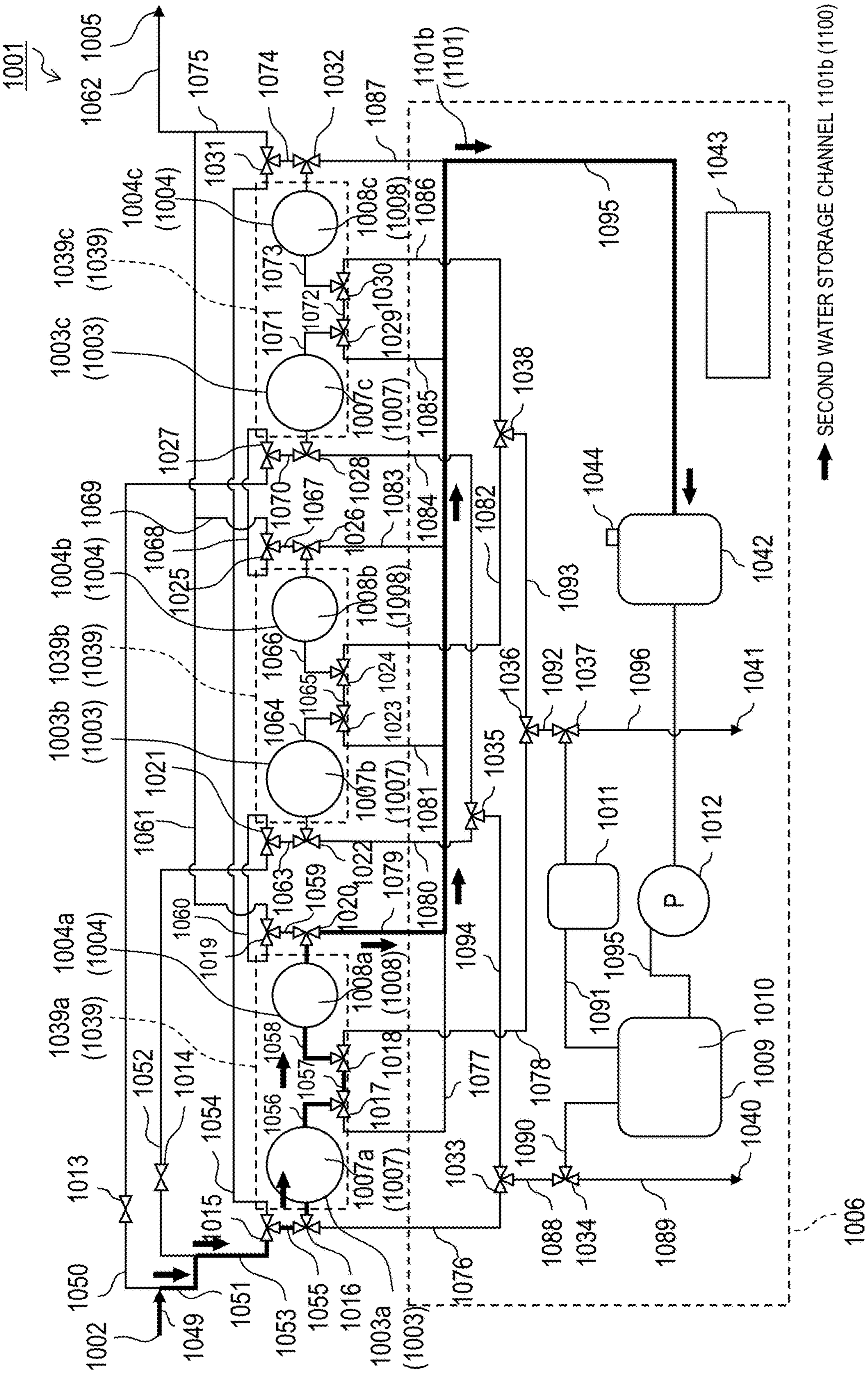
FIG. 10 is a configuration diagram illustrating a second water storage channel of the water softening device.
Figure 11:
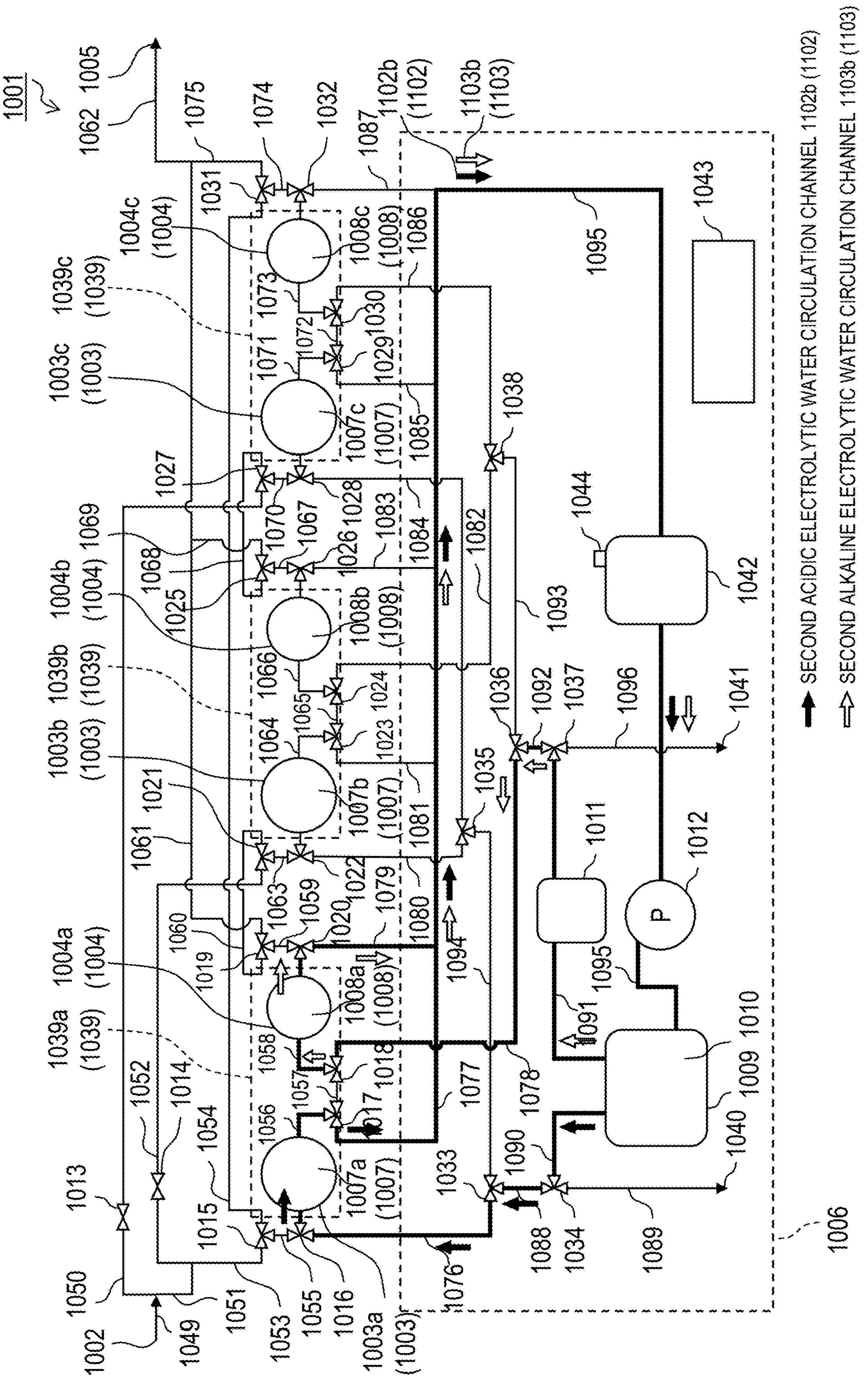
FIG. 11 is a configuration diagram illustrating a second acidic electrolytic water circulation channel and a second alkaline electrolytic water circulation channel of the water softening device.

Next, with reference to FIGS. 9 to 11, respective channels (second water softening channel 1100*b*, second water storage channel 1101*b*, second acidic electrolytic water circulation channel 1102*b*, and second alkaline electrolytic water circulation channel 1103*b*) in a state where three-stage water softening portions 1039 are switched to a water softening treatment portion including second water softening portion 1039*b* and third water softening portion 1039*c* and a regeneration treatment portion including first water softening portion 1039*a* will be described. FIG. 9 is a configuration diagram illustrating second water softening channel 1100*b* of water softening device 1001. FIG. 10 is a configuration diagram illustrating second water storage channel 1101*b* of water softening device 1001. FIG. 11 is a configuration diagram illustrating second acidic electrolytic water circulation channel 1102*b* and second alkaline electrolytic water circulation channel 1103*b* of water softening device 1001.

(Second Water Softening Channel)

As illustrated in FIG. 9 (black arrow), second water softening channel 1100*b* is a channel through which raw water flowing in from inlet port 1002 flows through second water softening portion 1039*b* and third water softening portion 1039*c* in this order to perform a water softening treatment and to take out softened water from water take-out port 1005. More specifically, in second water softening channel 1100*b*, the raw water flowing in from inlet port 1002 flows into channel 1049, channel 1051, channel 1052, on-off valve 1014 provided in channel 1052, selection valves 1021, channel 1063, selection valve 1022, channel 1064, second water softening tank 1003*b* provided in channel 1064, selection valves 1023, channel 1065, selection valve 1024, channel 1066, second neutralizing tank 1004*b* provided in channel 1066, selection valves 1026, channel 1067, selection valve 1025, channel 1068, selection valve 1027, channel 1070, selection valves 1028, channel 1071, third water softening tank 1003*c* provided in channel 1071, selection valve 1029, channel 1072, selection valve 1030, channel 1073, third neutralizing tank 1004*c* provided in channel 1073, selection valve 1032, channel 1074, selection valve 1031, channel 1075, and channel 1062 in this order, and the softened water is taken out from water take-out port 1005.

(Second Water Storage Channel)

As illustrated in FIG. 10 (black arrow), second water storage channel 1101*b* is a channel for circulating the raw water flowing in from inlet port 1002 to first water softening portion 1039*a* and storing the raw water in water storage tank 1042 in order to store the water to be used at the time of performing the regeneration treatment in regeneration device 1006. More specifically, second water storage channel 1101*b* is a channel through which the raw water flowing in from inlet port 1002 flows through channel 1049, channel 1051, channel 1053, selection valve 1015, channel 1055, selection valve 1016, channel 1056, first water softening tank 1003*a* provided in channel 1056, selection valve 1017, channel 1057, selection valve 1018, channel 1058, first neutralizing tank 1004*a* provided in channel 1058, selection valve 1020, channel 1079, channel 1077, and channel 1095 in this order to store water in water storage tank 1042.

(Second Acidic Electrolytic Water Circulation Channel)

As illustrated in FIG. 11 (black arrow), the second acidic electrolytic water circulation channel 1102*b* is a channel for generating acidic electrolytic water by electrolyzing water fed from water storage tank 1042 by water pump 1012 with electrode 1010 in electrolyzer 1009 during the regeneration treatment, circulating the generated acidic electrolytic water through first water softening tank 1003*a* to regenerate first weakly acidic cation exchange resin 1007*a*, and then returning to water storage tank 1042 for circulation. More specifically, second acidic electrolytic water circulation channel 1102*b* is a channel in which water fed from water storage tank 1042 by water pump 1012 flows through channel 1095 to be electrolyzed by electrolyzer 1009 to become acidic electrolytic water, and circulates through channel 1090, selection valve 1034, channel 1088, selection valve 1033, channel 1076, selection valve 1016, channel 1056, first water softening tank 1003*a* provided in channel 1056, selection valve 1017, channel 1077, and channel 1095 in this order.

(Second Alkaline Electrolytic Water Circulation Channel)

As illustrated in FIG. 11 (white arrow), the second alkaline electrolytic water circulation channel 1103*b* is a channel that generates alkaline electrolytic water by electrolyzing water fed from water storage tank 1042 by water pump 1012 by electrode 1010 in electrolyzer 1009 during the regeneration treatment, regenerates first weakly basic anion exchange resin 1008*a* by allowing the generated alkaline electrolytic water to flow through first neutralizing tank 1004*a*, and then returns to water storage tank 1042 for circulation. More specifically, second alkaline electrolytic water circulation channel 1103*b* is a channel in which water fed from water storage tank 1042 by water pump 1012 flows through channel 1095 and is electrolyzed by electrolyzer 1009 to become alkaline electrolytic water, and circulates through channel 1091, separation part 1011 provided in channel 1091, selection valve 1037, channel 1092, selection valve 1036, channel 1078, selection valve 1018, channel 1058, first neutralizing tank 1004*a* provided in channel 1058, selection valve 1020, channel 1079, channel 1077, and channel 1095 in this order.

Figure 13:
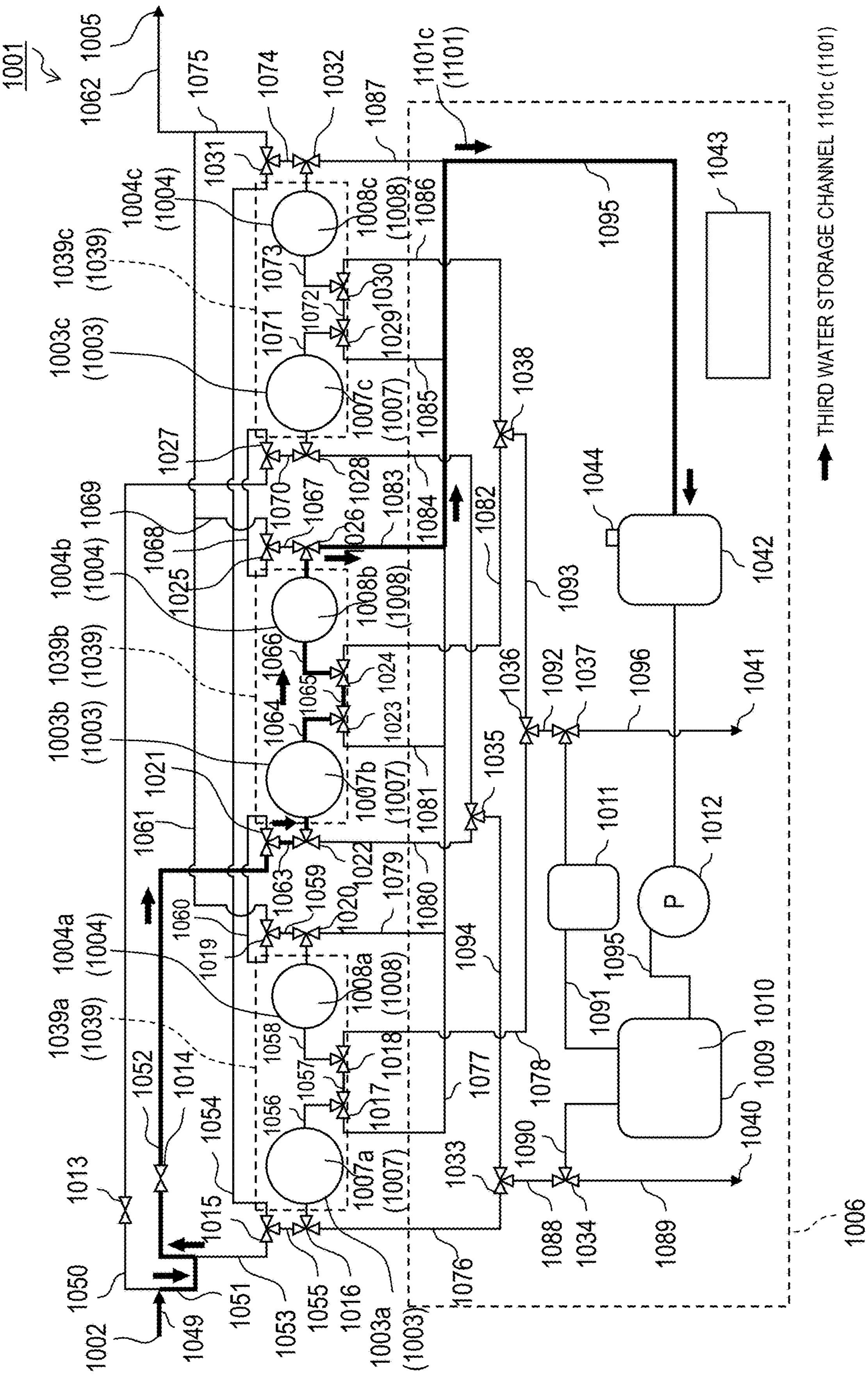
FIG. 13 is a configuration diagram illustrating a third water storage channel of the water softening device.
Figure 14:
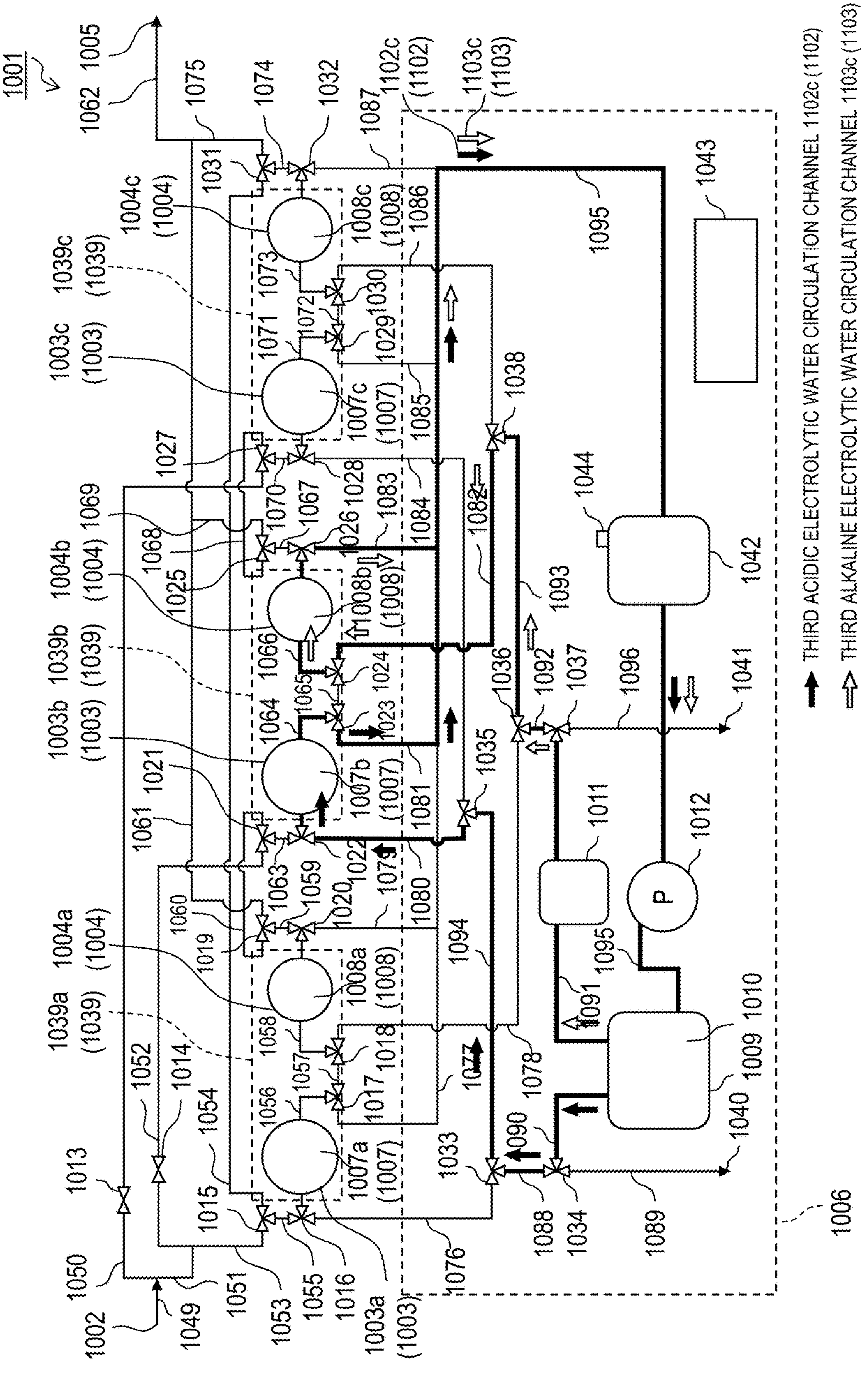
FIG. 14 is a configuration diagram illustrating a third acidic electrolytic water circulation channel and a third alkaline electrolytic water circulation channel of the water softening device.

Next, with reference to FIGS. 12 to 14, respective channels (third water softening channel 1100*c*, third water storage channel 1101*c*, third acidic electrolytic water circulation channel 1102*c*, third alkaline electrolytic water circulation channel 1103*c*) in a state where three-stage water softening portions 1039 are switched to a water softening treatment portion including third water softening portion 1039*c* and first water softening portion 1039*a* and a regeneration treatment portion including second water softening portion 1039*b* will be described. FIG. 12 is a configuration diagram illustrating third water softening channel 1100*c* of water softening device 1001. FIG. 13 is a configuration diagram illustrating third water storage channel 1101*c* of water softening device 1001. FIG. 14 is a configuration diagram illustrating third acidic electrolytic water circulation channel 1102*c* and third alkaline electrolytic water circulation channel 1103*c* of water softening device 1001.

(Third Water Softening Channel)

As illustrated in FIG. 12 (black arrow), third water softening channel 1100*c* is a channel through which raw water flowing in from inlet port 1002 flows through third water softening portion 1039*c* and first water softening portion 1039*a* in this order, and softened water is taken from water take-out port 1005. More specifically, in third water softening channel 1100*c*, the raw water flowing in from inlet port 1002 flows into channel 1049, channel 1050, on-off valve 1013 provided in channel 1050, selection valve 1027, channel 1070, selection valve 1028, channel 1071, third water softening tank 1003*c* provided in channel 1071, selection valve 1029, channel 1072, selection valve 1030, channel 1073, third neutralizing tank 1004*c* provided in channel 1073, selection valve 1032, channel 1074, selection valve 1031, channel 1054, selection valve 1015, channel 1055, selection valve 1016, channel 1056, first water softening tank 1003*a* provided in channel 1056, selection valve 1017, channel 1057, selection valve 1018, channel 1058, first neutralizing tank 1004*a* provided in channel 1058, selection valve 1020, channel 1059, selection valve 1019, channel 1061, and channel 1062 in this order, and the softened water is taken out from water take-out port 1005.

(Third Water Storage Channel)

As illustrated in FIG. 13 (black arrow), third water storage channel 1101*c* is a channel for circulating the raw water flowing in from inlet port 1002 to second water softening portion 1039*b* to store the raw water in water storage tank 1042 in order to store the water to be used at the time of performing the regeneration treatment in regeneration device 1006. More specifically, third water storage channel 1101*c* is a channel through which the raw water flowing in from inlet port 1002 flows through channel 1049, channel 1051, channel 1052, on-off valve 1014 provided in channel 1052, selection valve 1021, channel 1063, selection valve 1022, channel 1064, second water softening tank 1003*b* provided in channel 1064, selection valve 1023, channel 1065, selection valve 1024, channel 1066, second neutralizing tank 1004*b* provided in channel 1066, selection valve 1026, channel 1083, channel 1077, and channel 1095 in this order to store water in water storage tank 1042.

(Third Acidic Electrolytic Water Circulation Channel)

As illustrated in FIG. 14 (black arrow), third acidic electrolytic water circulation channel 1102*c* is a channel for generating acidic electrolytic water by electrolyzing water fed from water storage tank 1042 by water pump 1012 with electrode 1010 in electrolyzer 1009 during the regeneration treatment, circulating the generated acidic electrolytic water through second water softening tank 1003*b* to regenerate second weakly acidic cation exchange resin 1007*b*, and then returning to water storage tank 1042 for circulation. More specifically, third acidic electrolytic water circulation channel 1102*c* is a channel through which water fed from water storage tank 1042 by water pump 1012 flows through channel 1095 to be electrolyzed by electrolyzer 1009 to become acidic electrolytic water, and circulates through channel 1090, selection valve 1034, channel 1088, selection valve 1033, channel 1094, selection valve 1035, channel 1080, selection valve 1022, channel 1064, second water softening tank 1003*b* provided in channel 1064, selection valve 1023, channel 1081, channel 1077, and channel 1095 in this order.

(Third Alkaline Electrolytic Water Circulation Channel)

As illustrated in FIG. 14 (white arrow), third alkaline electrolytic water circulation channel 1103*c* is a channel that generates alkaline electrolytic water by electrolyzing water fed from water storage tank 1042 by water pump 1012 with electrode 1010 in electrolyzer 1009 during the regeneration treatment, regenerates second weakly basic anion exchange resin 1008*b* by allowing the generated alkaline electrolytic water to flow through second neutralizing tank 1004*b*, and then returns to water storage tank 1042 for circulation. More specifically, third alkaline electrolytic water circulation channel 1103*c* is a channel in which water fed from water storage tank 1042 by water pump 1012 flows through channel 1095 to be electrolyzed by electrolyzer 1009 to become alkaline electrolytic water, and circulates through channel 1091, separation part 1011 provided in channel 1091, selection valve 1037, channel 1092, selection valve 1036, channel 1093, selection valve 1038, channel 1082, selection valve 1024, channel 1066, second neutralizing tank

1004*b* provided in channel 1066, selection valve 1026, channel 1083, channel 1077, and channel 1095 in this order.

As described above, in water softening device 1001, by switching a plurality of on-off valves (on-off valve 1013, on-off valve 1014) and a plurality of selection valves (selection valve 1015 to selection valve 1038), it is possible to switch to a channel configuration corresponding to the water softening treatment in the water softening treatment portion and the regeneration treatment in the regeneration treatment portion.

Next, water softening treatment, water storage treatment, regeneration treatment, and drainage treatment in water softening device 1001 will be described with reference to FIG. 15. FIG. 15 is a diagram illustrating a state of water softening device 1001 in operation. Here, "ON" in FIG. 15 individually indicates a state in which the corresponding on-off valve is "open", a state in which electrode 1010 is energized, or a state in which water pump 1012 is operating. Blanks indicate a state in which the corresponding on-off valve is "closed", a state in which electrode 1010 is not energized, or a state in which water pump 1012 is stopped. In addition, the notations of selection valve 1015 to selection valve 1038 in FIG. 15 indicate a state of being opened to the channel corresponding to the numeral (reference sign). For example, "1015→1055" of selection valve 1015 indicates a state in which selection valve 1015 is opened from channel 1053 toward channel 1055.

As illustrated in FIG. 15, during the water softening treatment, the water storage treatment, the regeneration treatment, and the drainage treatment, controller 1043 switches on-off valve 1013, on-off valve 1014, selection valve 1015 to selection valve 1038, electrode 1010 of electrolyzer 1009, and water pump 1012 to control them to be in respective flowing states. More specifically, controller 1043 controls the first water softening treatment, the second water softening treatment, and the third water softening treatment as the water softening treatment. Further, controller 1043 controls the first water storage treatment, the second water storage treatment, and the third water storage treatment as the water storage treatment. Controller 1043 controls the first regeneration treatment, the second regeneration treatment, and the third regeneration treatment as the regeneration treatment.

Here, the first water softening treatment is a treatment for softening water by first water softening portion 1039*a* and second water softening portion 1039*b* in first water softening channel 1100*a*. The second water softening treatment is a treatment for softening water by second water softening portion 1039*b* and third water softening portion 1039*c* in second water softening channel 1100*b*. The third water softening treatment is a treatment for softening water by third water softening portion 1039*c* and first water softening portion 1039*a* in the third water softening channel 1100*c*.

The first water storage treatment is a treatment for storing softened water in water storage tank 1042 of regeneration device 1006 via third water softening portion 1039*c* in the first water storage channel 1101*a*. The second water storage treatment is a treatment for storing softened water in the water storage tank 1042 of regeneration device 1006 via first water softening portion 1039*a* in second water storage channel 1101*b*. The third water storage treatment is a treatment for storing softened water in water storage tank 1042 of regeneration device 1006 via second water softening portion 1039*b* in the third water storage channel 1101*c*.

The first regeneration treatment is a treatment for regenerating third water softening portion 1039*c* in first acidic electrolytic water circulation channel 1102*a* and first alkaline electrolytic water circulation channel 1103*a*. The second regeneration treatment is a treatment for regenerating first water softening portion 1039*a* in the second acidic electrolytic water circulation channel 1102*b* and second alkaline electrolytic water circulation channel 1103*b*. The third regeneration treatment is a treatment for regenerating second water softening portion 1039*b* in third acidic electrolytic water circulation channel 1102*c* and third alkaline electrolytic water circulation channel 1103*c*.

Water softening device 1001 first starts the first water softening treatment as an operation of the water softening treatment, the water storage treatment, the regeneration treatment, and the drainage treatment. Then, water softening device 1001 performs the first water storage treatment, the first regeneration treatment, and the drainage treatment in this order during the period in which the first water softening treatment is performed. Next, water softening device 1001 finishes the first water softening treatment and switches to the second water softening treatment after a lapse of a certain period from the start of the first water softening treatment. Then, water softening device 1001 performs the second water storage treatment, the second regeneration treatment, and the drainage treatment in this order during the period in which the second water softening treatment is performed. Next, water softening device 1001 finishes the second water softening treatment after a lapse of a certain period from the start of the second water softening treatment, and switches to the third water softening treatment. Water softening device 1001 performs the third water storage treatment, the third regeneration treatment, and the drainage treatment in this order during the period in which the third water softening treatment is performed. Further, water softening device 1001 finishes the third water softening treatment after a lapse of a certain period from the start of the third water softening treatment and switches to the first water softening treatment. Water softening device 1001 generates city water (raw water containing hardness components) supplied from the outside as neutral softened water that can be used as domestic water while sequentially repeating the first water softening treatment, the second water softening treatment, and the third water softening treatment as described above. Here, the certain period is set to once in one day (24 hours), for example.

(First Water Softening Treatment)

First, an operation of water softening device 1001 at the time of the first water softening treatment will be described with reference to the column "IN FIRST WATER SOFTENING TREATMENT" in FIG. 15.

In the first water softening treatment, as illustrated in FIG. 15, in a state where on-off valve 1013 and on-off valve 1014 are closed, selection valve 1015 is opened from channel 1053 toward channel 1055, selection valve 1016 is opened from channel 1055 toward channel 1056, selection valve 1017 is opened from channel 1056 toward channel 1057, selection valve 1018 is opened from channel 1057 toward channel 1058, selection valve 1019 is opened from channel 1059 toward channel 1060, selection valve 1020 is opened from channel 1058 toward channel 1059, selection valve 1021 is opened from channel 1060 toward channel 1063, selection valve 1022 is opened from channel 1063 toward channel 1064, and selection valve 1023 is opened from channel 1064 toward channel 1065, selection valve 1024 is opened from channel 1065 toward channel 1066, selection valve 1025 is opened from channel 1067 toward channel 1069, and selection valve 1026 is opened from channel 1066 toward channel 1067. As a result, the city water (raw water containing hardness components) flowing in from inlet port 1002 is softened through first water softening portion 1039a and second water softening portion 1039b in the process of flowing through first water softening channel 1100a, and taken out as softened water (neutral softened water) from water take-out port 1005.

Specifically, as illustrated in FIG. 6, in the first water softening treatment, raw water supplied by the pressure of city water flows through first water softening channel 1100a and is supplied to the first water softening tank 1003a of the first water softening portion 1039a. The raw water supplied to first water softening tank 1003a flows through first weakly acidic cation exchange resin 1007a provided in first water softening tank 1003a. At this time, cations as the hardness component in the raw water are adsorbed by the action of first weakly acidic cation exchange resin 1007a, and hydrogen ions are released (ion exchange is performed). Then, cations are removed from the raw water, whereby the raw water is softened. Since the softened water contains a large amount of hydrogen ions that have been exchanged for the hardness component and flowed out, the softened water is acidified to be acidic water having a low pH. The softened water further flows through first water softening channel 1100a and flows into first neutralizing tank 1004a. In first neutralizing tank 1004a, hydrogen ions contained in the softened water are adsorbed by the action of first weakly basic anion exchange resin 1008a. That is, since hydrogen ions are removed from the water softened by first water softening tank 1003a, the lowered pH is increased and neutralized. The water neutralized by first neutralizing tank 1004a further flows through first water softening channel 1100a and flows into second water softening tank 1003b of second water softening portion 1039b. In second water softening tank 1003b, cations as hardness components contained in water from first water softening portion 1039a are adsorbed and hydrogen ions are released by the action of second weakly acidic cation exchange resin 1007b. That is, the water flowing into second water softening tank 1003b is further softened to be softened water. The softened water containing hydrogen ions flows through first water softening channel 1100a and flows into second neutralizing tank 1004b. In second neutralizing tank 1004b, hydrogen ions contained in the inflowing softened water are adsorbed by the action of second weakly basic anion exchange resin 1008b. That is, since hydrogen ions are removed from the softened water, the lowered pH increases, and the softened water becomes softened neutral water that can be used as domestic water. The softened neutral water can be taken out from water take-out port 1005 through first water softening channel 1100a.

At this time, the raw water (or softened water) is prevented from flowing into the channel other than the first water softening channel 1100a by opening selection valve 1031 from channel 1074 toward channel 1054. While first water softening portion 1039a and second water softening portion 1039b perform the first water softening treatment, the first water storage treatment, the first regeneration treatment, and the drainage treatment are simultaneously performed in parallel to third water softening portion 1039c in this order.

(First Water Storage Treatment)

Next, an operation of water softening device 1001 at the time of the first water storage treatment will be described with reference to a column of "IN FIRST WATER STORAGE TREATMENT" in FIG. 15.

In the first water storage treatment, as illustrated in FIG. 15, in a state of the on-off valve and the selection valve "IN FIRST WATER SOFTENING TREATMENT", on-off valve 1013 is set to the "open" state, selection valve 1027 is opened from channel 1050 toward channel 1070, selection valve 1028 is opened from channel 1070 toward channel 1071, selection valve 1029 is opened from channel 1071 toward channel 1072, selection valve 1030 is opened from channel 1072 toward channel 1073, and selection valve 1032 is opened from channel 1073 toward channel 1087. As a result, as illustrated in FIG. 7, water softening device 1001 introduces softened water (water softened by third water softening portion 1039c) into water storage tank 1042 from inlet port 1002 via first water storage channel 1101a by the pressure of the city water. By storing a predetermined amount of water corresponding to the capacity of water softening device 1001 in water storage tank 1042, regeneration device 1006 can secure the amount of water at the time of regeneration.

(First Regeneration Treatment)

Next, the operation of water softening device 1001 at the time of the first regeneration treatment will be described with reference to the column of "IN FIRST REGENERATION TREATMENT" in FIG. 15.

In the first regeneration treatment, in a state of the on-off valve and the selection valve "IN FIRST WATER SOFTENING TREATMENT" as illustrated in FIG. 15, selection valve 1028 is opened from channel 1084 toward channel 1071, selection valve 1029 is opened from channel 1071 toward channel 1085, selection valve 1030 is opened from channel 1086 toward channel 1073, selection valve 1033 is opened from channel 1088 toward channel 1094, selection valve 1034 is opened from channel 1090 toward channel 1088, selection valve 1035 is opened from channel 1094 toward channel 1084, selection valve 1036 is opened from channel 1092 toward channel 1093, selection valve 1037 is opened from channel 1091 toward channel 1092, and selection valve 1038 is opened from channel 1093 toward channel 1086. As a result, in water softening device 1001, as illustrated in FIG. 8, first acidic electrolytic water circulation channel 1102a and first alkaline electrolytic water circulation channel 1103a are formed. When electrode 1010 of electrolyzer 1009 and water pump 1012 are operated, the water stored in water storage tank 1042 circulates through each of first acidic electrolytic water circulation channel 1102a and first alkaline electrolytic water circulation channel 1103a.

At this time, the acidic electrolytic water generated in electrolyzer 1009 flows through first acidic electrolytic water circulation channel 1102a, is fed into third water softening tank 1003c, and flows through third weakly acidic cation exchange resin 1007c inside. That is, by passing the acidic electrolytic water through third weakly acidic cation exchange resin 1007c, cations (hardness components) adsorbed to third weakly acidic cation exchange resin 1007c undergo an ion exchange reaction with hydrogen ions contained in the acidic electrolytic water. This allows third weakly acidic cation exchange resin 1007c to regenerate. Thereafter, the acidic electrolytic water having flowed through third weakly acidic cation exchange resin 1007c contains cations and is recovered into water storage tank 1042 via first acidic electrolytic water circulation channel 1102a. On the other hand, the alkaline electrolytic water generated in electrolyzer 1009 is fed into third neutralizing tank 1004c through first alkaline electrolytic water circulation channel 1103a, and flows through third weakly basic anion exchange resin 1008c inside. That is, by allowing the alkaline electrolytic water to pass through third weakly basic anion exchange resin 1008c, anions adsorbed on third weakly basic anion exchange resin 1008c undergo an ion exchange reaction with hydroxide ions contained in the alkaline electrolytic water. This allows third weakly basic anion exchange resin 1008*c* to regenerate. Thereafter, the alkaline electrolytic water having flowed through third weakly basic anion exchange resin 1008*c* contains anions and is recovered into water storage tank 1042 via first alkaline electrolytic water circulation channel 1103*a*. In water storage tank 1042, the acidic electrolytic water containing cations recovered from third water softening tank 1003*c* and the alkaline electrolytic water containing anions recovered from third neutralizing tank 1004*c* are mixed and neutralized.

Here, in the first regeneration treatment, by mixing the acidic electrolytic water containing cations (hardness components) and the alkaline electrolytic water containing anions, the hardness components react with hydroxide ions contained in the alkaline electrolytic water, and a precipitate is generated. However, at least at the initial stage of the regeneration treatment, the amount of hydroxide ions contained in the alkaline electrolytic water flowing from third neutralizing tank 1004*c* of third water softening portion 1039*c* is smaller than the amount of hardness components released from third water softening tank 1003*c* of third water softening portion 1039*c*, and thus the precipitate is less likely to be generated. Therefore, the hardness components contained in the neutralized electrolytic water are fed to electrolyzer 1009 as they are. Thereafter, the electrolytic water mixed in water storage tank 1042 passes through electrolyzer 1009 again via channel 1095. Then, the passed water is electrolyzed again in electrolyzer 1009. In electrolyzer 1009, water is electrolyzed, and a large amount of hydroxide ions are generated by electrolysis in the vicinity of the cathode, so that a precipitate is likely to be generated. That is, the hardness component (for example, calcium ions and magnesium ions) contained in the water supplied from water storage tank 1042 moves to the cathode side and reacts with hydroxide ions to become a precipitate. Then, the alkaline electrolytic water containing such precipitates is fed to first alkaline electrolytic water circulation channel 1103*a* and flows into separation part 1011. In separation part 1011, the precipitate contained in the alkaline electrolytic water is separated, and the alkaline electrolytic water (treated water) from which the hardness component has been removed can be obtained. Here, the acidic electrolytic water electrolyzed again in electrolyzer 1009 and the alkaline electrolytic water electrolyzed again in electrolyzer 1009 and separated from the precipitate by separation part 1011 are provided for the regeneration of third weakly acidic cation exchange resin 1007*c* and the regeneration of third weakly basic anion exchange resin 1008*c*, respectively. In the present exemplary embodiment, by separating the precipitate generated in electrolyzer 1009 by separation part 1011, it is possible to suppress the deposition of the precipitate due to the hardness component in electrolyzer 1009, third water softening tank 1003*c*, and third neutralizing tank 1004*c*. Further, when electrolysis is performed in electrolyzer 1009, the hardness component that is a cation moves to the alkaline electrolytic water side, so that the hardness of the acidic electrolytic water decreases, and a decrease in the regeneration efficiency of third weakly acidic cation exchange resin 1007*c* can be suppressed.

Then, in water softening device 1001, the operations of electrode 1010 and water pump 1012 are stopped when the regeneration treatment is completed. Then, the process proceeds to the drainage treatment. The regeneration treatment may be ended when a predetermined time (for example, 7 hours) elapses from the start of the regeneration treatment (the start of the operation of electrode 1010). This predetermined time is a time set in advance based on information regarding the use environment of water softening device 1001 (for example, the amount of softened water used, the hardness of raw water, and the like).

(Drainage Treatment)

Next, the operation of water softening device 1001 at the time of drainage treatment will be described with reference to the column of "IN DRAINAGE TREATMENT" in FIG. 15.

In water softening device 1001, when the first regeneration treatment is completed, the process proceeds to the drainage treatment. Here, the drainage treatment is a treatment for discharging acidic electrolytic water and alkaline electrolytic water remaining in first acidic electrolytic water circulation channel 1102*a* and first alkaline electrolytic water circulation channel 1103*a*. Also in the drainage treatment, the first water softening treatment is performed in parallel.

In water softening device 1001, in the drainage treatment (in draining), selection valve 1034 is opened from channel 1090 toward channel 1089 and selection valve 1037 is opened from channel 1091 toward channel 1096 from the states of the on-off valve and the selection valve at the "IN FIRST WATER SOFTENING TREATMENT" and "IN FIRST REGENERATION TREATMENT" as illustrated in FIG. 15. Then, by the action of air vent valve 1044, the electrolytic water in water storage tank 1042 can be discharged to the outside of the device through first drainage port 1040 and second drainage port 1041.

Next, selection valve 1034 is opened from channel 1090 toward channel 1088, and selection valve 1037 is returned to a state of being opened from channel 1091 toward channel 1092. Thus, the acidic electrolytic water remaining in first acidic electrolytic water circulation channel 1102*a* and the alkaline electrolytic water remaining in first alkaline electrolytic water circulation channel 1103*a* can flow into water storage tank 1042.

Then, selection valve 1034 is opened again from channel 1090 toward channel 1089, and selection valve 1037 is opened from channel 1091 toward channel 1096. Then, by the action of air vent valve 1044, the electrolytic water in water storage tank 1042 can be discharged to the outside of the device through first drainage port 1040 and second drainage port 1041.

By performing the drainage treatment, when water softening portion 1039 for which the regeneration treatment has been completed is used in place of water softening portion 1039 of the water softening treatment portion, the acidic electrolytic water remaining in the first acidic electrolytic water circulation channel 1102*a* and the alkaline electrolytic water remaining in the first alkaline electrolytic water circulation channel 1103*a* can be prevented from being mixed with the raw water flowing in from inlet port 1002 and being discharged from water take-out port 1005. Then, in water softening device 1001, when the drainage treatment is completed, the water pump is stopped. Note that the end of the drainage treatment may be set at the time when a certain time (for example, one minute) has elapsed from the start of the drainage treatment.

(Second Water Softening Treatment)

Next, the operation at the time of the second water softening treatment by water softening device 1001 will be described with reference to the column of "IN SECOND WATER SOFTENING TREATMENT" in FIG. 15. Here, the second water softening treatment is performed when a regeneration treatment is required for water softening portion 1039 (particularly, first water softening portion 1039*a*) constituting the water softening channel in the first water softening treatment (in the present exemplary embodiment, when a certain period of time has elapsed). At this time, the second water softening treatment is executed by separating water softening portion 1039 (first water softening portion 1039*a*) on the upstream side from water softening channel 1100 (first water softening channel 1100*a*) in the first water softening treatment and switching water softening channel 1100 (second water softening channel 1100*b*) so as to incorporate water softening portion 1039 (third water softening portion 1039*c*), for which the regeneration treatment has been completed, into the downstream side of water softening channel 1100 in the regeneration treatment portion. By switching in this manner, second water softening channel 1100*b* has a configuration in which two-stage water softening portions 1039 are communicatively connected in series in order of a larger adsorption amount of the hardness component adsorbed in water softening tank 1003 of water softening portion 1039 from the upstream side into which the raw water is introduced.

In the second water softening treatment, as illustrated in FIG. 15, in a state where on-off valve 1013 is closed and in a state where on-off valve 1014 is opened, selection valve 1021 is opened from channel 1052 toward channel 1063, selection valve 1022 is opened from channel 1063 toward channel 1064, selection valve 1023 is opened from channel 1064 toward channel 1065, selection valve 1023 is opened from channel 1064 toward channel 1065, selection valve 1024 is opened from channel 1065 toward channel 1066, selection valve 1025 is opened from channel 1067 toward channel 1068, selection valve 1026 is opened from channel 1066 toward channel 1067, selection valve 1027 is opened from channel 1068 toward channel 1070, selection valve 1028 is opened from channel 1070 toward channel 1071, selection valve 1029 is opened from channel 1071 toward channel 1072, selection valve 1030 is opened from channel 1072 toward channel 1073, selection valve 1031 is opened from channel 1074 toward channel 1075, and selection valve 1032 is opened from channel 1073 toward channel 1074. As a result, the city water (raw water containing hardness components) flowing in from inlet port 1002 is softened through second water softening portion 1039*b* and third water softening portion 1039*c* in the process of flowing through second water softening channel 1100*b*, and taken out from water take-out port 1005 as softened water (neutral softened water).

Specifically, as illustrated in FIG. 9, in the first water softening treatment, the raw water supplied by the pressure of city water passes through second water softening channel 1100*b* and is supplied to second water softening tank 1003*b* of second water softening portion 1039*b*. The raw water supplied to second water softening tank 1003*b* flows through second weakly acidic cation exchange resin 1007*b* provided in second water softening tank 1003*b*. At this time, cations as the hardness component in the raw water are adsorbed by the action of second weakly acidic cation exchange resin 1007*b*, and hydrogen ions are released (ion exchange is performed). Then, cations are removed from the raw water, whereby the raw water is softened. Since the softened water contains a large amount of hydrogen ions that have been exchanged for the hardness component and flowed out, the softened water is acidified to be acidic water having a low pH. The softened water further flows through second water softening channel 1100*b* and flows into second neutralizing tank 1004*b* of second water softening portion 1039*b*. In second neutralizing tank 1004*b*, hydrogen ions contained in the softened water are adsorbed by the action of second weakly basic anion exchange resin 1008*b*. That is, since hydrogen ions are removed from the water softened by second water softening tank 1003*b*, the lowered pH is increased and neutralized. The water neutralized by second neutralizing tank 1004*b* further flows through second water softening channel 1100*b* and flows into third water softening tank 1003*c* of third water softening portion 1039*c*. In third water softening tank 1003*c*, cations as hardness components contained in water from second water softening portion 1039*b* are adsorbed and hydrogen ions are released by the action of third weakly acidic cation exchange resin 1007*c*. That is, the water flowing into third water softening tank 1003*c* is further softened to be softened water. The softened water containing hydrogen ions flows through second water softening channel 1100*b* and flows into third neutralizing tank 1004*c* of third water softening portion 1039*c*. In third neutralizing tank 1004*c*, hydrogen ions contained in the inflowing softened water are adsorbed by the action of third weakly basic anion exchange resin 1008*c*. That is, since hydrogen ions are removed from the softened water, the lowered pH increases, and the softened water becomes softened neutral water that can be used as domestic water. The softened neutral water can be taken out from water take-out port 1005 through second water softening channel 1100*b*.

At this time, by opening selection valve 1019 in the direction from channel 1059 toward channel 1060, the raw water (or softened water) is prevented from flowing into the channel other than second water softening channel 1100*b*. While second water softening portion 1039*b* and third water softening portion 1039*c* are performing the second water softening treatment, the second water storage treatment, the second regeneration treatment, and the drainage treatment are simultaneously performed in parallel to first water softening portion 1039*a* in this order.

(Second Water Storage Treatment)

Next, an operation of water softening device 1001 at the time of the second water storage treatment will be described with reference to a column of "IN SECOND WATER STORAGE TREATMENT" in FIG. 15.

In the second water storage treatment, as illustrated in FIG. 15, in a state of the on-off valve and the selection valve "IN SECOND WATER SOFTENING TREATMENT", selection valve 1015 is opened from channel 1053 toward channel 1055, selection valve 1016 is opened from channel 1055 toward channel 1056, selection valve 1017 is opened from channel 1056 toward channel 1057, selection valve 1018 is opened from channel 1057 toward channel 1058, and selection valve 1020 is opened from channel 1058 toward channel 1079. As a result, as illustrated in FIG. 10, water softening device 1001 introduces softened water (water softened by first water softening portion 1039*a*) into water storage tank 1042 from inlet port 1002 via second water storage channel 1101*b* by the pressure of city water. By storing a predetermined amount of water corresponding to the capacity of water softening device 1001 in water storage tank 1042, regeneration device 1006 can secure the amount of water at the time of regeneration.

(Second Regeneration Treatment)

Next, the operation of water softening device 1001 at the time of the second regeneration treatment will be described with reference to the column of "IN SECOND REGENERATION TREATMENT" in FIG. 15.

In the second regeneration treatment, as illustrated in FIG. 15, in a state of the on-off valve and the selection valve "IN SECOND WATER SOFTENING TREATMENT", selection valve 1015 is opened from channel 1054 toward channel 1055, selection valve 1016 is opened from channel 1076 toward channel 1056, selection valve 1017 is opened from channel 1056 toward channel 1057, selection valve 1018 is opened from channel 1078 toward channel 1058, selection valve 1020 is opened from channel 1058 toward channel 1079, selection valve 1033 is opened from channel 1088 toward channel 1076, selection valve 1034 is opened from channel 1090 toward channel 1088, selection valve 1036 is opened from channel 1092 toward channel 1078, and selection valve 1037 is opened from channel 1091 toward channel 1092. As a result, in water softening device 1001, as illustrated in FIG. 11, second acidic electrolytic water circulation channel 1102*b* and second alkaline electrolytic water circulation channel 1103*b* are formed. When electrode 1010 of electrolyzer 1009 and water pump 1012 are operated, the water stored in water storage tank 1042 circulates through each of second acidic electrolytic water circulation channel 1102*b* and second alkaline electrolytic water circulation channel 1103*b*.

At this time, the acidic electrolytic water generated in electrolyzer 1009 flows through second acidic electrolytic water circulation channel 1102*b*, is fed into first water softening tank 1003*a*, and flows through first weakly acidic cation exchange resin 1007*a* inside. That is, by passing the acidic electrolytic water through first weakly acidic cation exchange resin 1007*a*, cations (hardness components) adsorbed to first weakly acidic cation exchange resin 1007*a* undergo an ion exchange reaction with hydrogen ions contained in the acidic electrolytic water. This allows first weakly acidic cation exchange resin 1007*a* to regenerate. Thereafter, the acidic electrolytic water having flowed through first weakly acidic cation exchange resin 1007*a* contains cations and is recovered into water storage tank 1042 via second acidic electrolytic water circulation channel 1102*b*. On the other hand, the alkaline electrolytic water generated in electrolyzer 1009 is fed into first neutralizing tank 1004*a* through second alkaline electrolytic water circulation channel 1103*b*, and flows through first weakly basic anion exchange resin 1008*a* inside. That is, by allowing the alkaline electrolytic water to pass through first weakly basic anion exchange resin 1008*a*, anions adsorbed on first weakly basic anion exchange resin 1008*a* undergo an ion exchange reaction with hydroxide ions contained in the alkaline electrolytic water. This allows first weakly basic anion exchange resin 1008*a* to regenerate. Thereafter, the alkaline electrolytic water having flowed through first weakly basic anion exchange resin 1008*a* contains anions and is recovered into water storage tank 1042 via second alkaline electrolytic water circulation channel 1103*b*. In water storage tank 1042, the acidic electrolytic water containing cations recovered from first water softening tank 1003*a* and the alkaline electrolytic water containing anions recovered from first neutralizing tank 1004*a* are mixed and neutralized.

Here, in the second regeneration treatment, the hardness components react with the hydroxide ions contained in the alkaline electrolytic water by mixing the acidic electrolytic water containing cations (hardness components) and the alkaline electrolytic water containing anions, and a precipitate is generated. However, as in the first regeneration treatment, at least at the initial stage of the regeneration treatment, the amount of hydroxide ions contained in the alkaline electrolytic water flowing from first neutralizing tank 1004*a* of first water softening portion 1039*a* is smaller than the amount of hardness components released from first water softening tank 1003*a* of first water softening portion 1039*a*, and thus the precipitate is less likely to be generated. Therefore, the hardness components contained in the neutralized electrolytic water are fed to electrolyzer 1009 as they are. Thereafter, the electrolytic water mixed in water storage tank 1042 passes through electrolyzer 1009 again via channel 1095. Then, the passed water is electrolyzed again in electrolyzer 1009. In electrolyzer 1009, water is electrolyzed, and a large amount of hydroxide ions are generated by electrolysis in the vicinity of the cathode, so that a precipitate is likely to be generated. That is, the hardness component (for example, calcium ions and magnesium ions) contained in the water supplied from water storage tank 1042 moves to the cathode side and reacts with hydroxide ions to become a precipitate. Then, the alkaline electrolytic water containing such precipitates is fed to second alkaline electrolytic water circulation channel 1103*b* and flows into separation part 1011. In separation part 1011, the precipitate contained in the alkaline electrolytic water is separated, and the alkaline electrolytic water (treated water) from which the hardness component has been removed can be obtained. Here, the acidic electrolytic water electrolyzed again in electrolyzer 1009 and the alkaline electrolytic water electrolyzed again in electrolyzer 1009 and separated from the precipitate by separation part 1011 are provided for the regeneration of first weakly acidic cation exchange resin 1007*a* and the regeneration of first weakly basic anion exchange resin 1008*a*, respectively. In the present exemplary embodiment, by separating the precipitate generated in electrolyzer 1009 by separation part 1011, it is possible to suppress the deposition of the precipitate due to the hardness component in electrolyzer 1009, first water softening tank 1003*a*, and first neutralizing tank 1004*a*. Further, when electrolysis is performed in electrolyzer 1009, the hardness component that is a cation moves to the alkaline electrolytic water side, so that the hardness of the acidic electrolytic water decreases, and a decrease in the regeneration efficiency of first weakly acidic cation exchange resin 1007*a* can be suppressed. Then, in water softening device 1001, the operations of electrode 1010 and water pump 1012 are stopped when the regeneration treatment is completed. Then, the process proceeds to the drainage treatment. The regeneration treatment may be ended when a predetermined time (for example, 7 hours) elapses from the start of the regeneration treatment (the start of the operation of electrode 1010).

(Drainage Treatment)

In water softening device 1001, when the second regeneration treatment is completed, the drainage treatment is executed. The operation of water softening device 1001 during the drainage treatment is similar to the drainage treatment performed after the first regeneration treatment, and the drainage treatment performed in the channel state of the first regeneration treatment may be performed in the channel state of the second regeneration treatment, so that the description thereof is omitted.

(Third Water Softening Treatment)

Next, the operation at the time of the third water softening treatment by water softening device 1001 will be described with reference to the column of "IN THIRD WATER SOFTENING TREATMENT" in FIG. 15. Here, the third water softening treatment is performed when a regeneration treatment is required for water softening portion 1039 (particularly, second water softening portion 1039*b*) constituting the water softening channel in the second water softening treatment (in the present exemplary embodiment, when a certain period of time has elapsed). At this time, the third water softening treatment is executed by separating water softening portion 1039 (second water softening portion 1039*b*) on the upstream side from water softening channel 1100 (second water softening channel 1100*b*) in the second water softening treatment and switching water softening channel 1100 (third water softening channel 1100*c*) so as to incorporate water softening portion 1039 (first water softening portion 1039*a*), for which the regeneration treatment has been completed, into the downstream side of water softening channel 1100 in the regeneration treatment portion. By switching in this manner, third water softening channel 1100*c* has a configuration in which two-stage water softening portions 1039 are communicatively connected in series in order of a larger adsorption amount of the hardness component adsorbed in water softening tank 1003 of water softening portion 1039 from the upstream side into which the raw water is introduced.

In the third water softening treatment, as illustrated in FIG. 15, in a state where on-off valve 1013 is opened and on-off valve 1014 is closed, selection valve 1015 is opened from channel 1054 toward channel 1055, selection valve 1016 is opened from channel 1055 toward channel 1056, selection valve 1017 is opened from channel 1056 toward channel 1057, selection valve 1018 is opened from channel 1057 toward channel 1058, selection valve 1019 is opened from channel 1059 toward channel 1061, selection valve 1020 is opened from channel 1058 toward channel 1059, selection valve 1027 is opened from channel 1050 toward channel 1070, selection valve 1028 is opened from channel 1070 toward channel 1071, selection valve 1029 is opened from channel 1071 toward channel 1072, selection valve 1030 is opened from channel 1072 toward channel 1073, selection valve 1031 is opened from channel 1074 toward channel 1054, and selection valve 1032 is opened from channel 1073 toward channel 1074. As a result, the city water (raw water containing hardness components) flowing in from inlet port 1002 is softened through the third water softening portion 1039*c* and first water softening portion 1039*a* in the process of flowing through third water softening channel 1100*c*, and taken out as softened water (neutral softened water) from water take-out port 1005.

Specifically, as illustrated in FIG. 12, in the third water softening treatment, raw water supplied by the pressure of city water passes through third water softening channel 1100*c* and is supplied to third water softening tank 1003*c* of third water softening portion 1039*c*. The raw water supplied to third water softening tank 1003*c* flows through third weakly acidic cation exchange resin 1007*c* provided in third water softening tank 1003*c*. At this time, cations as the hardness component in the raw water are adsorbed by the action of third weakly acidic cation exchange resin 1007*c*, and hydrogen ions are released (ion exchange is performed). Then, cations are removed from the raw water, whereby the raw water is softened. Since the softened water contains a large amount of hydrogen ions that have been exchanged for the hardness component and flowed out, the softened water is acidified to be acidic water having a low pH. The softened water further flows through third water softening channel 1100*c* and flows into third neutralizing tank 1004*c* of third water softening portion 1039*c*. In third neutralizing tank 1004*c*, hydrogen ions contained in the softened water are adsorbed by the action of third weakly basic anion exchange resin 1008*c*. That is, since hydrogen ions are removed from the water softened by third water softening tank 1003*c*, the lowered pH is increased and neutralized. The water neutralized by third neutralizing tank 1004*c* further flows through third water softening channel 1100*c* and flows into first water softening tank 1003*a* of first water softening portion 1039*a*. In first water softening tank 1003*a*, cations as hardness components contained in water from third water softening portion 1039*c* are adsorbed and hydrogen ions are released by the action of first weakly acidic cation exchange resin 1007*a*. That is, the water flowing into first water softening tank 1003*a* is further softened to be softened water. The softened water containing hydrogen ions flows through third water softening channel 1100*c* and flows into first neutralizing tank 1004*a* of first water softening portion 1039*a*. In first neutralizing tank 1004*a*, hydrogen ions contained in the inflowing softened water are adsorbed by the action of first weakly basic anion exchange resin 1008*a*. That is, since hydrogen ions are removed from the softened water, the lowered pH increases, and the softened water becomes softened neutral water that can be used as domestic water. The softened neutral water can be taken out from water take-out port 1005 through third water softening channel 1100*c*.

While third water softening portion 1039*c* and first water softening portion 1039*a* are performing the third water softening treatment, the third water storage treatment, the third regeneration treatment, and the drainage treatment are simultaneously performed in parallel to second water softening portion 1039*b* in this order.

(Third Water Storage Treatment)

Next, an operation of water softening device 1001 at the time of the third water storage treatment will be described with reference to a column of "IN THIRD WATER STORAGE TREATMENT" in FIG. 15.

In the third water storage treatment, as illustrated in FIG. 15, in a state of the on-off valve and the selection valve "IN SECOND WATER SOFTENING TREATMENT", on-off valve 1014 is opened, selection valve 1021 is opened from channel 1052 toward channel 1063, selection valve 1022 is opened from channel 1063 toward channel 1064, selection valve 1023 is opened from channel 1064 toward channel 1065, selection valve 1024 is opened from channel 1065 toward channel 1066, and selection valve 1026 is opened from channel 1066 toward channel 1083. As a result, as illustrated in FIG. 13, water softening device 1001 introduces softened water (water softened by second water softening portion 1039*b*) into water storage tank 1042 from inlet port 1002 via third water storage channel 1101*c* by the pressure of city water. By storing a predetermined amount of water corresponding to the capacity of water softening device 1001 in water storage tank 1042, regeneration device 1006 can secure the amount of water at the time of regeneration.

(Third Regeneration Treatment)

Next, the operation of water softening device 1001 at the time of the third regeneration treatment will be described with reference to the column of "IN THIRD REGENERATION TREATMENT" in FIG. 15.

In the third regeneration treatment, as illustrated in FIG. 15, in a state of the on-off valve and the selection valve "IN THIRD WATER SOFTENING TREATMENT", selection valve 1022 is opened from channel 1080 toward channel 1064, selection valve 1023 is opened from channel 1064 toward channel 1081, selection valve 1024 is opened from channel 1082 toward channel 1066, selection valve 1026 is opened from channel 1066 toward channel 1083, selection valve 1033 is opened from channel 1088 toward channel 1094, selection valve 1034 is opened from channel 1090 toward channel 1088, selection valve 1035 is opened from channel 1094 toward channel 1080, selection valve 1035 is opened from channel 1092 toward channel 1093, and selection valve 1037 is opened from channel 1091 toward channel 1092, and selection valve 1038 is opened from channel 1093 toward channel 1082. As a result, in water softening device 1001, as illustrated in FIG. 14, third acidic electrolytic water circulation channel 1102c and third alkaline electrolytic water circulation channel 1103c are formed, respectively. When electrode 1010 of electrolyzer 1009 and water pump 1012 are operated, the water stored in water storage tank 1042 circulates through each of third acidic electrolytic water circulation channel 1102c and third alkaline electrolytic water circulation channel 1103c.

At this time, the acidic electrolytic water generated in electrolyzer 1009 flows through third acidic electrolytic water circulation channel 1102c, is fed into second water softening tank 1003b, and flows through second weakly acidic cation exchange resin 1007b inside. That is, by passing the acidic electrolytic water through second weakly acidic cation exchange resin 1007b, cations (hardness components) adsorbed to second weakly acidic cation exchange resin 1007b undergo an ion exchange reaction with hydrogen ions contained in the acidic electrolytic water. This allows second weakly acidic cation exchange resin 1007b to regenerate. Thereafter, the acidic electrolytic water having flowed through second weakly acidic cation exchange resin 1007b contains cations and is recovered into water storage tank 1042 via third acidic electrolytic water circulation channel 1102c. On the other hand, the alkaline electrolytic water generated in electrolyzer 1009 is fed into second neutralizing tank 1004b through third alkaline electrolytic water circulation channel 1103c, and flows through second weakly basic anion exchange resin 1008b inside. That is, by allowing the alkaline electrolytic water to pass through second weakly basic anion exchange resin 1008b, anions adsorbed on second weakly basic anion exchange resin 1008b undergo an ion exchange reaction with hydroxide ions contained in the alkaline electrolytic water. This allows second weakly basic anion exchange resin 1008b to regenerate. Thereafter, the alkaline electrolytic water having flowed through second weakly basic anion exchange resin 1008b contains anions and is recovered into water storage tank 1042 via third alkaline electrolytic water circulation channel 1103c. In water storage tank 1042, the acidic electrolytic water containing cations recovered from second water softening tank 1003b and the alkaline electrolytic water containing anions recovered from second neutralizing tank 1004b are mixed and neutralized. Here, in the third regeneration treatment, by mixing acidic electrolytic water containing cations (hardness components) and alkaline electrolytic water containing anions, the hardness components react with hydroxide ions contained in the alkaline electrolytic water, and a precipitate is generated. However, at least at the initial stage of the regeneration treatment, the amount of hydroxide ions contained in the alkaline electrolytic water flowing from second neutralizing tank 1004b is smaller than the amount of hardness components released from second water softening tank 1003b, and thus the precipitate is less likely to be generated. Therefore, the hardness components contained in the neutralized electrolytic water are fed to electrolyzer 1009 as they are. Thereafter, the electrolytic water mixed in water storage tank 1042 passes through electrolyzer 1009 again via channel 1095. Then, the passed water is electrolyzed again in electrolyzer 1009. In electrolyzer 1009, water is electrolyzed, and a large amount of hydroxide ions are generated by electrolysis in the vicinity of the cathode, so that a precipitate is likely to be generated. That is, the hardness component (for example, calcium ions and magnesium ions) contained in the water supplied from water storage tank 1042 moves to the cathode side and reacts with hydroxide ions to become a precipitate. Then, the alkaline electrolytic water containing such precipitates is fed to third alkaline electrolytic water circulation channel 1103c and flows into separation part 1011. In separation part 1011, the precipitate contained in the alkaline electrolytic water is separated, and the alkaline electrolytic water (treated water) from which the hardness component has been removed can be obtained. Here, the acidic electrolytic water electrolyzed again in electrolyzer 1009 and the alkaline electrolytic water electrolyzed again in electrolyzer 1009 and separated from the precipitate by separation part 1011 are provided for the regeneration of second weakly acidic cation exchange resin 1007b and the regeneration of second weakly basic anion exchange resin 1008b, respectively. In the present exemplary embodiment, by separating the precipitate generated in electrolyzer 1009 by separation part 1011, it is possible to suppress the deposition of the precipitate due to the hardness component in electrolyzer 1009, second water softening tank 1003b, and second neutralizing tank 1004b. Further, when electrolysis is performed in electrolyzer 1009, the hardness component that is a cation moves to the alkaline electrolytic water side, so that the hardness of the acidic electrolytic water decreases, and a decrease in the regeneration efficiency of second weakly acidic cation exchange resin 1007b can be suppressed.

Then, in water softening device 1001, the operations of electrode 1010 and water pump 1012 are stopped when the regeneration treatment is completed. Then, the process proceeds to the drainage treatment. The regeneration treatment may be ended when a predetermined time (for example, 7 hours) elapses from the start of the regeneration treatment (the start of the operation of electrode 1010).

(Drainage Treatment)

In water softening device 1001, the drainage treatment is executed when the third regeneration treatment is completed. The operation of water softening device 1001 during the drainage treatment is similar to the drainage treatment performed after the first regeneration treatment, and the drainage treatment performed in the channel state of the first regeneration treatment may be performed in the channel state of the third regeneration treatment, so that the description thereof is omitted.

Thereafter, when water softening portion 1039 (particularly third water softening portion 1039c) constituting the water softening channel needs to be regenerated in the third water softening treatment (in the present exemplary embodiment, when a certain period of time has elapsed), the first water softening treatment is executed again. At this time, the first water softening treatment is executed by separating water softening portion 1039 (third water softening portion 1039c) on the upstream side from water softening channel 1100 (third water softening channel 1100c) in the third water softening treatment and switching water softening channel 1100 (first water softening channel 1100a) so as to incorporate water softening portion 1039 (second water softening portion 1039b), for which the regeneration treatment has been completed, into the downstream side of water softening channel 1100 in the regeneration treatment portion. By switching in this manner, first water softening channel 1100a has a configuration in which two-stage water softening portions 1039 are communicatively connected in series in order of a larger adsorption amount of the hardness component adsorbed in water softening tank 1003 of water softening portion 1039 from the upstream side into which the raw water is introduced.

As described above, water softening device 1001 sequentially switches the combination of the three-stage water softening portions 1039 (first water softening portion 1039a, second water softening portion 1039*b*, third water softening portion 1039*c*) to form the connection state of each channel, and executes each treatment.

According to water softening device 1001 of the present second exemplary embodiment-1, the following effects can be obtained.

(1) Water softening device 1001 includes a plurality (three stages) of water softening portions 1039 each including a water softening tank 1003 for softening raw water containing a hardness component by weakly acidic cation exchange resin 1007 and neutralizing tank 1004 for neutralizing softened water having passed through water softening tank 1003 by weakly basic anion exchange resin 1008, and electrolyzer 1009 for generating acidic electrolytic water for regenerating weakly acidic cation exchange resin 1007 in water softening tank 1003 and alkaline electrolytic water for regenerating weakly basic anion exchange resin 1008 in neutralizing tank 1004. The plurality of water softening portions 1039 are configured to include a water softening treatment portion that performs a water softening treatment of raw water by connecting two or more water softening portions 1039 (for example, two stages of first water softening portion 1039*a* and second water softening portion 1039*b*) in series and a regeneration treatment portion that performs a regeneration treatment of water softening portion 1039 (for example, third water softening portion 1039*c* which is the remaining one stage) using acidic electrolytic water and alkaline electrolytic water fed from electrolyzer 1009 during a period in which the water softening treatment is performed.

In this way, the water softening treatment is performed by the two or more water softening portions 1039 in the water softening treatment portion, and water softening portion 1039 in the regeneration treatment portion is regenerated during the period in which the water softening treatment is performed. Therefore, water softening device 1001 can complete the regeneration treatment of water softening portion 1039 (weakly acidic cation exchange resin 1007 in water softening tank 1003 and weakly basic anion exchange resin 1008 in the neutralizing tank 1004) used as water softening treatment portion without causing restriction on the supply of softened water to the user. That is, it is possible to provide a water softening device 1001 capable of executing the regeneration treatment of the water softening tank 1003 and the neutralizing tank 1004 without causing restriction on the supply of softened water to the user.

(2) In water softening device 1001, two or more water softening portions 1039 (for example, two stages of first water softening portion 1039*a* and second water softening portion 1039*b*) are connected in series as the water softening treatment portion, and the water softening treatment of the raw water is performed. In this way, the raw water containing the hardness component passes through the two or more water softening portions 1039, so that it is possible to suppress a decrease in pH and acidification of the water flowing through water softening tank 1003 (for example, second water softening tank 1003*b* of second water softening portion 1039*b*) of water softening portion 1039 on the downstream side as compared with a case where the water softening tank and the neutralizing tank are each configured as a single body as in the conventional water softening device. Therefore, exchange between the hardness component and hydrogen ions held by weakly acidic cation exchange resin 1007 in water softening tank 1003 of water softening portion 1039 on the downstream side easily occurs. Therefore, water softening device 1001 can improve water softening performance as compared with the conventional water softening device. However, two or more water softening portions 1039 constituting the water softening treatment portion in water softening device 1001 and the conventional water softening device have substantially the same total volume of each of weakly acidic cation exchange resin 1007 and weakly basic anion exchange resin 1008.

(3) In water softening device 1001, the water softening treatment portion performs the water softening treatment by communicating and connecting water softening portions 1039 in series in order of a larger adsorption amount of the hardness component adsorbed to water softening tank 1003 of water softening portion 1039 from the upstream side into which the raw water is introduced to form water softening channel 1100, and circulating the raw water through water softening channel 1100. As a result, in the water softening treatment portion, water softening portion 1039 needs to be regenerated from the upstream side of water softening channel 1100, so that it is possible to efficiently exchange water softening portion 1039 for which the regeneration treatment is required in the water softening treatment portion with water softening portion 1039 for which the regeneration treatment is completed in the regeneration treatment portion.

(4) In water softening device 1001, when water softening portion 1039 constituting water softening channel 1100 needs to be regenerated (when a certain period of time has elapsed), the most upstream water softening portion 1039 is separated from water softening channel 1100, and water softening channel 1100 is switched so that water softening portion 1039 for which the regeneration treatment has been completed in the regeneration treatment portion is incorporated into the most downstream of water softening channel 1100. As a result, when water softening portion 1039 that needs to be regenerated in the water softening treatment portion is replaced with water softening portion 1039 for which the regeneration treatment has been completed in the regeneration treatment portion (in other words, when switching of water softening channel 1100 is performed), water softening channel 1100 in the water softening treatment portion can be formed by connecting water softening portions 1039 in series in order of a larger adsorption amount of the hardness component adsorbed to water softening tank 1003 of water softening portion 1039 from the upstream side into which the raw water is introduced. As a result, it is possible to easily specify water softening portion 1039 that requires a regeneration treatment in the water softening treatment portion.

(5) In water softening device 1001, switching of the water softening treatment portion is performed every lapse of a certain period from the start of the water softening treatment. As a result, by setting a certain period based on the hardness of the raw water in the use environment of water softening device 1001 and the integrated flow rate and periodically switching water softening channel 1100, in water softening device 1001, it is possible to suppress deterioration or disappearance of the hardness removing performance of the water softening treatment portion, and it is possible to stably soften the water over a long period of time.

(6) In water softening device 1001, water softening portion 1039 is configured by communicably connecting water softening tank 1003 and neutralizing tank 1004 in this order. As a result, hydrogen ions contained in the acidic softened water flowing out of water softening tank 1003 can be reliably neutralized by neutralizing tank 1004. Therefore, the inflow of the acidic softened water into water softening tank 1003 of water softening portion 1039 communicatively connected to the downstream side is suppressed, and the water softening performance of water softening tank 1003 entering the downstream side can be suppressed from deteriorating.

(7) In water softening device 1001, first water softening tank 1003*a*, second water softening tank 1003*b*, and third water softening tank 1003*c* have the same channel length, channel cross-sectional area, volume of resin filled in water softening tank 1003, and type of resin filled in water softening tank 1003. Accordingly, since first water softening tank 1003*a*, second water softening tank 1003*b*, and third water softening tank 1003*c* can be made common, the cost of water softening device 1001 can be reduced.

(8) In water softening device 1001, first neutralizing tank 1004*a*, second neutralizing tank 1004*b*, and third neutralizing tank 1004*c* have the same channel length, channel cross-sectional area, volume of resin filled in neutralizing tank 1004, and type of resin filled in neutralizing tank 1004. Accordingly, since first neutralizing tank 1004*a*, second neutralizing tank 1004*b*, and third neutralizing tank 1004*c* can be made common, the cost of water softening device 1001 can be reduced.

(9) Water softening device 1001 includes separation part 1011 that is provided in a channel communicating electrolyzer 1009 and neutralizing tank 1004 (first neutralizing tank 1004*a*, second neutralizing tank 1004*b*, third neutralizing tank 1004*c*) and separates a precipitate caused by a hardness component contained in water introduced into electrolyzer 1009. As a result, when water softening tank 1003 and neutralizing tank 1004 are regenerated, the precipitate contained in the alkaline electrolytic water that has passed through electrolyzer 1009 (the precipitate caused by the hardness component contained in the water introduced into electrolyzer 1009) can be separated by separation part 1011, and the inflow of the precipitate into neutralizing tank 1004 can be reduced. Therefore, when water softening portion 1039 (in particular, neutralizing tank 1004) for which the regeneration treatment has been completed is used in place of water softening portion 1039 of the water softening treatment portion, it is possible to suppress the precipitate flowing into neutralizing tank 1004 from reacting with hydrogen ions from water softening tank 1003 to form a hardness component, and it is possible to reduce deterioration in water softening performance associated with dissolution of the precipitate.

Second Exemplary Embodiment-2

Figure 16:
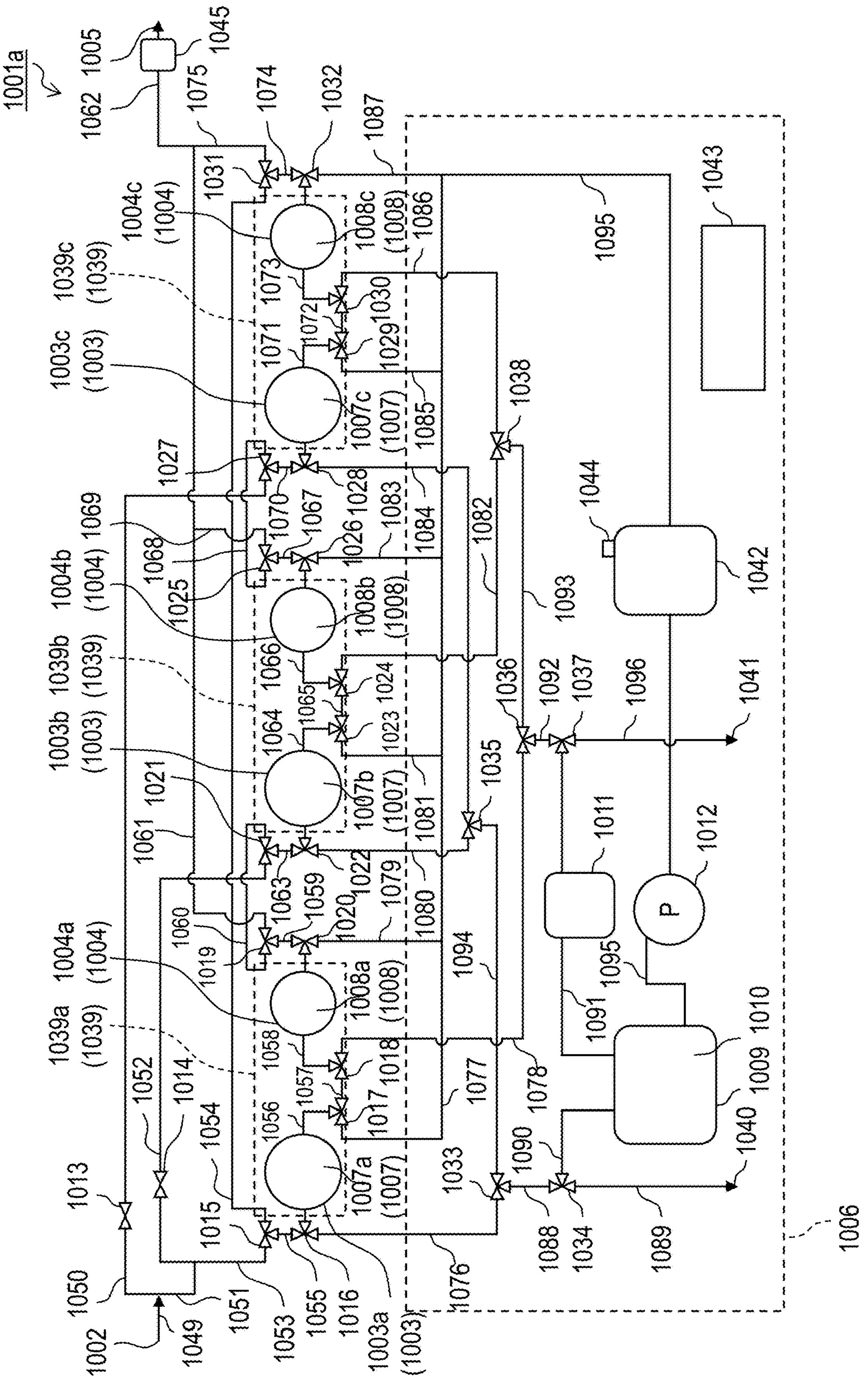
FIG. 16 is a conceptual diagram illustrating a configuration of a water softening device according to a second exemplary embodiment-2 of the present disclosure.

Next, water softening device 1001*a* according to the second exemplary embodiment-2 of the present disclosure will be described with reference to FIG. 16. FIG. 16 is a conceptual diagram illustrating a configuration of water softening device 1001*a* according to the second exemplary embodiment-2 of the present disclosure.

In water softening device 1001 according to the second exemplary embodiment-1, water softening channel 1100 is switched when the water softening treatment has passed a certain period, but water softening device 1001*a* according to the second exemplary embodiment-2 is different from that of the second exemplary embodiment-1 in that water softening channel 1100 is switched based on information regarding the ion concentration (for example, the hardness component concentration) of softened water led out to water take-out port 1005. Other configurations of water softening device 1001*a* are the same as those of water softening device 1001 according to the second exemplary embodiment. In the following, description of the contents already described in the second exemplary embodiment-1 will be omitted as appropriate, and differences from the second exemplary embodiment-1 will be mainly described.

Specifically, as illustrated in FIG. 16, water softening device 1001*a* includes ion concentration detector 1045 in channel 1062 connected to water take-out port 1005. Ion concentration detector 1045 detects the ion concentration of softened water flowing through channel 1062 in the water softening treatment. In other words, ion concentration detector 1045 detects the ion concentration of softened water led out from the downstream side of water softening channel 1100 (first water softening channel 1100*a*, second water softening channel 1100*b*, third water softening channel 1100*c*) in the connection state of the respective channels. Ion concentration detector 1045 is connected to controller 1043 so as to be able to communicate with the controller in a wireless or wired manner, and information regarding the detected ion concentration is used as an input signal of controller 1043. Here, a general-purpose ion concentration detector can be used as ion concentration detector 1045, and examples thereof include a detector that measures the electrical conductivity of a liquid and a detector that measures the amount of total dissolved solid (TDS) contained in water.

Water (pure water) itself is an insulator that hardly conducts electricity, but various substances are dissolved (ionized) to conduct electricity. That is, the electrical conductivity of the liquid is an index of the amount of ionized substances contained in the liquid. In general city water, the content is proportional to the content of calcium ions, magnesium ions, sodium ions, chloride ions, and the like contained in a large amount in river water or groundwater which is a water source of city water. In the present exemplary embodiment, TDS represents the total concentration of ions (calcium ion, magnesium ion, chloride ion, hydrogen ion, and the like) contained in water flowing through ion concentration detector 1045 during the washing treatment. In water of the same water system, the electrical conductivity and the TDS are approximately proportional to each other.

Controller 1043 acquires information regarding the ion concentration output from ion concentration detector 1045. Then, controller 1043 performs control to switch water softening channel 1100 when the ion concentration specified based on the acquired information regarding the ion concentration becomes equal to or more than the reference value. More specifically, controller 1043 performs control to switch water softening channel 1100 in the order of first water softening channel 1100*a* (see FIG. 6), second water softening channel 1100*b* (see FIG. 9), and third water softening channel 1100*c* (see FIG. 12). On the other hand, when the specified ion concentration is less than the reference value, controller 1043 performs control to continue the water softening treatment without switching water softening channel 1100.

As described above, water softening device 1001*a* sequentially switches the combination of the three-stage water softening portions 1039 (first water softening portion 1039*a*, second water softening portion 1039*b*, third water softening portion 1039*c*) based on the ion concentration of the softened water led out to water take-out port 1005 to configure the connection state of each channel, and executes each treatment.

According to water softening device 1001*a* of the present second exemplary embodiment-2 described above, the following effects can be obtained.

(10) Water softening device 1001*a* includes ion concentration detector 1045 that detects the ion concentration of the softened water led out from the downstream side of water softening channel 1100, and water softening channel 1100 is switched based on the ion concentration. As a result, when the hardness removing performance in the water softening treatment portion decreases or disappears, the water softening channel 1100 can be reliably switched, so that the water softening device 1001*a* can more reliably suppress the decrease or disappearance of the hardness removing performance of the water softening treatment portion, and can stably soften water over a long period of time.

Second Exemplary Embodiment-3

Figure 17:
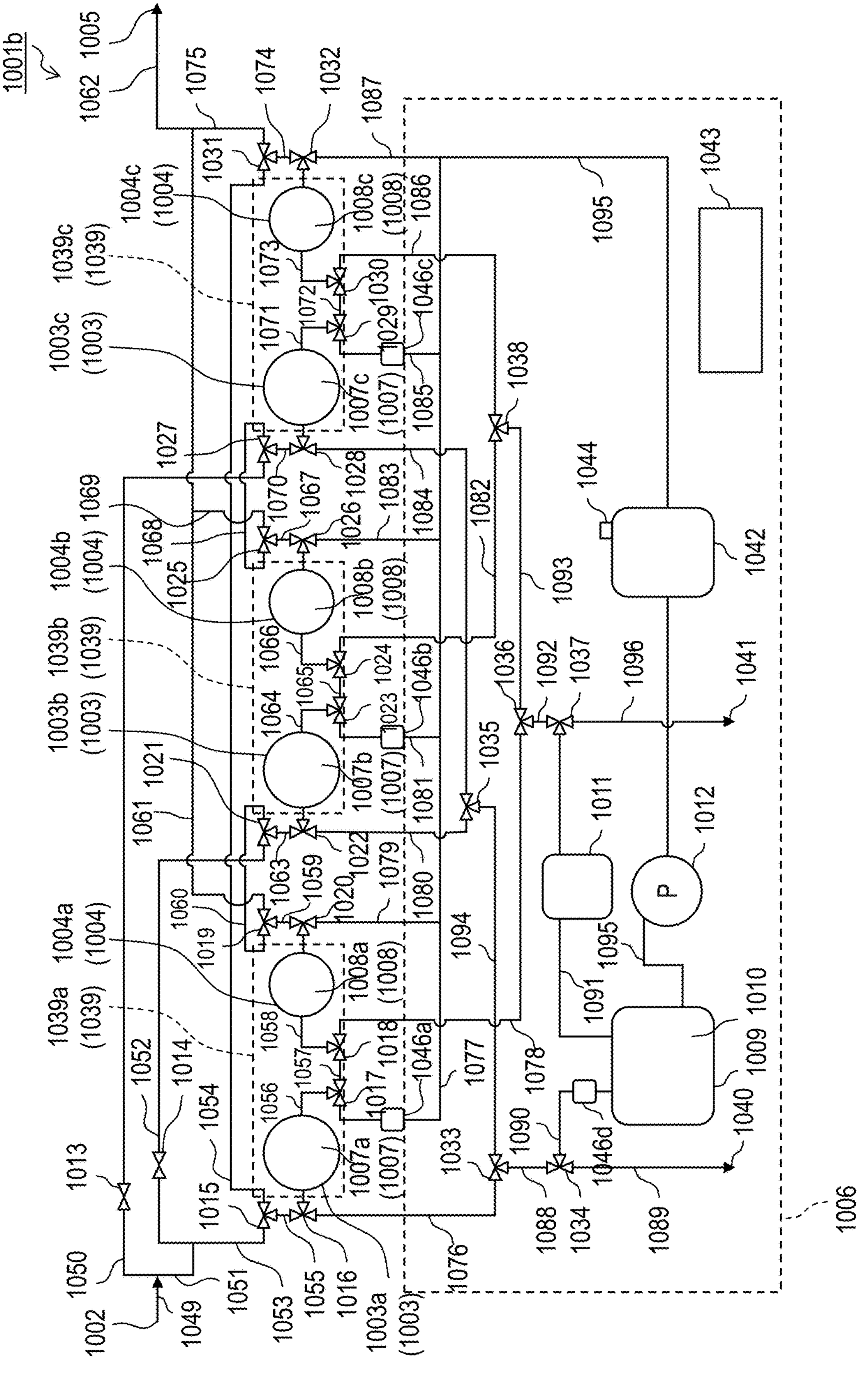
FIG. 17 is a conceptual diagram illustrating a configuration of a water softening device according to a second exemplary embodiment-3 of the present disclosure.

Next, water softening device 1001*b* according to the second exemplary embodiment-3 of the present disclosure will be described with reference to FIG. 17. FIG. 17 is a conceptual diagram illustrating a configuration of water softening device 1001*b* according to the second exemplary embodiment-3 of the present disclosure.

While water softening device 1001 according to the second exemplary embodiment-1 switches water softening channel 1100 when the water softening treatment has passed a certain period, water softening device 1001*b* according to the second exemplary embodiment-3 is different from that of the second exemplary embodiment-1 in that water softening channel 1100 is switched by detecting the ion concentration (hardness component, hydrogen ions, and the like) of the acidic electrolytic water before and after flowing through water softening tank 1003 of water softening portion 1039. Other configurations of water softening device 1001*b* are the same as water softening device 1001 according to the second exemplary embodiment-1. In the following, description of the contents already described in the second exemplary embodiment-1 will be omitted as appropriate, and differences from the second exemplary embodiment-1 will be mainly described.

Specifically, as illustrated in FIG. 17, water softening device 1001*b* includes first ion concentration detector 1046*a* provided in channel 1077, second ion concentration detector 1046*b* provided in channel 1081, third ion concentration detector 1046*c* provided in channel 1085, and fourth ion concentration detector 1046*d* provided in channel 1090. Here, first ion concentration detector 1046*a*, second ion concentration detector 1046*b*, and third ion concentration detector 1046*c* correspond to a "post-stage ion concentration detector" of the claims, and fourth ion concentration detector 1046*d* corresponds to a "pre-stage ion concentration detector" of the claims.

First ion concentration detector 1046*a* is provided in channel 1077 between the connection point between channel 1079 and channel 1077 and selection valve 1017. First ion concentration detector 1046*a* detects the ion concentration (hardness component, hydrogen ions, and the like) of the acidic electrolytic water having flowed through first water softening tank 1003*a* as a "second ion concentration".

Second ion concentration detector 1046*b* is provided in channel 1081 between the connection point between channel 1081 and channel 1077 and selection valve 1023. Second ion concentration detector 1046*b* detects the ion concentration (hardness component, hydrogen ions, and the like) of the acidic electrolytic water having flowed through second water softening tank 1003*b* as a "second ion concentration".

Third ion concentration detector 1046*c* is provided in channel 1085 between the connection point between channel 1085 and channel 1077 and selection valve 1029. Third ion concentration detector 1046*c* detects the ion concentration (hardness component, hydrogen ions, and the like) of the acidic electrolytic water having flowed through third water softening tank 1003*c* as a "second ion concentration".

Fourth ion concentration detector 1046*d* is provided in channel 1090 between electrolyzer 1009 and selection valve 1034. Fourth ion concentration detector 1046*d* detects the ion concentration (hardness component, hydrogen ions, and the like) of the acidic electrolytic water fed from electrolyzer 1009 as a "first ion concentration".

First ion concentration detector 1046*a*, second ion concentration detector 1046*b*, third ion concentration detector 1046*c*, and fourth ion concentration detector 1046*d* are all connected to controller 1043 so as to be able to communicate with the controller in a wireless or wired manner, and information regarding the detected ion concentration (first ion concentration, second ion concentration) is used as an input signal of controller 1043. As each ion concentration detector, a general-purpose one can be used, and for example, the same one as ion concentration detector 1045 is used.

Controller 1043 determines a timing at which the regeneration treatment is completed by using the information regarding the ion concentration (first ion concentration, second ion concentration) of the acidic electrolytic water, and controls switching of water softening channel 1100 based on the determination result.

More specifically, in the first regeneration treatment, controller 1043 acquires the information regarding the second ion concentration output from third ion concentration detector 1046*c* and the information regarding the first ion concentration output from fourth ion concentration detector 1046*d*. When the concentration difference between the first ion concentration and the second ion concentration is equal to or larger than the reference value, controller 1043 continues the first regeneration treatment. On the other hand, when the concentration difference between the first ion concentration and the second ion concentration is smaller than the reference value, controller 1043 determines that the first regeneration treatment is completed, and stops the operations of electrode 1010 and water pump 1012. Then, the process proceeds to the drainage treatment. Thereafter, controller 1043 executes switching to second water softening channel 1100*b*. That is, it can be said that the switching of second water softening channel 1100*b* is performed based on the second ion concentration detected by third ion concentration detector 1046*c* and the first ion concentration detected by fourth ion concentration detector 1046*d*.

In the second regeneration treatment, controller 1043 acquires the information regarding the second ion concentration output from first ion concentration detector 1046*a* and the information regarding the first ion concentration output from fourth ion concentration detector 1046*d*. When the concentration difference between the first ion concentration and the second ion concentration is equal to or larger than the reference value, controller 1043 continues the second regeneration treatment. On the other hand, when the concentration difference between the first ion concentration and the second ion concentration is smaller than the reference value, controller 1043 determines that the second regeneration treatment is completed, and stops the operations of electrode 1010 and water pump 1012. Then, the process proceeds to the drainage treatment. Thereafter, controller 1043 executes switching of third water softening channel 1100*c*. That is, it can be said that the switching of third water softening channel 1100*c* is performed based on the second ion concentration detected by first ion concentration detector 1046*a* and the first ion concentration detected by fourth ion concentration detector 1046*d*.

In the third regeneration treatment, controller 1043 acquires the information regarding the second ion concentration output from second ion concentration detector 1046*b* and the information regarding the first ion concentration output from fourth ion concentration detector 1046*d*. When the concentration difference between the first ion concentration and the second ion concentration is equal to or larger than the reference value, controller 1043 continues the third regeneration treatment. On the other hand, when the concentration difference between the first ion concentration and the second ion concentration is smaller than the reference value, controller 1043 determines that the third regeneration treatment is completed, and stops the operations of electrode 1010 and water pump 1012. Then, the process proceeds to the drainage treatment. Thereafter, controller 1043 executes switching to first water softening channel 1100*a*. That is, it can be said that the switching of first water softening channel 1100*a* is performed based on the second ion concentration detected by second ion concentration detector 1046*b* and the first ion concentration detected by fourth ion concentration detector 1046*d*.

According to water softening device 1001*b* of the present second exemplary embodiment-3 described above, the following effects can be obtained.

(11) Water softening device 1001*b* includes a pre-stage ion concentration detector (fourth ion concentration detector 1046*d*) that detects the first ion concentration of the acidic electrolytic water before being introduced from electrolyzer 1009 to water softening portion 1039 constituting the regeneration treatment portion, and a post-stage ion concentration detector (first ion concentration detector 1046*a*, second ion concentration detector 1046*b*, and third ion concentration detector 1046*c*) that detects the second ion concentration of the acidic electrolytic water after being led out from water softening portion 1039 constituting the regeneration treatment portion. Water softening channel 1100 is switched based on the first ion concentration detected by the pre-stage ion concentration detector and the second ion concentration detected by the post-stage ion concentration detector. As a result, at the timing when the regeneration of water softening portion 1039 in the regeneration treatment portion is completed, water softening portion 1039 for which the regeneration treatment is completed can be replaced with water softening portion 1039 in the water softening treatment portion. Therefore, water softening device 1001*b* can stably soften water for a long period of time without causing restriction on the supply of softened water to the user.

The present disclosure has been described above based on the exemplary embodiments. It will be understood by those skilled in the art that the exemplary embodiments are merely examples; further, in modifications of the exemplary embodiments, components or processes of the exemplary embodiments are variously combined, and additionally, the modifications fall within the scope of the present disclosure.

Water softening device 1001 according to the present second exemplary embodiment-1 is configured using three-stage water softening portions 1039, but is not limited thereto. For example, the number of stages of the water softening portions 1039 may be four or more. In a case where water softening portion 1039 has 4 stages, if water softening portion 1039 is set to 3 stages as the water softening treatment portion and water softening portion 1039 is set to 1 stage as the regeneration treatment portion, the number of times of alternately performing water softening and neutralization in the water softening treatment increases, so that the water softening performance can be further improved. In addition, when water softening portion 1039 is set to 2 stages as the water softening treatment portion, water softening portion 1039 is set to 1 stage as the regeneration treatment portion, and the preliminary water softening portion 1039 that does not belong to the water softening treatment portion or the regeneration treatment portion is set to 1 stage, the water softening performance of the water softening treatment portion can be improved by cutting off water softening portion 1039 on the upstream side of the water softening treatment portion and incorporating the preliminary water softening portion 1039 on the downstream side of the water softening treatment portion even when the water softening performance of the water softening treatment portion is insufficient but the regeneration treatment in the regeneration treatment portion is not completed.

Further, in water softening device 1001 according to the present second exemplary embodiment-1, the acidic electrolytic water is circulated from the upstream side of water softening tank 1003, and the alkaline electrolytic water is circulated from the upstream side of neutralizing tank 1004, but both may be circulated from the downstream side. In this way, water softening tank 1003 can be regenerated and neutralizing tank 1004 can be regenerated, and the regeneration efficiency can be further improved.

In water softening device 1001 according to the present second exemplary embodiment-1, the one-stage water softening portion 1039 (one water softening tank 1003 and one neutralizing tank 1004) is regenerated, but the present disclosure is not limited thereto. For example, when there are four stages of water softening portions, the regeneration treatment portion may be configured by two-stage water softening portions 1039, and the acidic electrolytic water may be continuously circulated in water softening tanks 1003 of respective water softening portions 1039, and the alkaline electrolytic water may be continuously circulated in neutralizing tanks 1004 of respective water softening portions 1039. Alternatively, the two-stage water softening portions 1039 may be regenerated through independent flow paths using a first regeneration device and a second regeneration device having functions equivalent to those of the regeneration device 1006. This makes it possible to simultaneously perform the regeneration treatment of the two-stage water softening portions 1039.

In addition, in water softening device 1001 according to the present second exemplary embodiment-1, the separation part is connected to channel 1091 through which the alkaline electrolytic water generated in electrolyzer 1009 flows, but the present disclosure is not limited thereto. Water storage tank 1042 may further include a water storage tank separation part. As a result, since the precipitate can be separated also by the water storage tank separation part, the precipitate can be more reliably separated. In addition, since the hardness component contained in the electrolytic water supplied to electrolyzer 1009 can be reduced, precipitates are reduced in electrolyzer 1009. Therefore, the maintenance frequency of separation part 1011 can be reduced, and the water softening device that can be used for a long period of time can be obtained.

In addition, in water softening device 1001*b* according to the present second exemplary embodiment-3, the ion concentration of the acidic electrolytic water before and after flowing through water softening tank 1003 of water softening portion 1039 is detected to switch water softening channel 1100, but the present disclosure is not limited thereto. Water softening channel 1100 may be switched by detecting the ion concentration of the alkaline electrolytic water before and after flowing through neutralizing tank 1004 of water softening portion 1039. Thus, even when the type of the ion exchange resin is changed and the regeneration time of weakly basic anion exchange resin 1008 is longer than the regeneration time of weakly acidic cation exchange resin 1007, the timing of switching water softening channel 1100 can be determined.

Third Exemplary Embodiment

A third exemplary embodiment includes at least a third exemplary embodiment-1, a third exemplary embodiment-2, and a third exemplary embodiment-3 described below.

A water softening device according to the present disclosure includes a water softening tank, a neutralizing tank, an electrolyzer, a water storage tank, and a separation part. In the water softening tank, raw water containing a hardness component and chloride ions is softened by a weakly acidic cation exchange resin. The neutralizing tank neutralizes the pH of softened water that has passed through the water softening tank by a weakly basic anion exchange resin. The electrolyzer produces acidic electrolytic water for regenerating the weakly acidic cation exchange resin in the water softening tank and alkaline electrolytic water for regenerating the weakly basic anion exchange resin in the neutralizing tank. The water storage tank mixes the acidic electrolytic water having flowed through the water softening tank and the alkaline electrolytic water having flowed through the neutralizing tank to generate mixture, and supplies the mixture to the electrolyzer. The separation part is provided in a channel communicating the electrolyzer and the neutralizing tank, and separates a precipitate caused by a hardness component contained in water introduced into the electrolyzer.

According to such a configuration, when the water softening tank and the neutralizing tank are regenerated, the precipitate contained in the alkaline electrolytic water that has passed through the electrolyzer (the precipitate caused by the hardness component contained in the water introduced into the electrolyzer) can be separated by the separation part, and the inflow of the precipitate into the neutralizing tank can be reduced. Therefore, when the water softening treatment is resumed after the end of the regeneration treatment, it is possible to suppress the occurrence of a phenomenon that the precipitate flowing into the neutralizing tank reacts with hydrogen ions released from the water softening tank to form a hardness component, which is observed in the conventional water softening device, and it is possible to reduce deterioration of water softening performance associated with dissolution of the precipitate.

In addition, the water softening device according to the present disclosure may further include a controller that controls the regeneration treatment of the weakly acidic cation exchange resin in the water softening tank and the weakly basic anion exchange resin in the neutralizing tank, and the controller may be configured to perform control such that, after completion of the regeneration treatment, the electrolyzer is subjected to polarity inversion, and the acidic electrolytic water after the polarity inversion is caused to flow to the separation part and discharged to the outside of the device. According to such a configuration, since the separation part is washed (dissolution and removal of the precipitate separated in the separation part), the maintenance frequency of the separation part can be reduced, and the water softening device that can be used for a long period of time can be provided.

Further, in the water softening device according to the present disclosure, the controller may be configured to perform control so as to end the polarity inversion of the electrolyzer when the ion concentration specified based on the information regarding the ion concentration of the acidic electrolytic water after the polarity inversion after flowing through the separation part becomes less than the reference value. According to such a configuration, the end of the polarity inversion can be controlled based on the ion concentration contained in the acidic electrolytic water after the polarity inversion. Therefore, the acidic electrolytic water can be allowed to flow through the separation part until the hardness component contained in the acidic electrolytic water after flowing through the separation part becomes less than the reference value, and the separation part can be more reliably washed (the separated precipitate is dissolved). Therefore, the maintenance frequency of the separation part can be further reduced, and the water softening device can be used for a long period of time.

Further, in the water softening device according to the present disclosure, the water storage tank may further include a water storage tank separation part that separates a precipitate caused by the hardness component contained in the water introduced into the tank. According to such a configuration, since the precipitates can be separated not only by the separation part provided between the electrolyzer and the neutralizing tank but also by the water storage tank separation part, the precipitates can be more reliably separated. Therefore, when the water softening treatment is resumed after the end of the regeneration treatment, it is possible to suppress the occurrence of a phenomenon that the precipitate flowing into the neutralizing tank reacts with hydrogen ions from the water softening tank to form a hardness component, which is observed in the conventional water softening device, and it is possible to further reduce deterioration of water softening performance associated with dissolution of the precipitate.

Hereinafter, exemplary embodiments of the present disclosure will be described with reference to the drawings. Note that the following exemplary embodiments are examples embodying the present disclosure, and do not limit the technical scope of the present disclosure. Each of the drawings described in the following exemplary embodiments is a schematic view, and each of a ratio of sizes and a ratio of thicknesses of each constituent element in each drawing does not necessarily reflect the actual dimensional ratio.

Third Exemplary Embodiment-1

Figure 18:
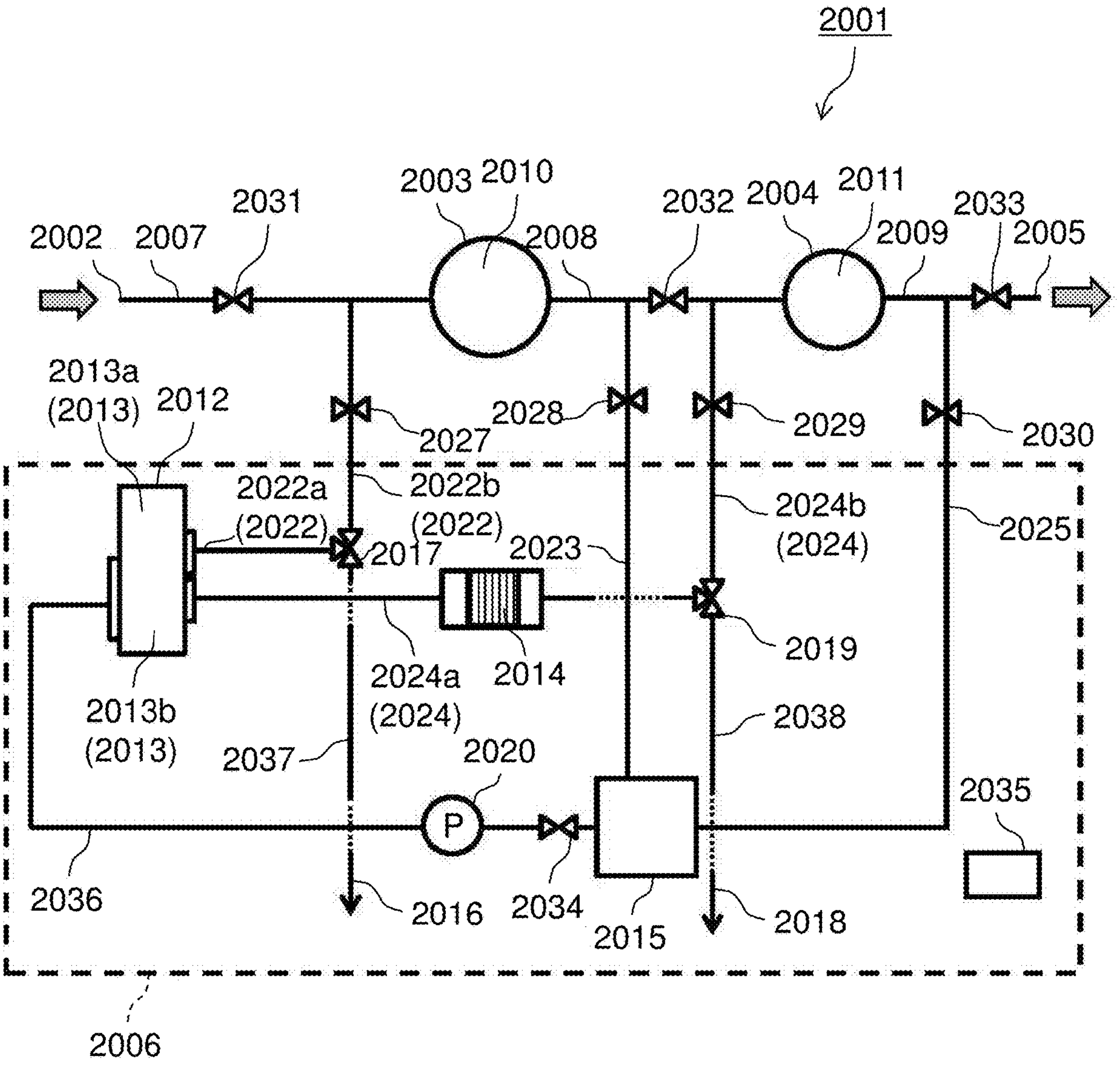
FIG. 18 is a conceptual diagram illustrating a configuration of a water softening device according to a third exemplary embodiment-1 of the present disclosure.

With reference to FIG. 18, water softening device 2001 according to the third exemplary embodiment-1 of the present disclosure will be described. FIG. 18 is a conceptual diagram illustrating a configuration of water softening device 2001 according to the third exemplary embodiment-1 of the present disclosure. FIG. 18 conceptually shows each element of water softening device 2001.

(Overall Configuration)

Water softening device 2001 is a device for generating neutral softened water that can be used as domestic water from city water (raw water containing a hardness component) supplied from the outside.

Specifically, as illustrated in FIG. 18, water softening device 2001 includes inlet port 2002 for raw water from the outside, water softening tank 2003, neutralizing tank 2004, water take-out port 2005 for softened water after treatment, and regeneration device 2006. Regeneration device 2006 includes electrolyzer 2012, separation part 2014, water storage tank 2015, and water pump 2020. Water softening device 2001 includes first drainage port 2016, second drainage port 2018, a plurality of selection valves (selection valve 2017, selection valve 2019), a plurality of on-off valves (on-off valve 2027 to on-off valve 2034), and controller 2035.

Inlet port 2002 is connected to city water. Water softening device 2001 allows water after water softening treatment to be taken out from water take-out port 2005 by the pressure of city water.

The path from inlet port 2002 to water take-out port 2005 is connected by channel 2007, channel 2008, channel 2009. Channel 2007 connects inlet port 2002 to water softening tank 2003. Channel 2008 connects water softening tank 2003 to neutralizing tank 2004. Channel 2009 connects neutralizing tank 2004 to water take-out port 2005.

In other words, channel 2007 guides raw water containing a hardness component from inlet port 2002 to water softening tank 2003. Channel 2008 guides raw water softened in water softening tank 2003 to neutralizing tank 2004. Channel 2009 guides softened water neutralized by neutralizing tank 2004 to water take-out port 2005.

That is, in water softening device 2001, in the water softening treatment, city water supplied from the outside flows through inlet port 2002, channel 2007, water softening tank 2003, channel 2008, neutralizing tank 2004, channel 2009, and water take-out port 2005 in this order, and is discharged as neutral softened water.

(Water Softening Tank and Neutralizing Tank)

Water softening tank 2003 is filled with weakly acidic cation exchange resin 2010, and neutralizing tank 2004 is filled with weakly basic anion exchange resin 2011.

Here, weakly acidic cation exchange resin 2010 is not particularly limited, and ones for general purposes can be used. Examples thereof include a resin having a carboxyl group (—COOH) as an exchange group. A resin in which a hydrogen ion (H+) as a counter ion of a carboxyl group is a cation such as a metal ion or an ammonium ion (NH4+) may also be used.

Weakly basic anion exchange resin 2011 is not particularly limited, and ones for general purposes can be used. Examples thereof include a resin in free-base ion form.

Water softening tank 2003 softens raw water containing a hardness component by the action of weakly acidic cation exchange resin 2010. More specifically, water softening tank 2003 is provided with weakly acidic cation exchange resin 2010 having a hydrogen ion at the terminal of the functional group. Water softening tank 2003 exchanges cations (calcium ion, magnesium ion) which are hardness components contained in flowing water (raw water) with hydrogen ions to allow the hardness of the raw water to decrease and the raw water to be softened. In addition, because the terminal of the functional group of weakly acidic cation exchange resin 2010 is a hydrogen ion, weakly acidic cation exchange resin 2010 can be regenerated using acidic electrolytic water in the regeneration treatment described later. At this time, cations, which are hardness components taken in during the water softening treatment, are released from weakly acidic cation exchange resin 2010.

The raw water containing a hardness component passes from channel 2007 to water softening tank 2003, and passes through weakly acidic cation exchange resin 2010 filled inside water softening tank 2003, thereby passing to neutralizing tank 2004 via the channel 2008 as softened water. However, the softened water treated with weakly acidic cation exchange resin 2010 contains a large amount of hydrogen ions that have been exchanged for the hardness component.

Neutralizing tank 2004 neutralizes the pH of the softened water (acidified softened water) containing hydrogen ions that has come out of water softening tank 2003 by the action of weakly basic anion exchange resin 2011, and converts the softened water into neutral water (neutral softened water). More specifically, neutralizing tank 2004 is provided with weakly basic anion exchange resin 2011, and adsorbs hydrogen ions contained in softened water from water softening tank 2003 with anions, thereby increasing the pH of the softened water to obtain neutral softened water. In addition, weakly basic anion exchange resin 2011 can be regenerated using alkaline electrolytic water in a regeneration treatment to be described later.

Softened water containing hydrogen ions passes through neutralizing tank 2004 from channel 2008, and passes through weakly basic anion exchange resin 2011 filling inside, whereby the acidified softened water that has come out of water softening tank 2003 is neutralized, and the softened water passes to the outside via channel 2009 as neutral softened water.

(Regeneration Device)

Regeneration device 2006 is a device for regenerating weakly acidic cation exchange resin 2010 of water softening tank 2003 and regenerating weakly basic anion exchange resin 2011 of neutralizing tank 2004. Specifically, as described above, regeneration device 2006 includes electrolyzer 2012, separation part 2014, water storage tank 2015, and water pump 2020. In regeneration device 2006, first supply channel 2022, first recovery channel 2023, second supply channel 2024, and second recovery channel 2025 are connected to channel 2007, channel 2008, and channel 2009 from inlet port 2002 to water take-out port 2005, respectively. Each of the channels constitutes circulation channel 2021 (first circulation channel 2021*a*, second circulation channel 2021*b*) to be described later.

Here, first supply channel 2022 supplies acidic electrolytic water from electrolyzer 2012 to water softening tank 2003. First supply channel 2022 includes first supply channel 2022*a* that is a channel communicatively connecting electrolyzer 2012 and selection valve 2017, and first supply channel 2022*b* that is a channel communicatively connecting selection valve 2017 and water softening tank 2003. First recovery channel 2023 is a channel for recovering water containing a hardness component that has passed through water softening tank 2003 into water storage tank 2015. Second supply channel 2024 is a channel for supplying alkaline electrolytic water from electrolyzer 2012 to neutralizing tank 2004. Second supply channel 2024 includes second supply channel 2024*a* that is a channel communicatively connecting electrolyzer 2012 and selection valve 2019, and second supply channel 2024*b* that is a channel communicatively connecting selection valve 2019 and water softening tank 2003. Second recovery channel 2025 is a channel for recovering water that have passed through neutralizing tank 2004 into water storage tank 2015.

(Electrolyzer)

Electrolyzer 2012 generates acidic electrolytic water and alkaline electrolytic water by electrolyzing water (water supplied from water storage tank 2015) that has entered using a pair of electrodes 2013 (electrode 2013*a* and electrode 2013*b*) provided inside, and discharges the generated water. More specifically, in electrode 2013*a* serving as an anode during electrolysis, hydrogen ions are generated by electrolysis, and acidic electrolytic water is generated. In electrode 2013*b* serving as a cathode during electrolysis, hydroxide ions are generated by electrolysis, and alkaline electrolytic water is generated. Then, electrolyzer 2012 supplies acidic electrolytic water to water softening tank 2003 via first supply channel 2022 and supplies alkaline electrolytic water to neutralizing tank 2004 via second supply channel 2024. Although details will be described later, the acidic electrolytic water generated by electrolyzer 2012 is used for regenerating weakly acidic cation exchange resin 2010 of water softening tank 2003, and the alkaline electrolytic water generated by electrolyzer 2012 is used for regenerating weakly basic anion exchange resin 2011 of neutralizing tank 2004. Electrolyzer 2012 is configured such that an energization state to the pair of electrodes 2013 can be controlled by controller 2035 described later.

Further, electrolyzer 2012 is subjected to the polarity inversion when washing separation part 2014 described later (in washing of separation part). Here, the polarity inversion is to apply a voltage to the anode and the cathode of the pair of electrodes 2013 in an exchanged manner That is, in electrode 2013*a* serving as a cathode in polarity inversion, hydroxide ions are generated by electrolysis and become alkaline electrolytic water. In addition, in electrode 2013*b* serving as an anode in polarity inversion, hydrogen ions are generated by electrolysis to become acidic electrolytic water. Accordingly, in polarity inversion, electrolyzer 2012 supplies acidic electrolytic water to second supply channel 2024*a*, and supplies alkaline electrolytic water to first supply channel 2022*a*. Although details will be described later, in polarity inversion, the alkaline electrolytic water fed from electrolyzer 2012 flows through first supply channel 2022*a*, and is discharged from first drainage port 2016 to the outside of the device via selection valve 2017 and first drainage channel 2037. On the other hand, the acidic electrolytic water fed from electrolyzer 2012 flows through second supply channel 2024*a*, flows into separation part 2014 provided on second supply channel 2024*a*, washes separation part 2014, and then is discharged from second drainage port 2018 to the outside of the device via selection valve 2019 and second drainage channel 2038.

In electrolyzer 2012, after a lapse of a certain time (for example, 5 minutes) from the start of the polarity inversion, the polarity inversion is completed.

(Water Storage Tank)

Water storage tank 2015 secures and stores water to be circulated in circulation channel 2021 (see FIG. 19) when weakly acidic cation exchange resin 2010 and weakly basic anion exchange resin 2011 are regenerated. In addition, water storage tank 2015 mixes acidic electrolytic water containing a hardness component that has flowed through water softening tank 2003 and alkaline electrolytic water containing anions that has flowed through neutralizing tank 2004 to generate mixture, and supplies the mixture to electrolyzer 2012.

Then, the water having flowed through water storage tank 2015 passes through electrolyzer 2012, is electrolyzed in electrolyzer 2012, becomes acidic electrolytic water and alkaline electrolytic water, and is supplied to water softening tank 2003 and neutralizing tank 2004, respectively. Then, the acidic electrolytic water and the alkaline electrolytic water are reused in water softening tank 2003 and neutralizing tank 2004, respectively, and thereafter pass (recovered) into water storage tank 2015 again. Therefore, the acidic electrolytic water and the alkaline electrolytic water used for the regeneration of weakly acidic cation exchange resin 2010 and the regeneration of weakly basic anion exchange resin 2011 can be reused.

(Water Pump)

Water pump 2020 is a device for circulating water in circulation channel 2021 (see FIG. 19) during the regeneration treatment by regeneration device 2006. Water pump 2020 is provided in water delivery channel 2036 communicatively connecting water storage tank 2015 and electrolyzer 2012. Water pump 2020 is preferably disposed on the upstream side of electrolyzer 2012 and on the downstream side of water storage tank 2015. Such a disposition is adopted because one water pump 2020 can easily circulate water to first circulation channel 2021*a* and second circulation channel 2021*b* described later. Water pump 2020 is connected to controller 2035 described later so as to be able to communicate therewith in a wireless or wired manner.

(Separation Part)

Separation part 2014 is provided in second supply channel 2024*a* that communicatively connects electrolyzer 2012 and selection valve 2019. Then, separation part 2014 separates a precipitate contained in the alkaline electrolytic water fed from electrolyzer 2012. Here, the precipitate is a reaction product generated when a hardness component, which is a cation released from the water softening tank during the regeneration treatment of water softening tank, reacts with alkaline electrolytic water in electrolyzer 2012. More specifically, electrolysis of water is performed in electrolyzer 2012, and acidic electrolytic water is obtained on the anode side (electrode 2013*a*) and is supplied to first supply channel 2022*a*. On the cathode side (electrode 2013*b*), alkaline electrolytic water containing anions (for example, hydroxide ions) is obtained, and the alkaline electrolytic water passes through second supply channel 2024*a*. In addition, while electrolysis is being performed in electrolyzer 2012, the hardness components (for example, calcium ions and magnesium ions) released from water softening tank 2003 during the regeneration treatment move to the cathode side. Since alkaline electrolytic water is generated on the cathode side, the hardness component and the alkaline electrolytic water react with each other to form a precipitate. For example, when the hardness component is calcium ions, a reaction in which calcium carbonate is generated or calcium hydroxide is generated occurs by mixing the calcium ions with the alkaline electrolytic water. Then, the precipitate derived from the hardness component is separated as a precipitate by separation part 2014 provided on second supply channel 2024*a*. By separating the precipitates derived from the hardness components by separation part 2014, the precipitates can be prevented from flowing into neutralizing tank 2004 and accumulating. Therefore, when the water softening treatment is resumed after the end of the regeneration treatment, the precipitate deposited in neutralizing tank 2004 reacts with hydrogen ions released from water softening tank 2003 to form a hardness component, and it is possible to suppress an increase in hardness of the softened water fed from neutralizing tank 2004. In addition, during the regeneration treatment, the alkaline electrolytic water from which the precipitate derived from the hardness component is separated by separation part 2014 flows through neutralizing tank 2004, is mixed with the acidic electrolytic water, and then electrolyzed again in electrolyzer 2012, and is provided for regeneration of weakly acidic cation exchange resin 2010 and regeneration of weakly basic anion exchange resin 2011 as the acidic electrolytic water and the alkaline electrolytic water, respectively. At this time, the hardness component contained in the acidic electrolytic water is reduced as compared with the city water or the case of the water treated by the device where separation part 2014 is not provided. That is, since the hardness of the acidic electrolytic water is reduced by separating the precipitate by separation part 2014, the hardness component flowing into water softening tank 2003 can be reduced, and the reduction in the regeneration efficiency of weakly acidic cation exchange resin 2010 can be suppressed.

Note that "the hardness component reacts" includes not only a state in which all the hardness components react but also a state in which a component that does not react or a component that does not exceed the solubility product is contained.

The form of separation part 2014 is not limited as long as the precipitate generated by the reaction between the hardness component and the alkaline electrolytic water can be separated. For example, a form using a cartridge type filter, a filtration layer using a granular filter material, a cyclone type solid-liquid separator, a hollow fiber membrane, or the like can be mentioned.

As a means generally used as a form of separation part 2014, a cartridge type filter can be exemplified. As the cartridge type filter, a deep filtration type such as a yarn winding filter, a surface filtration type such as a pleated filter and a membrane filter, or a combination thereof can be used.

The yarn winding filter corresponds to a particle diameter of 1 to 150 micrometers, and is mainly used as a pre-filter. The pleated filter and the membrane filter have particle diameters as wide as about 0.03 to 100 micrometers, and it is preferable to use a pleated filter and a membrane filter with an accuracy of about 0.5 to 1.5 micrometers particularly in the implementation of the present disclosure in order to capture the hardness component precipitated in the regeneration treatment described later. Since alkaline electrolytic water flows in separation part 2014 in the regeneration treatment described later and acidic electrolytic water flows in the washing treatment, the material of the cartridge type filter is preferably a material (for example, polypropylene) having high corrosion resistance against acid and alkali.

The granular filter material used for the filtration layer is intended to capture and remove hardness components, but it is also possible to remove particles having a surface potential to be adsorbed to the granular filter material, particles having a particle diameter of about 1 μm to 10 μm or chromaticity depending on the existence state of ions and the like in raw water. As the granular filter material, a filter material suitable for an object to be removed, such as filtration sand, a pellet fiber filter material, or the like, can be used. The material of the granular filter material may be, for example, a material having hardness that is likely to settle in water and is less likely to be deformed by pressure, such as sand, anthracite, garnet, ceramics, granular activated carbon, iron oxyhydroxide, or manganese sand. The particle diameter may be, for example, 0.3 mm to 5.0 mm, having an equivalent coefficient of 1.2 to 2.0.

Multilayer filtration method in which a plurality of types of filter materials having different specific gravities are mixed and used is a method in which particles having different sizes are layered in order from smallest particles to largest from the bottom as a layer for filtration. In the multilayer filtration method, particles having a large specific gravity and a small size and particles having a small specific gravity and a large size are usually mixed to form a multilayer structure. The multilayer filtration method is preferable because there are advantages such as high filtration efficiency per unit volume and low head loss as compared with a case where a single kind of filter material is used. As a granular filter material, for example, 0.3 millimeters of garnet, 0.6 meters of sand, and 1.0 millimeters of anthracite are mixed at 2:1:1 and used, and it is preferable to adjust the mixing ratio and the particle diameter according to the particle characteristics of the turbidity.

(On-Off Valve and Selection Valve)

A plurality of on-off valves (on-off valve 2027 to on-off valve 2034) are provided in the respective channels, and switch between an "open" state and a "closed" state in the respective channels. Selection valve 2017 is provided in first supply channel 2022, and determines the flowing direction of the electrolytic water generated by electrolysis in electrode 2013*a* of electrolyzer 2012. Specifically, selection valve 2017 switches between a flowing state in which electrolytic water generated by electrolysis at electrode 2013*a* flows through first supply channel 2022 (first supply channel 2022*a* and first supply channel 2022*b*) to reach water softening tank 2003, and a channel state in which electrolytic water generated by electrolysis at electrode 2013*a* flows from first supply channel 2022*a* to first drainage port 2016 via first drainage channel 2037. Selection valve 2019 is provided in second supply channel 2024, and determines the flowing direction of the electrolytic water generated by electrolysis in electrode 2013*b* of electrolyzer 2012. Specifically, selection valve 2019 switches between a flowing state in which the electrolytic water generated by electrolysis at electrode 2013*b* flows through separation part 2014 and second supply channel 2024 (second supply channel 2024*a* and second supply channel 2024*b*) to reach neutralizing tank 2004, and a channel state in which the electrolytic water generated by electrolysis at electrode 2013*b* flows from second supply channel 2024*a* to second drainage port 2018 via separation part 2014 and second drainage channel 2038. Each of the plurality of on-off valves (on-off valve 2027 to on-off valve 2034), selection valve 2017, and selection valve 2019 is connected to controller to be described later so as to communicate with controller 2035 in a wireless or wired manner.

(Drainage Port)

First drainage port 2016 and second drainage port 2018 drain the electrolytic water (acidic electrolytic water and alkaline electrolytic water) having flowed out of electrolyzer 2012 to the outside of the device in washing of separation part 2014 (in washing of separation part) described later and in draining performed subsequently to the washing of the separation part.

First drainage port 2016 discharges the alkaline electrolytic water having flowed out of electrolyzer 2012 and having flowed through first supply channel 2022*a* and first drainage channel 2037 to the outside of the device in washing of the separation part. In draining, first drainage port 2016 discharges water (water such as alkaline electrolytic water remaining in the channel), which is fed from electrolyzer 2012 and flows through first supply channel 2022*a* and first drainage channel 2037, to the outside of the device.

Second drainage port 2018 discharges the acidic electrolytic water having flowed out of electrolyzer 2012 and having flowed through second supply channel 2024*a*, separation part 2014, and second drainage channel 2038 to the outside of the device in washing of the separation part. In draining, second drainage port 2018 discharges water (water such as acidic electrolytic water remaining in the channel), which is fed from electrolyzer 2012 and flows through second supply channel 2024*a*, separation part 2014, and second drainage channel 2038, to the outside of the device.

(Controller)

Controller 2035 controls water softening treatment for softening raw water containing a hardness component. In addition, controller 2035 controls the regeneration treatment of weakly acidic cation exchange resin 2010 in water softening tank 2003 and weakly basic anion exchange resin 2011 in neutralizing tank 2004. In addition, controller 2035 controls the polarity inversion of electrolyzer 2012. Further, controller 2035 controls switching of the water softening treatment, the regeneration treatment, the washing treatment, and the drainage treatment of water softening device 2001. At this time, controller 2035 controls the operations of electrode 2013, water pump 2020, on-off valve 2027, on-off valve 2028, on-off valve 2029, on-off valve 2030, on-off valve 2031, on-off valve 2032, on-off valve 2033, on-off valve 2034, selection valve 2017, and selection valve 2019, and executes switching of the water softening treatment, the regeneration treatment, the washing treatment, and the drainage treatment, the respective treatments, and the polarity inversion.

(Channel)

Figure 19:
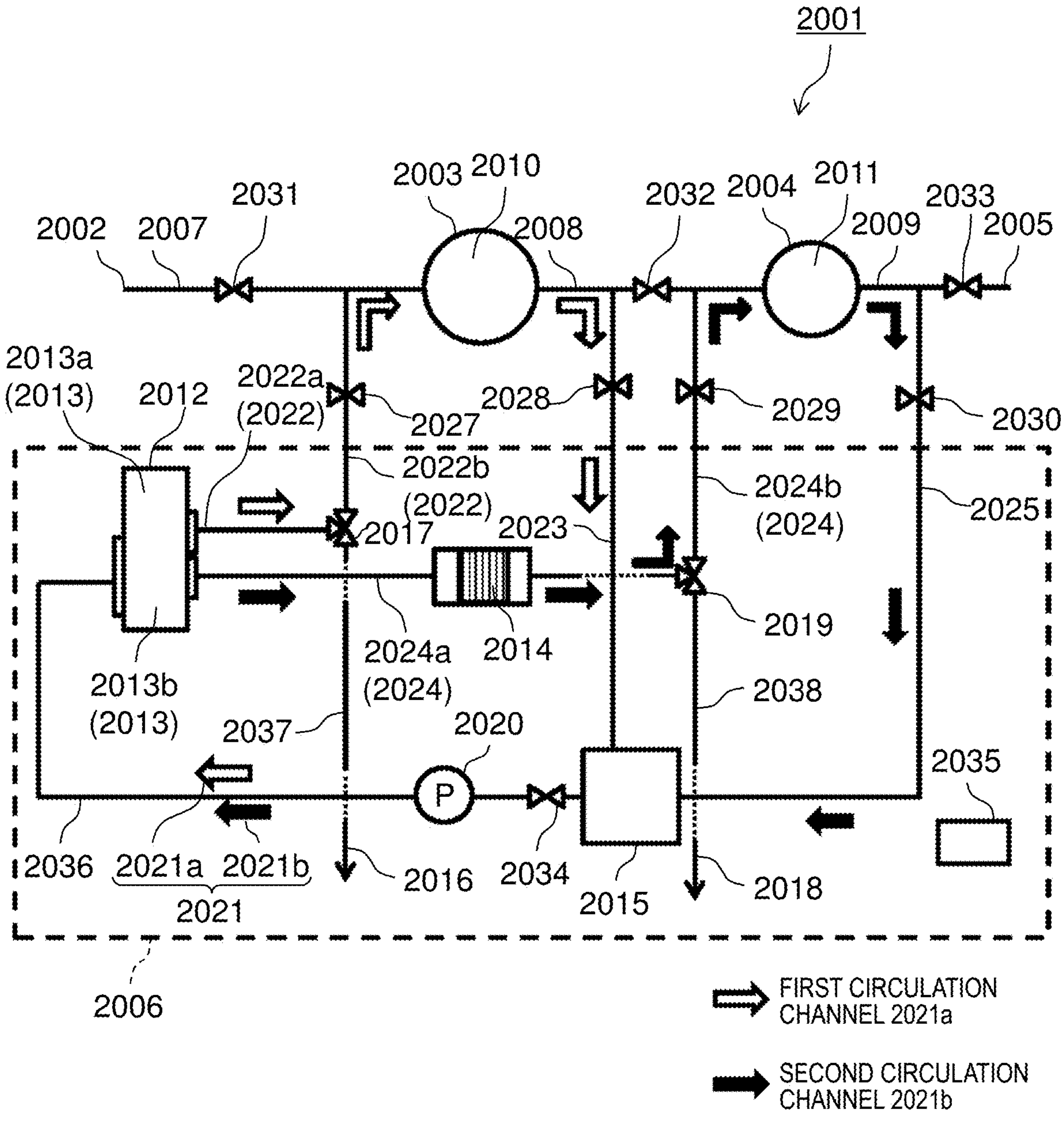
FIG. 19 is a configuration diagram illustrating a circulation channel of the water softening device.

Next, circulation channel 2021 formed during the regeneration treatment of water softening device 2001 will be described with reference to FIG. 19. FIG. 19 is a configuration diagram illustrating circulation channel 2021 of water softening device 2001.

Although the description overlaps, in water softening device 2001, electrolyzer 2012 and water storage tank 2015 included in regeneration device 2006 are communicably connected by water delivery channel 2036 as illustrated in FIG. 19. Electrolyzer 2012 and water storage tank 2015 are communicably connected to channel 2007, channel 2008, and channel 2009, which connect the path from inlet port 2002 to water take-out port 2005, by first supply channel 2022, first recovery channel 2023, and second supply channel 2024 and second recovery channel 2025, respectively. In regeneration device 2006, circulation channel 2021 is configured by a combination of the channels.

First supply channel 2022 is a channel for supplying acidic electrolytic water from electrolyzer 2012 to water softening tank 2003, and selection valve 2017 and on-off valve 2027 are installed in the channel. First supply channel 2022 includes a first supply channel 2022*a* that communicatively connects electrolyzer 2012 and selection valve 2017, and first supply channel 2022*b* that communicatively connects selection valve 2017 and water softening tank 2003. That is, water softening device 2001 includes first supply channel 2022 that can draw out acidic electrolytic water from electrolyzer 2012 and supply the acidic electrolytic water to the upstream side of water softening tank 2003.

First recovery channel 2023 is a channel for recovering water containing a hardness component that has passed through water softening tank 2003 into water storage tank 2015, and on-off valve 2028 is installed in the channel That is, water softening device 2001 includes first recovery channel 2023 that enables the upstream side of water storage tank 2015 to be connected to the downstream side of water softening tank 2003.

Second supply channel 2024 is a channel for supplying alkaline electrolytic water from electrolyzer 2012 to neutralizing tank 2004 via separation part 2014, and selection valve 2019 and on-off valve 2029 are installed in the channel Second supply channel 2024 includes a second supply channel 2024*a* that communicatively connects electrolyzer 2012 and selection valve 2019, and second supply channel 2024*b* that communicatively connects selection valve 2019 and neutralizing tank 2004. That is, water softening device 2001 includes second supply channel 2024 capable of separating the precipitate derived from the hardness component contained in the alkaline electrolytic water drawn out from electrolyzer 2012 by separation part 2014 and supplying the alkaline electrolytic water from which the precipitate has been separated to the upstream side of neutralizing tank 2004.

Second recovery channel 2025 is a channel for collecting water having passed through neutralizing tank 2004 into water storage tank 2015, and on-off valve 2030 is installed in the channel. That is, water softening device 2001 includes second recovery channel 2025 that enables the upstream side of water storage tank 2015 to be connected to the downstream side of neutralizing tank 2004.

Circulation channel 2021 includes first circulation channel 2021*a* through which water fed from water storage tank 2015 by water pump 2020 flows through water softening tank 2003, and second circulation channel 2021*b* through which water fed from water storage tank 2015 by water pump 2020 flows through neutralizing tank 2004.

As illustrated in FIG. 19 (white arrows), first circulation channel 2021*a* is a channel in which water fed from water storage tank 2015 by water pump 2020 flows through electrolyzer 2012 and water softening tank 2003 and returns to water storage tank 2015 for circulation. More specifically, first circulation channel 2021*a* is a channel in which water fed from water storage tank 2015 by water pump 2020 flows and circulates through water delivery channel 2036, electrolyzer 2012, first supply channel 2022*a*, selection valve 2017, first supply channel 2022*b*, on-off valve 2027, water softening tank 2003, first recovery channel 2023, on-off valve 2028, and water storage tank 2015 in this order.

As illustrated in FIG. 19 (black arrows), second circulation channel 2021*b* is a channel in which water fed from water storage tank 2015 by water pump 2020 flows through electrolyzer 2012 and neutralizing tank 2004 and returns to water storage tank 2015 for circulation. More specifically, second circulation channel 2021*b* is a channel in which water fed from water storage tank 2015 by water pump 2020 flows and circulates through water delivery channel 2036, electrolyzer 2012, second supply channel 2024*a*, selection valve 2019, second supply channel 2024*b*, on-off valve 2029, neutralizing tank 2004, second recovery channel 2025, on-off valve 2030, and water storage tank 2015 in this order.

Here, to circulate water in circulation channel 2021, channel 2007 is provided with on-off valve 2031 on the downstream side of inlet port 2002. Closing on-off valve 2031 and opening on-off valve 2027 form a state in which first supply channel 2022 is communicably connected to the upstream side of water softening tank 2003. This allows water softening device to supply the acidic electrolytic water from electrolyzer 2012 to water softening tank 2003.

Channel 2008 is provided with on-off valve 2032 at a position on the downstream side of first recovery channel 2023 and on the upstream side of second supply channel 2024*b*. Closing on-off valve 2032 and opening on-off valve 2028 form a state in which first recovery channel 2023 is communicatively connected to the downstream side of water softening tank 2003. In water softening device 2001, the water (acidic electrolytic water containing a hardness component) that has flowed through water softening tank 2003 can be recovered into water storage tank 2015.

Closing on-off valve 2032 and opening on-off valve 2029 form a state in which second supply channel 2024 is communicatively connected to the upstream side of neutralizing tank 2004. In water softening device 2001, the alkaline electrolytic water can be supplied from the electrolyzer 2012 to neutralizing tank 2004.

Channel 2009 is provided with on-off valve 2033 on the downstream side of neutralizing tank 2004. Closing on-off valve 2033 and opening on-off valve 2030 form a state in which second recovery channel 2025 is communicatively connected to the downstream side of neutralizing tank 2004. This allows the water (alkaline electrolytic water containing anions) that has passed through second recovery channel 2025 to be recovered into water storage tank 2015.

Water delivery channel 2036 is provided with on-off valve 2034 on the downstream side of water storage tank 2015 (position between water storage tank 2015 and water pump 2020). By closing on-off valve 2034, water can be stored in water storage tank 2015. On the other hand, by opening on-off valve 2034, water can be supplied to water delivery channel 2036.

Selection valve 2017 is provided in first supply channel 2022 (first supply channel 2022*a* and first supply channel 2022*b*). By switching selection valve 2017, it is possible to bring about a flowing state in which the electrolytic water generated by electrolysis in electrode 2013*a* flows through first supply channel 2022*a* and first supply channel 2022*b* and reaches water softening tank 2003, and a channel state in which the electrolytic water generated by electrolysis in electrode 2013*a* is discharged from first supply channel 2022*a* to the outside of the device via first drainage channel 2037 to be described later by first drainage port 2016.

Selection valve 2019 is provided in second supply channel 2024 (second supply channel 2024*a* and second supply channel 2024*b*). By switching selection valve 2019, it is possible to bring about a flowing state in which the electrolytic water generated by electrolysis in electrode 2013*b* flows through second supply channel 2024*a* and second supply channel 2024*b* to reach water softening tank 2003, and a channel state in which the electrolytic water generated by electrolysis in electrode 2013*b* is discharged from second supply channel 2024*a* to the outside of the device through second drainage port 2018 via first drainage channel 2037 described later.

By closing on-off valve 2033, the circulation of water to circulation channel 2021 can start. On the other hand, by opening on-off valve 2033, the circulation of water to circulation channel 2021 can be caused to stop.

Figure 20:
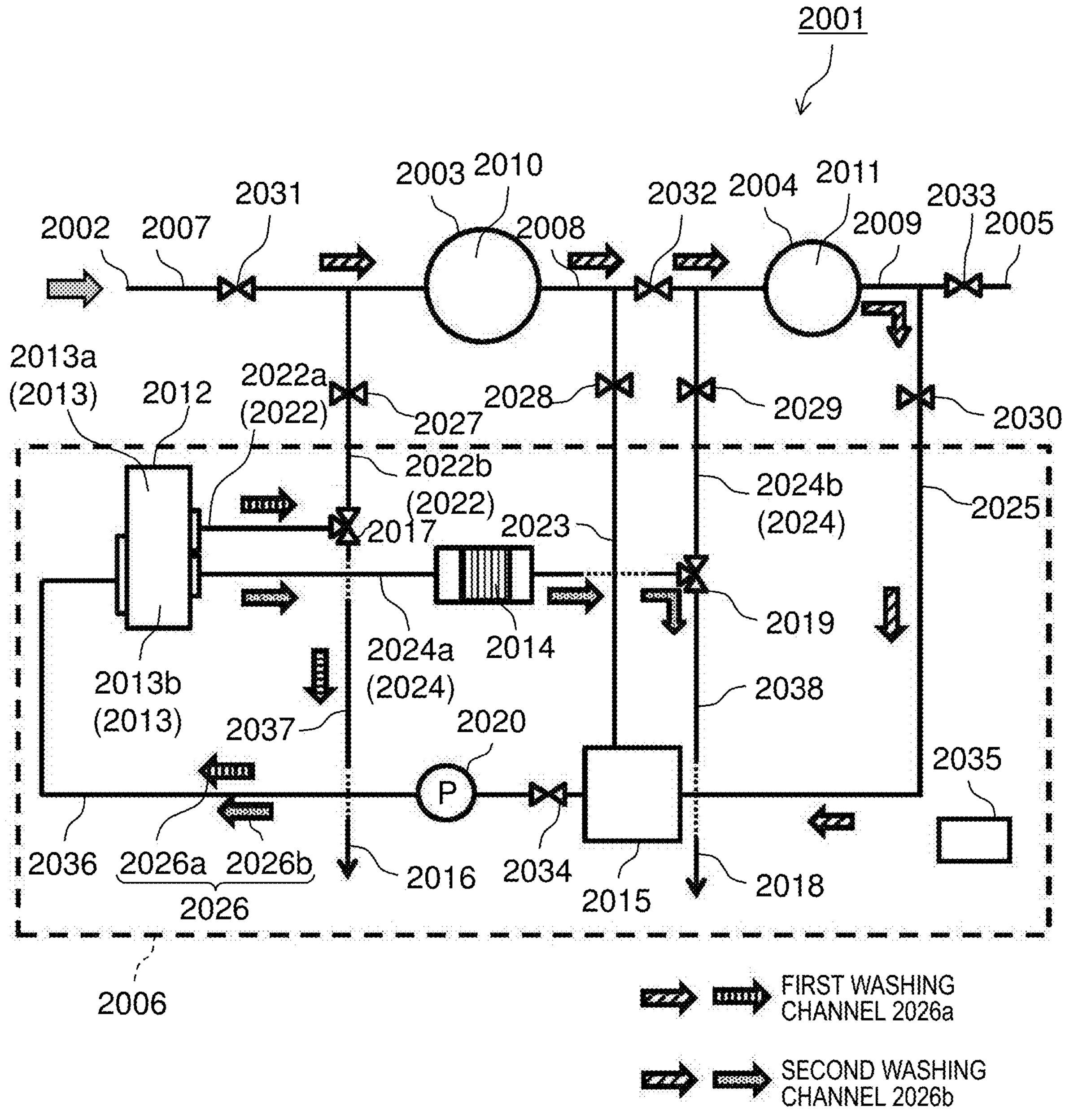
FIG. 20 is a configuration diagram illustrating a washing channel of the water softening device.

Next, with reference to FIG. 20, washing channel 2026 formed at the time of the washing treatment of water softening device 2001 will be described. FIG. 20 is a configuration diagram illustrating washing channel 2026 of water softening device 2001.

Although the description overlaps, as illustrated in FIG. 20, regeneration device 2006 includes an electrolyzer 2012, separation part 2014, and water storage tank 2015. Water storage tank 2015 is communicably connected to channel 2009 by second recovery channel 2025. Electrolyzer 2012 and water storage tank 2015 are communicably connected by water delivery channel 2036. Electrolyzer 2012 is communicably connected to first drainage port 2016 by first supply channel 2022*a* and first drainage channel 2037. Electrolyzer 2012 is communicably connected to second drainage port 2018 by second supply channel 2024*a* and second drainage channel 2038. In regeneration device 2006, washing channel 2026 is formed by a combination of the channels.

First drainage channel 2037 is a channel through which water is discharged from selection valve 2017 to first drainage port 2016. That is, water softening device 2001 includes first drainage channel 2037 that allows water to be drawn out from selection valve 2017 to first drainage port 2016 and discharged to the outside of the device.

Second drainage channel 2038 is a channel through which water is discharged from selection valve 2019 to second drainage port 2018. That is, water softening device 2001 includes second drainage channel 2038 that allows water to be drawn out from selection valve 2019 to second drainage port 2018 and discharged to the outside of the device.

Washing channel 2026 includes first washing channel 2026*a* and second washing channel 2026*b*.

As illustrated in FIG. 20 (hatched arrow and horizontal arrow), first washing channel 2026*a* is a channel in which water introduced from inlet port 2002 flows through channel 2007, water softening tank 2003, channel 2008, neutralizing tank 2004, second recovery channel 2025, water storage tank 2015, water delivery channel 2036, and electrolyzer 2012 in this order, is electrolyzed in electrolyzer 2012, then flows through first supply channel 2022*a*, selection valve 2017, and first drainage channel 2037 as alkaline electrolytic water, and is discharged from first drainage port 2016 to the outside of the device.

As illustrated in FIG. 20 (hatched arrow and shaded arrow), second washing channel 2026*b* is a channel in which water introduced from inlet port 2002 flows through channel 2007, water softening tank 2003, channel 2008, neutralizing tank 2004, second recovery channel 2025, water storage tank 2015, water delivery channel 2036, and electrolyzer 2012 in this order, is electrolyzed in electrolyzer 2012, then flows through second supply channel 2024*a* (including separation part 2014), selection valve 2019, and second drainage channel 2038 as acidic electrolytic water, and is discharged from second drainage port 2018 to the outside of the device.

(Water Softening Treatment, Regeneration Treatment, Washing Treatment, and Drainage Treatment)

Next, with reference to FIG. 21, water softening treatment, regeneration treatment, washing treatment, and drainage treatment of water softening device 2001 starting from the regeneration treatment will be described. FIG. 21 is a diagram illustrating a state of water softening device 2001 in operation.

In the water softening treatment, the regeneration treatment, the washing treatment, and the water drainage treatment, as illustrated in FIG. 21, controller 2035 switches on-off valve 2027, on-off valve 2028, on-off valve 2029, on-off valve 2030, on-off valve 2031, on-off valve 2032, on-off valve 2033, on-off valve 2034, selection valve 2017, selection valve 2019, electrode 2013 of electrolyzer 2012, and water pump 2020 to control them to be in respective flowing states. Controller 2035 includes, for example, a computer system including a processor and a memory. Then, with the processor executing a program stored in the memory, the computer system functions as the controller. Here, the program executed by the processor is recorded in advance in the memory of the computer system, but may be provided by being recorded in a non-transitory recording medium such as a memory card, or may be provided through a telecommunication line such as the Internet.

Here, "ON" in FIG. 21 individually indicates a state in which the corresponding on-off valve is "open", a state in which electrode 2013 is energized, or a state in which water pump 2020 is operating. Blanks indicate a state in which the corresponding on-off valve is "closed", a state in which electrode 2013 is not energized, or a state in which water pump 2020 is stopped. Notations of selection valve 2017 and selection valve 2019 in FIG. 21 indicate a state in which the channel is opened to the component (water softening tank 2003, neutralizing tank 2004, first drainage port 2016 or second drainage port 2018) corresponding to the numeral (reference sign). Selection valve 2017 at the normal time is in a state where the channel is opened to water softening tank 2003, but is left blank when it is not related to other treatments. Selection valve 2019 at the normal time is in a state where the channel is opened to neutralizing tank 2004, but is left blank when it is not related to other treatments. Further, "ON (polarity inversion)" of electrode 2013 in washing of the separation part illustrated in FIG. 21 indicates a state in which electrode 2013 is subjected to the polarity inversion.

(Regeneration Treatment)

Next, an operation during the regeneration treatment by regeneration device 2006 of water softening device 2001 will be described sequentially with reference to the columns of "IN WATER INJECTION" and "IN REGENERATION" in FIG. 21.

In water softening device 2001, when water softening tank 2003 filled with weakly acidic cation exchange resin 2010 is continuously used, the cation exchange capacity decreases or disappears. That is, ion exchange cannot be performed after all the hydrogen ions, which are functional groups of the cation exchange resin, are exchanged for calcium ions or magnesium ions, which are hardness components. In such a state, the hardness component is contained in the treatment water. Therefore, in water softening device 2001, it is necessary to perform regeneration treatment of water softening tank 2003 and neutralizing tank 2004 by regeneration device 2006.

Therefore, in water softening device 2001, controller 2035 specifies a time zone in which the regeneration treatment can be performed once in a predetermined period (for example, one day (24 hours)) and executes the regeneration treatment.

First, as illustrated in FIG. 21, in injecting water, on-off valve 2031 and on-off valve 2028 are opened. This causes water softening device 2001 to introduce the raw water into water storage tank 2015 from inlet port 2002 through water softening tank 2003 by the pressure of city water. At this time, on-off valve 2027, on-off valve 2032, on-off valve 2029, on-off valve 2033, on-off valve 2030, and on-off valve 2034 are closed. By storing a predetermined amount of water corresponding to the capacity of water softening device 2001 in water storage tank 2015, regeneration device 2006 can secure an amount of water at the time of regeneration.

Next, in regeneration, when on-off valve 2031, on-off valve 2032, and on-off valve 2033 are closed, on-off valve 2027, on-off valve 2028, on-off valve 2029, on-off valve 2030, and on-off valve 2034 are opened, the water flowing direction of selection valve 2017 is set to the direction of water softening tank 2003, and the water flowing direction of selection valve 2019 is set to the direction of neutralizing tank 2004, as illustrated in FIG. 19, first circulation channel 2021*a* and second circulation channel 2021*b* are formed.

When electrode 2013 of electrolyzer 2012 and water pump 2020 operate, the water stored in water storage tank 2015 circulates through each of first circulation channel 2021*a* and second circulation channel 2021*b*.

At this time, the acidic electrolytic water generated in electrolyzer 2012 is supplied into water softening tank 2003 through first supply channel 2022, and flows through weakly acidic cation exchange resin 2010 inside water softening tank 2003. That is, flowing of the acidic electrolytic water through weakly acidic cation exchange resin 2010 causes cations (hardness component) adsorbed to weakly acidic cation exchange resin 2010 to undergo an ion exchange reaction with hydrogen ions contained in the acidic electrolytic water. This allows weakly acidic cation exchange resin 2010 to regenerate. Thereafter, the acidic electrolytic water that has flowed through weakly acidic cation exchange resin 2010 contains cations and flows into first recovery channel 2023. That is, the acidic electrolytic water containing cations that has flowed through weakly acidic cation exchange resin 2010 is recovered into water storage tank 2015 via first recovery channel 2023.

On the other hand, the alkaline electrolytic water generated in electrolyzer 2012 is supplied into neutralizing tank 2004 through second supply channel 2024 and separation part 2014 provided in second supply channel 2024, and flows through weakly basic anion exchange resin 2011 inside. That is, flowing of the alkaline electrolytic water through weakly basic anion exchange resin 2011 causes anions adsorbed to weakly basic anion exchange resin 2011 to undergo an ion exchange reaction with hydroxide ions contained in the alkaline electrolytic water. This allows weakly basic anion exchange resin 2011 to regenerate. Thereafter, the alkaline electrolytic water that has flowed through weakly basic anion exchange resin 2011 contains anions and flows into second recovery channel 2025. That is, the alkaline electrolytic water containing anions that has flowed through weakly basic anion exchange resin 2011 is recovered into water storage tank 2015 via second recovery channel 2025.

Then, in water storage tank 2015, the acidic electrolytic water containing cations recovered from water softening tank 2003 and the alkaline electrolytic water containing anions recovered from neutralizing tank 2004 are mixed and neutralized.

At this time, by mixing acidic electrolytic water containing cations (hardness components) and alkaline electrolytic water containing anions, the hardness components react with hydroxide ions contained in the alkaline electrolytic water, and a precipitate is generated. However, at least in the initial stage of the regeneration treatment, the amount of hydroxide ions contained in the alkaline electrolytic water flowing from the neutralizing tank 2004 is smaller than the amount of hardness components released from the water softening tank 2003, so that the precipitate is less likely to be generated. Therefore, the hardness components contained in the neutralized electrolytic water are fed to electrolyzer 2012 as they are.

Thereafter, the electrolytic water mixed in water storage tank 2015 passes through electrolyzer 2012 again via water delivery channel 2036. Then, the passed water is electrolyzed again in electrolyzer 2012.

As described above, water is electrolyzed in electrolyzer 2012, and a large amount of hydroxide ions are generated by electrolysis near the cathode, so that a precipitate is likely to be generated. That is, the hardness component (for example, calcium ions and magnesium ions) contained in the water supplied from water storage tank 2015 moves to the cathode side and reacts with hydroxide ions to become a precipitate. Then, the alkaline electrolytic water containing such precipitates is fed to second supply channel 2024*a* and flows into separation part 2014.

In separation part 2014, the precipitate contained in the alkaline electrolytic water is separated, and the alkaline electrolytic water (treated water) from which the hardness component has been removed can be obtained.

Here, the acidic electrolytic water electrolyzed again in electrolyzer 2012 and the alkaline electrolytic water electrolyzed again in electrolyzer 2012 and separated from the precipitate by separation part 2014 are provided for the regeneration of weakly acidic cation exchange resin 2010 and the regeneration of weakly basic anion exchange resin 2011, respectively.

Here, as a problem occurring in the neutralizing tank of the conventional water softening device, there has been a case where a precipitate generated by a reaction between the hardness component released from the water softening tank and the alkaline electrolytic water in the electrolyzer in the regeneration treatment flows into the neutralizing tank and is deposited in the neutralizing tank. That is, when the water softening treatment is resumed in a state where the precipitate is deposited in the neutralizing tank, the precipitate reacts with hydrogen ions released from the water softening tank to form a hardness component, so that the water softening performance is deteriorated. However, in the present exemplary embodiment, by separating the precipitate generated in electrolyzer 2012 by separation part 2014, it is possible to suppress the deposition of the precipitate caused by the hardness component in neutralizing tank 2004.

Then, in water softening device 2001, when the regeneration treatment is completed, electrode 2013 is subjected to the polarity inversion. Further, the process proceeds to the washing treatment by closing on-off valve 2027, on-off valve 2028, and on-off valve 2029, opening on-off valve 2031 and on-off valve 2032, switching the water flowing direction of selection valve 2017 from the direction of water softening tank 2003 to the direction of first drainage port 2016, and switching the water flowing direction of selection valve 2019 from the direction of neutralizing tank 2004 to the direction of second drainage port 2018.

(Washing Treatment)

In water softening device 2001, when the regeneration treatment is completed, the process proceeds to the washing treatment. Here, the washing treatment is a treatment for washing separation part 2014, and is a treatment in which the pair of electrodes 2013 of electrolyzer 2012 is subjected to the polarity inversion, the acidic electrolytic water generated in electrolyzer 2012 in polarity inversion is circulated to separation part 2014, and the precipitate caused by the hardness component separated in separation part 2014 is dissolved.

Next, the operation of water softening device 2001 at the time of washing treatment will be described with reference to the column of "IN WASHING" in FIG. 21.

As illustrated in FIG. 21, in water softening device 2001, on-off valve 2030, on-off valve 2031, on-off valve 2032, and on-off valve 2034 are opened in the washing treatment (washing). As a result, water softening device 2001 introduces the raw water into electrolyzer 2012 through water softening tank 2003, neutralizing tank 2004, second recovery channel 2025, and water storage tank 2015 from inlet port 2002 by the pressure of the city water. At this time, on-off valve 2027, on-off valve 2028, on-off valve 2029, and on-off valve 2033 are closed. By circulating the raw water through water softening tank 2003, neutralizing tank 2004, and second recovery channel 2025, the electrolytic water circulating through water softening tank 2003, neutralizing tank 2004, and second recovery channel 2025 in the regeneration treatment can be replaced with the raw water.

Next, when electrode 2013 is subjected to the polarity inversion, the water flowing direction of selection valve 2017 is set to the direction of first drainage port 2016, and the water flowing direction of selection valve 2019 is set to the direction of second drainage port 2018, washing channel 2026 is formed as illustrated in FIG. 20. By the polarity inversion, electrolyzer 2012 can supply acidic electrolytic water to second supply channel 2024*a* and supply alkaline electrolytic water to first supply channel 2022*a*.

When electrode 2013 of electrolyzer 2012 and water pump 2020 are operated, the raw water and the electrolytic water (acidic electrolytic water, alkaline electrolytic water) flow through washing channel 2026.

At this time, the alkaline electrolytic water generated in electrolyzer 2012 flows through first supply channel 2022*a* and first drainage channel 2037, and is discharged from first drainage port 2016 to the outside of the device.

On the other hand, acidic electrolytic water generated in electrolyzer 2012 is supplied to second drainage channel 2038 through separation part 2014 provided in second supply channel 2024*a*, and discharged to the outside of the device through second drainage port 2018. That is, by allowing the acidic electrolytic water to flow through separation part 2014, the precipitate resulting from the hardness component trapped in separation part 2014 reacts with the acidic electrolytic water. As a result, the precipitate caused by the hardness component is dissolved and becomes a hardness component, and is contained in the acidic electrolytic water. Thereafter, the acidic electrolytic water having flowed through separation part 2014 contains a hardness component, and is discharged to the outside of the device through second drainage port 2018. That is, by circulating acidic electrolytic water through separation part 2014 and discharging the circulating acidic electrolytic water, separation part 2014 can be washed, and the hardness component can be discharged to the outside of the device. As a result, since separation part 2014 can be washed, a decrease in the quantity of water flow due to clogging of separation part 2014 can be reduced. In addition, the number of times of maintenance of separation part 2014 can be reduced.

Then, in water softening device 2001, when the washing treatment is completed, the polarity inversion of electrode 2013 is completed and the operation is stopped. In addition, on-off valve 2031 and on-off valve 2032 are closed to stop inflow of city water, so that the process proceeds to the drainage treatment.

Note that the end of the washing treatment is when a certain time (for example, 5 minutes) has elapsed from the start of the polarity inversion.

(Drainage Treatment)

In water softening device 2001, when the washing treatment is completed, the process proceeds to the drainage treatment. Here, the drainage treatment is a treatment for discharging the raw water, the acidic electrolytic water, and the alkaline electrolytic water remaining in washing channel 2026.

Next, the operation at the time of drainage treatment by water softening device 2001 will be described with reference to the column of "IN DRAINING" in FIG. 21.

As illustrated in FIG. 21, in water softening device 2001, in the drainage treatment (in draining), on-off valve 2027, on-off valve 2028, on-off valve 2029, on-off valve 2031, on-off valve 2032, and on-off valve 2033 are closed, and on-off valve 2030 is opened. As a result, the inflow of the city water from inlet port 2002 is stopped, and the raw water remaining in the path from the inside of water softening tank 2003 to water storage tank 2015 via first recovery channel 2023 and the raw water remaining in the path from the inside of neutralizing tank 2004 to water storage tank 2015 via second recovery channel 2025 can be caused to flow into water storage tank 2015.

Next, on-off valve 2034 is opened, water pump 2020 is operated, and electrode 2013 is stopped. Accordingly, it is possible to discharge the raw water remaining in the path from the inside of water storage tank 2015 to electrolyzer 2012 via water delivery channel 2036, the alkaline electrolytic water remaining in the path from the inside of electrolyzer 2012 to first drainage port 2016 via first supply channel

2022*a* and first drainage channel 2037, and the electrolytic water remaining in the path from the inside of electrolyzer 2012 to second drainage port 2018 via second supply channel 2024*a* and second drainage channel 2038 to the outside of the device.

By performing the drainage treatment, it is possible to prevent the inflow of the alkaline electrolytic water remaining in washing channel 2026 into water softening tank 2003 and the inflow of the acidic electrolytic water remaining in washing channel 2026 into neutralizing tank 2004.

Then, in water softening device 2001, when the drainage treatment is completed, the operation of water pump 2020 is stopped. On-off valve 2030 and on-off valve 2034 are closed, and on-off valve 2031, on-off valve 2032, and on-off valve 2033 are opened. Further, when the water flowing direction of selection valve 2017 is set to the direction of water softening tank 2003 and the water flowing direction of selection valve 2019 is set to the direction of neutralizing tank 2004, the process proceeds to the water softening treatment.

Note that the end of the drainage treatment is when a certain time (for example, one minute) has elapsed from the start of the drainage treatment.

(Water Softening Treatment)

Water softening device 2001 proceeds to the water softening treatment when the drainage treatment is completed.

First, an operation at the time of water softening treatment by water softening device 2001 will be described with reference to the column "IN WATER SOFTENING" in FIG. 21.

As illustrated in FIG. 21, water softening device 2001 opens on-off valve 2033 provided in water take-out port 2005 in a state where on-off valve 2031 and on-off valve 2032 are open in the water softening treatment (in water softening). Therefore, the water softening device 2001 causes city water (raw water containing a hardness component) to flow through water softening tank 2003 and neutralizing tank 2004 from the outside, and therefore allows the softened water (neutral softened water) to be taken out from water take-out port 2005. At this time, all of on-off valve 2027, on-off valve 2028, on-off valve 2029, on-off valve 2030, and on-off valve 2034 are in a closed state. Electrode 2013 of electrolyzer 2012 and water pump 2020 are also stopped.

Specifically, as illustrated in FIG. 18, in the water softening treatment, raw water to be supplied is supplied from inlet port 2002 to water softening tank 2003 through channel 2007 by the pressure of city water. The raw water supplied to water softening tank 2003 flows through weakly acidic cation exchange resin 2010 provided in water softening tank 2003. At this time, cations as the hardness component in the raw water are adsorbed by the action of weakly acidic cation exchange resin 2010, and hydrogen ions are released (ion exchange is performed). Then, cations are removed from the raw water, whereby the raw water is softened. The softened water further passes through channel 2008 and proceeds to neutralizing tank 2004. In neutralizing tank 2004, hydrogen ions contained in the softened water are adsorbed by the action of weakly basic anion exchange resin 2011. That is, because hydrogen ions are removed from the softened water after the treatment, the lowered pH increases, and neutral water softened as domestic water can be taken out from water take-out port 2005 through channel 2009.

Then, in water softening device 2001, the regeneration treatment is executed when the time zone specified by controller 2035 is reached or when the water softening treatment exceeds a certain period of time.

As described above, in water softening device 2001, the water softening treatment, the regeneration treatment, the washing treatment, and the drainage treatment are repeatedly executed.

According to water softening device 2001 of the present third exemplary embodiment-1 described above, the following effects can be obtained.

(1) Water softening device 2001 includes water softening tank 2003, neutralizing tank 2004, electrolyzer 2012, water storage tank 2015, and separation part 2014. Water softening tank 2003 softens raw water containing a hardness component by weakly acidic cation exchange resin 2010. The neutralizing tank 2004 neutralizes the pH of the softened water that has passed through the water softening tank by weakly basic anion exchange resin 2011. Electrolyzer 2012 produces acidic electrolytic water for regenerating weakly acidic cation exchange resin 2010 in water softening tank 2003 and alkaline electrolytic water for regenerating weakly basic anion exchange resin 2011 in neutralizing tank 2004. Water storage tank 2015 mixes the acidic electrolytic water having flowed through water softening tank 2003 and the alkaline electrolytic water having flowed through neutralizing tank 2004 to generate mixture, and supplies the mixture to electrolyzer 2012. Separation part 2014 is provided in a channel that communicatively connected electrolyzer 2012 and neutralizing tank 2004, and is configured to separate a precipitate caused by a hardness component contained in water introduced into electrolyzer 2012.

As a result, when water softening tank 2003 and neutralizing tank 2004 are regenerated, the precipitate contained in the alkaline electrolytic water that has passed through electrolyzer 2012 (the precipitate caused by the hardness component contained in the water introduced into electrolyzer 2012) can be separated by separation part 2014, and the inflow of the precipitate into neutralizing tank 2004 can be reduced. Therefore, when the water softening treatment is resumed after the end of the regeneration treatment, it is possible to suppress the precipitate flowing into neutralizing tank 2004 from reacting with hydrogen ions from water softening tank 2003 to form a hardness component, and it is possible to reduce deterioration in water softening performance associated with dissolution of the precipitate.

(2) Water softening device 2001 includes controller 2035 that controls the regeneration treatment of weakly acidic cation exchange resin 2010 in water softening tank 2003 and weakly basic anion exchange resin 2011 in neutralizing tank 2004. Then, after completion of the regeneration treatment, controller 2035 performs control such that electrolyzer 2012 is subjected to the polarity inversion, and the acidic electrolytic water after the polarity inversion is circulated to separation part 2014 and discharged to the outside of the device. As a result, separation part 2014 is washed (the precipitate separated in separation part 2014 is dissolved and removed), so that the maintenance frequency of separation part 2014 can be reduced, and water softening device 2001 that can be used for a long period of time can be obtained.

Third Exemplary Embodiment-2

Figure 22:
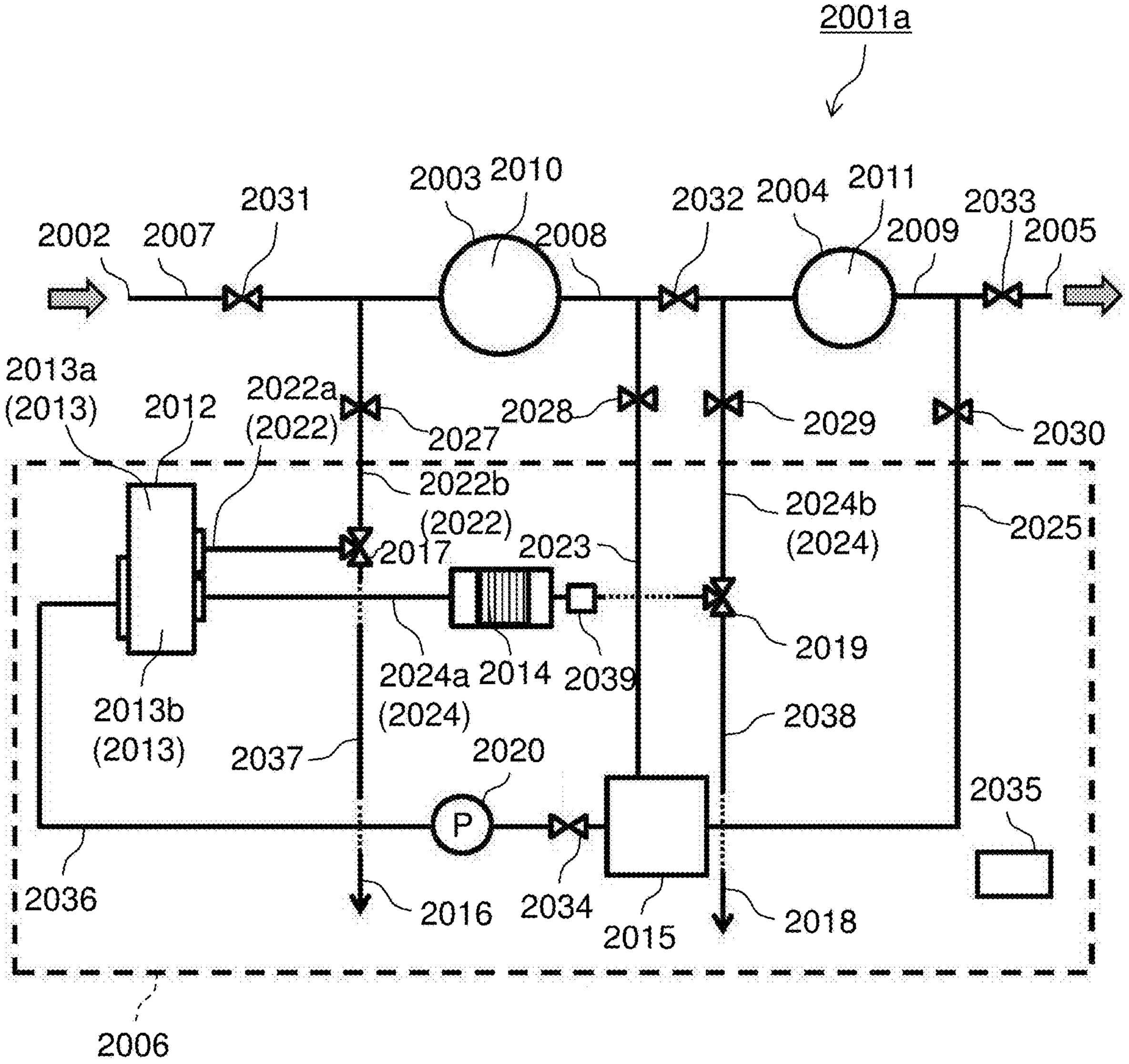
FIG. 22 is a conceptual diagram illustrating a configuration of a water softening device according to a third exemplary embodiment-2 of the present disclosure.

Next, water softening device 2001*a* according to the third exemplary embodiment-2 of the present disclosure will be described with reference to FIG. 22. FIG. 22 is a conceptual diagram illustrating a configuration of water softening device 2001*a* according to the third exemplary embodiment-2 of the present disclosure.

Water softening device 2001*a* according to the third exemplary embodiment-2 is different from the third exemplary embodiment-1 in that ion concentration detector 2039 is provided on the downstream side of separation part 2014. That is, in water softening device 2001*a* according to the third exemplary embodiment-2, based on the information regarding the ion concentration of the polarity-inverted acidic electrolytic water after circulation through separation part 2014, when the ion concentration becomes less than the reference value, the control is performed so as to end the polarity inversion of electrolyzer 2012. Other configurations of water softening device 2001*a* are the same as those of water softening device 2001 according to the third exemplary embodiment-1. In the following, description of the contents already described in the third exemplary embodiment-1 will be omitted as appropriate, and differences from the third exemplary embodiment-1 will be mainly described.

As illustrated in FIG. 22, water softening device 2001*a* includes ion concentration detector 2039 at the subsequent stage of separation part 2014 and the preceding stage of selection valve 2019 on second supply channel 2024*a*.

Ion concentration detector 2039 detects the ion concentration of the acidic electrolytic water having flowed through separation part 2014 in the washing treatment. Ion concentration detector 2039 is connected to controller 2035 so as to be able to communicate with the controller in a wireless or wired manner, and information regarding the detected ion concentration is used as an input signal of controller 2035.

Here, a general-purpose ion concentration detector can be used as ion concentration detector 2039, and examples thereof include a detector for measuring the electrical conductivity of a liquid or a detector for measuring the amount of total dissolved solid (TDS) contained in water.

Water (pure water) itself is an insulator that hardly conducts electricity, but various substances are dissolved (ionized) to conduct electricity. That is, the electrical conductivity of the liquid is an index of the amount of ionized substances contained in the liquid. In general city water, the content is proportional to the content of calcium ions, magnesium ions, sodium ions, chloride ions, and the like contained in a large amount in river water or groundwater which is a water source of city water. In the present exemplary embodiment, TDS represents the total concentration of ions (calcium ion, magnesium ion, chloride ion, hydrogen ion, and the like) contained in water flowing through ion concentration detector 2039 during the washing treatment. In water of the same water system, the electrical conductivity and the TDS are approximately proportional to each other.

In a case where the ion concentration specified based on the information regarding the ion concentration output from ion concentration detector 2039 is less than the reference value, controller 2035 performs control so as to end the polarity inversion of electrolyzer 2012. On the other hand, when the ion concentration is equal to or larger than the reference value, controller 2035 performs control to continue the polarity inversion of electrolyzer 2012. As a result, controller 2035 can control the end of the polarity inversion based on the ion concentration contained in the acidic electrolytic water after the polarity inversion. Therefore, the acidic electrolytic water can be circulated through separation part 2014 until the ion concentration contained in the acidic electrolytic water after flowing through separation part 2014 becomes less than the reference value.

Here, the ion concentration specified based on the information regarding the ion concentration output from ion concentration detector 2039 is an ion concentration of a difference between the ion concentration contained in the acidic electrolytic water after flowing through separation part 2014 and the ion concentration contained in the acidic electrolytic water after flowing through separation part 2014 in the washing treatment in a state where there is no precipitate in separation part 2014. The reference value is defined such that the ion concentration of the difference falls within a predetermined range.

As described above, according to water softening device 2001*a* of the present third exemplary embodiment-2, the following effects can be obtained in addition to the effects (1) and (2) obtained by the third exemplary embodiment-1.

(3) In water softening device 2001*a*, controller 2035 performs control so as to end the polarity inversion of electrolyzer 2012 when the ion concentration specified based on the information regarding the ion concentration (hardness component concentration) of the acidic electrolytic water after the polarity inversion after flowing through separation part 2014 becomes less than the reference value. Accordingly, the end of the polarity inversion can be controlled based on the information regarding the ion concentration contained in the acidic electrolytic water after the polarity inversion. Therefore, the acidic electrolytic water can be circulated through separation part 2014 until the ion concentration specified based on the information regarding the ion concentration contained in the acidic electrolytic water after the polarity inversion is less than the reference value, and separation part 2014 can be more reliably washed (the separated precipitate is dissolved). Therefore, the maintenance frequency of separation part 2014 can be further reduced, and water softening device 2001*a* that can be used for a long period of time can be obtained.

Third Exemplary Embodiment-3

Figure 23:
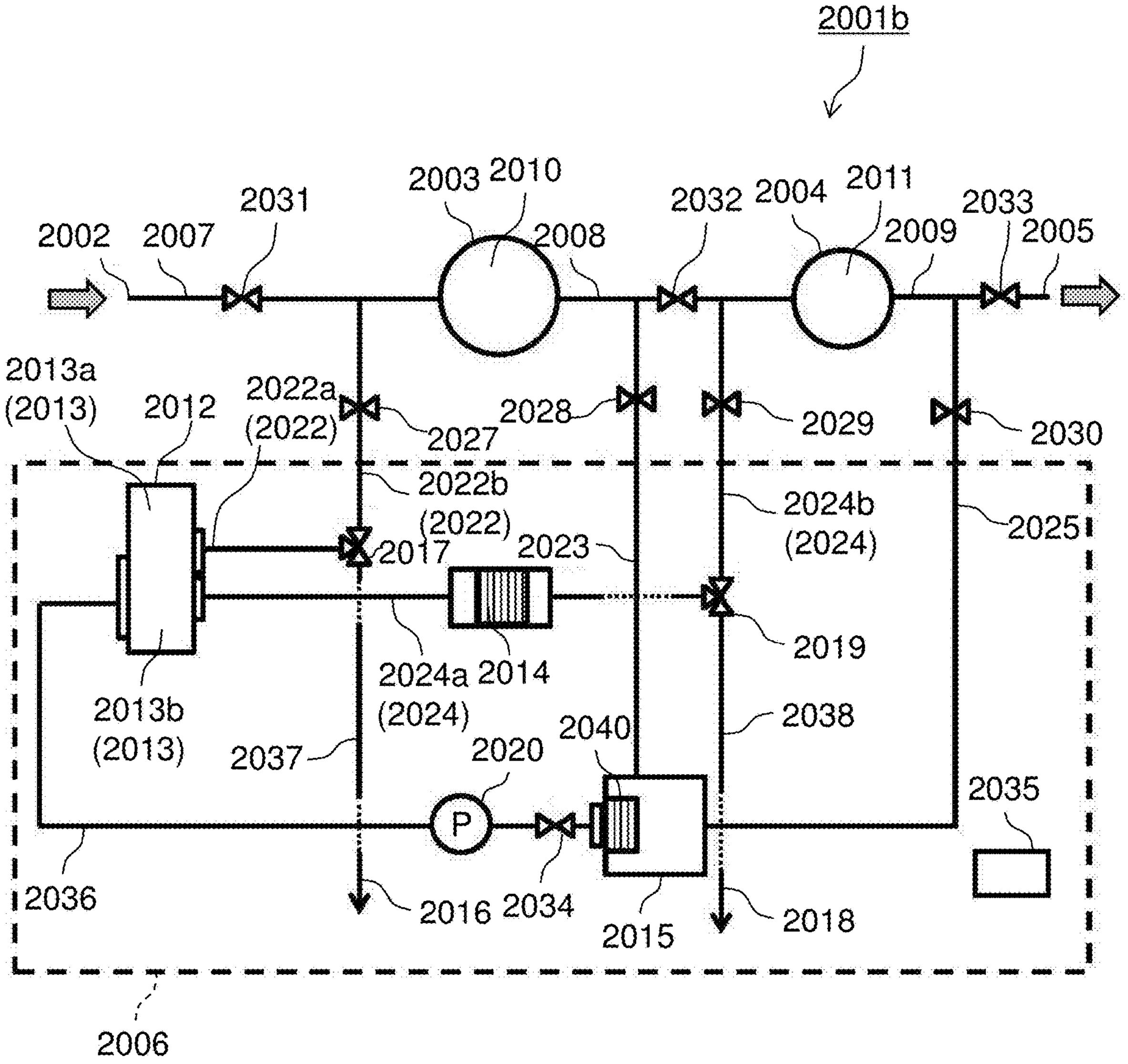
FIG. 23 is a conceptual diagram illustrating a configuration of a water softening device according to a third exemplary embodiment-3 of the present disclosure.

Next, water softening device 2001*b* according to the third exemplary embodiment-3 of the present disclosure will be described with reference to FIG. 23. FIG. 23 is a conceptual diagram illustrating a configuration of water softening device 2001*b* according to the third exemplary embodiment-3 of the present disclosure.

Water softening device 2001*b* according to the third exemplary embodiment-3 is different from the third exemplary embodiment-1 in that water storage tank 2015 further includes water storage tank separation part 2040. Other configurations of water softening device 2001*b* are the same as those of water softening device 2001 according to the third exemplary embodiment-1. In the following, description of the contents already described in the third exemplary embodiment-1 will be omitted as appropriate, and differences from the third exemplary embodiment-1 will be mainly described.

As illustrated in FIG. 23, water softening device 2001*b* includes water storage tank separation part 2040 near an outlet of water storage tank 2015 (a connection portion between water storage tank 2015 and water delivery channel 2036). That is, in water softening device 2001*b*, the precipitate caused by the hardness component is separated by separation part 2014 and water storage tank separation part 2040.

As described above, in water storage tank 2015, although the amount of hydroxide ions contained in the alkaline electrolytic water is small at the initial stage of the regeneration treatment, the regeneration of neutralizing tank 2004 ends earlier than the regeneration of water softening tank 2003, and thus the amount of hydroxide ions contained in the alkaline electrolytic water increases at the latter half stage of the regeneration treatment. That is, in the second half stage of the regeneration treatment, the acidic electrolytic water containing the hardness component released from water softening tank 2003 and the alkaline electrolytic water released from neutralizing tank 2004 are mixed, and a precipitate is likely to occur. As a result, the hardness components (for example, calcium ions and magnesium ions) released from water softening tank 2003 react with hydroxide ions from neutralizing tank 2004 to form precipitates. Therefore, water storage tank separation part 2040 separates the precipitate generated in water storage tank 2015. As with separation part 2014, the form of water storage tank separation part 2040 is not limited as long as the precipitate generated by the reaction between the hardness component and the alkaline electrolytic water can be separated. As described above, for example, a form using a cartridge type filter, a filtration layer using a granular filter material, a cyclone type solid-liquid separator, a hollow fiber membrane, or the like can be mentioned.

Then, water storage tank 2015 supplies the electrolytic water from which the precipitate is separated by water storage tank separation part 2040 to electrolyzer 2012 via water delivery channel 2036. At this time, since the hardness component contained in the electrolytic water supplied to electrolyzer 2012 is reduced, the precipitate generated in electrode 2013*b* of the electrolyzer 2012 is also reduced.

As described above, according to water softening device 2001*b* of the present third exemplary embodiment-3, the following effects can be obtained in addition to the effects (1) and (2) obtained by the third exemplary embodiment-1.

(4) In water softening device 2001*b*, water storage tank 2015 further includes water storage tank separation part 2040 that separates the precipitate caused by the hardness component contained in the water introduced into the tank. As a result, since the precipitates can be separated not only by separation part 2014 provided between electrolyzer 2012 and neutralizing tank 2004 but also by water storage tank separation part 2040, the precipitates can be more reliably separated. Therefore, when the water softening treatment is resumed after the end of the regeneration treatment, it is possible to suppress the precipitate flowing into neutralizing tank 2004 from reacting with hydrogen ions from water softening tank 2003 to form a hardness component as in the conventional water softening device, and it is possible to further reduce the deterioration in water softening performance associated with the dissolution of the precipitate.

(5) Water softening device 2001*b* includes separation part 2014 provided on the downstream side of electrolyzer 2012 and water storage tank separation part 2040 provided on the upstream side of electrolyzer 2012 with respect to washing channel 2026. As a result, the hardness component contained in the electrolytic water supplied to electrolyzer 2012 can be reduced, so that the precipitate generated in electrolyzer 2012 is reduced. Therefore, the maintenance frequency of separation part 2014 can be further reduced, and water softening device 2001*b* that can be used for a long period of time can be obtained.

The present disclosure has been described above based on the exemplary embodiments. It will be understood by those skilled in the art that the exemplary embodiments are merely examples; further, in modifications of the exemplary embodiments, components or processes of the exemplary embodiments are variously combined, and additionally, the modifications fall within the scope of the present disclosure.

In addition, in water softening device 2001 according to the present third exemplary embodiment-1, the regeneration treatment is executed when the time zone specified by controller 2035 is reached or when the water softening treatment exceeds a certain period of time, but the present disclosure is not limited thereto. For example, an ion concentration detector different from ion concentration detector 2039 may be provided on the downstream side of second recovery channel 2025 and the upstream side of on-off valve 2027, the ion concentration detector may constantly detect the ion concentration (for example, the hardness component concentration) of softened water flowing through channel 2009, and the regeneration treatment may be executed not only in a case where the time zone specified by controller 2035 is reached or the water softening treatment exceeds a certain time, but also in a case where the ion concentration exceeds a preset reference value. Thus, the execution of the regeneration treatment can be determined based on the ion concentration of water after flowing through neutralizing tank 2004. Therefore, the state of weakly acidic cation exchange resin 2010 in water softening tank 2003 can be determined more accurately, and weakly acidic cation exchange resin 2010 and weakly basic anion exchange resin 2011 can be regenerated at an appropriate timing.

Further, in water softening device 2001 according to the present third exemplary embodiment-1, in the washing treatment (washing), the raw water is introduced into electrolyzer 2012 from inlet port 2002 through water softening tank 2003, neutralizing tank 2004, second recovery channel 2025, and water storage tank 2015, but the present disclosure is not limited thereto. For example, first recovery channel 2023 may be circulated instead of second recovery channel 2025. This makes it possible to recover the acidic electrolytic water containing the hardness component remaining in first recovery channel 2023.

In addition, in water softening device 2001 according to the present third exemplary embodiment-1, water storage tank 2015 may further include an on-off valve and an air vent valve. When the on-off valve provided in water storage tank 2015 is opened at the time of the drainage treatment, the water in water storage tank 2015 is discharged to the outside by the action of the air vent valve. Accordingly, the time required for the drainage treatment can be shortened.

In addition, in water softening device 2001 according to the present third exemplary embodiment-1, first drainage port 2016 and second drainage port 2018 are provided as configurations for discharging the electrolytic water fed from electrolyzer 2012 to the outside of the device in the washing treatment and the drainage treatment, but the present disclosure is not limited thereto. For example, it is preferable that alkaline electrolytic water drained from first drainage port 2016 and acidic electrolytic water drained from second drainage port 2018 are mixed and drained. Thus, the acidic electrolytic water and the alkaline electrolytic water can be neutralized and discharged.

In water softening device 2001 according to the present third exemplary embodiment-1, the washing treatment is performed on separation part 2014, but the present disclosure is not limited thereto. For example, the washing treatment may not be performed on separation part 2014. As a result, although the above-described effect (2) cannot be obtained, effects such as simplification of the device configuration, downsizing of the device, and cost reduction of the device can be obtained.

Fourth Exemplary Embodiment

A fourth exemplary embodiment includes at least a fourth exemplary embodiment-1, a fourth exemplary embodiment-2, a fourth exemplary embodiment-3, and a fourth exemplary embodiment-4 described below.

A water softening device according to the present disclosure includes a water softening tank, a neutralizing tank, an electrolyzer, and a separation part. In the water softening tank, raw water containing a hardness component and chloride ions is softened by a weakly acidic cation exchange resin. The neutralizing tank neutralizes the pH of softened water that has passed through the water softening tank by a weakly basic anion exchange resin. The electrolyzer produces acidic electrolytic water for regenerating the weakly acidic cation exchange resin in the water softening tank and alkaline electrolytic water for regenerating the weakly basic anion exchange resin in the neutralizing tank. The separation part is provided in a channel communicating the electrolyzer and the neutralizing tank, and separates a precipitate caused by a hardness component contained in water introduced into the electrolyzer. Then, after the water softening tank and the neutralizing tank are regenerated, the water softening device performs a separation part washing treatment of flowing the acidic softened water having flowed through the water softening tank to the separation part and discharging the acidic softened water to the outside of the device.

According to such a configuration, the precipitate separated by the separation part can be dissolved using the acidic softened water softened by the water softening tank, and the separation part can be washed. Therefore, the water softening device can reliably wash the separation part and can be used for a long period of time.

Further, in the water softening device according to the present disclosure, the separation part washing treatment may be performed by flowing a part of the acidic softened water having flowed through the water softening tank to the separation part during a period in which the water softening treatment of the raw water by the water softening tank and the neutralizing tank is performed. In this way, the washing treatment of the separation part can be performed in parallel with the water softening treatment. Therefore, the water softening treatment can be executed for a long time as compared with the case where the water softening treatment is performed after the separation part washing treatment.

Further, in the water softening device according to the present disclosure, the separation part washing treatment may be performed by allowing acidic softened water to flow into the separation part from the downstream side of the separation part. In this way, backwashing of the separation part can be performed. Therefore, the treatment efficiency of the separation part washing treatment can be improved, and the separation part washing treatment can be ended in a shorter period of time.

Further, in the water softening device according to the present disclosure, the flow of the acidic softened water to the separation part may be stopped when the separation part washing treatment is completed. In this way, it is possible to suppress the supply of the acidic softened water exceeding the amount required for the separation part washing treatment to the separation part. Therefore, the separation part washing treatment can be completed without excessively using the acidic softened water.

Further, in the water softening device according to the present disclosure, the end of the separation part washing treatment may be after a certain period of time from the start of the separation part washing treatment. In this way, since the washing treatment of the separation part can be ended in a certain period, insufficient washing of the separation part or excessive use of acidic softened water can be suppressed.

In addition, the water softening device according to the present disclosure may further include an ion concentration detector that detects ion concentration information regarding the ion concentration of water that has flowed out of the separation part, and the separation part washing treatment may be finished based on the ion concentration information. In this way, the washing state of separation part 3014 during the separation part washing treatment can be grasped, and the end of the separation part washing treatment can be determined based on the ion concentration information. Therefore, the washing of separation part 3014 can be completed more reliably.

Hereinafter, exemplary embodiments of the present disclosure will be described with reference to the drawings. Note that the following exemplary embodiments are examples embodying the present disclosure, and do not limit the technical scope of the present disclosure. Each of the drawings described in the following exemplary embodiments is a schematic view, and each of a ratio of sizes and a ratio of thicknesses of each constituent element in each drawing does not necessarily reflect the actual dimensional ratio.

Fourth Exemplary Embodiment-1

Figure 24:
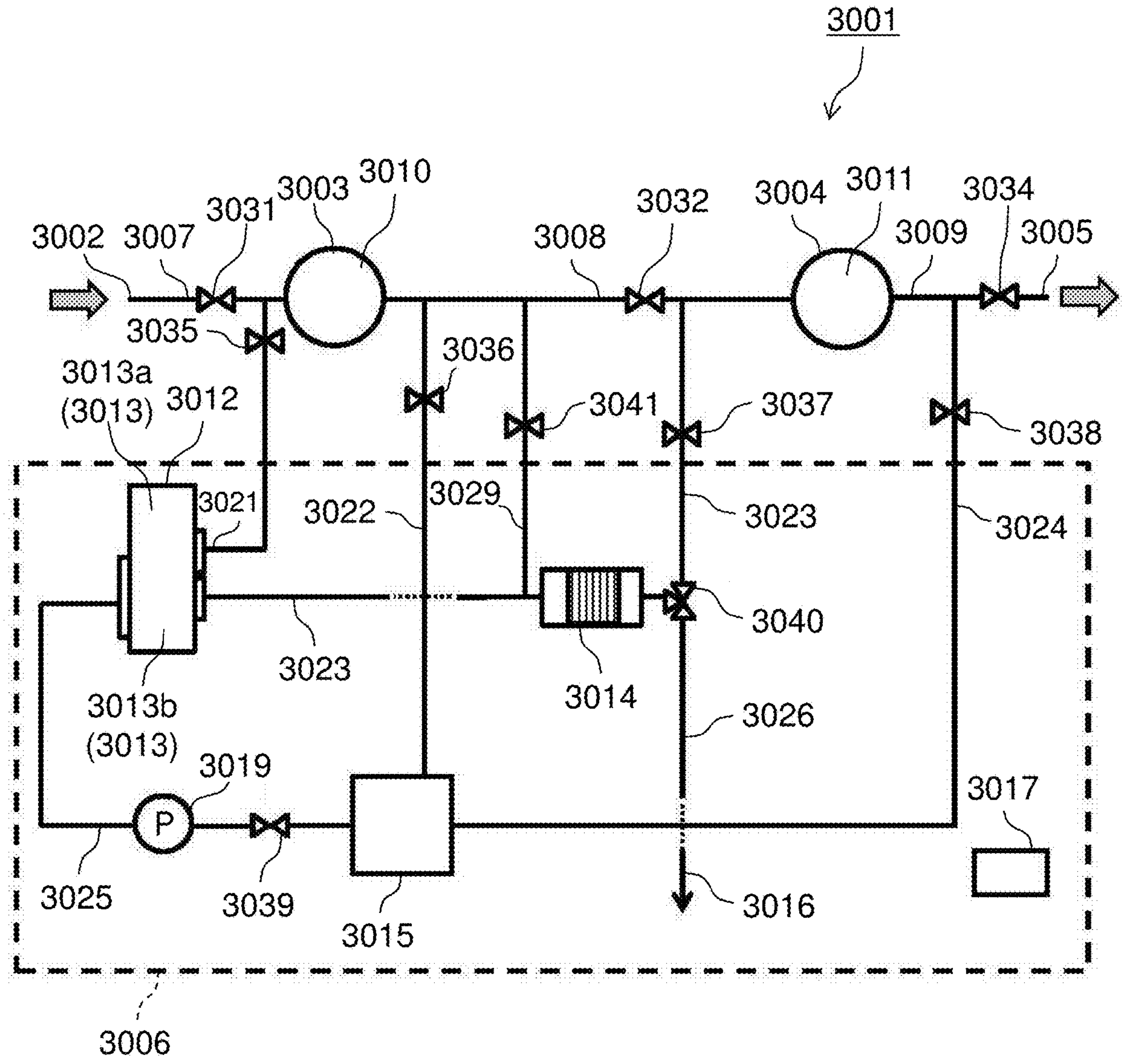
FIG. 24 is a conceptual diagram illustrating a configuration of a water softening device according to a fourth exemplary embodiment-1 of the present disclosure.

With reference to FIG. 24, water softening device 3001 according to the fourth exemplary embodiment-1 of the present disclosure will be described. FIG. 24 is a conceptual diagram illustrating a configuration of water softening device 3001 according to the fourth exemplary embodiment-1 of the present disclosure. FIG. 24 conceptually shows each element of water softening device 3001.

(Overall Configuration)

Water softening device 3001 is a device for generating neutral softened water that can be used as domestic water from city water (raw water containing a hardness component) supplied from the outside.

Specifically, as illustrated in FIG. 24, water softening device 3001 includes inlet port 3002 for raw water from the outside, water softening tank 3003, neutralizing tank 3004, water take-out port 3005 for softened water after treatment, and regeneration device 3006. Regeneration device 3006 includes electrolyzer 3012, separation part 3014, water storage tank 3015, and water pump 3019. Water softening device 3001 includes drainage port 3016, controller 3017, a plurality of on-off valves (on-off valve 3031, on-off valve 3032, on-off valve 3034 to on-off valve 3039, and on-off valve 3041), and selection valve 3040.

Inlet port 3002 is connected to city water. Water softening device 3001 allows water after water softening treatment to be taken out from water take-out port 3005 by the pressure of city water.

The path from inlet port 3002 to water take-out port 3005 is connected by channel 3007, channel 3008, channel 3009. Channel 3007 connects inlet port 3002 to water softening tank 3003. Channel 3008 connects water softening tank 3003 to neutralizing tank 3004. Channel 3009 connects neutralizing tank 3004 to water take-out port 3005.

In other words, channel 3007 guides raw water containing a hardness component from inlet port 3002 to water softening tank 3003. Channel 3008 guides raw water softened in water softening tank 3003 to neutralizing tank 3004. Channel 3009 guides softened water neutralized by neutralizing tank 3004 to water take-out port 3005.

That is, in water softening device 3001, in the water softening treatment, city water supplied from the outside flows through inlet port 3002, channel 3007, water softening tank 3003, channel 3008, neutralizing tank 3004, channel 3009, and water take-out port 3005 in this order, and is discharged as neutral softened water.

(Water Softening Tank and Neutralizing Tank)

Water softening tank 3003 is filled with weakly acidic cation exchange resin 3010, and neutralizing tank 3004 is filled with weakly basic anion exchange resin 3011.

Here, weakly acidic cation exchange resin 3010 is not particularly limited, and ones for general purposes can be used. Examples thereof include a resin having a carboxyl group (—COOH) as an exchange group. A resin in which a hydrogen ion (H+) as a counter ion of a carboxyl group is a cation such as a metal ion or an ammonium ion (NH4+) may also be used.

Weakly basic anion exchange resin 3011 is not particularly limited, and ones for general purposes can be used. Examples thereof include a resin in free-base ion form.

Water softening tank 3003 softens raw water containing a hardness component by the action of weakly acidic cation exchange resin 3010. More specifically, water softening tank 3003 is provided with weakly acidic cation exchange resin 3010 having a hydrogen ion at the terminal of the functional group. Water softening tank 3003 exchanges cations (calcium ion, magnesium ion) which are hardness components contained in flowing water (raw water) with hydrogen ions to allow the hardness of the raw water to decrease and the raw water to be softened. In addition, because the terminal of the functional group of weakly acidic cation exchange resin 3010 is a hydrogen ion, weakly acidic cation exchange resin 3010 can be regenerated using acidic electrolytic water in the regeneration treatment described later. At this time, cations, which are hardness components taken in during the water softening treatment, are released from weakly acidic cation exchange resin 3010.

The raw water containing a hardness component passes from channel 3007 to water softening tank 3003, and passes through weakly acidic cation exchange resin 3010 filled inside water softening tank 3003, thereby passing to neutralizing tank 3004 via channel 3008 as softened water. However, the softened water treated with weakly acidic cation exchange resin 3010 contains a large amount of hydrogen ions that have been exchanged for the hardness component. That is, the softened water flowing out of water softening tank 3003 is softened water (acidic softened water) acidified by containing a large amount of hydrogen ions.

Neutralizing tank 3004 neutralizes the pH of the softened water (acidified softened water) containing hydrogen ions that has come out of water softening tank 3003 by the action of weakly basic anion exchange resin 3011, and converts the softened water into neutral water (neutral softened water). More specifically, neutralizing tank 3004 is provided with weakly basic anion exchange resin 3011, and adsorbs hydrogen ions contained in softened water from water softening tank 3003 with anions, thereby increasing the pH of the softened water to obtain neutral softened water. In addition, weakly basic anion exchange resin 3011 can be regenerated using alkaline electrolytic water in a regeneration treatment to be described later.

Softened water containing hydrogen ions passes through neutralizing tank 3004 from channel 3008, and passes through weakly basic anion exchange resin 3011 filling inside, whereby the acidified softened water that has come out of water softening tank 3003 is neutralized, and the softened water passes to the outside via channel 3009 as neutral softened water.

(Regeneration Device)

Regeneration device 3006 is a device for regenerating weakly acidic cation exchange resin 3010 of water softening tank 3003 and regenerating weakly basic anion exchange resin 3011 of neutralizing tank 3004. Specifically, as described above, regeneration device 3006 includes electrolyzer 3012, separation part 3014, water storage tank 3015, and water pump 3019. In regeneration device 3006, first supply channel 3021, first recovery channel 3022, second supply channel 3023, second recovery channel 3024, and channel 3029 are connected to channel 3007, channel 3008, and channel 3009 from inlet port 3002 to water take-out port 3005, respectively. Each of the channels constitutes circulation channel 3020 (first circulation channel 3020*a*, second circulation channel 3020*b*) or separation part washing channel 3027 described later.

First supply channel 3021 is a channel for supplying acidic electrolytic water from electrolyzer 3012 to water softening tank 3003. First recovery channel 3022 is a channel for recovering water containing a hardness component that has passed through water softening tank 3003 into water storage tank 3015. Second supply channel 3023 is a channel for supplying alkaline electrolytic water from electrolyzer 3012 to neutralizing tank 3004. Second recovery channel 3024 is a channel for recovering water that have passed through neutralizing tank 3004 into water storage tank 3015. Channel 3029 is a channel for supplying acidic softened water from water softening tank 3003 to separation part 3014.

(Electrolyzer)

Electrolyzer 3012 generates acidic electrolytic water and alkaline electrolytic water by electrolyzing water (water supplied from water storage tank 3015) that has entered using a pair of electrodes 3013 (electrode 3013*a* and electrode 3013*b*) provided inside, and discharges the generated water. More specifically, in electrode 3013*a* serving as an anode during electrolysis, hydrogen ions are generated by electrolysis, and acidic electrolytic water is generated. In electrode 3013*b* serving as a cathode during electrolysis, hydroxide ions are generated by electrolysis, and alkaline electrolytic water is generated. Then, electrolyzer 3012 supplies acidic electrolytic water to water softening tank 3003 via first supply channel 3021 and supplies alkaline electrolytic water to neutralizing tank 3004 via second supply channel 3023. Although details will be described later, the acidic electrolytic water generated by electrolyzer 3012 is used for regenerating weakly acidic cation exchange resin 3010 of water softening tank 3003, and the alkaline electrolytic water generated by electrolyzer 3012 is used for regenerating weakly basic anion exchange resin 3011 of neutralizing tank 3004. Electrolyzer 3012 is configured such that an energization state to the pair of electrodes 3013 can be controlled by controller 3017 described later.

(Water Storage Tank)

Water storage tank 3015 secures and stores water to be circulated in circulation channel 3020 (see FIG. 25) when weakly acidic cation exchange resin 3010 and weakly basic anion exchange resin 3011 are regenerated. In addition, water storage tank 3015 mixes acidic electrolytic water containing a hardness component that has flowed through water softening tank 3003 and alkaline electrolytic water containing anions that has flowed through neutralizing tank 3004 to generate mixture, and supplies the mixture to electrolyzer 3012.

Then, the water having flowed through water storage tank 3015 passes through electrolyzer 3012, is electrolyzed in electrolyzer 3012, becomes acidic electrolytic water and alkaline electrolytic water, and is supplied to water softening tank 3003 and neutralizing tank 3004, respectively. Then, the acidic electrolytic water and the alkaline electrolytic water are reused in water softening tank 3003 and neutralizing tank 3004, respectively, and thereafter pass (recovered)

into water storage tank 3015 again. Therefore, the acidic electrolytic water and the alkaline electrolytic water used for the regeneration of weakly acidic cation exchange resin 3010 and the regeneration of weakly basic anion exchange resin 3011 can be reused.

(Water Pump)

Water pump 3019 is a device for circulating water in circulation channel 3020 (see FIG. 25) during the regeneration treatment by regeneration device 3006. Water pump 3019 is provided in water delivery channel 3025 communicatively connecting water storage tank 3015 and electrolyzer 3012. Water pump 3019 is preferably disposed on the upstream side of electrolyzer 3012 and on the downstream side of water storage tank 3015. Such a disposition is adopted because one water pump 3019 can easily circulate water to first circulation channel 3020*a* and second circulation channel 3020*b*. Water pump 3019 is connected to controller 3017 described later so as to be able to communicate therewith in a wireless or wired manner.

(Separation Part)

Separation part 3014 is provided in second supply channel 3023 that communicatively connects electrolyzer 3012 and neutralizing tank 3004. Then, separation part 3014 separates a precipitate contained in the alkaline electrolytic water fed from electrolyzer 3012. Here, the precipitate is a reaction product generated when a hardness component, which is a cation released from water softening tank 3003 during the regeneration treatment of water softening tank 3003, reacts with alkaline electrolytic water in electrolyzer 3012. More specifically, while the electrolysis of water is being performed in electrolyzer 3012, the hardness component (for example, calcium ions and magnesium ions) released from water softening tank 3003 during the regeneration treatment moves to the cathode (electrode 3013*b*) side. Since alkaline electrolytic water is generated on the cathode side, the hardness component and the alkaline electrolytic water react with each other to form a precipitate. For example, when the hardness component is calcium ions, a reaction in which calcium carbonate is generated or calcium hydroxide is generated occurs by mixing the calcium ions with the alkaline electrolytic water. Then, the precipitate derived from the hardness component is separated as a precipitate by separation part 3014 provided on second supply channel 3023. By separating the precipitates derived from the hardness components by separation part 3014, the precipitates can be prevented from flowing into neutralizing tank 3004 and accumulating. Therefore, when the water softening treatment is resumed after the end of the regeneration treatment, the precipitate deposited in neutralizing tank 3004 reacts with hydrogen ions released from water softening tank 3003 to form a hardness component, and it is possible to suppress an increase in hardness of the softened water fed from neutralizing tank 3004. In addition, during the regeneration treatment, the alkaline electrolytic water from which the precipitate derived from the hardness component is separated by separation part 3014 flows through neutralizing tank 3004, is mixed with the acidic electrolytic water, and then electrolyzed again in electrolyzer 3012, and is provided for regeneration of weakly acidic cation exchange resin 3010 and regeneration of weakly basic anion exchange resin 3011 as the acidic electrolytic water and the alkaline electrolytic water, respectively. At this time, the hardness component contained in the acidic electrolytic water is reduced as compared with the city water or the case of the water treated by the device with which separation part 3014 is not provided. That is, since the hardness of the acidic electrolytic water is reduced by separating the precipitate by separation part 3014, the hardness component flowing into water softening tank 3003 can be reduced, and the reduction in the regeneration efficiency of weakly acidic cation exchange resin 3010 can be suppressed.

Note that "the hardness component reacts" includes not only a state in which all the hardness components react but also a state in which a component that does not react or a component that does not exceed the solubility product is contained.

The form of separation part 3014 is not limited as long as the precipitate generated by the reaction between the hardness component and the alkaline electrolytic water can be separated. For example, a form using a cartridge type filter, a filtration layer using a granular filter material, a cyclone type solid-liquid separator, a hollow fiber membrane, or the like can be mentioned.

As a means generally used as a form of separation part 3014, a cartridge type filter can be exemplified. As the cartridge type filter, a deep filtration type such as a yarn winding filter, a surface filtration type such as a pleated filter and a membrane filter, or a combination thereof can be used.

The yarn winding filter corresponds to a particle diameter of 1 to 150 micrometers, and is mainly used as a pre-filter. The pleated filter and the membrane filter have particle diameters as wide as about 0.03 to 100 micrometers, and it is preferable to use a pleated filter and a membrane filter with an accuracy of about 0.5 to 1.5 micrometers particularly in the implementation of the present disclosure in order to capture the hardness component precipitated in the regeneration treatment described later. Since alkaline electrolytic water flows in separation part 3014 in the regeneration treatment described later and acidic electrolytic water flows in the washing treatment, the material of the cartridge type filter is preferably a material (for example, polypropylene) having high corrosion resistance against acid and alkali.

The granular filter material used for the filtration layer is intended to capture and remove hardness components, but it is also possible to remove particles having a surface potential to be adsorbed to the granular filter material, particles having a particle diameter of about 1 μm to 10 μm or chromaticity depending on the existence state of ions and the like in raw water. As the granular filter material, a filter material suitable for an object to be removed, such as filtration sand, a pellet fiber filter material, or the like, can be used. The material of the granular filter material may be, for example, a material having hardness that is likely to settle in water and is less likely to be deformed by pressure, such as sand, anthracite, garnet, ceramics, granular activated carbon, iron oxyhydroxide, or manganese sand. The particle diameter may be, for example, 0.3 mm to 5.0 mm, having an equivalent coefficient of 1.2 to 2.0.

Multilayer filtration method in which a plurality of types of filter materials having different specific gravities are mixed and used is a method in which particles having different sizes are layered in order from smallest particles to largest from the bottom as a layer for filtration. In the multilayer filtration method, particles having a large specific gravity and a small size and particles having a small specific gravity and a large size are usually mixed to form a multilayer structure. The multilayer filtration method is preferable because there are advantages such as high filtration efficiency per unit volume and low head loss as compared with a case where a single kind of filter material is used. As a granular filter material, for example, 0.3 millimeters of garnet, 0.6 meters of sand, and 1.0 millimeters of anthracite are mixed at 2:1:1 and used, and it is preferable to adjust the mixing ratio or the particle diameter according to the particle characteristics of the turbidity.

(On-Off Valve and Selection Valve)

A plurality of on-off valves (on-off valve 3031, on-off valve 3032, on-off valve 3034 to on-off valve 3039, and on-off valve 3041) are provided in the respective channels, and switch between an "open" state and a "closed" state in the respective channels.

Selection valve 3040 is provided between separation part 3014 and neutralizing tank 3004. Selection valve 3040 is provided at a junction of second supply channel 3023 and drainage channel 3026, and determines a flowing direction of the acidic softened water and the alkaline electrolytic water having flowed through separation part 3014. Specifically, selection valve 3040 switches between a flowing state in which the alkaline electrolytic water having flowed through separation part 3014 in the regeneration treatment reaches neutralizing tank 3004 and a flowing state in which the water having flowed out of separation part 3014 in the drainage treatment and the separation part washing treatment reaches drainage port 3016.

In addition, each of the plurality of on-off valves (on-off valve 3031, on-off valve 3032, on-off valve 3034 to on-off valve 3039, and on-off valve 3041) and selection valve 3040 is connected to the controller described later so as to be able to communicate with controller 3017 in a wireless or wired manner.

(Drainage Port)

Drainage port 3016 discharges the acidic softened water having flowed through separation part 3014 to the outside of the device at the time of washing separation part 3014 to be described later (at the time of separation part washing treatment), and discharges the electrolytic water (acidic electrolytic water and alkaline electrolytic water) and the acidic softened water remaining in each channel to the outside of the device in water drainage treatment.

More specifically, in separation part washing treatment, drainage port 3016 discharges water that has flowed through channel 3007, water softening tank 3003, channel 3008, channel 3029, on-off valve 3041, separation part 3014, selection valve 3040, and drainage channel 3026, and containing a hardness component generated by dissolving a precipitate in separation part 3014 to the outside of the device.

In the drainage treatment, water (for example, acidic electrolytic water, alkaline electrolytic water, and acidic softened water) remaining in circulation channel 3020 and separation part washing channel 3027 is fed from electrolyzer 3012, and water (water such as alkaline electrolytic water remaining in the channel) flowing through second supply channel 3023 and drainage channel 3026 is discharged to the outside of the device from drainage port 3016.

(Controller)

Controller 3017 controls the regeneration treatment of weakly acidic cation exchange resin 3010 in water softening tank 3003 and weakly basic anion exchange resin 3011 in neutralizing tank 3004. In addition, controller 3017 controls separation part washing treatment of washing separation part 3014 with acidic softened water. In addition, controller 3017 controls a drainage treatment for discharging water remaining in each channel. In addition, controller 3017 controls a water softening treatment for softening raw water containing a hardness component. In addition, controller 3017 controls the operation of on-off valve 3041 to control the flowing direction and the flowing amount of the acidic softened water having flowed out of water softening tank 3003. In addition, controller 3017 controls the operation of selection valve 3040 to control the flowing direction of the water having flowed out of separation part 3014. Further, controller 3017 controls switching of water softening device 3001 among the regeneration treatment, the separation part washing treatment, the drainage treatment, and the water softening treatment. At this time, controller 3017 controls operations of electrode 3013, water pump 3019, a plurality of on-off valves (on-off valve 3031, on-off valve 3032, on-off valve 3034 to on-off valve 3039, and on-off valve 3041), and selection valve 3040, and switches the regeneration treatment, the separation part washing treatment, the drainage treatment, and the water softening treatment and executes each treatment.

(Channel)

Figure 25:
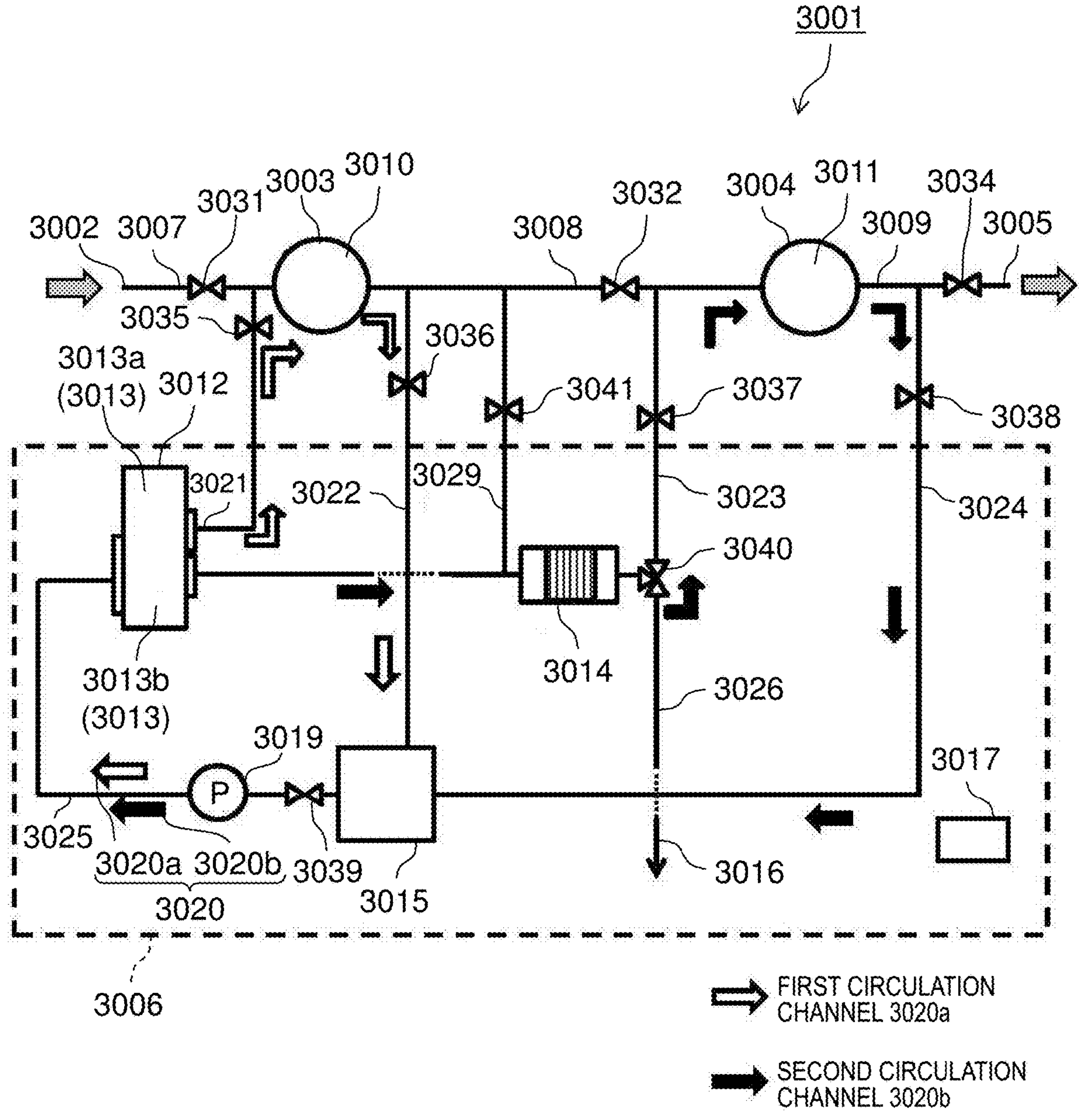
FIG. 25 is a configuration diagram illustrating a circulation channel of a water softening device according to the fourth exemplary embodiment-1.

Next, circulation channel 3020 formed during the regeneration treatment of water softening device 3001 will be described with reference to FIG. 25. FIG. 25 is a configuration diagram illustrating circulation channel 3020 of water softening device 3001.

Although the description overlaps, in water softening device 3001, electrolyzer 3012 and water storage tank 3015 included in regeneration device 3006 are communicably connected by water delivery channel 3025 as illustrated in FIG. 25. Electrolyzer 3012 and water storage tank 3015 are communicably connected to channel 3007, channel 3008, and channel 3009, which connect the path from inlet port 3002 to water take-out port 3005, by first supply channel 3021, first recovery channel 3022, and second supply channel 3023 and second recovery channel 3024, respectively. In regeneration device 3006, circulation channel 3020 is configured by a combination of the channels.

First supply channel 3021 is a channel for supplying acidic electrolytic water from electrolyzer 3012 to water softening tank 3003, and an on-off valve 3035 is installed in the channel That is, water softening device 3001 includes first supply channel 3021 that can draw out acidic electrolytic water from electrolyzer 3012 and supply the acidic electrolytic water to the upstream side of water softening tank 3003.

First recovery channel 3022 is a channel for recovering water containing a hardness component that has passed through water softening tank 3003 into water storage tank 3015, and on-off valve 3036 is installed in the channel That is, water softening device 3001 includes first recovery channel 3022 that enables the upstream side of water storage tank 3015 to be connected to the downstream side of water softening tank 3003.

Second supply channel 3023 is a channel for supplying alkaline electrolytic water from electrolyzer 3012 to neutralizing tank 3004 via separation part 3014 in the regeneration treatment to be described later, and separation part 3014, selection valve 3040, and on-off valve 3037 are installed in the channel. That is, water softening device 3001 includes second supply channel 3023 capable of separating the precipitate derived from the hardness component contained in the alkaline electrolytic water drawn out from electrolyzer 3012 by separation part 3014 and supplying the alkaline electrolytic water from which the precipitate has been separated to the upstream side of neutralizing tank 3004. Second supply channel 3023 is connected to channel 3008 on the downstream side of first recovery channel 3022. This is to suppress mixing of the acidic electrolytic water discharged from water softening tank 3003 and the alkaline electrolytic water fed from electrolyzer 3012 in the regeneration treatment to be described later. That is, channel 3008 is connected to first recovery channel 3022 and second supply channel 3023 in order from the upstream side.

Second recovery channel 3024 is a channel for recovering water having passed through neutralizing tank 3004 into water storage tank 3015, and on-off valve 3038 is installed in the channel. That is, water softening device 3001 includes second recovery channel 3024 that enables the upstream side of water storage tank 3015 to be connected to the downstream side of neutralizing tank 3004.

Circulation channel 3020 includes first circulation channel 3020*a* through which water fed from water storage tank 3015 by water pump 3019 flows through water softening tank 3003, and second circulation channel 3020*b* through which water fed from water storage tank 3015 by water pump 3019 flows through neutralizing tank 3004.

As illustrated in FIG. 25 (white arrows), first circulation channel 3020*a* is a channel in which water fed from water storage tank 3015 by water pump 3019 flows through electrolyzer 3012 and water softening tank 3003 and returns to water storage tank 3015 for circulation. More specifically, first circulation channel 3020*a* is a channel through which water fed from water storage tank 3015 by water pump 3019 circulates through water delivery channel 3025, electrolyzer 3012, first supply channel 3021, on-off valve 3035, water softening tank 3003, first recovery channel 3022, on-off valve 3036, and water storage tank 3015 in this order.

As illustrated in FIG. 25 (black arrows), second circulation channel 3020*b* is a channel in which water fed from water storage tank 3015 by water pump 3019 flows through electrolyzer 3012 and neutralizing tank 3004 and returns to water storage tank 3015 for circulation. More specifically, second circulation channel 3020*b* is a channel in which water fed from water storage tank 3015 by water pump 3019 flows and circulates through water delivery channel 3025, electrolyzer 3012, second supply channel 3023, separation part 3014, selection valve 3040, on-off valve 3037, neutralizing tank 3004, second recovery channel 3024, on-off valve 3038, and water storage tank 3015 in this order.

Here, to circulate water in circulation channel 3020, channel 3007 is provided with on-off valve 3031 on the downstream side of inlet port 3002. Closing on-off valve 3031 and opening on-off valve 3035 form a state in which first supply channel 3021 is communicably connected to the upstream side of water softening tank 3003. This allows water softening device to supply the acidic electrolytic water from electrolyzer 3012 to water softening tank 3003.

Channel 3008 is provided with on-off valve 3032 on the downstream side of channel 3029 and first recovery channel 3022 and on the upstream side of second supply channel 3023. Closing on-off valve 3032 and on-off valve 3041 provided in channel 3029 and opening on-off valve 3036 form a state in which first recovery channel 3022 is communicatively connected to the downstream side of water softening tank 3003. In water softening device 3001, the water (acidic electrolytic water containing a hardness component) that has flowed through water softening tank 3003 can be recovered into water storage tank 3015.

On-off valve 3032 and on-off valve 3041 are closed, on-off valve 3037 is opened, and the flowing direction of selection valve 3040 is switched to the direction of neutralizing tank 3004 (the direction in which the selection valve flows from separation part 3014 to neutralizing tank 3004), so that second supply channel 3023 is communicably connected to the upstream side of neutralizing tank 3004. In water softening device 3001, the alkaline electrolytic water from electrolyzer 3012 can be circulated to separation part 3014, and can be supplied to neutralizing tank 3004.

Channel 3009 is provided with on-off valve 3034 on the downstream side of neutralizing tank 3004. Closing on-off valve 3034 and opening on-off valve 3038 form a state in which second recovery channel 3024 is communicatively connected to the downstream side of neutralizing tank 3004. This allows the water (alkaline electrolytic water containing anions) that has passed through second recovery channel 3024 to be recovered into water storage tank 3015.

By closing on-off valve 3034, the circulation of water to circulation channel 3020 can start. On the other hand, by opening on-off valve 3034, the circulation of water to circulation channel 3020 can stop.

Water delivery channel 3025 is provided with on-off valve 3039 on the downstream side of water storage tank 3015 (position between water storage tank 3015 and water pump 3019). By closing on-off valve 3039, water can be stored in water storage tank 3015. On the other hand, by opening on-off valve 3039, water can be supplied to water delivery channel 3025.

In second supply channel 3023, selection valve 3040 is installed between separation part 3014 and neutralizing tank 3004. By switching selection valve 3040, it is possible to bring about a channel state in which the alkaline electrolytic water generated by electrolysis in electrode 3013*b* flows through second supply channel 3023 and separation part 3014 to reach neutralizing tank 3004 and a channel state in which the water having flowed through separation part 3014 is discharged to the outside of the device by drainage port 3016 via drainage channel 3026 to be described later. In the channel state in which the water having flowed through separation part 3014 is discharged to the outside of the device by drainage port 3016, acidic softened water used for washing separation part 3014 in the separation part washing treatment, or electrolytic water remaining in circulation channel 3020 and acidic softened water remaining in separation part washing channel 3027 in the drainage treatment are discharged.

Figure 26:
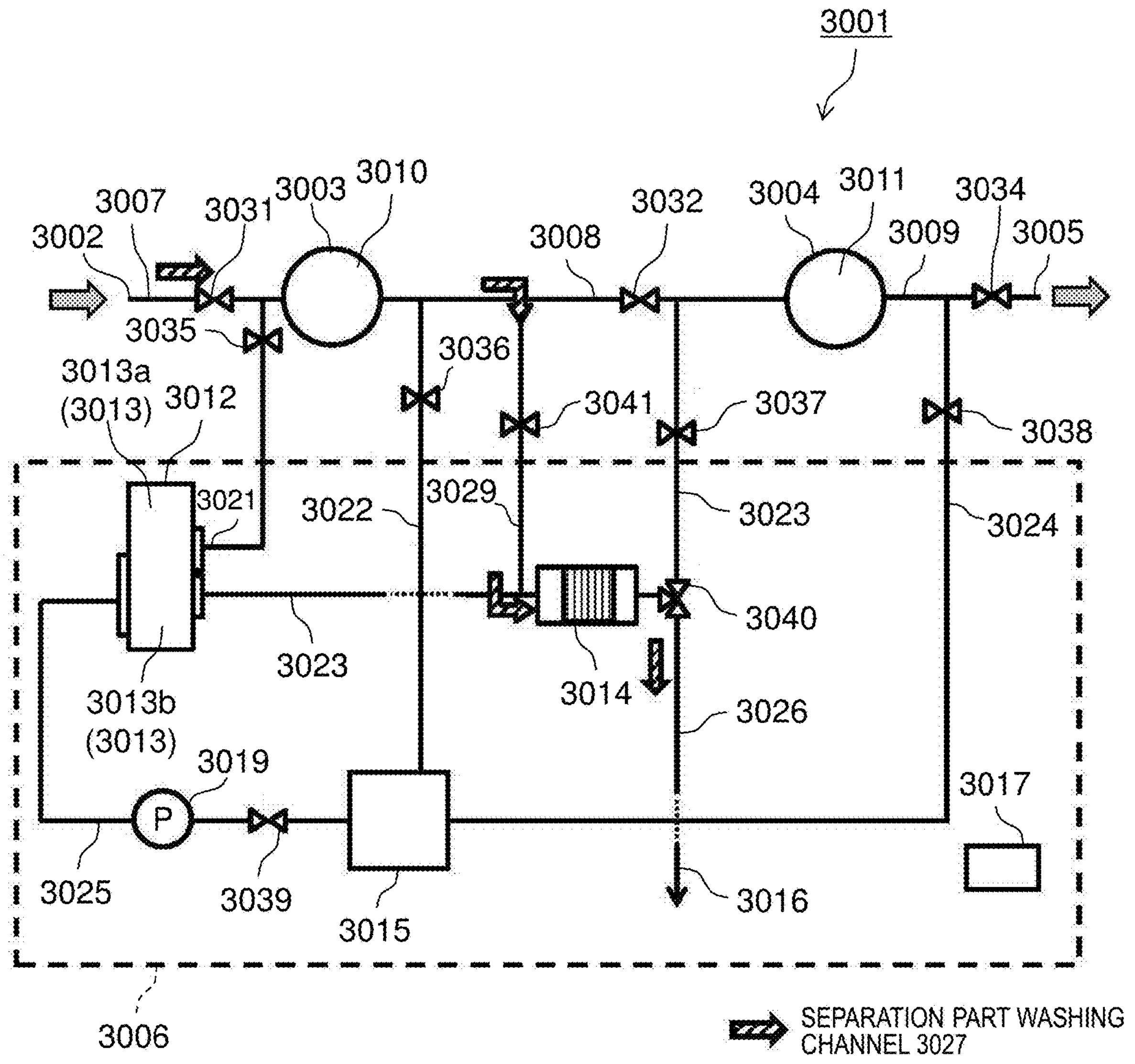
FIG. 26 is a configuration diagram illustrating a separation part washing channel of a water softening device according to the fourth exemplary embodiment-1.

Next, separation part washing channel 3027 formed at the time of the separation part washing treatment of water softening device 3001 will be described with reference to FIG. 26. FIG. 26 is a configuration diagram illustrating separation part washing channel 3027 of water softening device 3001.

As illustrated in FIG. 26, separation part washing channel 3027 is configured by channels connecting inlet port 3002, water softening tank 3003, separation part 3014, and drainage port 3016. Water softening tank 3003 is communicably connected to inlet port to separation part 3014 by channel 3008, channel 3029, and second supply channel 3023. Separation part 3014 is communicably connected to drainage port 3016 by second supply channel 3023 and drainage channel 3026 to be described later. Selection valve 3040 is provided at a connection portion between second supply channel 3023 and drainage channel 3026.

Channel 3029 is a channel for supplying the acidic softened water from water softening tank 3003 to separation part 3014. Channel 3029 is communicably connected to channel 3008 between water softening tank 3003 and second supply channel 3023. Channel 3029 is communicably connected to second supply channel 3023 between electrolyzer 3012 and separation part 3014. Channel 3029 is provided with on-off valve 3041. That is, water softening device 3001 includes channel 3029 for supplying the acidic softened water softened by water softening tank 3003 to separation part 3014 and supplying the acidic softened water to the separation part washing treatment.

Drainage channel 3026 is a channel for discharging water from selection valve 3040 to drainage port 3016. Drainage channel 3026 is communicatively connected to second supply channel 3023 between separation part 3014 and neutralizing tank 3004. Selection valve 3040 is provided in drainage channel 3026. That is, water softening device 3001 includes drainage channel 3026 that allows water to be drawn out from selection valve 3040 to drainage port 3016 and discharged to the outside of the device.

As illustrated in FIG. 26 (hatched arrow), separation part washing channel 3027 is a channel in which water introduced from inlet port 3002 flows through channel 3007 and water softening tank 3003 in this order, is made acidic softened water in water softening tank 3003, then flows through channel 3008, channel 3029, second supply channel 3023, and separation part 3014 in this order, is subjected to a separation part washing treatment, flows through selection valve 3040 and drainage channel 3026, and is discharged from drainage port 3016 to the outside of the device.

(Water Softening Treatment, Regeneration Treatment, Separation Part Washing Treatment, and Drainage Treatment)

Figure 28:
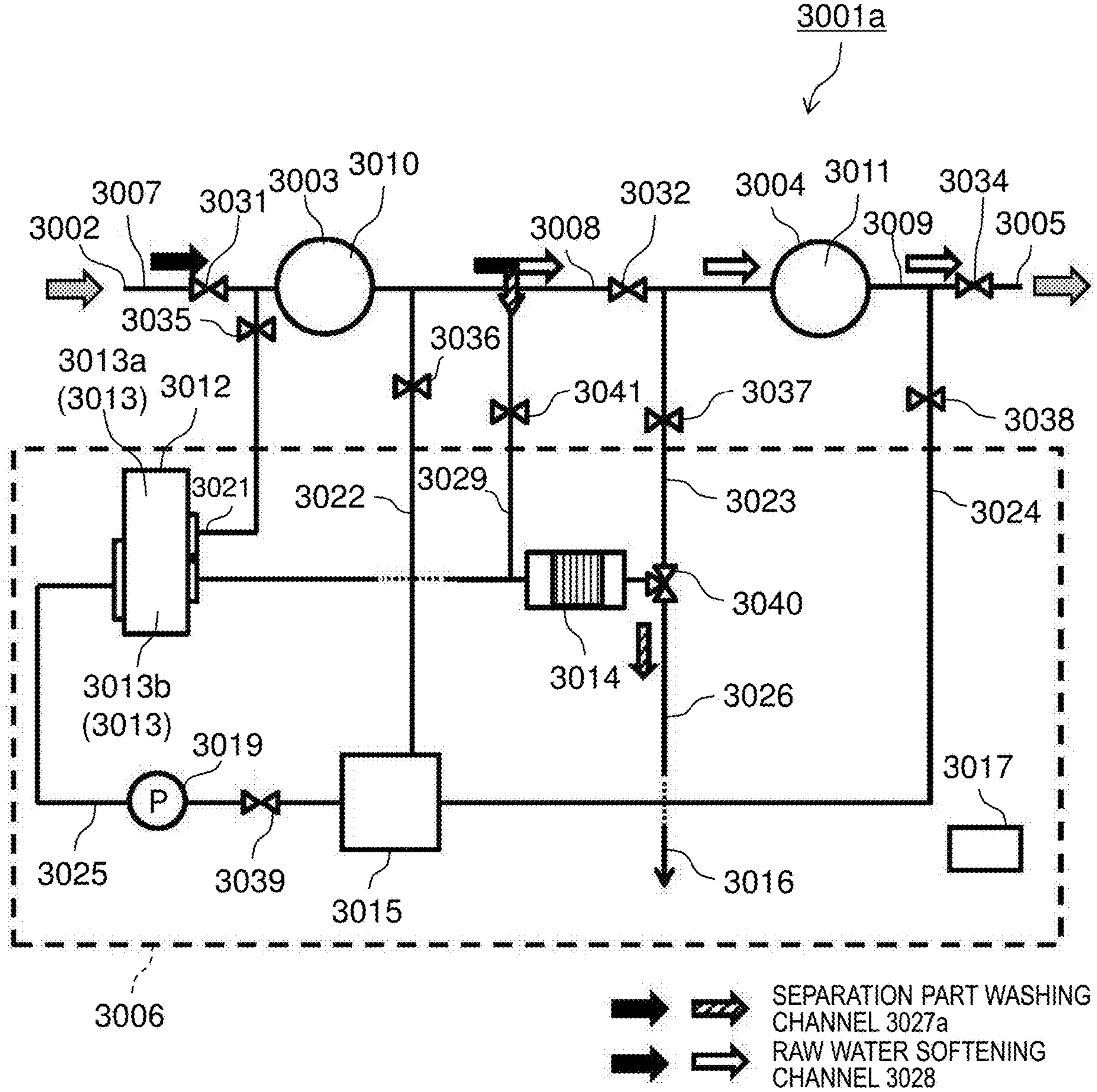
FIG. 28 is a configuration diagram illustrating a channel in a case where the water softening treatment and the separation part washing treatment are performed in parallel in the water softening device according to a fourth exemplary embodiment-2.

Next, with reference to FIG. 27, the regeneration treatment, the separation part washing treatment, the drainage treatment, and the water softening treatment of water softening device 3001 starting from the regeneration treatment will be described. FIG. 28 is a diagram illustrating a state of water softening device 3001 in operation.

In the regeneration treatment, the separation part washing treatment, the water drainage treatment, and the water softening treatment, as illustrated in FIG. 27, controller 3017 switches on-off valve 3031, on-off valve 3032, on-off valve 3034 to on-off valve 3039, selection valve 3040, on-off valve 3041, electrode 3013 of electrolyzer 3012, and water pump 3019 to control the respective flowing states. Controller 3017 includes, for example, a computer system including a processor and a memory. Then, with the processor executing a program stored in the memory, the computer system functions as the controller. Here, the program executed by the processor is recorded in advance in the memory of the computer system, but may be provided by being recorded in a non-transitory recording medium such as a memory card, or may be provided through a telecommunication line such as the Internet.

Here, "ON" in FIG. 27 individually indicates a state in which the corresponding on-off valve is "open", a state in which electrode 3013 is energized, or a state in which water pump 3019 is operating. Blanks indicate a state in which the corresponding on-off valve is "closed", a state in which electrode 3013 is not energized, or a state in which water pump 3019 is stopped. The notation of selection valve 3040 in FIG. 27 indicates a state in which the channel is opened to the component (neutralizing tank 3004 or drainage port 3016) corresponding to the numeral (symbol). Selection valve 3040 at the normal time is in a state where the channel is opened to neutralizing tank 3004, but is left blank when it is not related to other treatments.

(Regeneration Treatment)

Next, an operation during the regeneration treatment by regeneration device 3006 of water softening device 3001 will be described sequentially with reference to the columns of "IN WATER INJECTION" and "IN REGENERATION" in FIG. 27.

In water softening device 3001, when water softening tank 3003 filled with weakly acidic cation exchange resin 3010 is continuously used, the cation exchange capacity decreases or disappears. That is, ion exchange cannot be performed after all the hydrogen ions, which are functional groups of the cation exchange resin, are exchanged for calcium ions or magnesium ions, which are hardness components. In such a state, the hardness component is contained in the treatment water. Therefore, in water softening device 3001, it is necessary to perform regeneration treatment of water softening tank 3003 and neutralizing tank 3004 by regeneration device 3006.

Therefore, in water softening device 3001, controller 3017 specifies a time zone in which the regeneration treatment can be performed once in a predetermined period (for example, one day (24 hours)) and executes the regeneration treatment.

First, as illustrated in FIG. 27, in water injection, on-off valve 3031 and on-off valve 3036 are opened. This causes water softening device 3001 to introduce the raw water into water storage tank 3015 from inlet port 3002 through water softening tank 3003 by the pressure of city water. At this time, on-off valve 3032, on-off valve 3034, on-off valve 3035, on-off valve 3037, on-off valve 3039, and on-off valve 3041 are closed. In addition, selection valve 3040 connects the channel in a direction in which the water having flowed through separation part 3014 flows through neutralizing tank 3004. By storing a predetermined amount of water corresponding to the capacity of water softening device 3001 in water storage tank 3015, regeneration device 3006 can secure an amount of water at the time of regeneration.

Next, in regeneration, when on-off valve 3031, on-off valve 3032, on-off valve 3034, and on-off valve 3041 are closed, on-off valve 3035 to on-off valve 3039 are opened, and the water flowing direction of selection valve 3040 is set to the direction of neutralizing tank 3004 (the direction flowing from separation part 3014 to neutralizing tank 3004), first circulation channel 3020*a* and second circulation channel 3020*b* are formed, respectively, as illustrated in FIG. 25.

When electrode 3013 of electrolyzer 3012 and water pump 3019 operate, the water stored in water storage tank 3015 circulates through each of first circulation channel 3020*a* and second circulation channel 3020*b*.

At this time, the acidic electrolytic water generated in electrolyzer 3012 is supplied into water softening tank 3003 through first supply channel 3021, and flows through weakly acidic cation exchange resin 3010 inside water softening tank 3003. That is, flowing of the acidic electrolytic water through weakly acidic cation exchange resin 3010 causes cations (hardness component) adsorbed to weakly acidic cation exchange resin 3010 to undergo an ion exchange reaction with hydrogen ions contained in the acidic electrolytic water. This allows weakly acidic cation exchange resin 3010 to regenerate. Thereafter, the acidic electrolytic water that has flowed through weakly acidic cation exchange resin 3010 contains cations and flows into first recovery channel 3022. That is, the acidic electrolytic water containing cations that has flowed through weakly acidic cation exchange resin 3010 is recovered into water storage tank 3015 via first recovery channel 3022.

On the other hand, the alkaline electrolytic water generated in electrolyzer 3012 is supplied into neutralizing tank 3004 through second supply channel 3023 and separation part 3014, and flows through weakly basic anion exchange resin 3011 inside neutralizing tank 3004. That is, flowing of the alkaline electrolytic water through weakly basic anion exchange resin 3011 causes anions adsorbed to weakly basic anion exchange resin 3011 to undergo an ion exchange reaction with hydroxide ions contained in the alkaline electrolytic water. This allows weakly basic anion exchange resin 3011 to regenerate. Thereafter, the alkaline electrolytic water that has flowed through weakly basic anion exchange resin 3011 contains anions and flows into second recovery channel 3024. That is, the alkaline electrolytic water containing anions that has flowed through weakly basic anion exchange resin 3011 is recovered into water storage tank 3015 via second recovery channel 3024.

Then, in water storage tank 3015, the acidic electrolytic water containing cations recovered from water softening tank 3003 and the alkaline electrolytic water containing anions recovered from neutralizing tank 3004 are mixed and neutralized.

At this time, by mixing acidic electrolytic water containing cations (hardness components) and alkaline electrolytic water containing anions, the hardness components react with hydroxide ions contained in the alkaline electrolytic water, and a precipitate is generated. However, at least in the initial stage of the regeneration treatment, the amount of hydroxide ions contained in the alkaline electrolytic water flowing from the neutralizing tank 3004 is smaller than the amount of hardness components released from the water softening tank 3003, so that the precipitate is less likely to be generated. Therefore, the hardness components contained in the neutralized electrolytic water are fed to electrolyzer 3012 as they are.

Thereafter, the electrolytic water mixed in water storage tank 3015 passes through electrolyzer 3012 again via water delivery channel 3025. Then, the passed water is electrolyzed again in electrolyzer 3012.

As described above, water is electrolyzed in electrolyzer 3012, and a large amount of hydroxide ions are generated by electrolysis near the cathode, so that a precipitate is likely to be generated. That is, the hardness component (for example, calcium ions and magnesium ions) contained in the water supplied from water storage tank 3015 moves to the cathode side and reacts with hydroxide ions to become a precipitate. Then, the alkaline electrolytic water containing the precipitate is fed to second supply channel 3023 and flows into separation part 3014.

In separation part 3014, the precipitate contained in the alkaline electrolytic water is separated, and the alkaline electrolytic water (treated water) from which the hardness component has been removed can be obtained. Then, the acidic electrolytic water electrolyzed again in electrolyzer 3012 and the alkaline electrolytic water electrolyzed again in electrolyzer 3012 and separated from the precipitate by separation part 3014 are provided for the regeneration of weakly acidic cation exchange resin 3010 and the regeneration of weakly basic anion exchange resin 3011, respectively.

Here, as a problem occurring in the neutralizing tank of the conventional water softening device, there has been a case where a precipitate generated by a reaction between the hardness component released from the water softening tank and the alkaline electrolytic water in the electrolyzer in the regeneration treatment flows into the neutralizing tank and is deposited in the neutralizing tank. That is, when the water softening treatment is resumed in a state where the precipitate is deposited in the neutralizing tank, the precipitate reacts with hydrogen ions released from the water softening tank to form a hardness component, so that the water softening performance is deteriorated. However, in the present exemplary embodiment, by separating the precipitate generated in electrolyzer 3012 by separation part 3014, it is possible to suppress the deposition of the precipitate caused by the hardness component in neutralizing tank 3004.

Thereafter, in water softening device 3001, the operation of electrode 3013 is stopped when the regeneration treatment is completed. Then, on-off valve 3035 to on-off valve 3039 are closed, and on-off valve 3031 and on-off valve 3041 are opened. Further, the water flowing direction of selection valve 3040 is switched from the direction of neutralizing tank 3004 (direction flowing from separation part 3014 to neutralizing tank 3004) to the direction of drainage port 3016 (direction flowing from separation part 3014 to drainage port 3016). Accordingly, the process proceeds from the regeneration treatment to the separation part washing treatment.

(Separation Part Washing Treatment)

When the regeneration treatment is completed, water softening device 3001 proceeds to the separation part washing treatment. Here, the separation part washing treatment is a treatment for washing separation part 3014, and is a treatment for causing the acidic softened water generated in water softening tank 3003 to flow through separation part 3014 to dissolve the precipitate caused by the hardness component separated in separation part 3014.

Next, an operation at the time of washing treatment by water softening device 3001 will be described with reference to a column of "IN WASHING OF SEPARATION PART" in FIG. 27.

As illustrated in FIG. 27, in water softening device 3001, in the separation part washing treatment, on-off valve 3031 and on-off valve 3041 are opened, and selection valve 3040 is switched so as to be in a channel state where water passes from separation part 3014 to drainage channel 3026. As a result, in water softening device 3001, separation part washing channel 3027 is formed, and separation part 3014 can be washed. At this time, on-off valve 3032 and on-off valve 3034 to on-off valve 3039 are closed.

Specifically, as illustrated in FIG. 26, in the separation part washing treatment, raw water to be supplied is supplied from inlet port 3002 to water softening tank 3003 through channel 3007 by the pressure of city water. The raw water supplied to water softening tank 3003 flows through weakly acidic cation exchange resin 3010 provided in water softening tank 3003. At this time, cations as the hardness component in the raw water are adsorbed by the action of weakly acidic cation exchange resin 3010, and hydrogen ions are released (ion exchange is performed). Then, cations are removed from the raw water, whereby the raw water is softened. At this time, the water having flowed out of water softening tank 3003 becomes acidic due to the release of hydrogen ions. That is, the raw water flowing into water softening tank 3003 is fed from water softening tank 3003 as acidic softened water.

Next, since on-off valve 3041 is opened and on-off valve 3032 and on-off valve 3036 are closed, the acidic softened water fed from water softening tank 3003 flows through channel 3008, channel 3029, and second supply channel 3023, and flows into separation part 3014. By allowing the acidic softened water to flow into separation part 3014, the precipitate resulting from the hardness component trapped in separation part 3014 reacts with the acidic softened water. As a result, the precipitate caused by the hardness component is dissolved and becomes a hardness component, and is contained in the acidic softened water.

Since the water flowing direction of selection valve 3040 is set to the direction of drainage port 3016 (the direction flowing from separation part 3014 to drainage port 3016), the acidic softened water having flowed through separation part 3014 flows through drainage channel 3026 and is discharged from drainage port 3016 to the outside of the device. That is, by circulating the acidic softened water through separation part 3014 and discharging the circulated acidic softened water, separation part 3014 can be washed, and the hardness component can be discharged to the outside of the device. As a result, the precipitate captured by separation part 3014 can be dissolved and removed, and separation part 3014 can be washed, so that a decrease in the quantity of water flow due to clogging of separation part 3014 can be reduced.

Then, in water softening device 3001, when the separation part washing treatment is completed, on-off valve 3031 and on-off valve 3041 are closed, on-off valve 3035 to on-off valve 3039 are opened, and water pump 3019 is started, so that the process proceeds to the water drainage treatment.

Note that the end of the separation part washing treatment is when a certain time (for example, one hour) has elapsed from the start of the separation part washing treatment. Here, the certain period of time is a period of time set based on an evaluation result in a washing experiment performed in advance as a period of time required to dissolve the precipitate captured by separation part 3014.

(Drainage Treatment)

In water softening device 3001, when the separation part washing treatment is completed, the process proceeds to the drainage treatment. Here, the drainage treatment is a treatment of discharging the raw water, the acidic electrolytic water, the alkaline electrolytic water, and the acidic softened water remaining in circulation channel 3020.

Next, the operation at the time of drainage treatment by water softening device 3001 will be described with reference to the column of "IN DRAINING" in FIG. 27.

As illustrated in FIG. 27, in water softening device 3001, on-off valve 3031, on-off valve 3032, on-off valve 3034, and on-off valve 3041 are closed and on-off valve 3035 to on-off valve 39 are opened in the drainage treatment (in draining). The water flowing direction of selection valve 3040 is set to a direction of drainage port 3016 (a direction flowing from separation part 3014 to drainage port 3016). As a result, the inflow of the city water from inlet port 3002 is stopped, and the acidic electrolytic water remaining in the path from electrolyzer 3012 to water storage tank 3015 via first supply channel 3021, water softening tank 3003, and first recovery channel 3022 and the alkaline electrolytic water remaining in the path from separation part 3014 to water storage tank 3015 via second supply channel 3023, neutralizing tank 3004, and second recovery channel 3024 can be caused to flow into water storage tank 3015.

Next, water pump 3019 is started, on-off valve 3039 is opened, and the flowing direction of selection valve 3040 is switched to the direction of drainage port 3016. As a result, it is possible to discharge the electrolytic water remaining in the path from the inside of water storage tank 3015 to electrolyzer 3012 via water delivery channel 3025, the electrolytic water remaining in the path from the inside of electrolyzer 3012 to drainage port 3016 via second supply channel 3023 and drainage channel 3026, and the acidic softened water remaining in separation part washing channel 3027 to the outside of the device. At this time, the operation of electrode 3013 is stopped.

Then, in water softening device 3001, when the drainage treatment is completed, the operation of water pump 3019 is stopped. In addition, on-off valve 3035 to on-off valve 3039 are closed, on-off valve 3031, on-off valve 3032, and on-off valve 3034 are opened, and the water flowing direction of selection valve 3040 is set to the direction of neutralizing tank 3004 (the direction flowing from separation part 3014 to neutralizing tank 3004), thereby shifting to the water softening treatment.

Note that the end of the drainage treatment is when a certain time (for example, one minute) has elapsed from the start of the drainage treatment.

(Water Softening Treatment)

Water softening device 3001 proceeds to the water softening treatment when the drainage treatment is completed.

An operation at the time of water softening treatment by water softening device 3001 will be described with reference to the column "IN WATER SOFTENING" in FIG. 27.

As illustrated in FIG. 27, water softening device 3001 opens on-off valve 3034 provided in water take-out port 3005 in a state where on-off valve 3031 and on-off valve 3032 are open in the water softening treatment. Therefore, the water softening device 3001 causes city water (raw water containing a hardness component) to flow through water softening tank 3003 and neutralizing tank 3004 from the outside, and therefore allows the softened water (neutral softened water) to be taken out from water take-out port 3005.

Specifically, in the water softening treatment, raw water to be supplied is supplied from inlet port 3002 to water softening tank 3003 through channel 3007 by the pressure of city water. The raw water supplied to water softening tank 3003 flows through weakly acidic cation exchange resin 3010 provided in water softening tank 3003. At this time, cations as the hardness component in the raw water are adsorbed by the action of weakly acidic cation exchange resin 3010, and hydrogen ions are released (ion exchange is performed). Then, cations are removed from the raw water, whereby the raw water is softened. The softened water further passes through channel 3008 and proceeds to neutralizing tank 3004. In neutralizing tank 3004, hydrogen ions contained in the softened water are adsorbed by the action of weakly basic anion exchange resin 3011. That is, because hydrogen ions are removed from the softened water after the treatment, the lowered pH increases, and neutral water softened as domestic water can be taken out from water take-out port 3005 through channel 3009. At this time, all of on-off valve 3035 to on-off valve 3039 are closed. Electrode 3013 of electrolyzer 3012 and water pump 3019 are also stopped.

Then, water softening device 3001 stops the water softening treatment when the time zone specified by controller 3017 is reached or when the water softening treatment exceeds a certain period of time, and executes the above-described regeneration treatment.

As described above, in water softening device 3001, the regeneration treatment, the separation part washing treatment, the drainage treatment, and the water softening treatment are repeatedly executed. Then, water softening device 3001 supplies city water (raw water containing hardness components) as neutral softened water that can be used as domestic water.

According to water softening device 3001 of the present fourth exemplary embodiment-1 described above, the following effects can be obtained.

(1) Water softening device 3001 includes water softening tank 3003, neutralizing tank 3004, electrolyzer 3012, and separation part 3014. In the water softening tank 3003, raw water containing a hardness component and chloride ions is softened by a weakly acidic cation exchange resin 3010. The neutralizing tank 3004 neutralizes the pH of the softened water that has passed through the water softening tank 3003 by weakly basic anion exchange resin 3011. Electrolyzer 3012 produces acidic electrolytic water for regenerating weakly acidic cation exchange resin 3010 in water softening tank 3003 and alkaline electrolytic water for regenerating weakly basic anion exchange resin 3011 in neutralizing tank 3004. Separation part 3014 is provided in a channel communicating electrolyzer 3012 and neutralizing tank 3004, and separates a precipitate caused by a hardness component contained in water introduced into electrolyzer 3012. Then, water softening device 3001 performs a separation part washing treatment of flowing the acidic softened water having flowed through water softening tank 3003 to separation part 3014 and then discharging the acidic softened water to the outside of the device.

As a result, the precipitate separated by separation part 3014 can be dissolved using the acidic softened water softened by water softening tank 3003, and separation part 3014 can be washed. Therefore, the water softening device 3001 can reliably wash the separation part 3014 and can be used for a long period of time.

(2) In water softening device 3001, the end of the separation part washing treatment is set to a certain period after the start of the separation part washing treatment. Accordingly, it is possible to end the washing treatment of separation part 3014 in a certain period of time. Therefore, insufficient washing of separation part 3014 or excessive use of acidic softened water can be suppressed.

Fourth Exemplary Embodiment-2

Next, water softening device 3001*a* according to the fourth exemplary embodiment-2 of the present disclosure will be described with reference to FIG. 28. FIG. 28 is a configuration diagram illustrating a channel in a case where the water softening treatment and the separation part washing treatment are performed in parallel in water softening device 3001*a* according to the fourth exemplary embodiment-2.

Water softening device 3001*a* according to the fourth exemplary embodiment-2 is different from the fourth exemplary embodiment-1 in that the separation part washing treatment and the water softening treatment can be performed in parallel. Other configurations of water softening device 3001*a* are the same as those of water softening device 3001 according to the fourth exemplary embodiment-1. In the following, description of the contents already described in the fourth exemplary embodiment-1 will be omitted as appropriate, and differences from the fourth exemplary embodiment-1 will be mainly described.

As illustrated in FIG. 28, water softening device 3001*a* is configured to perform a separation part washing treatment by separation part washing channel 3027*a* and a water softening treatment by raw water softening channel 3028 in parallel. More specifically, in water softening device 3001*a*, the drainage treatment is performed after the completion of the regeneration treatment, and then the separation part washing treatment is performed during the period in which the water softening treatment is performed.

(Channel and On-Off Valve)

As illustrated in FIG. 28, separation part washing channel 3027*a* is configured by channels connecting inlet port 3002, water softening tank 3003, separation part 3014, and drainage port 3016. Water softening tank 3003 is communicably connected to inlet port to separation part 3014 by channel 3008, channel 3029, and second supply channel 3023. Separation part 3014 is communicably connected to drainage port 3016 by second supply channel 3023 and drainage channel 3026. Selection valve 3040 is provided at a connection portion between second supply channel 3023 and drainage channel 3026. Channel 3029 is provided with on-off valve 3041*a*.

As illustrated in FIG. 28 (hatched arrow), separation part washing channel 3027*a* is a channel in which water introduced from inlet port 3002 flows through channel 3007 and water softening tank 3003 in this order, is made acidic softened water in water softening tank 3003, then flows through channel 3008, channel 3029, second supply channel 3023, and separation part 3014 in this order, is subjected to a separation part washing treatment, flows through selection valve 3040 and drainage channel 3026, and is discharged from drainage port 3016 to the outside of the device.

On-off valve 3041*a* is provided in channel 3029, and switches between an "open" state and a "closed" state in channel 3029. On-off valve 3041*a* is capable of not only switching between "open" and "close" but also adjusting the degree of opening to the channel By adjusting the opening degree of on-off valve 3041*a*, the flow rate of the acidic softened water to be supplied to channel 3029 can be adjusted according to the state of the separation part washing treatment.

As illustrated in FIG. 28, raw water softening channel 3028 is configured by channels connecting inlet port 3002, water softening tank 3003, neutralizing tank 3004, and water take-out port 3005. Water softening tank 3003 is communicably connected to inlet port 3002 by channel 3007. Water softening tank 3003 is communicably connected to neutralizing tank 3004 by channel 3008.

Neutralizing tank 3004 is communicatively connected to water take-out port 3005 by channel 3009.

Raw water softening channel 3028 is a channel that makes externally introduced city water (raw water containing hardness components) available as neutral softened water by the water softening treatment. More specifically, as illustrated in FIG. 28 (black arrow and white arrow), the channel is a channel in which water introduced from inlet port 3002 flows through channel 3007 and water softening tank 3003 in this order, is made acidic softened water in water softening tank 3003, then flows into neutralizing tank 3004, is neutralized, and flows out of water take-out port 3005 to the outside.

(Regeneration Treatment, Drainage Treatment, Separation Part Washing Treatment, and Water Softening Treatment)

In water softening device 3001*a*, the operation of electrode 3013 is stopped when the regeneration treatment is completed. Further, by switching the water flowing direction of selection valve 3040 from the direction of neutralizing tank 3004 (the direction flowing from separation part 3014 to neutralizing tank 3004) to the direction of drainage port 3016 (the direction flowing from separation part 3014 to drainage port 3016), the process proceeds to the drainage treatment.

In addition, in water softening device 3001*a*, when the drainage treatment is completed, the operation of water pump 3019 is stopped. Further, on-off valve 3035 to on-off valve 3039 are closed, on-off valve 3031, on-off valve 3032, on-off valve 3034, and on-off valve 3041*a* are opened, and the water flowing direction of selection valve 3040 is set to the direction of drainage port 3016 (the direction flowing from separation part 3014 to drainage port 3016), whereby the process proceeds to the water softening treatment (and the separation part washing treatment).

Water softening device 3001*a* opens on-off valve 3034 provided in water take-out port 3005 in a state where on-off valve 3031 and on-off valve 3032 are open in the water softening treatment. As a result, as illustrated in FIG. 28, in water softening device 3001, raw water softening channel 3028 is formed, and city water (raw water containing hardness components) flows through water softening tank 3003 and neutralizing tank 3004 from the outside, so that softened water (neutral softened water) can be taken out from water take-out port 3005.

Here, on-off valve 3041*a* provided in channel 3029 is opened to a predetermined degree of opening. This is because a part (for example, 20%) of the acidic softened water having flowed out of water softening tank 3003 can be supplied to separation part 3014. As a result, separation part washing channel 3027*a* is formed. At this time, the remaining acidic softened water (for example, 80%) that is not fed to separation part washing channel 3027*a* is fed to neutralizing tank 3004. With such a configuration, the water softening treatment and the separation part washing treatment can be performed in parallel. More specifically, it is possible to perform the drainage treatment after completion of the regeneration treatment, and then perform the separation part washing treatment during a period in which the water softening treatment is performed. At this time, all of on-off valve 3035 to on-off valve 3039 are closed. Electrode 3013 of electrolyzer 3012 and water pump 3019 are also stopped. Water softening device 3001*a* is configured to simultaneously start the separation part washing treatment and the water softening treatment.

Then, in water softening device 3001*a*, when the separation part washing treatment is completed, on-off valve 3041*a* is closed. Thus, the acidic softened water fed from water softening tank 3003 can be subjected to the water softening treatment without being used for the separation part washing treatment. At this time, the water flowing direction of selection valve 3040 is set to the direction of neutralizing tank 3004 (the direction flowing from separation part 3014 to neutralizing tank 3004).

Note that the end of the separation part washing treatment is when a certain time (for example, one hour) has elapsed from the start of the separation part washing treatment. Here, the certain period of time is a period of time set based on an evaluation result in a washing experiment performed in advance as a period of time required to dissolve the precipitate captured by separation part 3014.

Then, water softening device 3001*a* stops the water softening treatment when the time zone specified by controller 3017 is reached or when the water softening treatment exceeds a certain period of time, and executes the regeneration treatment.

As described above, in water softening device 3001*a*, the regeneration treatment, the drainage treatment, the separation part washing treatment, and the water softening treatment are repeatedly executed. Then, water softening device 3001*a* supplies city water (raw water containing hardness components) as neutral softened water that can be used as domestic water.

As described above, according to water softening device 3001*a* of the present fourth exemplary embodiment-2, the following effects can be obtained in addition to the effects (1) and (2) obtained by the fourth exemplary embodiment-1.

(3) Water softening device 3001 caused a part of the acidic softened water having flowed through water softening tank 3003 to flow to separation part 3014 during a period in which the water softening treatment of the raw water by water softening tank 3003 and neutralizing tank 3004 is performed. Accordingly, the washing treatment of separation part 3014 can be performed in parallel with the water softening treatment. Therefore, the water softening treatment can be executed for a long time as compared with the case where the water softening treatment is performed after the separation part washing treatment.

(4) Water softening device 3001 is configured to stop the supply of the acidic softened water to separation part 3014 when the separation part washing treatment is completed. As a result, it is possible to suppress the supply of the acidic softened water exceeding the amount necessary for the separation part washing treatment to separation part 3014. Therefore, the separation part washing treatment can be completed without excessively using the acidic softened water.

Fourth Exemplary Embodiment-3

Figure 29:
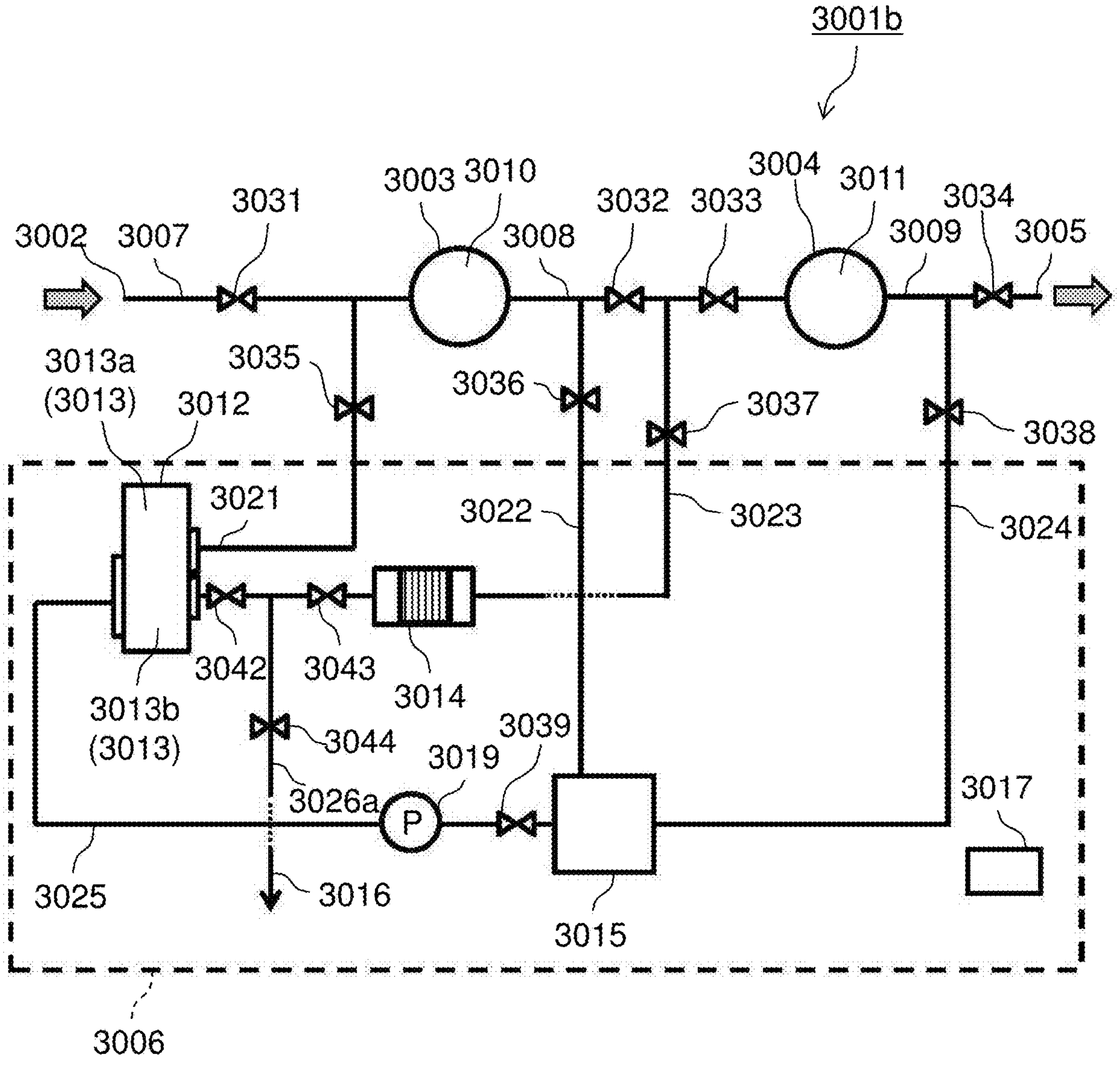
FIG. 29 is a conceptual diagram illustrating a configuration of a water softening device according to a fourth exemplary embodiment-3.
Figure 30:
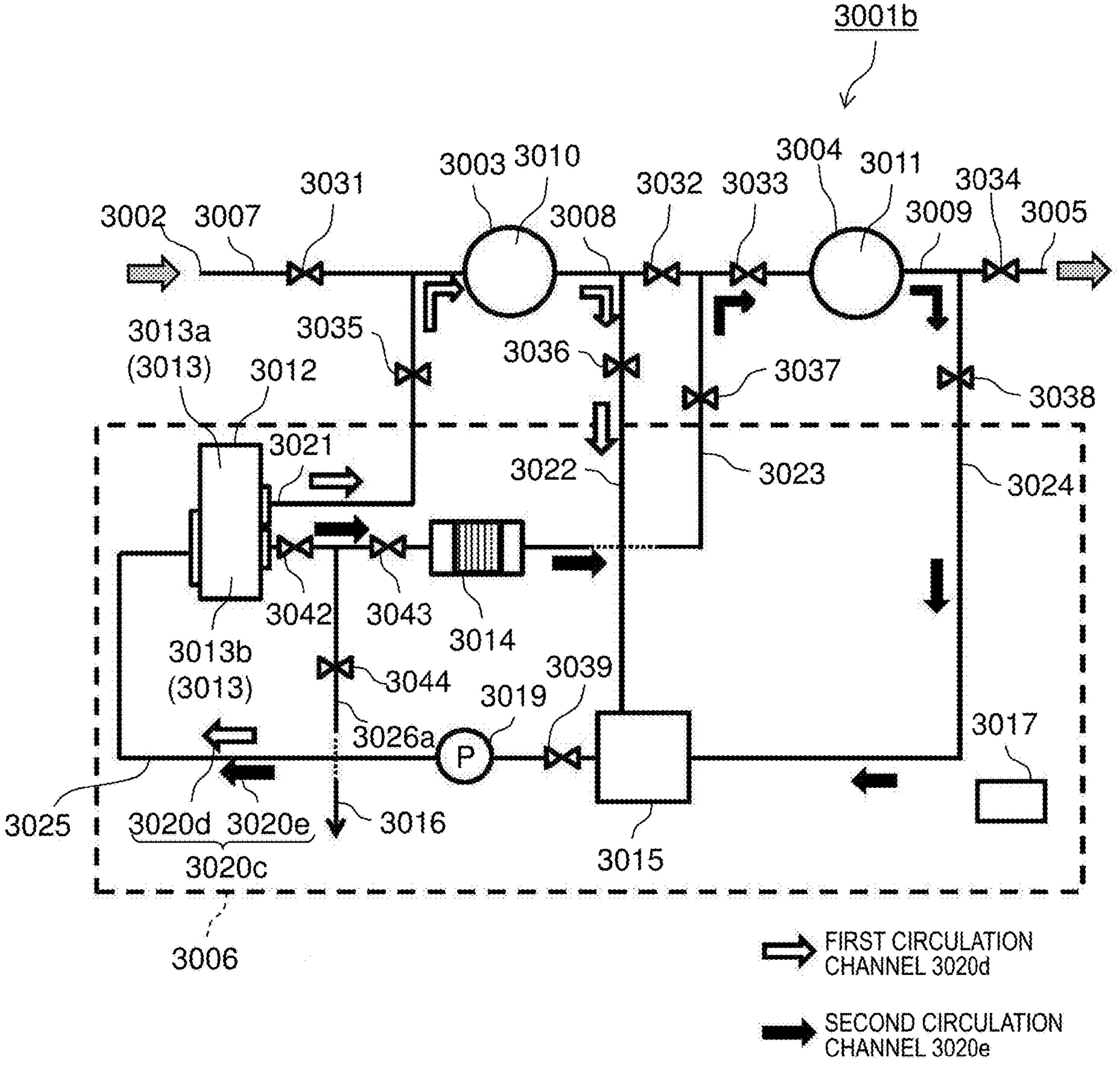
FIG. 30 is a configuration diagram illustrating a circulation channel of the water softening device according to the fourth exemplary embodiment-3.
Figure 31:
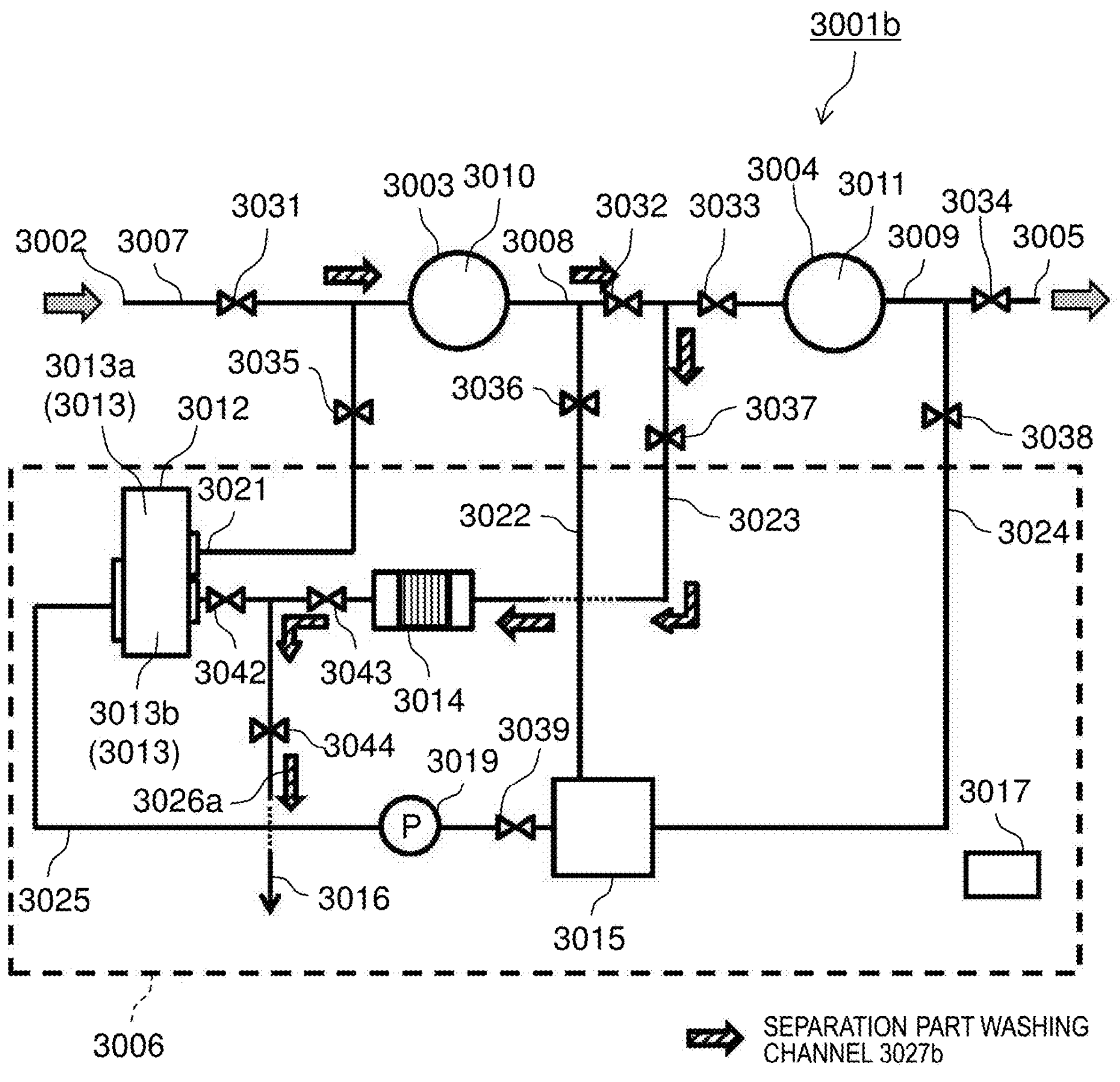
FIG. 31 is a configuration diagram illustrating the separation part washing channel of the water softening device according to the fourth exemplary embodiment-3.

Next, water softening device 3001*b* according to the fourth exemplary embodiment-3 of the present disclosure will be described with reference to FIGS. 29 to 32. FIG. 29 is a conceptual diagram illustrating a configuration of water softening device 3001*b* according to the fourth exemplary embodiment-3 of the present disclosure. FIG. 30 is a configuration diagram illustrating circulation channel 3020*c* of water softening device 3001*b* according to the fourth exemplary embodiment-3. FIG. 31 is a configuration diagram illustrating separation part washing channel 3027*b* of water softening device 3001*b* according to the fourth exemplary embodiment-3. FIG. 32 is a diagram illustrating a state during operation of water softening device 3001*b* according to the fourth exemplary embodiment-3.

Water softening device 3001*b* according to the fourth exemplary embodiment-3 is different from the fourth exemplary embodiment-1 in that backwashing of separation part 3014 is performed in washing of the separation part. Other configurations of water softening device 3001*b* are the same as those of water softening device 3001 according to the fourth exemplary embodiment-1. In the following, description of the contents already described in the fourth exemplary embodiment-1 will be omitted as appropriate, and differences from the fourth exemplary embodiment-1 will be mainly described.

(Channel and On-Off Valve)

As illustrated in FIG. 29, water softening device 3001*b* includes a plurality of on-off valves (on-off valve 3031 to on-off valve 3039 and on-off valve 3042 to on-off valve 3044). A plurality of on-off valves (on-off valve 3031 to on-off valve 3039 and on-off valve 3042 to on-off valve 3044) are provided in the respective channels, and switch between an "open" state and a "closed" state in the respective channels. Further, water softening device 3001*b* does not include a channel corresponding to channel 3029 of the fourth exemplary embodiment-1. Water softening device 3001*b* is configured to supply acidic softened water to separation part 3014 by second supply channel 3023 instead of channel 3029.

Second supply channel 3023 is a channel that communicatively connects electrolyzer 3012 and channel 3008, and the channel is provided with on-off valve 3042, on-off valve 3043, separation part 3014, and on-off valve 3037. Second supply channel 3023 is communicably connected to drainage channel 3026*a* between on-off valve 3042 and on-off valve 3043.

On-off valve 3042 is provided between a connection point between second supply channel 3023 and drainage channel 3026*a* and between electrolyzer 3012. On-off valve 3043 is provided between a connection point between second supply channel 3023 and drainage channel 3026*a* and separation part 3014. On-off valve 3037 is provided between a connection point between second supply channel 3023 and channel 3008 and separation parts 3014. That is, the alkaline electrolytic water fed from electrolyzer 3012 in the regeneration treatment flows through second supply channel 3023 through on-off valve 3042, on-off valve 3043, separation part 3014, and on-off valve 3037 in this order, and flows into channel 3008.

As illustrated in FIG. 30, circulation channel 3020*c* includes first circulation channel 3020*d* through which water fed from water storage tank 3015 by water pump 3019 flows in water softening tank 3003, and second circulation channel 3020*e* through which water fed from water storage tank 3015 by water pump 3019 flows in neutralizing tank 3004.

As illustrated in FIG. 30 (white arrows), first circulation channel 3020*d* is a channel in which water fed from water storage tank 3015 by water pump 3019 flows through electrolyzer 3012 and water softening tank 3003 and returns to water storage tank 3015 for circulation. More specifically, first circulation channel 3020*d* is a channel through which water fed from water storage tank 3015 by water pump 3019 circulates through water delivery channel 3025, electrolyzer 3012, first supply channel 3021, on-off valve 3035, water softening tank 3003, first recovery channel 3022, on-off valve 3036, and water storage tank 3015 in this order.

As illustrated in FIG. 30 (black arrows), second circulation channel 3020*e* is a channel in which water fed from water storage tank 3015 by water pump 3019 flows through electrolyzer 3012 and neutralizing tank 3004 and returns to water storage tank 3015 for circulation. More specifically, second circulation channel 3020*e* is a channel in which water fed from water storage tank 3015 by water pump 3019 flows and circulates through water delivery channel 3025, electrolyzer 3012, second supply channel 3023, on-off valve 3042, on-off valve 3043, separation part 3014, on-off valve 3037, on-off valve 3033, neutralizing tank 3004, second recovery channel 3024, on-off valve 3038, and water storage tank 3015 in this order. That is, in water softening device 3001*b*, the upstream side of separation part 3014 is communicably connected to the downstream side of electrolyzer 3012 in the regeneration treatment for forming second circulation channel 3020*e*.

Water softening device 3001*b* includes drainage channel 3026*a*. Drainage channel 3026*a* is a channel for supplying water discharged from electrolyzer 3012 or separation part 3014 to drainage port 3016 and discharging the water to the outside of the device. Drainage channel 3026*a* is communicably connected to second supply channel 3023 between electrolyzer 3012 and separation part 3014. Drainage channel 3026*a* is provided with on-off valve 3044. By opening on-off valve 3044, drainage channel 3026*a* is communicably connected to second supply channel 3023. That is, water softening device 3001*b* includes drainage channel 3026*a* that allows water to be drawn out from second supply channel 3023 to drainage port 3016 and discharged to the outside of the device.

As illustrated in FIG. 31, separation part washing channel 3027*b* is configured by channels connecting inlet port 3002, water softening tank 3003, separation part 3014, and drainage port 3016. That is, water softening tank 3003 is communicably connected to inlet port 3002 by channel 3007. In addition, water softening tank 3003 is communicably connected to separation part 3014 by channel 3008 and second supply channel 3023. Separation part 3014 is communicably connected to drainage port 3016 by second supply channel 3023 and drainage channel 3026*a*. Second supply channel 3023 is provided with separation part 3014, on-off valve 3037, on-off valve 3042, and on-off valve 3043. As illustrated in FIG. 31 (hatched arrow), separation part washing channel 3027*b* is a channel in which water introduced from inlet port 3002 flows through channel 3007 and water softening tank 3003 in this order, is made acidic softened water in water softening tank 3003, then flows through channel 3008, second supply channel 3023, and separation part 3014 in this order, is subjected to a separation part washing treatment, on-off valve 3043 and drainage channel 3026, and is discharged from drainage port 3016 to the outside of the device. That is, in water softening device 3001*b*, separation part 3014 is configured such that the acidic softened water flows into separation part 3014 from the downstream side of separation part 3014 and backwashing is performed in the separation part washing treatment.

(Regeneration Treatment, Separation Part Washing Treatment, Drainage Treatment, and Water Softening Treatment)

(Regeneration Treatment)

Next, an operation during the regeneration treatment by regeneration device 3006 of water softening device 3001*b* will be described sequentially with reference to the columns of "IN WATER INJECTION" and "IN REGENERATION" in FIG. 32.

First, as illustrated in FIG. 32, in water injection, on-off valve 3031 and on-off valve 3036 are opened. This causes water softening device 3001 to introduce the raw water into water storage tank 3015 from inlet port 3002 through water softening tank 3003 by the pressure of city water. At this time, on-off valve 3032 to on-off valve 3035, on-off valve 3037 to on-off valve 3039, and on-off valve 3042 to on-off valve 3044 are closed. By storing a predetermined amount of water corresponding to the capacity of water softening device 3001 in water storage tank 3015, regeneration device 3006 can secure an amount of water at the time of regeneration.

Next, in regeneration, when on-off valve 3031, on-off valve 3032, on-off valve 3034, and on-off valve 3044 are closed, and on-off valve 3033, on-off valve 3035 to on-off valve 3039, on-off valve 3042, and on-off valve 3043 are opened, first circulation channel 3020*d* and second circulation channel 3020*e* are formed.

When electrode 3013 of electrolyzer 3012 and water pump 3019 are operated, the water stored in water storage tank 3015 is fed to electrolyzer 3012, becomes acidic electrolytic water and alkaline electrolytic water by electrolysis, and circulates through each of first circulation channel 3020*d* and second circulation channel 3020*e*.

At this time, the acidic electrolytic water generated in electrolyzer 3012 is supplied into water softening tank 3003 through first supply channel 3021, and flows through weakly acidic cation exchange resin 3010 inside to regenerate weakly acidic cation exchange resin 3010. Then, the acidic electrolytic water containing cations that has flowed through weakly acidic cation exchange resin 3010 is recovered into water storage tank 3015 via first recovery channel 3022.

On the other hand, the alkaline electrolytic water generated in electrolyzer 3012 is supplied into neutralizing tank 3004 through second supply channel 3023 and separation part 3014, and flows through weakly basic anion exchange resin 3011 inside, whereby weakly basic anion exchange resin 3011 is regenerated. Then, the alkaline electrolytic water containing anions that has flowed through weakly basic anion exchange resin 3011 is recovered into water storage tank 3015 via second recovery channel 3024.

Then, in water storage tank 3015, the acidic electrolytic water containing cations recovered from water softening tank 3003 and the alkaline electrolytic water containing anions recovered from neutralizing tank 3004 are mixed and neutralized, and fed to electrolyzer 3012.

Thereafter, the electrolytic water mixed in water storage tank 3015 passes through electrolyzer 3012 again via water delivery channel 3025. Then, the passed water is electrolyzed again in electrolyzer 3012.

Then, in water softening device 3001*b*, the operation of electrode 3013 is stopped when the regeneration treatment is completed. In addition, on-off valve 3033, on-off valve 3035 to on-off valve 3039, and on-off valve 3042 are closed, and on-off valve 3031, on-off valve 3032, and on-off valve 3044 are opened, so that the process proceeds to the separation part washing treatment.

(Separation Part Washing Treatment)

When the regeneration treatment is completed, water softening device 3001*b* proceeds to the separation part washing treatment.

Next, the operation of water softening device 3001*b* at the time of separation part washing treatment will be described with reference to the column of "IN WASHING OF SEPARATION PART" in FIG. 32.

As illustrated in FIG. 32, in water softening device 3001*b*, on-off valve 3031, on-off valve 3032, on-off valve 3037, on-off valve 3043, and on-off valve 3044 are opened in the separation part washing treatment. As a result, in water softening device 3001, separation part washing channel 3027*b* is formed, and separation part 3014 can be washed. At this time, on-off valve 3033 to on-off valve 3039 and on-off valve 3042 are closed.

As illustrated in FIG. 31, since on-off valve 3032 and on-off valve 3037 are opened and on-off valve 3033 and on-off valve 3036 are closed, the acidic softened water fed from water softening tank 3003 flows through channel 3008 and second supply channel 3023 and flows into separation part 3014. By allowing the acidic softened water to flow into separation part 3014, the precipitate resulting from the hardness component trapped in separation part 3014 reacts with the acidic softened water. As a result, the precipitate caused by the hardness component is dissolved and becomes a hardness component, and is contained in the acidic softened water.

Since on-off valve 3043 and on-off valve 3044 are opened and on-off valve 3042 is closed, the acidic softened water fed from separation part 3014 flows through second supply channel 3023 and drainage channel 3026*a*, and is discharged to the outside of the device by drainage port 3016.

Then, in water softening device 3001*b*, when the separation part washing treatment is completed, on-off valve 3031 and on-off valve 3032 are closed, on-off valve 3033 and on-off valve 3035 to on-off valve 3044 are opened, and water pump 3019 is started, so that the process proceeds to the water drainage treatment.

Note that the end of the separation part washing treatment is when a certain time (for example, one hour) has elapsed from the start of the separation part washing treatment. Here, the certain period of time is a period of time set based on an evaluation result in a washing experiment performed in advance as a period of time required to dissolve the precipitate captured by separation part 3014.

(Drainage Treatment)

In water softening device 3001*b*, when the separation part washing treatment is completed, the process proceeds to the drainage treatment. Here, the drainage treatment is a treatment of discharging the raw water, the acidic electrolytic water, and the alkaline electrolytic water remaining in circulation channel 3020*c*.

Next, an operation at the time of drainage treatment by water softening device 3001*b* will be described with reference to the column of "IN DRAINING" in FIG. 32.

As illustrated in FIG. 32, in water softening device 3001*b*, on-off valve 3031, on-off valve 3032, and on-off valve 3034 are closed, and on-off valve 3033, on-off valve 3035 to 39, and on-off valve 3042 to on-off valve 3044 are opened in the drainage treatment (in draining). As a result, the inflow of the city water from inlet port 3002 is stopped, and the acidic electrolytic water remaining in the path from electrolyzer 3012 to water storage tank 3015 via first supply channel 3021, water softening tank 3003, and first recovery channel 3022 and the alkaline electrolytic water remaining in the path from separation part 3014 to water storage tank 3015 via second supply channel 3023, neutralizing tank 3004, and second recovery channel 3024 can be caused to flow into water storage tank 3015.

Next, in the drainage treatment, water pump 3019 is operated, on-off valve 3039, on-off valve 3042, and on-off valve 3044 are opened, and the operation of electrode 3013 is stopped. With such a configuration, it is possible to discharge the electrolytic water remaining in the path from the inside of water storage tank 3015 to electrolyzer 3012 via water delivery channel 3025 and the electrolytic water remaining in the path from the inside of electrolyzer 3012 to drainage port 3016 via second supply channel 3023 and drainage channel 3026 to the outside of the device.

Then, in water softening device 3001*b*, when the drainage treatment is completed, the operation of water pump 3019 is stopped. In addition, on-off valve 3035 to on-off valve 3039 and on-off valve 3042 to on-off valve 3044 are closed, and on-off valve 3031 to on-off valve 3034 are opened to proceed to the water softening treatment.

Note that the end of the drainage treatment is when a certain time (for example, one minute) has elapsed from the start of the drainage treatment.

(Water Softening Treatment)

Water softening device 3001*b* proceeds to the water softening treatment when the drainage treatment is completed.

An operation at the time of water softening treatment by water softening device 3001*b* will be described with reference to the column "IN WATER SOFTENING" in FIG. 32.

As illustrated in FIG. 32, water softening device 3001*b* opens on-off valve 3034 provided in water take-out port 3005 in a state where on-off valve 3031 to on-off valve 3033 are open in the water softening treatment. Therefore, the water softening device 3001 causes city water (raw water containing a hardness component) to flow through water softening tank 3003 and neutralizing tank 3004 from the outside, and therefore allows the softened water (neutral softened water) to be taken out from water take-out port 3005. At this time, all of on-off valve 3035 to on-off valve 3039 and on-off valve 3042 to on-off valve 3044 are in a closed state. Electrode 3013 of electrolyzer 3012 and water pump 3019 are also stopped.

Then, water softening device 3001*b* stops the water softening treatment when the time zone specified by controller 3017 is reached or when the water softening treatment exceeds a certain period of time, and executes the regeneration treatment.

As described above, in water softening device 3001*b*, the regeneration treatment, the separation part washing treatment, the drainage treatment, and the water softening treatment are repeatedly executed.

As described above, according to water softening device 3001*b* of the present fourth exemplary embodiment-3, the following effects can be obtained in addition to the effects (1) and (2) obtained by the fourth exemplary embodiment-1.

(5) In water softening device 3001*b*, separation part 3014 is configured such that the upstream side is communicably connected to the downstream side of electrolyzer 3012, and the acidic softened water flows into separation part 3014 from the downstream side of separation part 3014 in the separation part washing treatment. As a result, the acidic softened water flows in from the downstream side of separation part 3014. Since the electrolytic water containing the precipitate caused by the hardness component flows into separation part 3014 from the upstream side of separation part 3014, backwashing of separation part 3014 can be performed by flowing the acidic softened water from the downstream side. Therefore, the treatment efficiency of the separation part washing treatment can be improved, and the separation part washing treatment can be ended in a shorter period of time.

Fourth Exemplary Embodiment-4

Figure 33:
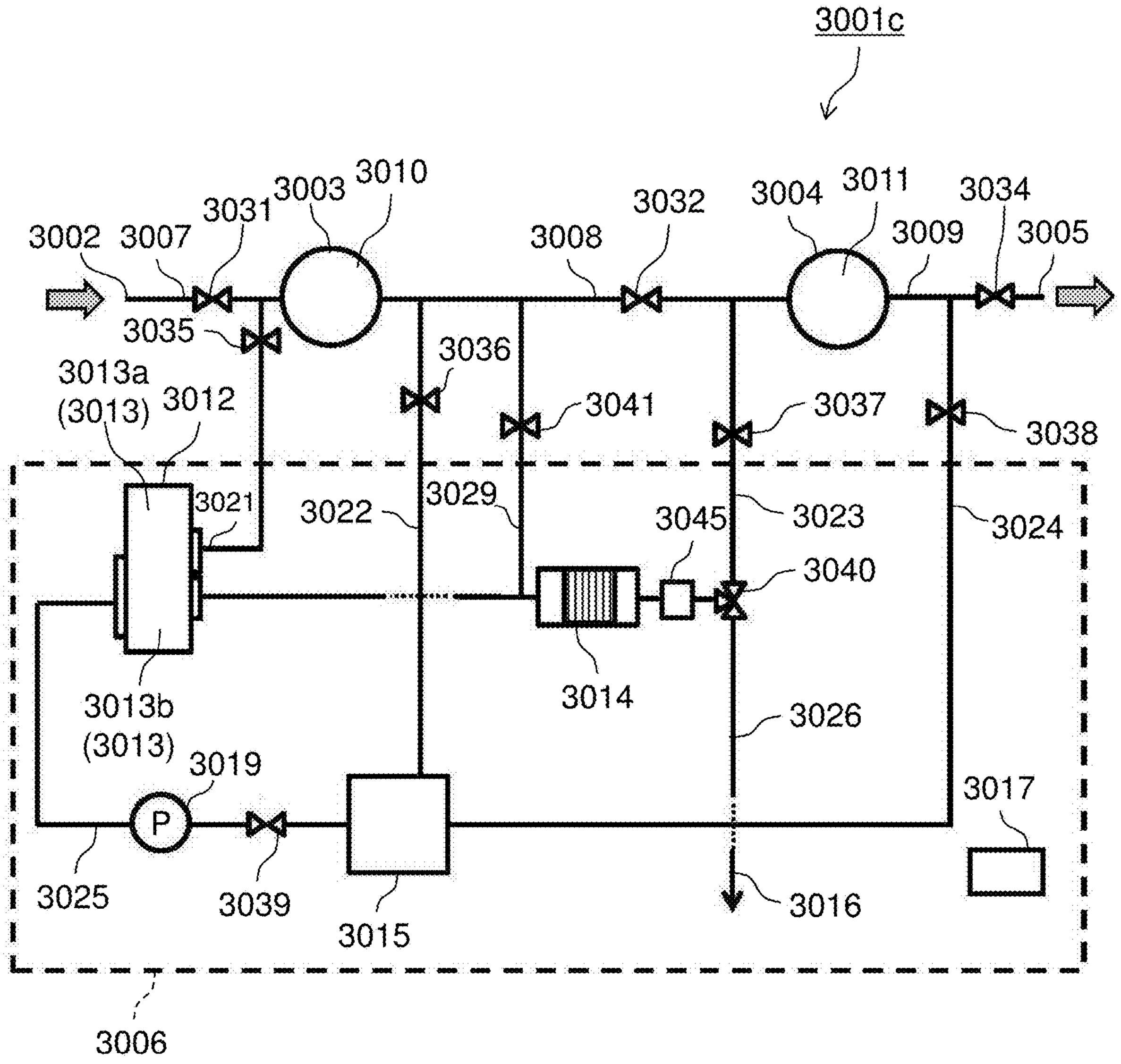
FIG. 33 is a conceptual diagram illustrating a configuration of a water softening device according to a fourth exemplary embodiment-4.

Next, water softening device 3001*c* according to the fourth exemplary embodiment-4 of the present disclosure will be described with reference to FIG. 33. FIG. 33 is a conceptual diagram illustrating a configuration of water softening device 3001*c* according to the fourth exemplary embodiment-4.

Water softening device 3001*c* according to the fourth exemplary embodiment-4 is different from the fourth exemplary embodiment-1 in that ion concentration detector 3045 is provided at the subsequent stage of separation part 3014 and the preceding stage of selection valve 3040. That is, in water softening device 3001*c* according to the fourth exemplary embodiment-4, when the ion concentration becomes less than the reference value based on the information regarding the ion concentration of the acidic softened water after flowing through separation part 3014, control is performed so as to end the separation part washing treatment. Other configurations of water softening device 3001*c* are the same as those of water softening device 3001 according to the fourth exemplary embodiment-1. In the following, description of the contents already described in the fourth exemplary embodiment-1 will be omitted as appropriate, and differences from the fourth exemplary embodiment-1 will be mainly described.

As illustrated in FIG. 33, water softening device 3001*c* includes an ion concentration detector 3045 at the subsequent stage of separation part 3014 and the preceding stage of selection valve 3040 on second supply channel 3023.

Ion concentration detector 3045 detects ion concentration information regarding the ion concentration (for example, the hardness component concentration) of the water having flowed out of separation part 3014 in the separation part washing treatment. Ion concentration detector 3045 is connected to controller 3017 so as to be able to communicate with the controller in a wireless or wired manner, and information regarding the detected ion concentration is used as an input signal of controller 3017.

Here, a general-purpose ion concentration detector can be used as ion concentration detector 3045, and examples thereof include a detector for measuring the electrical conductivity of a liquid or a detector for measuring the amount of total dissolved solid (TDS) contained in water.

In a case where the ion concentration specified based on the information regarding the ion concentration output from ion concentration detector 3045 is less than the reference value, controller 3017 performs control so as to end the separation part washing treatment. On the other hand, when the ion concentration is equal to or larger than the reference value, controller 3017 performs control to continue the separation part washing treatment. As a result, controller 3017 can determine the end of the separation part washing treatment based on the ion concentration contained in the acidic softened water after flowing through separation part 3014. Therefore, the acidic softened water can be circulated through separation part 3014 until the ion concentration contained in the acidic softened water after flowing through separation part 3014 becomes less than the reference value.

Here, the ion concentration specified based on the information regarding the ion concentration output from ion concentration detector 3045 is an ion concentration of a difference between the ion concentration contained in the acidic softened water after flowing through separation part 3014 and the ion concentration contained in the acidic softened water after flowing through separation part 3014 in the separation part washing treatment in a state where there is no precipitate in separation part 3014. The reference value is defined such that the ion concentration of the difference falls within a predetermined range.

As described above, according to water softening device 3001*c* of the present fourth exemplary embodiment-4, the following effects can be obtained in addition to the effects (1) and (2) obtained by the fourth exemplary embodiment-1.

(6) Water softening device 3001*c* further includes ion concentration detector 3045 that detects ion concentration information regarding the ion concentration of water having flowed out of separation part 3014, and is configured such that the separation part washing treatment is finished based on the ion concentration information. Therefore, the washing state of separation part 3014 during the separation part washing treatment can be grasped, and the end of the separation part washing treatment can be determined based on the ion concentration information. Therefore, the washing of separation part 3014 can be completed more reliably.

The present disclosure has been described above based on the exemplary embodiments. It will be understood by those skilled in the art that the exemplary embodiments are merely examples; further, in modifications of the exemplary embodiments, components or processes of the exemplary embodiments are variously combined, and additionally, the modifications fall within the scope of the present disclosure.

In addition, water softening device 3001 according to the present fourth exemplary embodiment-1 is configured to repeatedly execute the regeneration treatment, the separation part washing treatment, the drainage treatment, and the water softening treatment in this order, but the present disclosure is not limited thereto. For example, the regeneration treatment, the drainage treatment, and the water softening treatment may be repeatedly executed in this order, and the separation part washing treatment may be performed by specifying a timing at which separation part 3014 needs to be washed by detecting the ion concentration. In addition, the regeneration treatment, the drainage treatment, and the water softening treatment may be repeatedly executed in this order, and the separation part washing treatment may be performed once in a certain period (for example, one day). In addition, controller 3017 may specify a time during which the water softening treatment is not performed, and perform control such that the separation part washing treatment is performed while the water softening treatment is not performed. In this way, the frequency of performing the separation part washing treatment can be reduced. Therefore, the time from the end of the water softening treatment to the start of the next water softening treatment can be shortened.

In addition, in water softening device 3001*a* according to the present fourth exemplary embodiment-2, after the end of the drainage treatment, the water softening treatment and the separation part washing treatment are performed in parallel, and after a lapse of a certain period of time, the separation part washing treatment is ended, and the water softening treatment is continued, but the present disclosure is not limited thereto. For example, the water softening treatment may be performed after the end of the drainage treatment, and the water softening treatment and the separation part washing treatment may be performed in parallel after the lapse of a certain period of time. Further, the water softening treatment may be performed after the end of the drainage treatment, and the water softening treatment and the separation part washing treatment may be performed in parallel after a certain period of time, and then the process may proceed to the water softening treatment again. In this way, separation part 3014 can be washed at a predetermined timing. Therefore, it is possible to wash separation part 3014 while obtaining a necessary amount of softened water from water take-out port 3005.

In addition, in water softening device 3001 according to the present fourth exemplary embodiment-1, the regeneration treatment is executed when the time zone specified by controller 3017 is reached or when the water softening treatment exceeds a certain period of time, but the present disclosure is not limited thereto. For example, an ion concentration detector different from ion concentration detector 3045 may be provided on the downstream side of neutralizing tank 3004 and the upstream side of on-off valve 3034, the ion concentration detector may constantly detect the ion concentration (for example, the hardness component concentration) of the softened water flowing through channel 3009, and the regeneration treatment may be executed when the ion concentration exceeds a preset reference value. Thus, the execution of the regeneration treatment can be determined based on the ion concentration of water after flowing through neutralizing tank 3004. Therefore, when the regeneration treatment is required, weakly acidic cation exchange resin 3010 and weakly basic anion exchange resin 3011 can be regenerated.

Fifth Exemplary Embodiment

Hereinafter, a water softening device according to a fifth exemplary embodiment of the present disclosure and a method for regenerating the water softening device will be described with reference to the drawings. Note that dimensional ratios in the drawings are exaggerated for convenience of description, and may be different from actual ratios.

<Water Softening Device>

Figure 44:
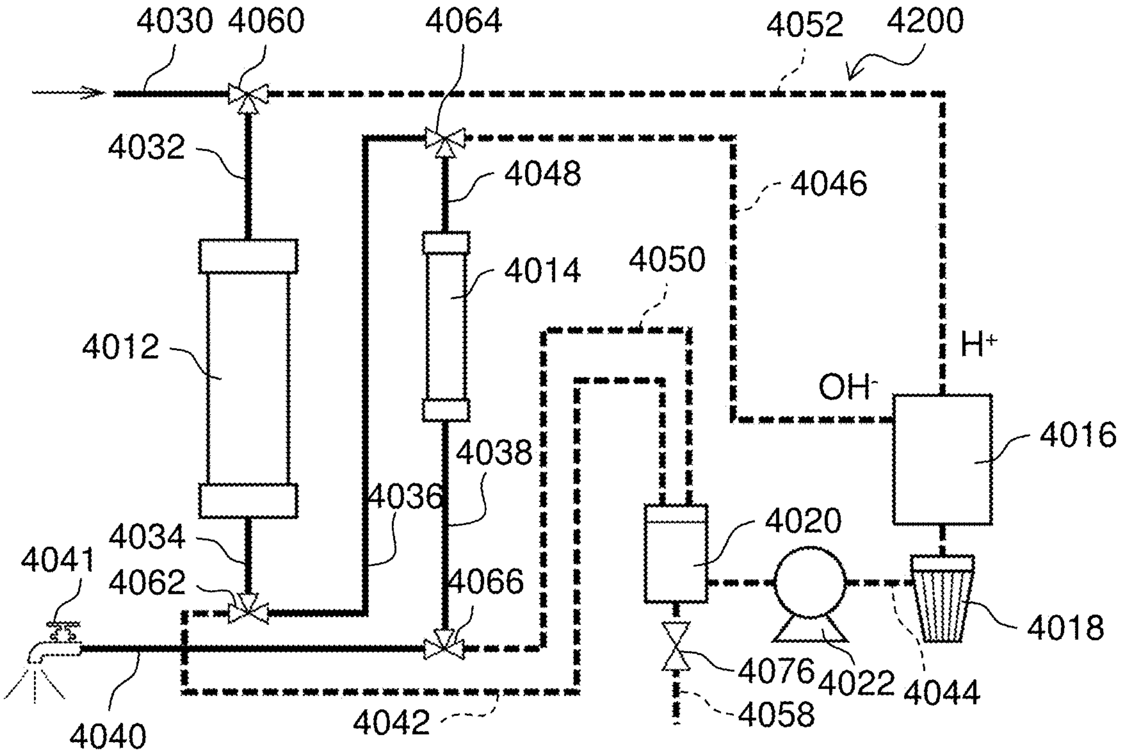
FIG. 44 is a conceptual diagram illustrating an example of a water softening device including a weakly acidic cation exchange resin and a weakly basic anion exchange resin.
Figure 45:
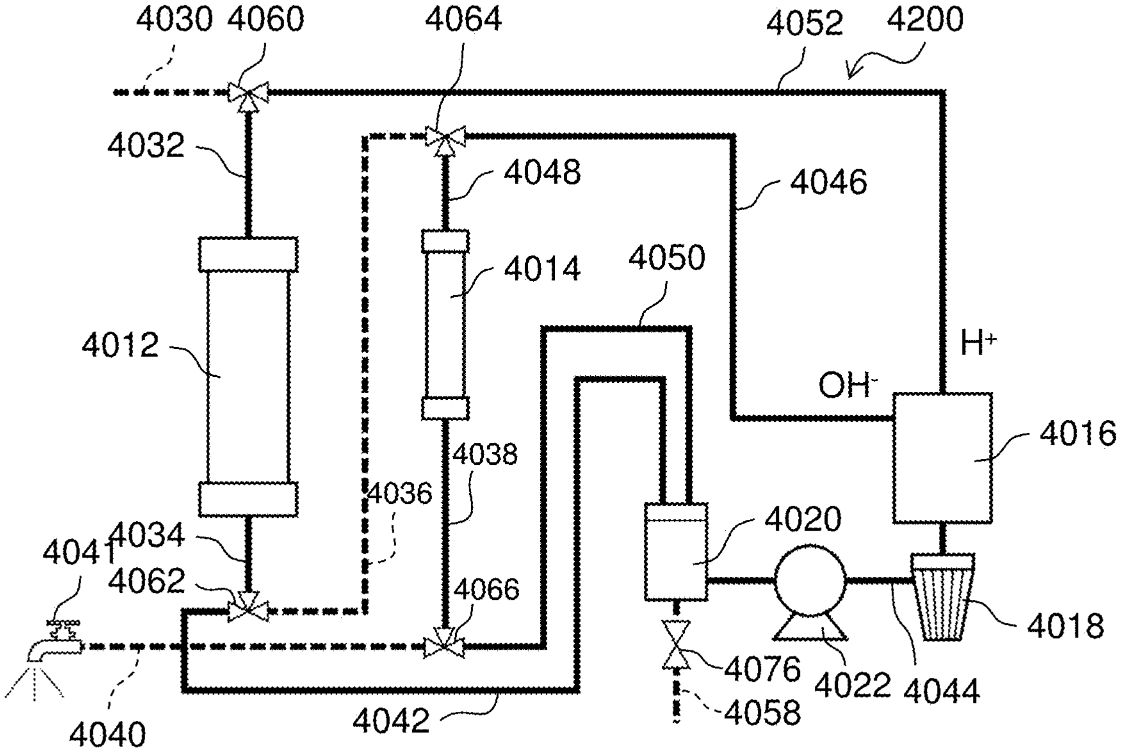
FIG. 45 is a conceptual diagram illustrating an example of a water softening device including a weakly acidic cation exchange resin and a weakly basic anion exchange resin.

Before describing the water softening device of the present fifth exemplary embodiment, first, a basic structure of a water softening device including a weakly acidic cation exchange resin and a weakly basic anion exchange resin will be described with reference to FIGS. 44 to 47. FIGS. 44 and 45 are conceptual diagrams illustrating an example of a water softening device having a weakly acidic cation exchange resin and a weakly basic anion exchange resin. Water softening device 4200 illustrated in FIGS. 44 and 45 includes water softening tank 4012 and neutralizing tank 4014 as elements responsible for water softening. Channel 4032 is connected to water softening tank 4012, and channel 4030 leading to a water source (not illustrated) of raw water is connected to channel 4032 via three-way valve 4060. Channel 4034, channel 4036, and channel 4048 are connected between water softening tank 4012 and neutralizing tank 4014. Three-way valve 4062 is provided between channel 4034 and channel 4036, and three-way valve 4064 is provided between channel 4036 and channel 4048. Further, channel 4038 is connected to neutralizing tank 4014 on the opposite side of channel 4048. Channel 4038 is connected to channel 4040 via three-way valve 4066, and faucet 4041 is provided at an end of channel 4040. With the above configuration, by appropriately setting the opening and closing of three-way valves 4060, 4062, 4064, and 4066, the raw water passes through channel 4030, channel 4032, water softening tank 4012, channel 4034, channel 4036, channel 4048, neutralizing tank 4014, channel 4038, and channel 4040 in this order. The raw water to be passed is softened by the weakly acidic cation exchange resin of water softening tank 4012. As described above, since the obtained softened water has a pH in an acidic range, the softened water passes through neutralizing tank 4014 and is neutralized by ion exchange of hydrogen ions by the weakly basic anion exchange resin in neutralizing tank 4014, so that softened water in a neutral range is obtained. In FIG. 44, the channel through which water passes is indicated by a solid line.

Meanwhile, water softening device 4200 further includes electrolyzer 4016, solid separation filter 4018, and tank 4020, which are responsible for regenerating each ion exchange resin. Acidic electrolytic water generated by electrolyzer 4016 is used for regenerating the weakly acidic cation exchange resin in water softening tank 4012, and alkaline electrolytic water is used for regenerating the weakly basic anion exchange resin in neutralizing tank 4014. First channel 4052 through which the acidic electrolytic water generated in electrolyzer 4016 is discharged is connected to water softening tank 4012 via three-way valve 4060 and channel 4032. Further, water softening tank 4012 is connected to tank 4020 via channel 4034, three-way valve 4062, and third channel 4042. Tank 4020 serves to store water used for the regeneration treatment. The water in tank 4020 is then used for regeneration treatment or drained. On the other hand, second channel 4046 through which the alkaline electrolytic water generated in electrolyzer 4016 is discharged is connected to neutralizing tank 4014 via three-way valve 4064 and channel 4048. Further, neutralizing tank 4014 is connected to tank 4020 via channel 4038, three-way valve 4066, and fourth channel 4050. Water pump 4022 and solid separation filter 4018 are provided in fifth channel 4044 between tank 4020 and electrolyzer 4016. Water pump 4022 plays a role of supplying water in the channel. Solid separation filter 4018 has a function of capturing a solid content and allowing only a liquid to pass therethrough. In FIG. 45, the channel through which water passes is indicated by a solid line.

In the above configuration, at the time of regenerating each ion exchange resin, water in tank 4020 is supplied by operating water pump 4022. When water pump 4022 is operated, water in tank 4020 flows into fifth channel 4044, passes through solid separation filter 4018, and flows into electrolyzer 4016. The water flowing into electrolyzer 4016 is electrolyzed to produce acidic electrolytic water and alkaline electrolytic water. The acidic electrolytic water flows into water softening tank 4012 via first channel 4052, three-way valve 4060, and channel 4032. Then, the weakly acidic cation exchange resin in water softening tank 4012 is regenerated by the acidic electrolytic water. The alkaline electrolytic water flows into neutralizing tank 4014 via second channel 4046, three-way valve 4064, and channel 4048. Then, the weakly basic anion exchange resin in neutralizing tank 4014 is regenerated by the alkaline electrolytic water. As described above, by circulating water by the operation of water pump 4022, the regeneration treatment of each ion exchange resin is performed.

Figure 46:
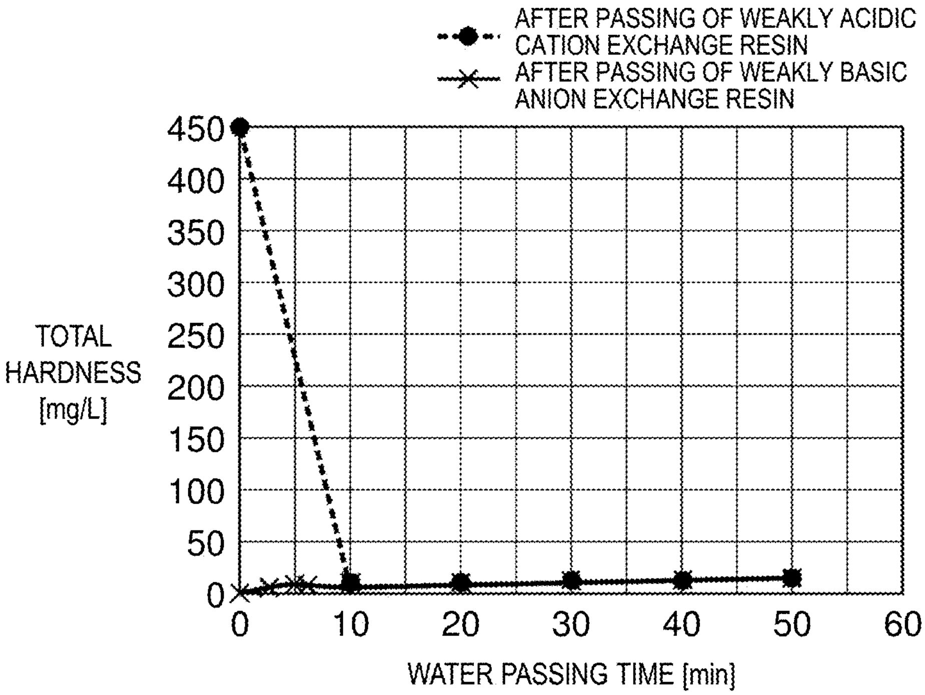
FIG. 46 is a graph illustrating a change in total hardness of water after passing through a new weakly acidic cation exchange resin or a new weakly basic anion exchange resin with respect to a water passing time.

By the way, in electrolyzer 4016, since the hardness component (cation) moves to the cathode side, the hardness component is contained in the alkaline electrolytic water generated at the cathode. Moreover, since alkaline electrolytic water is literally alkaline, the hardness component tends to exist as a solid content (hydroxide). Therefore, the solid content in the alkaline electrolytic water is adsorbed to the weakly basic anion exchange resin in neutralizing tank 4014. The graph illustrated in FIG. 46 shows the change in the total hardness with respect to the elapsed time after passing through a new weakly acidic cation exchange resin (water softening tank) or a new weakly basic anion exchange resin (neutralizing tank). "New" means that the regeneration treatment has never been performed. After passing through the weakly acidic cation exchange resin and after passing through the weakly acidic cation exchange resin, the hardness component is almost 0 [mg/L].

Figure 47:
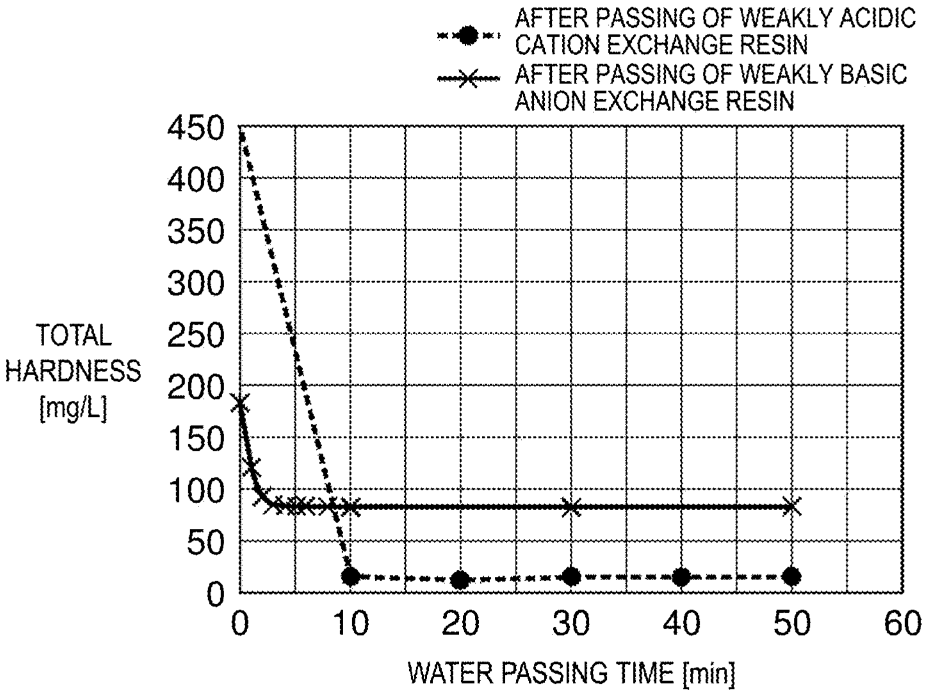
FIG. 47 is a graph illustrating a change in total hardness of water after passing through a weakly acidic cation exchange resin after regeneration or a weakly basic anion exchange resin after regeneration with respect to a water passing time.

On the other hand, the graph illustrated in FIG. 47 shows the change in the total hardness with respect to the elapsed time after passing through the weakly acidic cation exchange resin (water softening tank) after the regeneration treatment or the weakly basic anion exchange resin (neutralizing tank) after the regeneration treatment in water softening. After passing through the weakly acidic cation exchange resin, the hardness component decreases, whereas after passing through the weakly basic anion exchange resin, a certain amount of the hardness component is contained. As described above, when the new weakly acidic cation exchange resin and weakly basic anion exchange resin are used, the hardness components are almost 0 [mg/L]. On the other hand, the reason why the hardness component is contained only when the weakly basic anion exchange resin after the regeneration treatment is used is considered to be derived from the hardness component generated in the alkaline electrolytic water and adsorbed to the weakly basic anion exchange resin.

As described above, in water softening device 4200 having the configuration illustrated in FIGS. 44 and 45, the hardness component is contained in the alkaline electrolytic water generated in electrolyzer 4016, and is solidified in the alkaline electrolytic water to be adsorbed to the weakly basic anion exchange resin in neutralizing tank 4014. That is, in the water softening after the regeneration treatment, the solid content is dissolved in acidic softened water, so that the hardness of the softened water increases and the water softening function decreases.

In addition, in water softening device 4200 having the configuration illustrated in FIGS. 44 and 45, at the time of regenerating each ion exchange resin, water containing a solid content derived from a hardness component that has not been adsorbed by the weakly basic anion exchange resin in neutralizing tank 4014 circulates through the channel for regenerating, and is allowed to pass through electrolyzer 4016 again. Since the solid content derived from the hardness component undergoes a neutralization reaction with the acidic electrolytic water, the acidic electrolytic water is consumed by the presence of the solid content. As a result, the regeneration efficiency is reduced.

The water softening device of the present fifth exemplary embodiment solves the above problem. That is, the water softening device of the present fifth exemplary embodiment includes a water softening tank that softens raw water containing a hardness component by a weakly acidic cation exchange resin. In addition, a neutralizing tank for neutralizing acidic softened water obtained in the water softening tank by a weakly basic anion exchange resin is provided. Further, an electrolyzer for generating acidic electrolytic water and alkaline electrolytic water is provided. The water softening device further includes a first channel that guides acidic electrolytic water or alkaline electrolytic water generated in the electrolyzer to the water softening tank, and a second channel that guides acidic electrolytic water or alkaline electrolytic water generated in the electrolyzer to the neutralizing tank. Further, the water softening device includes a tank for storing acidic electrolytic water and alkaline electrolytic water used for regenerating the weakly acidic cation exchange resin and the weakly basic anion exchange resin. The water softening device further includes a third channel connecting the water softening tank and the tank, a fourth channel connecting the neutralizing tank and the tank, and a fifth channel connecting the electrolyzer and the tank. When the weakly acidic cation exchange resin is regenerated, the channel of water is set so that the acidic electrolytic water generated in the electrolyzer passes through the water softening tank via the first channel. When the weakly basic anion exchange resin is regenerated, the channel of water is set so that the alkaline electrolytic water generated in the electrolyzer passes through the second channel to the neutralizing tank. At least one of the following configuration (1) and the following configuration (2) is provided.

Figure 34:
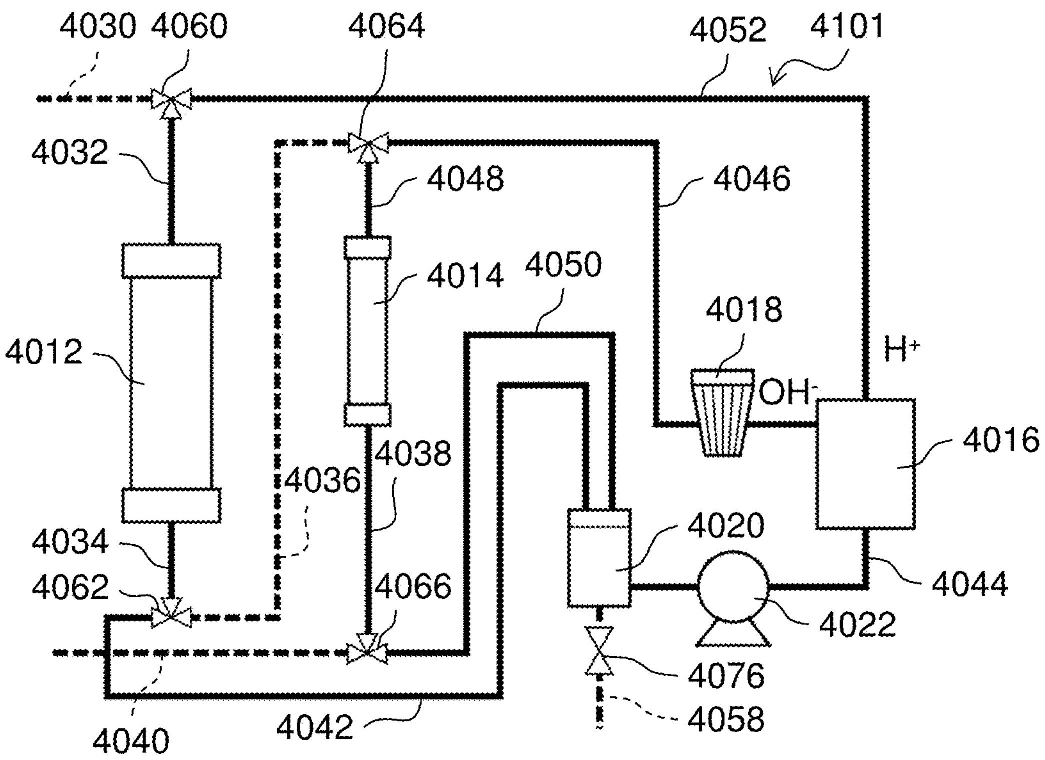
FIG. 34 is a conceptual diagram illustrating an example of a water softening device according to a fifth exemplary embodiment.

Configuration (1): Solid Separation Filter Positioned in the Middle of Second Channel Configuration (2): First switch valve for switching between a first bypass channel for guiding water discharged from an electrolyzer to a tank through a fourth channel from the middle of a second channel without passing through a neutralizing tank, and a channel to the first bypass channel and a channel to the neutralizing tank provided in the second channel FIG. 34 illustrates water softening device 4101 according to the present fifth exemplary embodiment. In FIG. 34, substantially the same components as those in FIGS. 44 and 45 are denoted by reference numerals. Water softening device 4101 illustrated in FIG. 34 is different from that in FIGS. 44 and 45 in that it includes the configuration (1). That is, in water softening device 4101, solid separation filter 4018 is provided in the middle of the channel for discharging the alkaline electrolytic water in electrolyzer 4016, that is, in the middle of second channel 4046. The cation of the hardness component becomes a solid content such as calcium hydroxide by generation of alkaline electrolytic water, and thus can be trapped by solid separation filter 4018. As a result, water is passed through neutralizing tank 4014 in a state where the solid content of the hardness component is removed, and washing is performed, so that adsorption of the hardness component to the weakly basic anion exchange resin in neutralizing tank 4014 can be prevented. As a result, even when acidic softened water flows in during subsequent water softening, mixing of hardness components can be suppressed.

In addition, in water softening device 4101 having the configuration illustrated in FIG. 34, in the regeneration of each ion exchange resin, even if there is a solid content derived from a hardness component that has not been adsorbed to the weakly basic anion exchange resin in neutralizing tank 4014, the solid content is captured by solid separation filter 4018. Therefore, it is possible to suppress the consumption of the acidic electrolytic water due to the neutralization reaction of the solid content derived from the hardness component by the acidic electrolytic water that is caused to pass through electrolyzer 4016 again. As a result, a decrease in regeneration efficiency can be suppressed. Since the solid content derived from the hardness component is generated on the side where the alkaline electrolytic water is generated in electrolyzer 4016, solid separation filter 4018 may be provided only in the middle of second channel 4046.

On the other hand, in water softening device 4200 illustrated in FIGS. 44 and 45, solid separation filter 4018 is provided on the upstream side of electrolyzer 4016, and in the area, the hardness component exists as an ionic state, so that it is difficult for solid separation filter 4018 to capture the hardness component.

Figure 35:
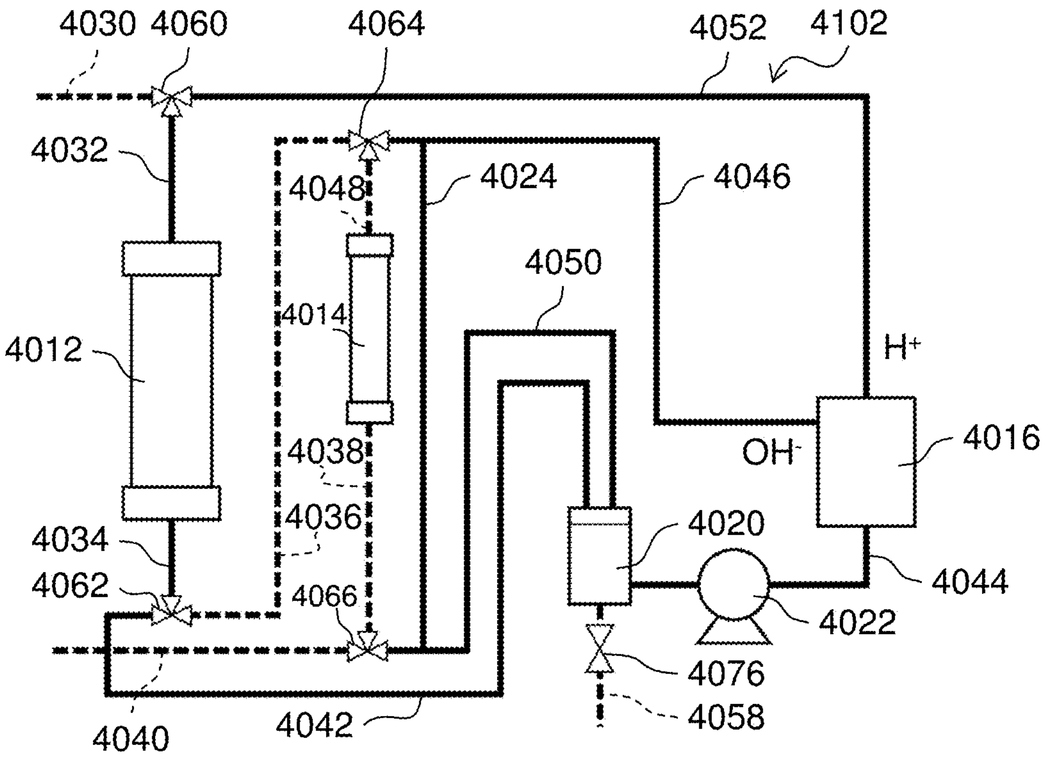
FIG. 35 is a conceptual diagram illustrating an example of the water softening device according to the fifth exemplary embodiment.

On the other hand, water softening device 4102 illustrated in FIG. 35 is different from that in FIGS. 44 and 45 in that it has the configuration (2). That is, first bypass channel 4024 that guides the alkaline electrolytic water generated in electrolyzer 4016 to tank 4020 through fourth channel 4050 from the middle of second channel 4046 without passing through neutralizing tank 4014 is provided. Further, three-way valve (switch valve) 4064 that is provided in second channel 4046 and switches a channel to first bypass channel 4024 and a channel to neutralizing tank 4014 is provided.

In the configuration (2), first bypass channel 4024 that guides the alkaline electrolytic water to tank 4020 without passing through neutralizing tank 4014 in regeneration is provided, and the reason therefor will be described.

The time required for regeneration of the weakly acidic cation exchange resin is longer than the time required for regeneration of the weakly basic anion exchange resin. The reason is as follows. As a premise, an alkalinity component (HCO3-) is always contained in water, and in the following description, the alkalinity component is water containing 1.4 times the hardness component (Ca2+ and Mg2+). In addition, only calcium ions are considered.

(1) In Water Softening i) Weakly Acidic Cation Exchange Resin

In water softening, the following reaction occurs in the weakly acidic cation exchange resin. Hereinafter, the weakly acidic cation exchange resin is represented by RCOO-H+.

$$2(RCOO—H^+)+Ca^{2+}(HCO_3^-)_2\rightarrow 2RCOO—Ca^{2+}+2H_2CO_3$$

$$H_2CO_3\rightarrow CO_2+H_2O$$

$$H_2CO_3\rightarrow H^++HCO_3^-$$

From the above three expressions, $$2(RCOO—H^+)+Ca^{2+}\rightarrow 2RCOO—Ca^{2+}+2H^+$$

Thus, hydrogen ions twice as large as calcium ions are generated.

The generated hydrogen ions are consumed as follows.

$$H^++HCO_3^-\rightarrow 2H_2CO_3$$

Here, since the content of the alkalinity component is 1.4 times that of calcium ions, 1.4 times that of calcium ions among generated hydrogen ions are consumed, and the rest (0.6 times that of calcium ions) is released as hydrogen ions, so that softened water exhibits acidity.

ii) Weakly Basic Anion Exchange Resin

In the weakly basic anion exchange resin, hydrogen ions generated in the weakly acidic cation exchange resin are adsorbed in pairs with anions in water. That is, the following reaction occurs. Hereinafter, the weakly basic anion exchange resin is represented by [R(CH3)N]HOH, and the anion in water is represented by X—.

$$[R(CH_3)N]HOH+H^++X^—\rightarrow [R(CH_3)2N]HX+HOH$$

The pair of hydrogen ions adsorbed to the weakly basic anion exchange resin and anions in water is 0.6 times that of calcium ions.

(2) During Regeneration i) Weakly Acidic Cation Exchange Resin

When the weakly acidic cation exchange resin is regenerated by supplying acidic electrolytic water, the following reaction occurs.

$$(2RCOO—)Ca^{2+}+2H^+\rightarrow 2(RCOO—H^+)+Ca^{2+}$$

ii) Weakly Basic Anion Exchange Resin $$[R\ CH_3)2N]HX+OH^—\rightarrow [R(CH_3)N]HOH+X^—$$

In water softening, as described in (1) above, since the pair of hydrogen ions adsorbed to the weakly basic anion exchange resin and anions in water is 0.6 times calcium ions, the time required for regeneration is also 0.6 times.

From the above, the time required for regeneration of the weakly acidic cation exchange resin is longer than the time required for regeneration of the weakly basic anion exchange resin. Therefore, in regeneration, the alkaline electrolytic water containing the solid content of the hardness component flows into neutralizing tank 4014 from the end of regeneration of the weakly basic anion exchange resin to the end of regeneration of the weakly acidic cation exchange resin. That is, since the hardness component continues to flow even after the completion of regeneration of the weakly basic anion exchange resin, the amount of the hardness component adsorbed to the weakly basic anion exchange resin increases. Therefore, by providing the configuration (2), the alkaline electrolytic water does not pass through neutralizing tank 4014 but passes through first bypass channel 4024 after the completion of the regeneration of the weakly basic anion exchange resin, so that an increase in the hardness component to be attached can be suppressed. As a result, even when acidic softened water flows in during subsequent water softening, mixing of hardness components can be suppressed. In addition, water containing a solid content derived from the hardness component is caused to pass through electrolyzer 4016 again, and the solid content undergoes a neutralization reaction with the acidic electrolytic water, so that the consumption of the acidic electrolytic water can be suppressed, and a decrease in the regeneration efficiency can be suppressed.

Although not illustrated, both the configuration (1) and the configuration (2) may be provided. That is, solid separation filter 4018 is provided in the middle of second channel 4046, and first bypass channel 4024 for guiding to tank 4020 from the middle of second channel 4046 and three-way valve (switch valve) 4064 for switching the channel to first bypass channel 4024 and the channel to neutralizing tank 4014 are provided. In other words, in the configuration illustrated in FIG. 34, as illustrated in FIG. 35, first bypass channel 4024 is provided in second channel 4046. Such a configuration is useful when solid content capturing capability of solid separation filter 4018 is not sufficient.

Hereinafter, each element of the water softening device of the present fifth exemplary embodiment will be described in detail.

[Water Softening Tank]

Water softening tank 4012 has a weakly acidic cation exchange resin inside, and softens raw water containing hardness components by the weakly acidic cation exchange resin. In the water softening tank, not only hardness components but also other cations (for example, potassium ions, sodium ions, ammonium ions, and the like) can be ion-exchanged, and the water softening tank is not necessarily limited to water softening applications.

The weakly acidic cation exchange resin is not particularly limited, and a general-purpose one can be used.

Examples thereof include those having a carboxyl group (—COOH) as an exchange group. A resin in which a hydrogen ion (H+) as a counter ion of a carboxyl group is a cation such as a metal ion or an ammonium ion (NH4+) may also be used.

[Neutralizing Tank]

Neutralizing tank 4014 has a weakly basic anion exchange resin inside, and neutralizes acidic softened water generated in the water softening tank by the weakly basic anion exchange resin. The weakly basic anion exchange resin preferably has a tertiary amino group as an anion exchange group.

[Electrolyzer]

Electrolyzer 4016 electrolyzes the introduced water into acidic electrolytic water and alkaline electrolytic water. Then, in the configurations of FIGS. 34 and 35, the acidic electrolytic water generated in electrolyzer 4016 is discharged from first channel 4052, guided to water softening tank 4012, and used for regeneration of the weakly acidic cation exchange resin. In the configuration of FIGS. 34 and 35, the alkaline electrolytic water generated in electrolyzer 4016 is discharged from second channel 4046, guided to neutralizing tank 4014, and used for regeneration of the weakly basic anion exchange resin.

Figure 48:
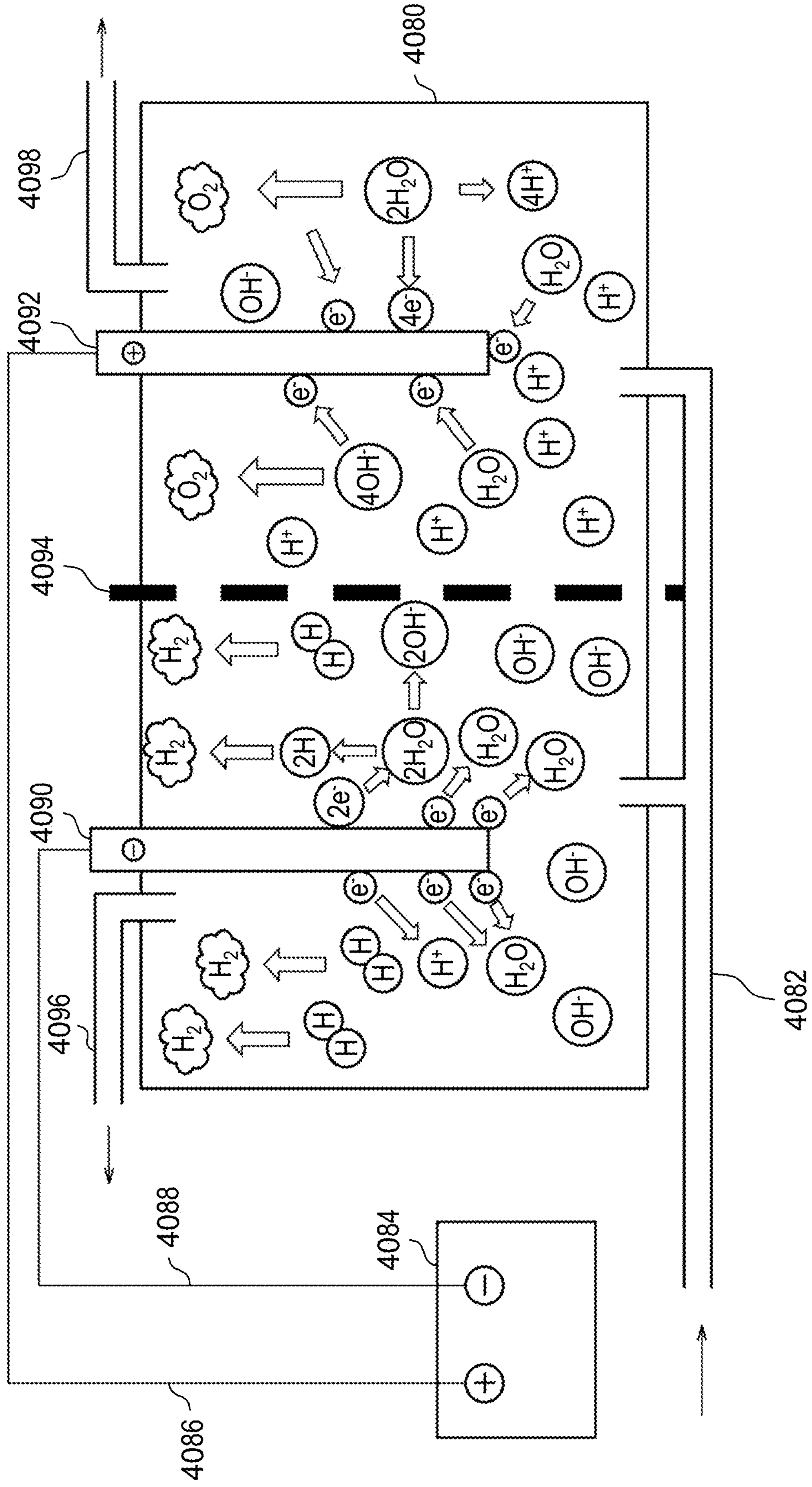
FIG. 48 is a conceptual diagram illustrating an example of an electrolyzer according to the fifth exemplary embodiment.

Electrolyzer 4016 used in the water softening device of the present fifth exemplary embodiment is not particularly limited as long as it can generate acidic electrolytic water and alkaline electrolytic water. An example of electrolyzer 4016 will be described with reference to FIG. 48. FIG. 48 is a conceptual diagram illustrating an example of an electrolyzer according to the fifth exemplary embodiment.

The electrolyzer illustrated in FIG. 48 includes electrolysis chamber 4080 for electrolyzing water, power supply 4084, anode 4092 connected to the anode of power supply 4084 via wiring 4086, and cathode 4090 connected to the cathode of power supply 4084 via wiring 88. In the inside of electrolysis chamber 4080, the ion permeable membrane is partitioned by partition wall 4094, and the right side in FIG. 48 constitutes an anode chamber, and the left side constitutes a cathode chamber. Water flows into the cathode chamber and the anode chamber from channel 4082, and the water in the cathode chamber is discharged as alkaline electrolytic water, and the water in the anode chamber is discharged as acidic electrolytic water from channels 4096, 4098, respectively.

Water introduced into the cathode chamber and the anode chamber of electrolysis chamber 4080 is electrolyzed by applying a voltage between cathode 4090 and anode 4092. In electrolysis chamber 4080, hydroxide ions (OH—) and hydrogen gas are generated in the cathode chamber, and hydrogen ions (H+) and oxygen gas are generated in the anode chamber by electrolysis of water. Then, alkaline electrolytic water is generated in the cathode chamber, and acidic electrolytic water is generated in the anode chamber. The alkaline electrolytic water is discharged from channel 4096, and the acidic electrolytic water is discharged from channel 4098.

On the other hand, when the cathode and the anode of the power supply 4084 are reversed, a phenomenon opposite to the above occurs, and the alkaline electrolytic water is discharged from channel 4098 and the acidic electrolytic water is discharged from channel 4096.

The acidic electrolytic water generated in electrolyzer 4016 contains more hydrogen ions, so that the weakly acidic cation exchange resin can be efficiently regenerated, and thus the pH is preferably as low as possible.

[Solid Separation Filter]

Solid separation filter 4018 is provided in the middle of second channel 4046, and plays a role of capturing the solid content (calcium hydroxide, magnesium hydroxide, etc.) of the hardness component in the alkaline electrolytic water discharged from electrolyzer 4016, in particular, as described above. That is, the solid content of the water discharged from electrolyzer 4016 is removed by solid separation filter 4018, and the water passes through neutralizing tank 4014.

In the present fifth exemplary embodiment, the form of solid separation filter 4018 is not limited as long as it can capture the solid content of the hardness component and perform solid-liquid separation. For example, a general filter medium or a filtration membrane can be used.

[Tank]

Acidic electrolytic water containing a hardness component after regenerating weakly acidic cation exchange resin in water softening tank 4012 passes through tank 4020 via third channel 4042. Further, alkaline electrolytic water after regenerating the weakly basic anion exchange resin in neutralizing tank 4014 passes through tank 4020 via fourth channel 4050. Then, in tank 4020, the acidic electrolytic water containing a hardness component and the alkaline electrolytic water are mixed, and the dilution is performed and the hardness component reacts with the alkaline electrolytic water. For example, when the hardness component in the acidic electrolytic water is calcium ions, a reaction in which calcium carbonate is generated or calcium hydroxide is generated occurs by the alkaline electrolytic water. Then, the reacted hardness components can be separated.

Note that "the hardness component reacts" includes not only a state in which all the hardness components react but also a state in which a component that does not react or a component that does not exceed the solubility product is contained.

On the other hand, tank 4020 plays a role of storing acidic softened water having passed through water softening tank 4012 as washing water during washing.

[Water Pump]

Water pump 4022 is provided in the middle of fifth channel 4044, and plays a role of supplying water stored in tank 4020 toward electrolyzer 4016. Water pump 4022 does not need to be operated in water softening. In addition, it is not necessary to operate water pump 4022 when the water pressure of the raw water is sufficient even in regeneration and washing.

[Controller]

The controller plays a role of controlling the entire water softening device. The controller includes, for example, an input and output unit that outputs a predetermined control signal, a storage unit, a random access memory (RAM) that is used as a work area or stores a calculation result, and a central processing unit (CPU) that controls the entire device.

<Method for Regenerating Water Softening Device>

Next, a method for regenerating the water softening device having the configuration (2) will be described. In the regenerating method, the water softening device includes at least the configuration (2). When the weakly acidic cation exchange resin and the weakly basic anion exchange resin are regenerated, the alkaline electrolytic water generated in electrolyzer 4016 is guided to tank 4020 via first bypass channel 4024 after completion of regeneration of the weakly basic anion exchange resin. As described above, the time required for regeneration of the weakly acidic cation exchange resin is longer than the time required for regeneration of the weakly basic anion exchange resin. Therefore, since the alkaline electrolytic water containing the hardness component continues to flow even after the completion of regeneration of the weakly basic anion exchange resin, the amount of the hardness component adsorbed to the weakly basic anion exchange resin increases. Therefore, after the completion of the regeneration of the weakly basic anion exchange resin, the alkaline electrolytic water is not allowed to pass through neutralizing tank 4014 but is allowed to pass through first bypass channel 4024, thereby suppressing an increase in the hardness component to be attached.

Whether the regeneration of the weakly basic anion exchange resin has ended can be determined, for example, by providing a pH meter in the middle of channel 4038 or using an empirical value obtained by an experiment or the like. More specifically, when the regeneration of the weakly basic anion exchange resin ends, the alkaline electrolytic water is not consumed and the pH increases, so that it can be determined that the regeneration ends at that time. In addition, the time required for regeneration of the weakly basic anion exchange resin can be determined by an experiment or the like, and the time point at which the time has elapsed can be determined as the end of regeneration of the weakly basic anion exchange resin.

In either case, when the controller detects the end of regeneration of the weakly basic anion exchange resin, the controller can switch three-way valve 4064 to allow water to pass through first bypass channel 4024.

In the water softening device having the configuration (1), it is not necessary to switch the channel from the start to the end of regeneration of each ion exchange resin. This is because, in configuration (1), solid separation filter 4018 is provided in the middle of second channel 4046, and the solid content of the hardness component is captured by solid separation filter 4018. That is, the alkaline electrolytic water discharged from electrolyzer 4016 passes through neutralizing tank 4014 in a state where the solid content of the hardness component is removed by solid separation filter 4018, and the regeneration treatment is performed.

<Method for Washing Water Softening Device>

In the water softening device of the present fifth exemplary embodiment, at least second channel 4046 can be washed using acidic softened water obtained by passing through the weakly acidic cation exchange resin or acidic electrolytic water generated in electrolyzer 4016. In addition to second channel 4046, in particular, solid separation filter 4018 can be washed. In the washing according to the present fifth exemplary embodiment, since the washing is performed with acidic water, the solid content of the hardness component is particularly removed. There are the following three modes for washing the water softening device, and each mode will be described.

(A) First Mode

In a first mode, in washing at least the second channel, the raw water is discharged after passing through the water softening tank, the third channel, the tank, the fifth channel, the electrolyzer, and the second channel in this order.

(B) Second Mode

In a second mode, the water softening device includes at least the configuration (2), and further includes a water pump between the tank and the electrolyzer. Then, at least at the time of washing the second channel, the raw water passed through the tank via the water softening tank and the third channel and stored is circulated by the water pump in a path through which the raw water passes through the fifth channel, the electrolyzer, the second channel, and the first bypass channel in this order and returns to the tank.

(C) Third Mode

In a third mode, the water softening device includes at least the configuration (2). In addition, a second bypass channel for guiding water discharged from the electrolyzer to the tank from the middle of the first channel without passing through the water softening tank is provided. The washing machine further includes a second switch valve provided in the first channel to switch a channel to the second bypass channel and a channel to the water softening tank, and a water pump located between the tank and the electrolyzer. At least at the time of washing the second channel, water stored in the tank is circulated by a water pump through the fifth channel and the electrolyzer, in (a) a path for returning to the tank via the first channel and the second bypass channel, and in (b) a path for returning to the tank via the second channel and the first bypass channel.

In the water softening device according to the present fifth exemplary embodiment, at least one of the following aspects is preferably applied to any of the first to third modes. Among the following (a) to (d), (a) and (b) are an alternative of two.

(a) Aspect 1

The electrolyzer is powered off and washed using acidic softened water obtained by passing through the weakly acidic cation exchange resin.

(b) Aspect 2

The electrolyzer is powered on, the acidic electrolytic water passes through the second channel from the electrolyzer, and the alkaline electrolytic water is drained in the middle of the first channel.

(c) Aspect 3

A detection mechanism that detects that water stored in the tank has reached a predetermined water level is further provided.

(d) Aspect 4

A drainage channel for discharging water stored in the tank to the outside is further included. That is, the tank is washed.

The modes will be described below.

(A) First Mode

Figure 36:
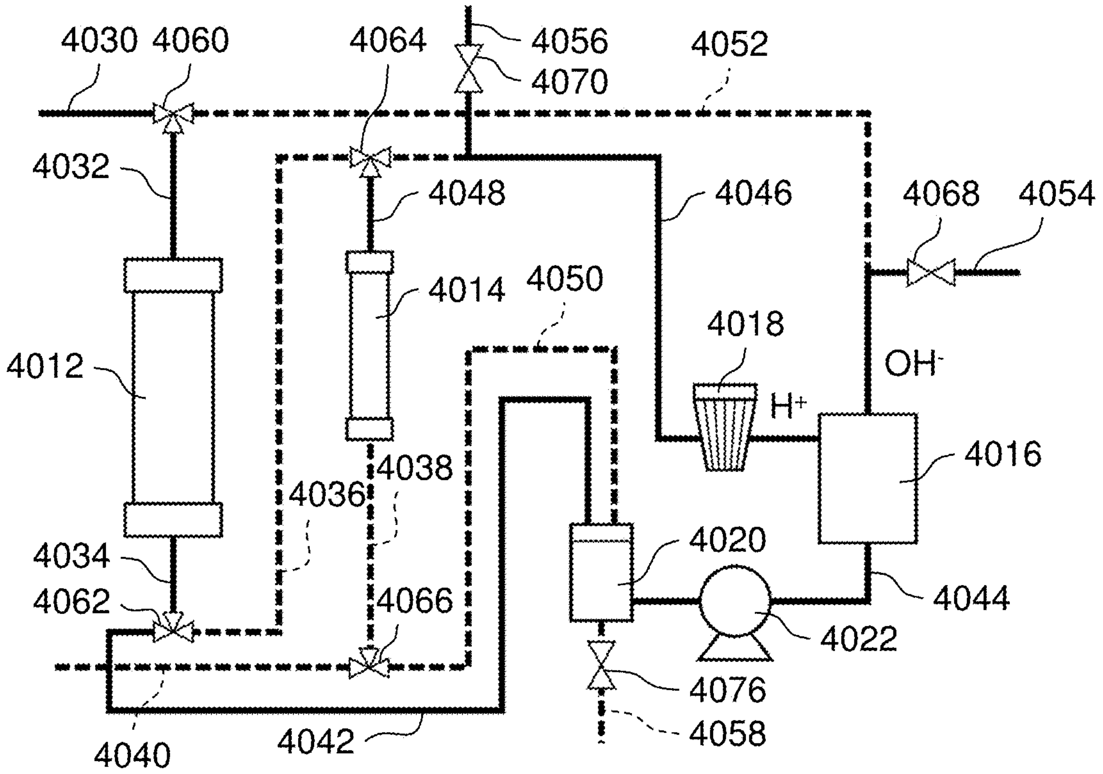
FIG. 36 is a conceptual diagram illustrating a state in which the water softening device according to the fifth exemplary embodiment is washed.

FIG. 36 illustrates a mode in which Aspect 2 is applied to the first mode. In FIG. 36, substantially the same components as those in FIG. 34 are denoted by reference numerals. Hereinafter, the operation at the time of washing in the mode illustrated in FIG. 36 will be described.

1a-i) Three-way valve 4064 is switched so that water does not flow into neutralizing tank 4014, and open-close valve 4070 provided in drainage channel 4056 is opened. In addition, open-close valve 4068 provided in drainage channel 4054 is opened.

1a-ii) Water pump 4022 is turned on.

1a-iii) Three-way valve 4060 and three-way valve 4062 are switched so that the raw water flows into water softening tank 4012, and the obtained acidic softened water is supplied to tank 4020.

1a-iv) Electrolyzer 4016 is turned on so as to have a potential opposite to that at the time of regeneration. That is, acidic electrolytic water is allowed to pass through second channel 4046, and alkaline electrolytic water is allowed to pass through first channel 4052.

1a-v) Acidic electrolytic water generated in electrolyzer 4016 passes through solid separation filter 4018, washes second channel 4046 and solid separation filter 4018, and then is discharged from drainage channel 4056. The alkaline electrolytic water is discharged from drainage channel 4054.

1a-vi) The above washing is performed for a certain period of time.

1a-vii) When the washing is finished, the energization of electrolyzer 4016 is stopped, three-way valve 4060 is switched to stop the inflow of the raw water into water softening tank 4012, water pump 4022 is stopped, and open-close valves 4068, 4070 are closed.

In the mode illustrated in FIG. 36, Aspect 2 is applied to the first mode, but Aspect 1 may be applied. In that case, washing can be performed by performing the above 1a-i) to 1a-vii) (excluding the above 1a-iv). That is, the power supply of electrolyzer 4016 is turned off, and washing is performed with the acidic softened water obtained in water softening tank 4012. When Aspect 1 is applied, acidic softened water is passed in 1a-iv).

Figure 37:
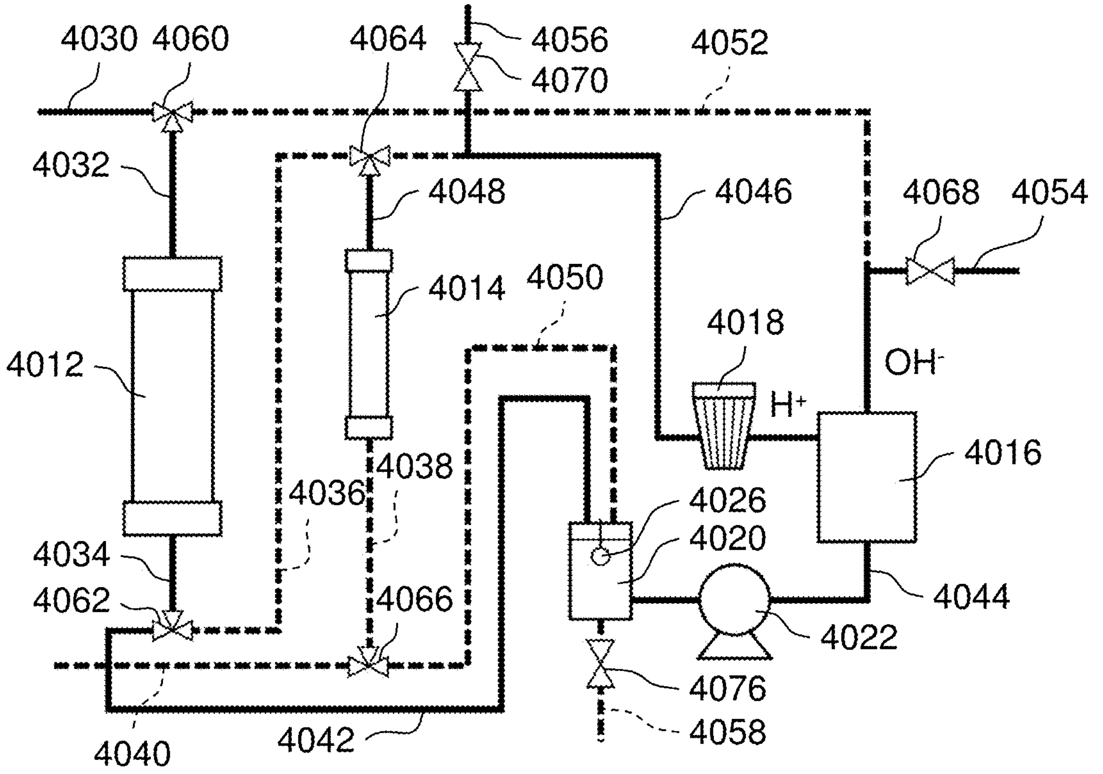
FIG. 37 is a conceptual diagram illustrating a state in which the water softening device according to the fifth exemplary embodiment is washed.

FIG. 37 illustrates a mode in which Aspect 2 and Aspect 3 are applied to the first mode. In FIG. 37, substantially the same components as those in FIG. 34 are denoted by reference numerals. In the mode illustrated in FIG. 37, float switch 4026 is provided as a detection mechanism for detecting that the water stored in tank 4020 has reached a predetermined water level. In FIG. 37, float switch 4026 is turned on when the water level of the water stored in tank 4020 reaches a predetermined level, and gives a switch-on signal to the controller. When float switch 4026 is turned on, the information is transmitted to the controller, and the controller executes predetermined processing. That is, turning on float switch 4026 means that a certain amount of water is stored in tank 4020, and the stored water can be used for washing. When float switch 4026 is turned on, there is no need to pass water through tank 4020, so that it is possible to stop the passage of water through tank 4020 and to circulate the water stored in tank 4020 for washing. As the detection mechanism, a liquid level sensor or the like may be used in addition to the float switch. Hereinafter, the operation at the time of washing in the mode illustrated in FIG. 37 will be described.

1b-i) Three-way valve 4064 is switched so that water does not flow into neutralizing tank 4014, and open-close valve 4070 provided in drainage channel 4056 is opened. In addition, open-close valve 4068 provided in drainage channel 4054 is opened.

1b-ii) Water pump 4022 is turned on.

1b-iii) Three-way valve 4060 and three-way valve 4062 are switched so that the raw water flows into water softening tank 4012, and the obtained acidic softened water is supplied to tank 4020. When the water level exceeds the upper limit value of float switch 4026 of tank 4020, open-close valve 4070 is switched to stop the inflow of the raw water.

1b-iv) Electrolyzer 4016 is turned on so as to have a potential opposite to that at the time of regeneration. That is, acidic electrolytic water is allowed to pass through second channel 4046, and alkaline electrolytic water is allowed to pass through first channel 4052.

1b-v) Acidic electrolytic water generated in electrolyzer 4016 passes through solid separation filter 4018, washes second channel 4046 and solid separation filter 4018, and then is discharged from drainage channel 4056. The alkaline electrolytic water is discharged from drainage channel 4054.

1b-vi) When the water level falls below the lower limit value of float switch 4026 in tank 4020, three-way valve 4060 is switched to allow raw water to flow in, and when the water level exceeds the upper limit value of float switch 4026 in tank 4020, three-way valve 4060 is switched to stop inflow of tap water. This operation is performed each time according to the water level.

1b-vii) The above washing is performed for a certain period of time.

1b-viii) When the washing is finished, the energization of electrolyzer 4016 is stopped, three-way valve 4060 is switched to stop the inflow of the raw water into water softening tank 4012, water pump 4022 is stopped, and open-close valves 4068, 4070 are closed.

In the mode illustrated in FIG. 37, Aspect 2 and Aspect 3 are applied to the first mode, but Aspect 1 and Aspect 3 may be applied. In that case, washing can be performed by executing the above 1b-i) to 1b-viii) (excluding the above 1b-iv). That is, the power supply of electrolyzer 4016 is turned off, and washing is performed with the acidic softened water obtained in water softening tank 4012. When Aspect 1 and Aspect 3 are applied, acidic softened water is passed in 1b-iv).

(B) Second Mode

Figure 38:
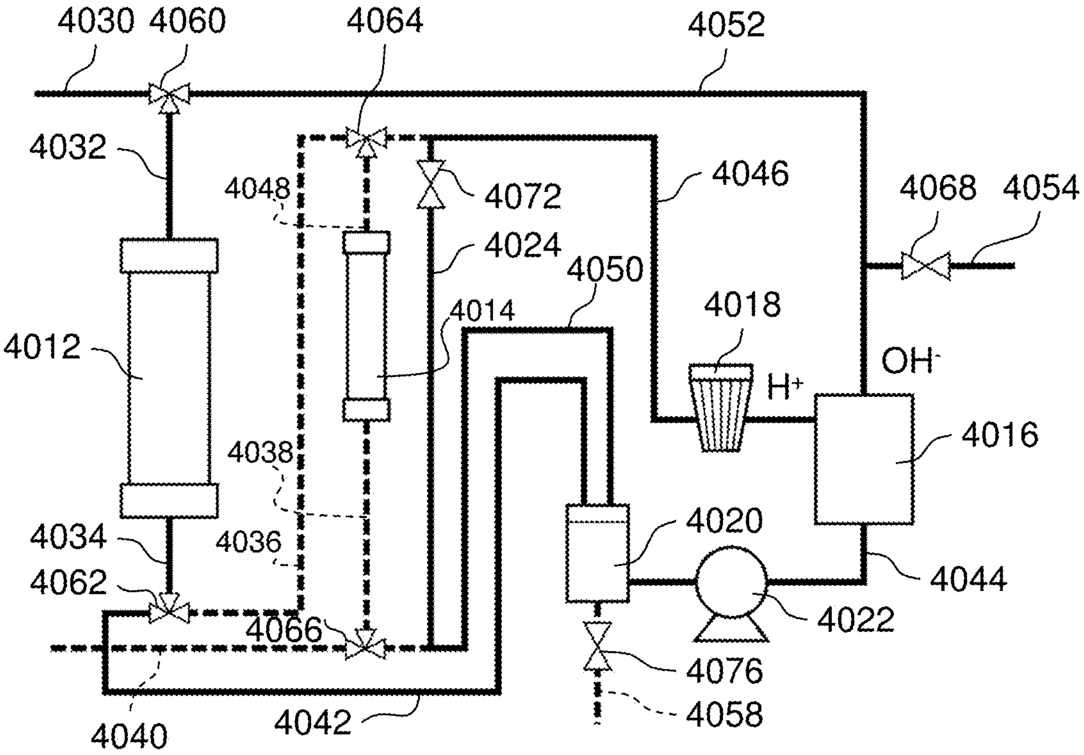
FIG. 38 is a conceptual diagram illustrating a state in which the water softening device according to the fifth exemplary embodiment is washed.

FIG. 38 illustrates a mode in which Aspect 2 is applied to the second mode. In FIG. 38, substantially the same components as those in FIG. 34 are denoted by reference numerals. In the mode illustrated in FIG. 38, first bypass channel 4024 for guiding water discharged from electrolyzer 4016 to tank 4020 from the middle of second channel 4046 via fourth channel 4050 without passing through neutralizing tank 4014 is provided. In addition, open-close valve (switch valve) 4072 that is provided in second channel 4046 and switches a channel to first bypass channel 4024 and a channel to neutralizing tank 4014 is provided. Hereinafter, the operation at the time of washing in the mode illustrated in FIG. 38 will be described.

2a-i) Three-way valve 4064 and three-way valve 4066 are switched, open-close valve 4072 provided in the middle of first bypass channel 4024 is opened, and water is allowed to pass through first bypass channel 4024. In addition, open-close valve 4068 provided in drainage channel 4054 is opened.

2a-ii) Water pump 4022 is turned on.

2a-iii) Three-way valve 4060 and three-way valve 4062 are switched so that the raw water is caused to flow into water softening tank 4012, and the obtained acidic softened water is supplied to tank 4020.

2a-iv) Electrolyzer 4016 is turned on so as to have a potential opposite to that at the time of regeneration. That is, acidic electrolytic water is allowed to pass through second channel 4046, and alkaline electrolytic water is allowed to pass through first channel 4052.

2a-v) The acidic electrolytic water generated in electrolyzer 4016 passes through solid separation filter 4018, washes second channel 4046 and solid separation filter 4018, passes through first bypass channel 4024, and is returned to tank 4020 again. The alkaline electrolytic water is discharged from drainage channel 4054.

2a-vi) The above washing is performed a certain period of time.

2a-vii) When the washing is finished, the energization of electrolyzer 4016 is stopped, three-way valve 4060 is switched to stop the inflow of the raw water into water softening tank 4012, water pump 4022 is stopped, and open-close valves 4068, 4070 are closed.

In the mode illustrated in FIG. 38, Aspect 2 is applied to the second mode, but Aspect 1 may be applied. In that case, washing can be performed by performing the above 2a-i) to 2a-vii) (excluding the above 2a-iv). That is, the power supply of electrolyzer 4016 is turned off, and washing is performed with the acidic softened water obtained in water softening tank 4012. When Aspect 1 is applied, acidic softened water is passed in 2a-v).

Figure 39:
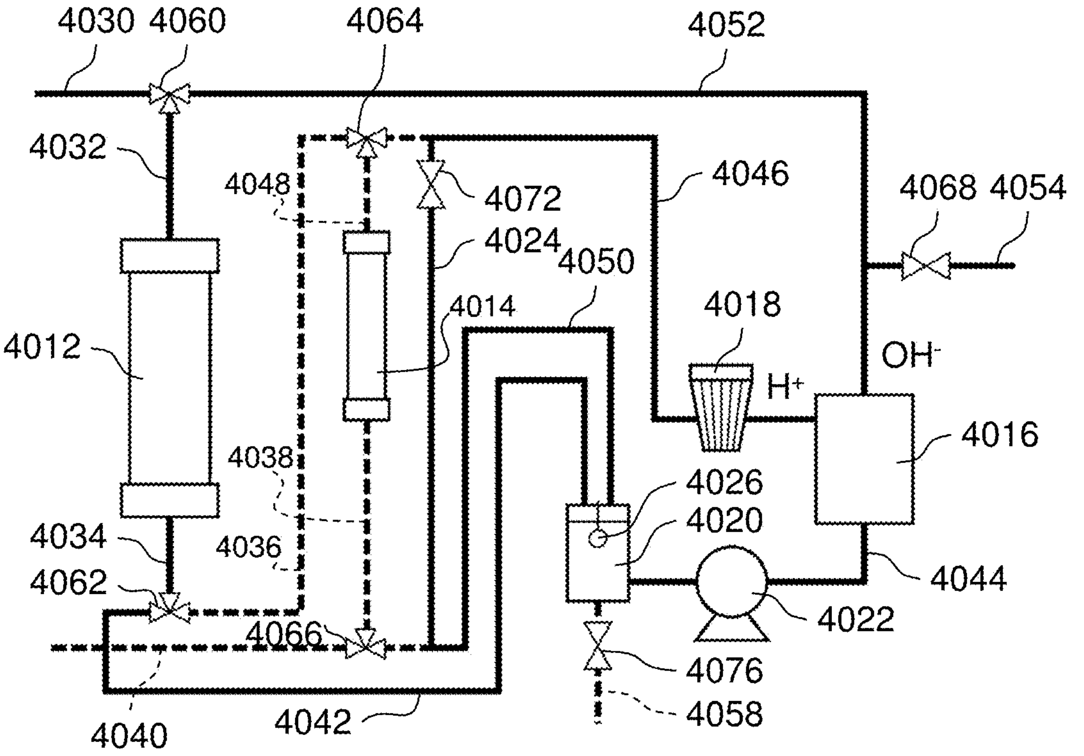
FIG. 39 is a conceptual diagram illustrating a state in which the water softening device according to the fifth exemplary embodiment is washed.

FIG. 39 illustrates a mode in which Aspect 2 and Aspect 3 are applied to the second mode. In FIG. 39, substantially the same components as those in FIG. 34 are denoted by reference numerals. In the mode illustrated in FIG. 39, float switch (detection mechanism) 4026 for detecting that the water stored in tank 4020 has reached a predetermined water level is provided. In addition, first bypass channel 4024 that guides water discharged from electrolyzer 4016 to tank 4020 from the middle of second channel 4046 without passing through neutralizing tank 4014 is provided. Further, open-close valve (switch valve) 4072 that is provided in second channel 4046 and switches a channel to first bypass channel 4024 and a channel to neutralizing tank 4014 is provided. Hereinafter, the operation at the time of washing in the mode illustrated in FIG. 39 will be described.

2b-i) Three-way valve 4064 and three-way valve 4066 are switched, open-close valve 4072 provided in the middle of first bypass channel 4024 is opened, and water is allowed to flow into first bypass channel 4024. In addition, open-close valve 4068 provided in drainage channel 4054 is opened.

2b-ii) Water pump 4022 is turned on.

2b-iii) Three-way valve 4060 and three-way valve 4062 are switched so that the raw water flows into water softening tank 4012, and the obtained acidic softened water is supplied to tank 4020. When the water level exceeds the upper limit value of float switch 4026 of tank 4020, open-close valve 4070 is switched to stop the inflow of the raw water.

2b-iv) Electrolyzer 4016 is turned on so as to have a potential opposite to that at the time of regeneration. That is, acidic electrolytic water is allowed to pass through second channel 4046, and alkaline electrolytic water is allowed to pass through first channel 4052.

2b-v) The acidic electrolytic water generated in electrolyzer 4016 passes through solid separation filter 4018, washes second channel 4046 and solid separation filter 4018, passes through first bypass channel 4024, and is returned to tank 4020 again. The alkaline electrolytic water is discharged from drainage channel 4054.

2b-vi) When the water level falls below the lower limit value of float switch 4026 in tank 4020, three-way valve 4060 is switched to allow raw water to flow in, and when the water level exceeds the upper limit value of float switch 4026 in tank 4020, three-way valve 4060 is switched to stop inflow of tap water. This operation is performed each time according to the water level.

2b-vii) The above washing is performed for a certain period of time.

2b-viii) When the washing is finished, the energization of electrolyzer 4016 is stopped, three-way valve 4060 is switched to stop the inflow of the raw water into water softening tank 4012, water pump 4022 is stopped, and open-close valves 4068, 4070 are closed.

In the mode illustrated in FIG. 39, Aspect 2 and Aspect 3 are applied to the second mode, but Aspect 1 and Aspect 3 may be applied. In that case, washing can be performed by executing the above 2b-i) to 2b-viii) (excluding the above 2b-iv). That is, the power supply of electrolyzer 4016 is turned off, and washing is performed with the acidic softened water obtained in water softening tank 4012.

Figure 40:
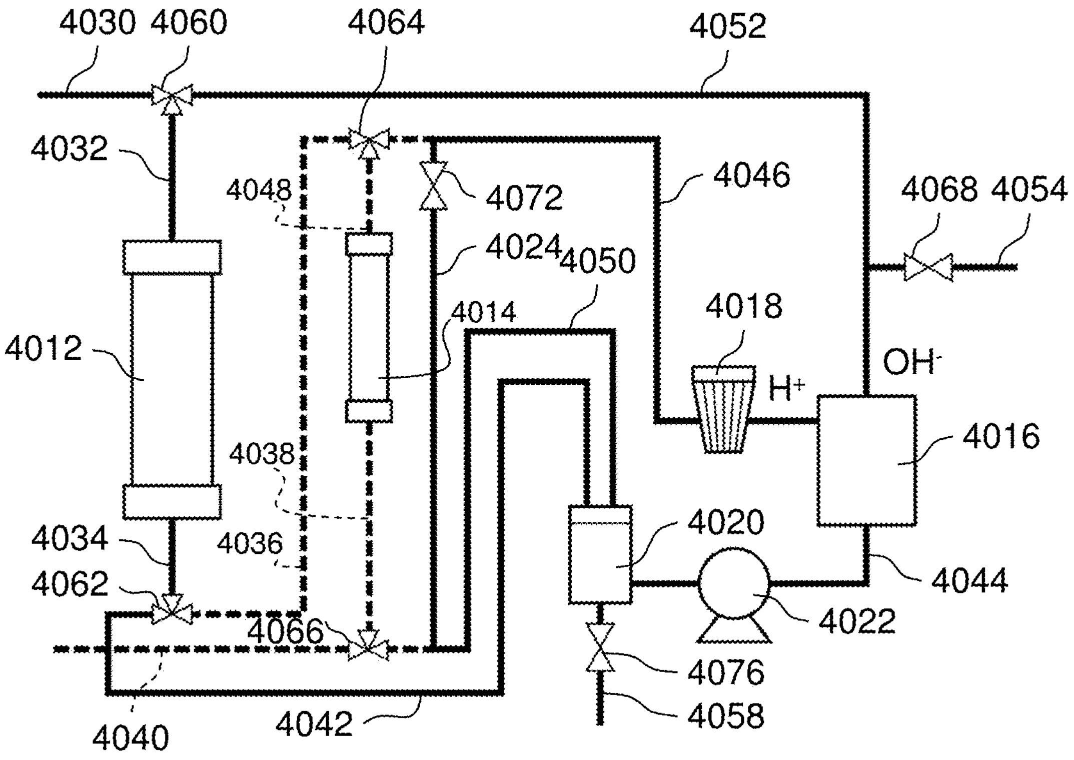
FIG. 40 is a conceptual diagram illustrating a state in which the water softening device according to the fifth exemplary embodiment is washed.

FIG. 40 illustrates a mode in which Aspect 2 and Aspect 4 are applied to the second mode. In FIG. 40, substantially the same components as those in FIG. 34 are denoted by reference numerals. In the mode illustrated in FIG. 40, first bypass channel 4024 for guiding water discharged from electrolyzer 4016 to tank 4020 from the middle of second channel 4046 without passing through neutralizing tank 4014 is provided. In addition, open-close valve (switch valve) 4072 that is provided in second channel 4046 and switches a channel to first bypass channel 4024 and a channel to neutralizing tank 4014 is provided. Further, drainage channel 4058 for discharging water stored in tank 4020 to the outside is provided. Hereinafter, the operation at the time of washing in the mode illustrated in FIG. 40 will be described.

2c-i) Three-way valve 4064 and three-way valve 4066 are switched, open-close valve 4072 provided in the middle of first bypass channel 4024 is opened to allow water to flow into first bypass channel 4024. In addition, open-close valve 4068 provided in drainage channel 4054 is opened.

2c-ii) Water pump 4022 is turned on.

2c-iii) Open-close valve 4076 is opened so that water flows into drainage channel 4058.

2c-iv) Three-way valve 4060 and three-way valve 4062 are switched, the raw water is caused to flow into water softening tank 4012, and the obtained acidic softened water is supplied to tank 4020.

2c-v) Electrolyzer 4016 is turned on so as to have a potential opposite to that at the time of regeneration. That is, acidic electrolytic water is allowed to pass through second channel 4046, and alkaline electrolytic water is allowed to pass through first channel 4052.

2c-vi) The acidic electrolytic water generated in electrolyzer 4016 passes through solid separation filter 4018, washes second channel 4046 and solid separation filter 4018, passes through first bypass channel 4024, and is returned to tank 4020 again. The water stored in tank 4020 is drained from drainage channel 4058. Further, the alkaline electrolytic water is discharged from drainage channel 4054.

2c-vii) The above washing is performed for a certain period of time.

2c-viii) When the washing is finished, the energization of electrolyzer 4016 is stopped, three-way valve 4060 is switched to stop the inflow of the raw water, water pump 4022 is stopped, and open-close valves 4068, 4070 are closed.

Figure 41:
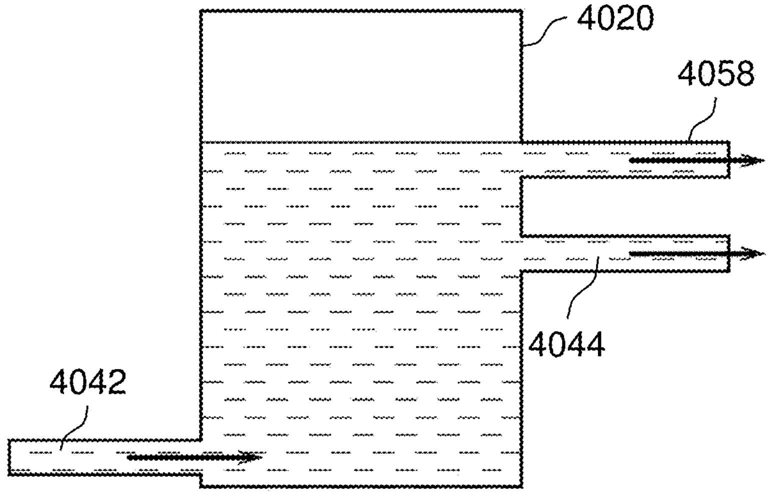
FIG. 41 is a conceptual diagram illustrating a state in which the water softening device according to the fifth exemplary embodiment is washed.

Here, in tank 4020, drainage channel 4058 is preferably connected to a position higher than third channel 4042 and fifth channel 4044. The mode of such tank 4020 is illustrated in FIG. 41. Third channel 4042, fifth channel 4044, and drainage channel 4058 are connected to tank 4020 illustrated in FIG. 41 in this order from the bottom. That is, drainage channel 4058 is connected to a position higher than 4042 and 4044. According to such a configuration, water is not drained unless the water level reaches the connection position of drainage channel 4058. Therefore, more water can be stored in tank 4020, and the inside of tank 4020 can be washed in a wider range. In addition, even when water is excessively supplied into tank 4020, it is possible to avoid an increase in the internal pressure in the tank.

In the mode illustrated in FIG. 40, Aspect 2 and Aspect 4 are applied to the second mode, but Aspect 1 and Aspect 4 may be applied. In that case, washing can be performed by executing the above 2c-i) to 2c-viii) (excluding the above 2c-v). That is, the power supply of electrolyzer 4016 is turned off, and washing is performed with the acidic softened water obtained in water softening tank 4012.

Figure 42:
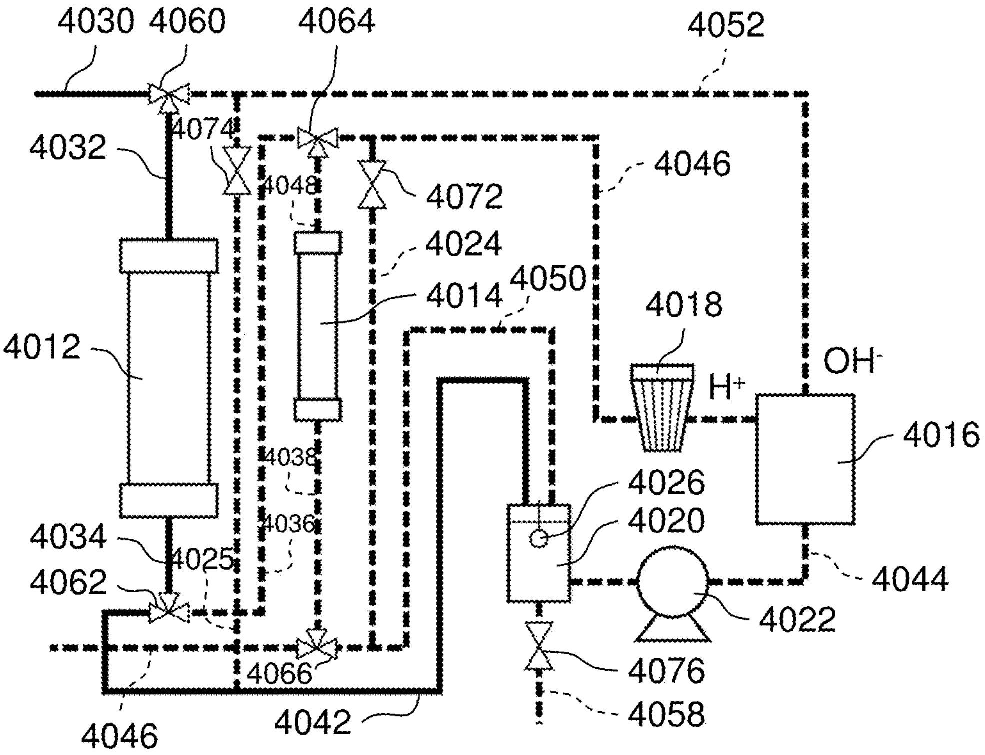
FIG. 42 is a conceptual diagram illustrating a state in which the water softening device according to the fifth exemplary embodiment is washed.
Figure 43:
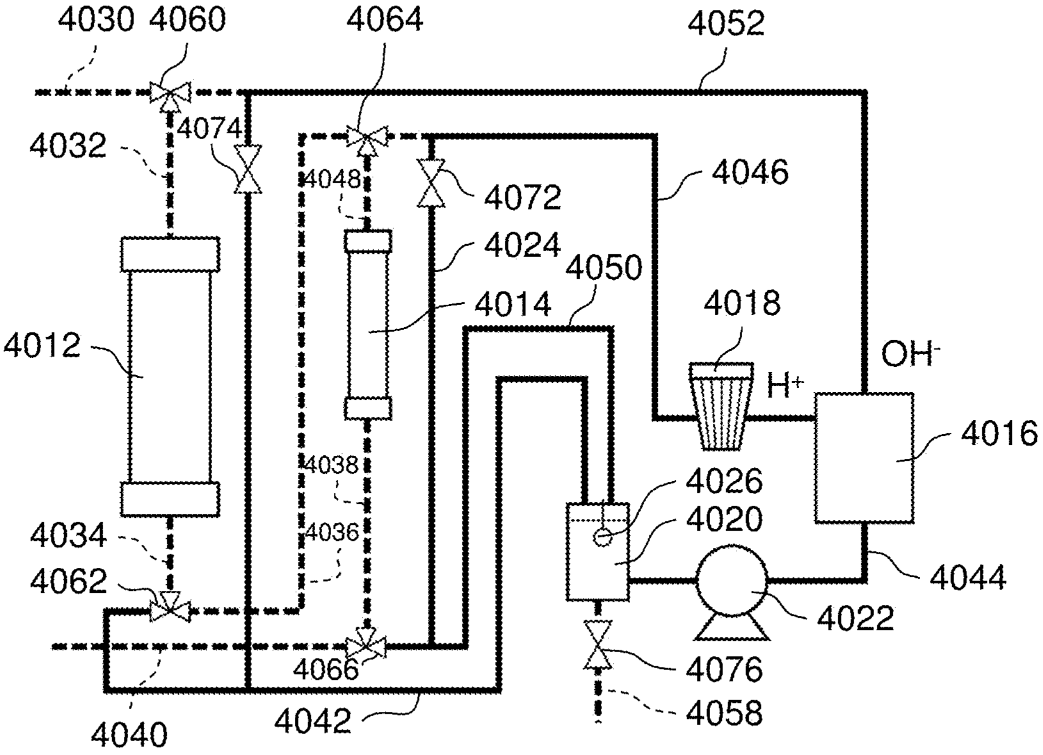
FIG. 43 is a conceptual diagram illustrating a state in which the water softening device according to the fifth exemplary embodiment is washed.

FIGS. 42 and 43 illustrate a mode in which Aspect 2 is applied to the third mode. In the modes illustrated in FIGS. 42 and 43, second bypass channel 4025 for guiding water discharged from electrolyzer 4016 to tank 4020 from the middle of first channel 4052 without passing through water softening tank 4012 is provided. In addition, open-close valve 4074 that is provided in first channel 4052 and switches a channel to second bypass channel 4025 and a channel to water softening tank 4012 is provided. Further, water pump 4022 positioned between tank 4020 and electrolyzer 4016 is provided. When at least Condition (2) is satisfied, at least second channel 4046 is washed, the water stored in tank 4020 is circulated by water pump 4022 through fifth channel 4044 and electrolyzer 4016 in (a) a path for returning the water to tank 4020 through first channel 4052 and second bypass channel 4025, and in (b) a path for returning the water to tank 4020 through second channel 4046 and first bypass channel 4024. Hereinafter, the operation at the time of washing in the mode illustrated in FIGS. 42 and 43 will be described.

3-i) Three-way valve 4060 and three-way valve 4062 are switched, the raw water is caused to flow into water softening tank 4012, and the obtained acidic softened water is supplied to tank 4020. When the water level exceeds the upper limit value of float switch 4026 of tank 4020, open-close valve 4070 is switched to stop the inflow of the raw water (FIG. 43).

3-ii) Three-way valve 4062 is switched, and open-close valve 4074 of second bypass channel 4025 is opened so that water flows into second bypass channel 4025.

3-iii) Water pump 4022 is turned on.

3-iv) Electrolyzer 4016 is turned on so as to have a potential opposite to that at the time of regeneration. That is, acidic electrolytic water is allowed to pass through second channel 4046, and alkaline electrolytic water is allowed to pass through first channel 4052.

3-v) Acidic electrolytic water generated during washing passes through second channel 4046, solid separation filter 4018, and first bypass channel 4024, and alkaline electrolytic water generated during washing passes through first channel 4052 and second bypass channel 4025, and is returned to tank 4020 again. In addition, when the water level falls below the lower limit value of float switch 4026 in tank 4020, three-way valve 4060 is switched to allow raw water to flow in, and when the water level exceeds the upper limit value of float switch 4026 in tank 4020, three-way valve 4060 is switched to stop inflow of tap water. This operation is performed each time according to the water level.

3-vi) The above washing is performed a certain period of time.

3-vii) When the washing is ended, the energization of electrolyzer 4016 is stopped, water pump 4022 is stopped, and open-close valve 4072 of first bypass channel 4024 and open-close valve 4074 of second bypass channel 4025 are closed. In addition, open-close valve 4076 of tank 4020 is opened to drain the water in tank 4020.

Although the fifth exemplary embodiment has been described above, the fifth exemplary embodiment is not limited thereto, and various modifications can be made within the scope of the gist of the fifth exemplary embodiment.

INDUSTRIAL APPLICABILITY

The water softening device according to the present disclosure can be applied to a point-of-use (POU) water purification system or a point-of-entry (POE) water purification system.

REFERENCE MARKS IN THE DRAWINGS

1: water softening device
1*c*: water softening device
2: inlet port
3: water softening tank
3*a*: first water softening tank
3*b*: second water softening tank
3*c*: water softening tank
4: neutralizing tank
4*a*: first neutralizing tank
4*b*: second neutralizing tank
4*c*: neutralizing tank
5 water take-out port
6: regeneration device
7: weakly acidic cation exchange resin
7*a*: first weakly acidic cation exchange resin
7*b*: second weakly acidic cation exchange resin
7*c*: weakly acidic cation exchange resin
8: weakly basic anion exchange resin
8*a*: first weakly basic anion exchange resin
8*b*: second weakly basic anion exchange resin
8*c*: weakly basic anion exchange resin
9: electrolyzer
10: electrode
11: treatment tank
12: water pump
13: filtration part
14: air vent valve
15: controller
20: channel
21: channel
22: channel
23: channel
24: channel
30: circulation channel
30*a*: first circulation channel
30*b*: second circulation channel
31: first supply channel
32: second supply channel
33: first bypass channel
34: second bypass channel
35: first recovery channel
36: second recovery channel
40: water delivery channel
41: on-off valve
42: on-off valve
43: on-off valve
44: on-off valve
45: on-off valve
51: on-off valve
52: on-off valve
53: on-off valve
54: on-off valve
55: on-off valve
56: on-off valve
61: on-off valve
62: on-off valve
1001: water softening device
1001*a*: water softening device
1001*b*: water softening device
1002: inlet port
1003: water softening tank
1003*a*: first water softening tank
1003*b*: second water softening tank
1003*c*: third water softening tank
1004: neutralizing tank
1004*a*: first neutralizing tank
1004*b*: second neutralizing tank
1004*c*: third neutralizing tank
1005: water take-out port
1006: regeneration device
1007: weakly acidic cation exchange resin
1007*a*: first weakly acidic cation exchange resin

1007*b*: second weakly acidic cation exchange resin
1007*c*: third weakly acidic cation exchange resin
1008: weakly basic anion exchange resin
1008*a*: first weakly basic anion exchange resin
1008*b*: second weakly basic anion exchange resin
1008*c*: third weakly basic anion exchange resin
1009: electrolyzer
1010: electrode
1011: separation part
1012: water pump
1013: on-off valve
1014: on-off valve
1015: selection valve
1016: selection valve
1017: selection valve
1018: selection valve
1019: selection valve
1020: selection valve
1021: selection valve
1022: selection valve
1023: selection valve
1024: selection valve
1025: selection valve
1026: selection valve
1027: selection valve
1028: selection valve
1029: selection valve
1030: selection valve
1031: selection valve
1032: selection valve
1033: selection valve
1034: selection valve
1035: selection valve
1036: selection valve
1037: selection valve
1038: selection valve
1039: water softening portion
1039*a*: first water softening portion
1039*b*: second water softening portion
1039*c*: third water softening portion
1040: first drainage port
1041: second drainage port
1042: water storage tank
1043: controller
1044: air vent valve
1045: ion concentration detector
1046*a*: first ion concentration detector
1046*b*: second ion concentration detector
1046*c*: third ion concentration detector
1046*d*: fourth ion concentration detector
1049: channel
1050: channel
1051: channel
1052: channel
1053: channel
1054: channel
1055: channel
1056: channel
1057: channel
1058: channel
1059: channel
1060: channel
1061: channel
1062: channel
1063: channel
1064: channel
1065: channel
1066: channel
1067: channel
1068: channel
1069: channel
1070: channel
1071: channel
1072: channel
1073: channel
1074: channel
1075: channel
1076: channel
1077: channel
1078: channel
1079: channel
1080: channel
1081: channel
1082: channel
1083: channel
1084: channel
1085: channel
1086: channel
1087: channel
1088: channel
1089: channel
1090: channel
1091: channel
1092: channel
1093: channel
1094: channel
1095: channel
1096: channel
1100: water softening channel
1100*a*: first water softening channel
1100*b*: second water softening channel
1100*c*: third water softening channel
1101: water storage channel
1101*a*: first water storage channel
1101*b*: second water storage channel
1101*c*: third water storage channel
1102: acidic electrolytic water circulation channel
1102*a*: first acidic electrolytic water circulation channel
1102*b*: second acidic electrolytic water circulation channel
1102*c*: third acidic electrolytic water circulation channel
1103: alkaline electrolytic water circulation channel
1103*a*: first alkaline electrolytic water circulation channel
1103*b*: second alkaline electrolytic water circulation channel
1103*c*: third alkaline electrolytic water circulation channel
2001: water softening device
2001*a*: water softening device
2001*b*: water softening device
2002: inlet port
2003: water softening tank
2004: neutralizing tank
2005: water take-out port
2006: regeneration device
2007: channel
2008: channel
2009: channel
2010: weakly acidic cation exchange resin
2011: weakly basic anion exchange resin
2012: electrolyzer
2013: electrode
2013*a*: electrode
2013*b*: electrode

2014: separation part
2015: water storage tank
2016: first drainage port
2017: selection valve
2018: second drainage port
2019: selection valve
2020: water pump
2021: circulation channel
2021*a*: first circulation channel
2021*b*: second circulation channel
2022: first supply channel
2022*a*: first supply channel
2022*b*: first supply channel
2023: first recovery channel
2024: second supply channel
2024*a*: second supply channel
2024*b*: second supply channel
2025: second recovery channel
2026: washing channel
2026*a*: first washing channel
2026*b*: second washing channel
2027: on-off valve
2028: on-off valve
2029: on-off valve
2030: on-off valve
2031: on-off valve
2032: on-off valve
2033: on-off valve
2034: on-off valve
2035: controller
2036: water delivery channel
2037: first drainage channel
2038: second drainage channel
2039: ion concentration detector
2040: water storage tank separation part
3001: water softening device
3001*a*: water softening device
3001*b*: water softening device
3001*c*: water softening device
3002: inlet port
3003: water softening tank
3004: neutralizing tank
3005: water take-out port
3006: regeneration device
3007: channel
3008: channel
3009: channel
3010: weakly acidic cation exchange resin
3011: weakly basic anion exchange resin
3012: electrolyzer
3013: electrode
3013*a*: electrode
3013*b*: electrode
3014: separation part
3015: water storage tank
3016: drainage port
3017: controller
3019: water pump
3020: circulation channel
3020*a*: first circulation channel
3020*b*: second circulation channel
3020*c*: circulation channel
3020*d*: first circulation channel
3020*e*: second circulation channel
3021: first supply channel
3022: first recovery channel
3023: second supply channel
3024: second recovery channel
3025: water delivery channel
3026: drainage channel
3026*a*: drainage channel
3027: separation part washing channel
3027*a*: separation part washing channel
3027*b*: separation part washing channel
3028: raw water softening channel
3029: channel
3031: on-off valve
3032: on-off valve
3033: on-off valve
3034: on-off valve
3035: on-off valve
3036: on-off valve
3037: on-off valve
3038: on-off valve
3039: on-off valve
3040: selection valve
3041: on-off valve
3041*a*: on-off valve
3042: on-off valve
3043: on-off valve
3044: on-off valve
3045: ion concentration detector
4101: water softening device
4102: water softening device
4200: water softening device
4012: water softening tank
4014: neutralizing tank
4016: electrolyzer
4018: solid separation filter
4020: tank
4022: water pump
4024: first bypass channel
4025: second bypass channel
4030: channel
4032: channel
4034: channel
4036: channel
4038: channel
4040: channel
4041: faucet
4042: third channel
4044: fifth channel
4046: second channel
4048: channel
4050: fourth channel
4052: first channel
4054: drainage channel
4056: drainage channel
4058: drainage channel
4060, 4062, 4064, 4066: three-way valve (switch valve)
4068, 4070, 4072, 4074, 4076: open-close valve (switch valve)
4082: channel
4096: channel
4098: channel

The invention claimed is:

1. A water softening device comprising:

an inlet port to receive raw water from an outside source;

a water softening tank comprising a first water softening tank and a second water softening tank, wherein the first and second water softening tanks soften the raw water containing a hardness component by a weakly acidic cation exchange resin; and a neutralizing tank comprising a first neutralizing tank and a second neutralizing tank wherein:

the first and second neutralizing tanks neutralize softened water that has passed through the water softening tank by a weakly basic anion exchange resin, and the raw water flows through the first water softening tank, the first neutralizing tank, the second water softening tank, and the second neutralizing tank in this order.

2. The water softening device according to claim 1, further comprising:

an electrolyzer that generates acidic electrolytic water for regenerating the weakly acidic cation exchange resin in the water softening tank and alkaline electrolytic water for regenerating the weakly basic anion exchange resin in the neutralizing tank; and a treatment tank that mixes the acidic electrolytic water having flowed through the water softening tank and the alkaline electrolytic water having flowed through the neutralizing tank to generate mixture, and supplies the mixture to the electrolyzer.

3. The water softening device according to claim 2, wherein, in a regeneration treatment for regenerating the weakly acidic cation exchange resin, the acidic electrolytic water fed from the electrolyzer flows through the second water softening tank and then flows through the first water softening tank.

4. The water softening device according to claim 3, wherein, during the regeneration treatment, the acidic electrolytic water is introduced into the first water softening tank and the second water softening tank from downstream sides of the first water softening tank and the second water softening tank.

* * * * *